US011775248B2

(12) United States Patent
Sepulveda et al.

(10) Patent No.: US 11,775,248 B2
(45) Date of Patent: Oct. 3, 2023

(54) SYSTEMS AND METHODS FOR INITIATING AND INTERACTING WITH A COMPANION-DISPLAY MODE FOR AN ELECTRONIC DEVICE WITH A TOUCH-SENSITIVE DISPLAY

(71) Applicant: Apple Inc., Cupertino, CA (US)

(72) Inventors: Raymond S. Sepulveda, Portland, OR (US); Chun Kin Minor Wong, San Jose, CA (US); John O. Louch, Boulder, CO (US); Christopher N. Ryan, Boulder, CO (US); Kevin J. Van Vechten, Montecito, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/667,484

(22) Filed: Feb. 8, 2022

(65) Prior Publication Data

US 2022/0164152 A1 May 26, 2022

Related U.S. Application Data

(63) Continuation of application No. 16/582,765, filed on Sep. 25, 2019, now Pat. No. 11,416,205.
(Continued)

(51) Int. Cl.
*G06F 3/147* (2006.01)
*G06F 3/0482* (2013.01)
(Continued)

(52) U.S. Cl.
CPC ............ *G06F 3/147* (2013.01); *G06F 3/0416* (2013.01); *G06F 3/0482* (2013.01);
(Continued)

(58) Field of Classification Search
None
See application file for complete search history.

(56) References Cited

U.S. PATENT DOCUMENTS 9,639,623 B2 * 5/2017 Lund .................... G06F 16/954
2004/0250205 A1 12/2004 Conning
(Continued)

FOREIGN PATENT DOCUMENTS

EP 2 658 228 A1 10/2013
EP 3 190 786 A2 7/2017

OTHER PUBLICATIONS

Office Action, dated Jan. 8, 2021, received in U.S. Appl. No. 16/582,765, 24 pages.
(Continued)

*Primary Examiner* — Mandrita Brahmachari
(74) *Attorney, Agent, or Firm* — Morgan, Lewis & Bockius LLP

(57) ABSTRACT

An example method includes, at a first electronic device that includes a display, displaying, on the display, a user interface that is associated with an application, the user interface displayed with a control user interface element for changing a display property of the user interface. The method includes, detecting an input directed to the control user interface element. The method also includes that in response to detecting the input, and while continuing to display the user interface, concurrently displaying on the display: a first selectable option for changing the display property of the user interface on the display of the first electronic device, and a second selectable option for requesting display at a second electronic device, distinct from the first electronic device, of a user interface that includes content from the user interface.

30 Claims, 140 Drawing Sheets

Related U.S. Application Data

(60) Provisional application No. 62/844,087, filed on May 6, 2019, provisional application No. 62/834,958, filed on Apr. 16, 2019.

(51) Int. Cl.

| | |
|---|---|
| ***G06F 3/04847*** | (2022.01) |
| ***G06F 3/04883*** | (2022.01) |
| ***G06F 3/04817*** | (2022.01) |
| ***G06F 3/04845*** | (2022.01) |
| ***G06F 3/041*** | (2006.01) |
| ***G06F 3/0486*** | (2013.01) |

(52) U.S. Cl.

CPC ........ *G06F 3/0486* (2013.01); *G06F 3/04817* (2013.01); *G06F 3/04845* (2013.01); *G06F 3/04847* (2013.01); *G06F 3/04883* (2013.01); *G06F 2203/04803* (2013.01); *G06F 2203/04808* (2013.01)

(56) References Cited

U.S. PATENT DOCUMENTS

| | | | | |
|---|---|---|---|---|
| 2005/0278649 | A1* | 12/2005 | McGlennon | G06F 3/0481 715/779 |
| 2006/0136828 | A1 | 6/2006 | Asano | |
| 2006/0221190 | A1* | 10/2006 | Limberis | G06F 16/4393 348/207.1 |
| 2009/0010485 | A1* | 1/2009 | Lamb | H04N 7/147 382/100 |
| 2011/0131520 | A1* | 6/2011 | Al-Shaykh | H04L 12/2809 715/771 |
| 2011/0276911 | A1 | 11/2011 | Choi | |
| 2012/0117193 | A1* | 5/2012 | Phillips | H04W 36/36 709/219 |
| 2013/0219283 | A1 | 8/2013 | Ryu et al. | |
| 2013/0254291 | A1 | 9/2013 | Park et al. | |
| 2014/0006974 | A1* | 1/2014 | Bell | H04L 12/1822 715/753 |
| 2014/0053078 | A1* | 2/2014 | Kannan | H04W 4/023 715/748 |
| 2014/0122644 | A1* | 5/2014 | Kusch | H04L 67/06 709/217 |
| 2014/0165003 | A1 | 6/2014 | Branton et al. | |
| 2014/0310643 | A1 | 10/2014 | Karmanenko et al. | |
| 2014/0320425 | A1 | 10/2014 | Jeong et al. | |
| 2015/0339090 | A1 | 11/2015 | Lee et al. | |
| 2015/0350590 | A1* | 12/2015 | Micewicz | H04N 21/42201 386/230 |
| 2016/0055221 | A1 | 2/2016 | Paquette et al. | |
| 2016/0357421 | A1 | 12/2016 | Milden et al. | |
| 2017/0207859 | A1 | 7/2017 | Kim | |
| 2017/0235435 | A1 | 8/2017 | Sohn et al. | |
| 2019/0339855 | A1 | 11/2019 | Walkin et al. | |
| 2020/0333994 | A1 | 10/2020 | Sepulveda et al. | |

OTHER PUBLICATIONS

Final Office Action, dated Jul. 26, 2021, received in U.S. Appl. No. 16/582,765, 24 pages.

Notice of Allowance, dated Dec. 16, 2021, received in U.S. Appl. No. 16/582,765, 8 pages.

Invitation to Pay Additional Fees, dated Jul. 1, 2020, received in International Patent Application No. PCT/US2020/026309, which corresponds with U.S. Appl. No. 16/582,765, 16 pages.

International Search Report and Written Opinion, dated Aug. 24, 2020, received in International Patent Application No. PCT/US2020/026309, which corresponds with U.S. Appl. No. 16/582,765, 20 pages.

Notice of Allowance, dated Mar. 30, 2022, received in U.S. Appl. No. 16/582,765, 8 pages.

Intent to Grant, dated Jul. 5, 2023, received in European Patent Application No. 20722084.9, which corresponds with U.S. Appl. No. 16/582,765, 10 pages.

* cited by examiner

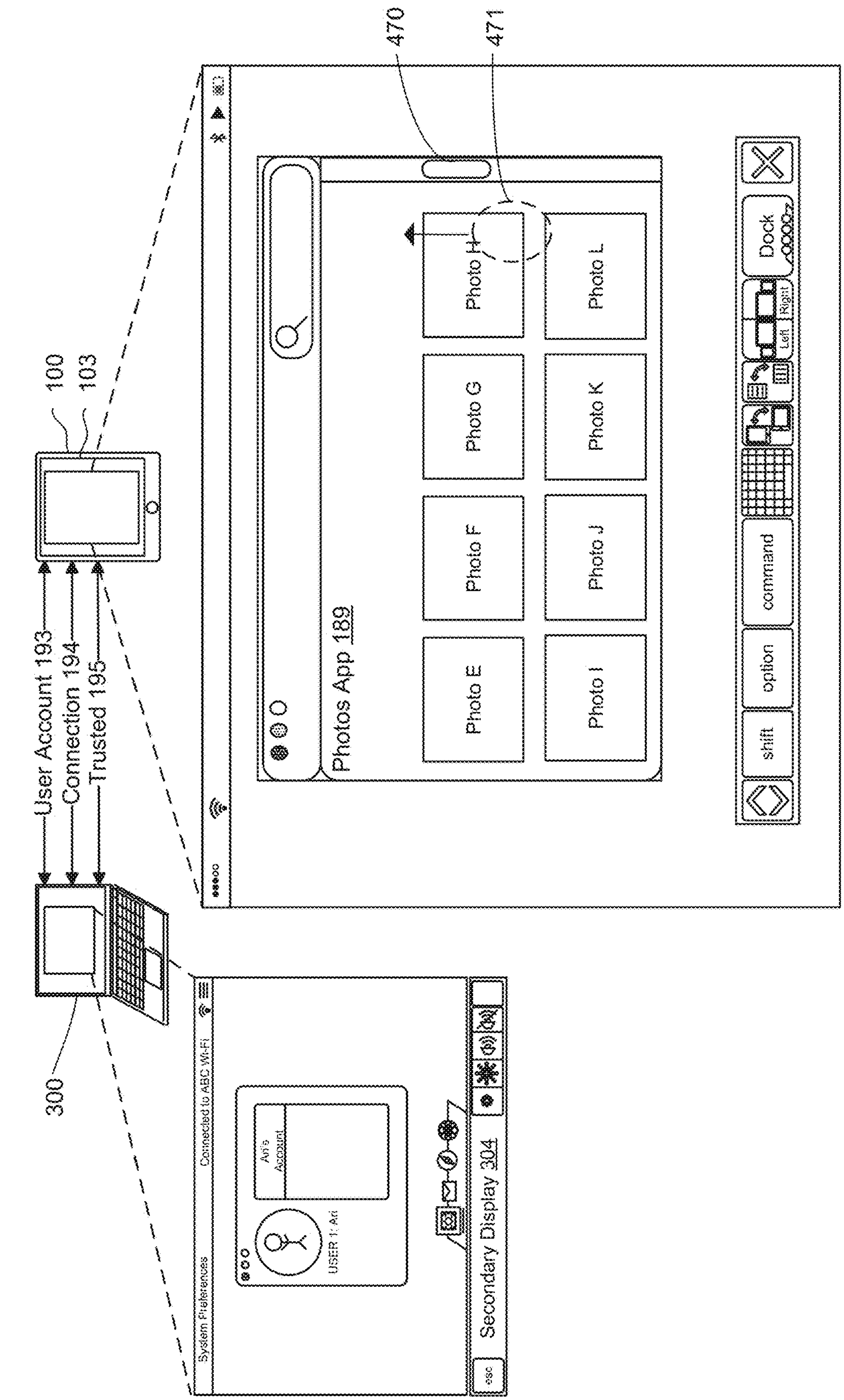
Figure 4AAA

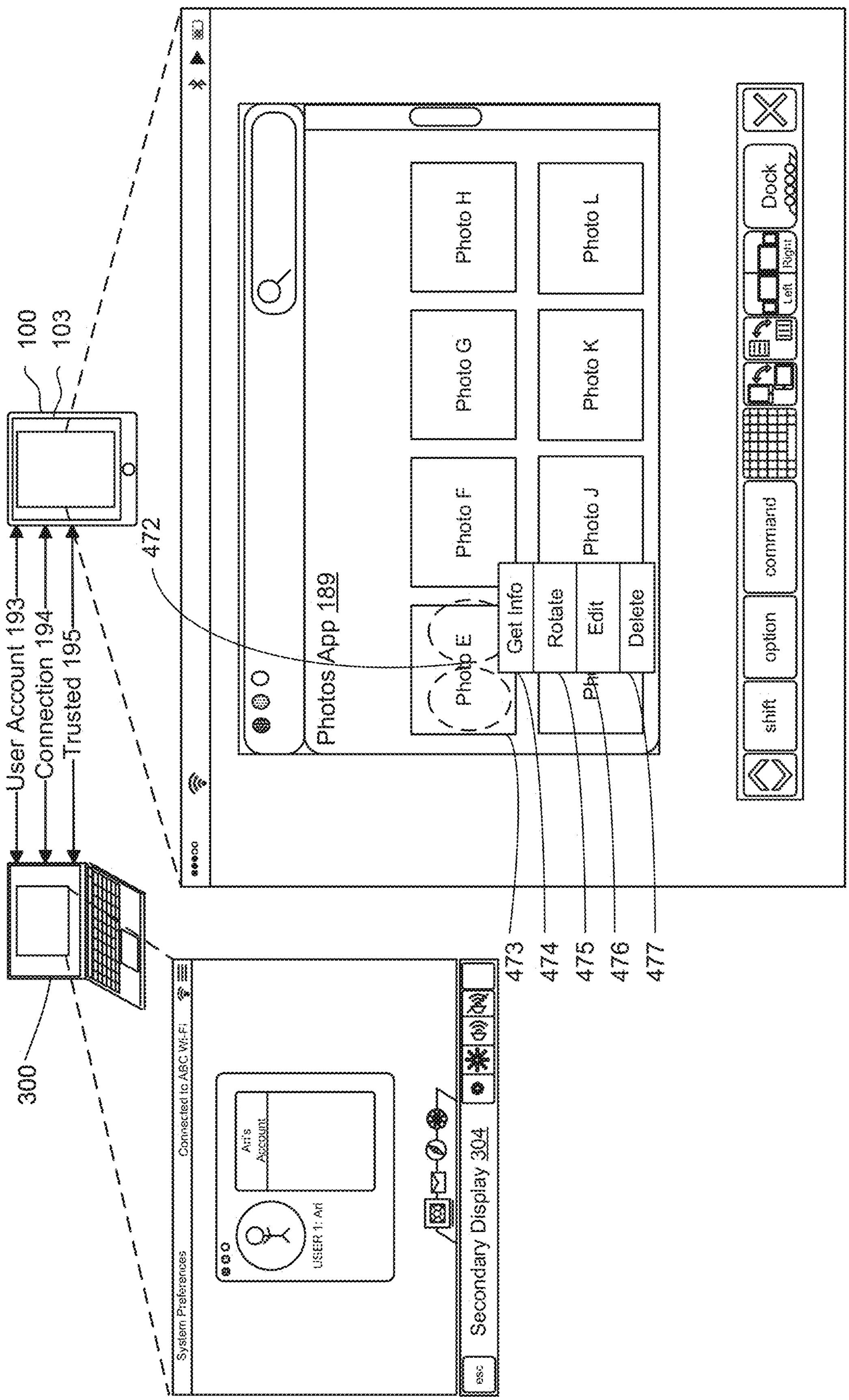
Figure 4BBB

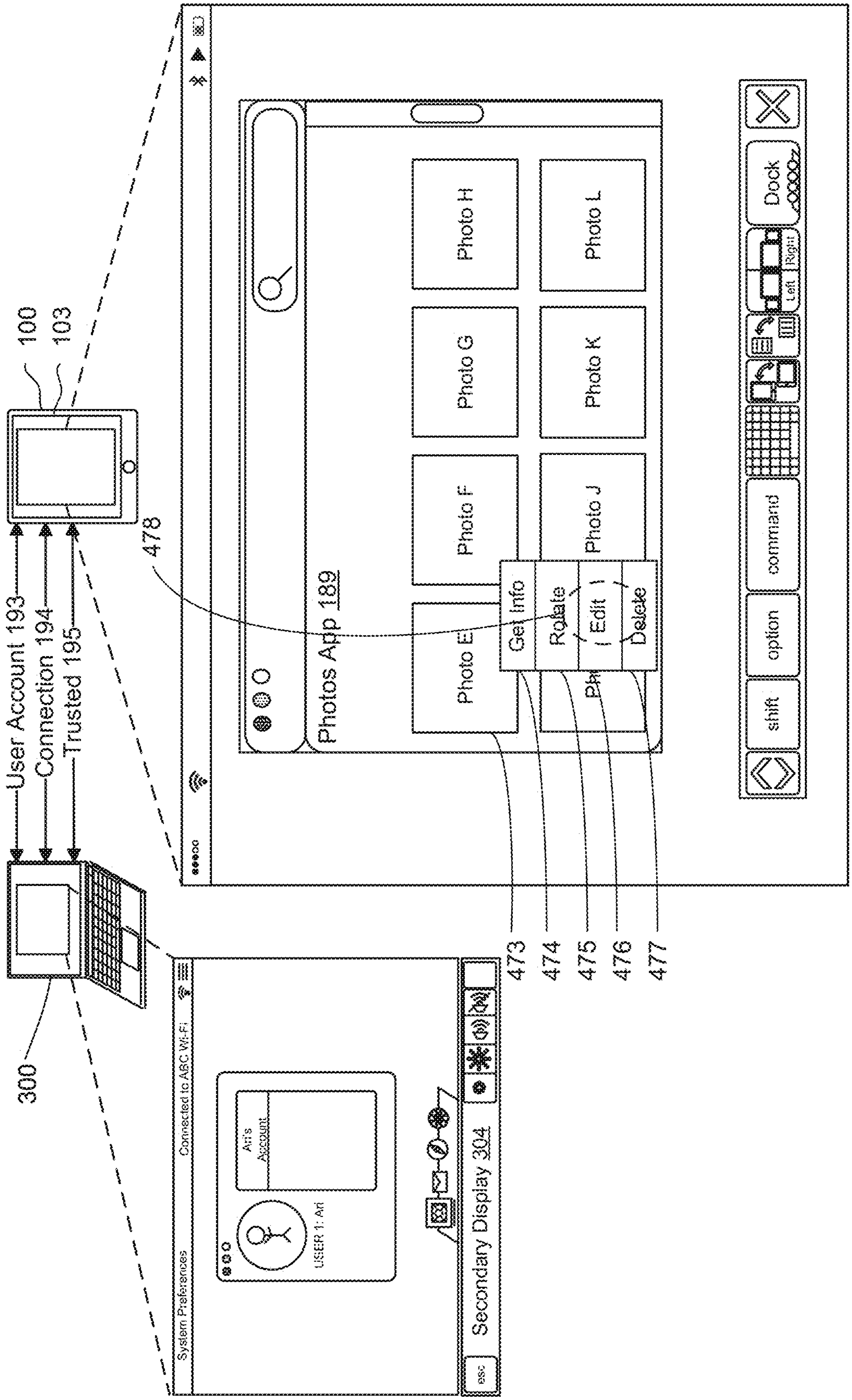
Figure 4CCC

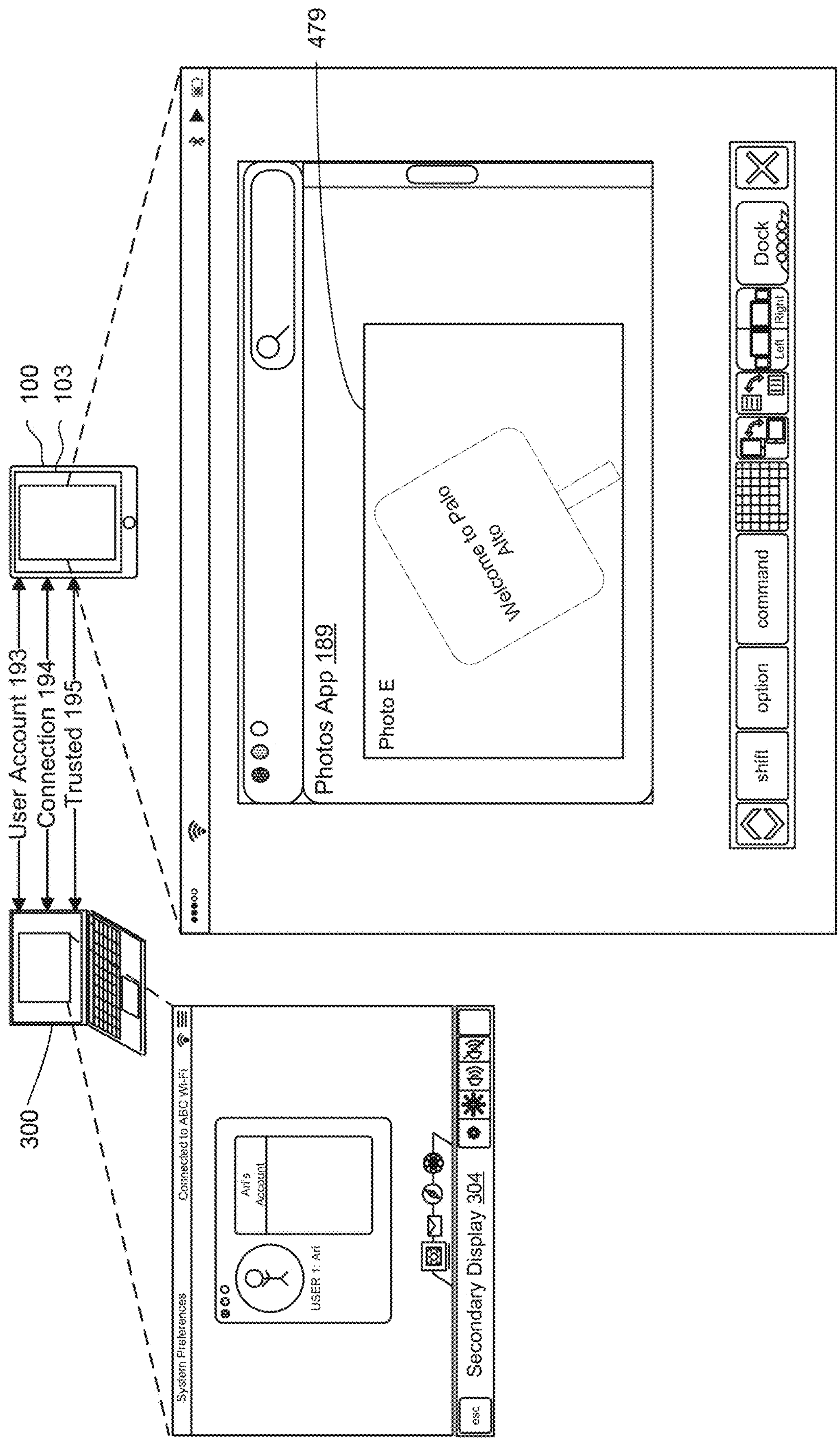
Figure 4DDD

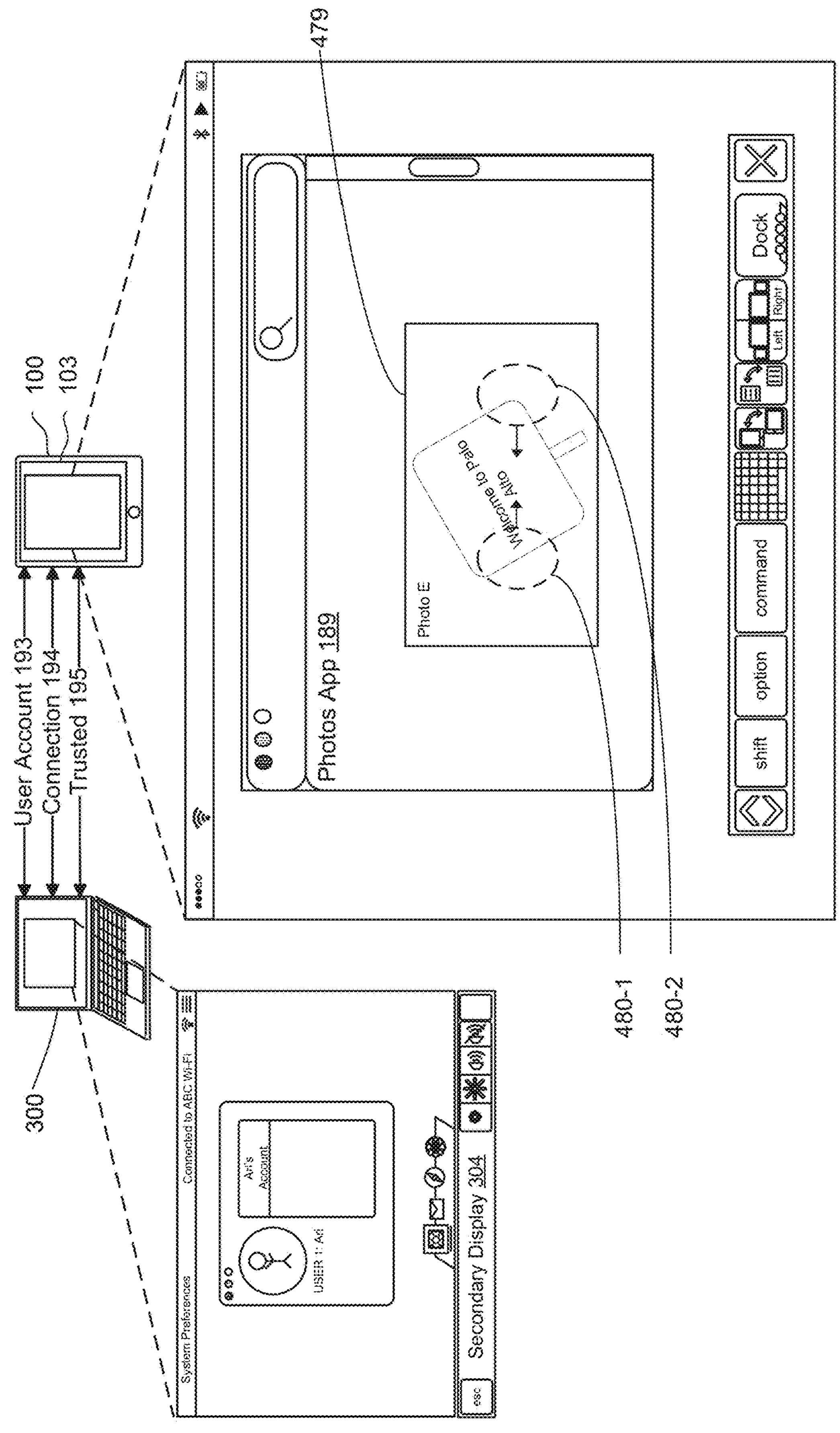
Figure 4EEE

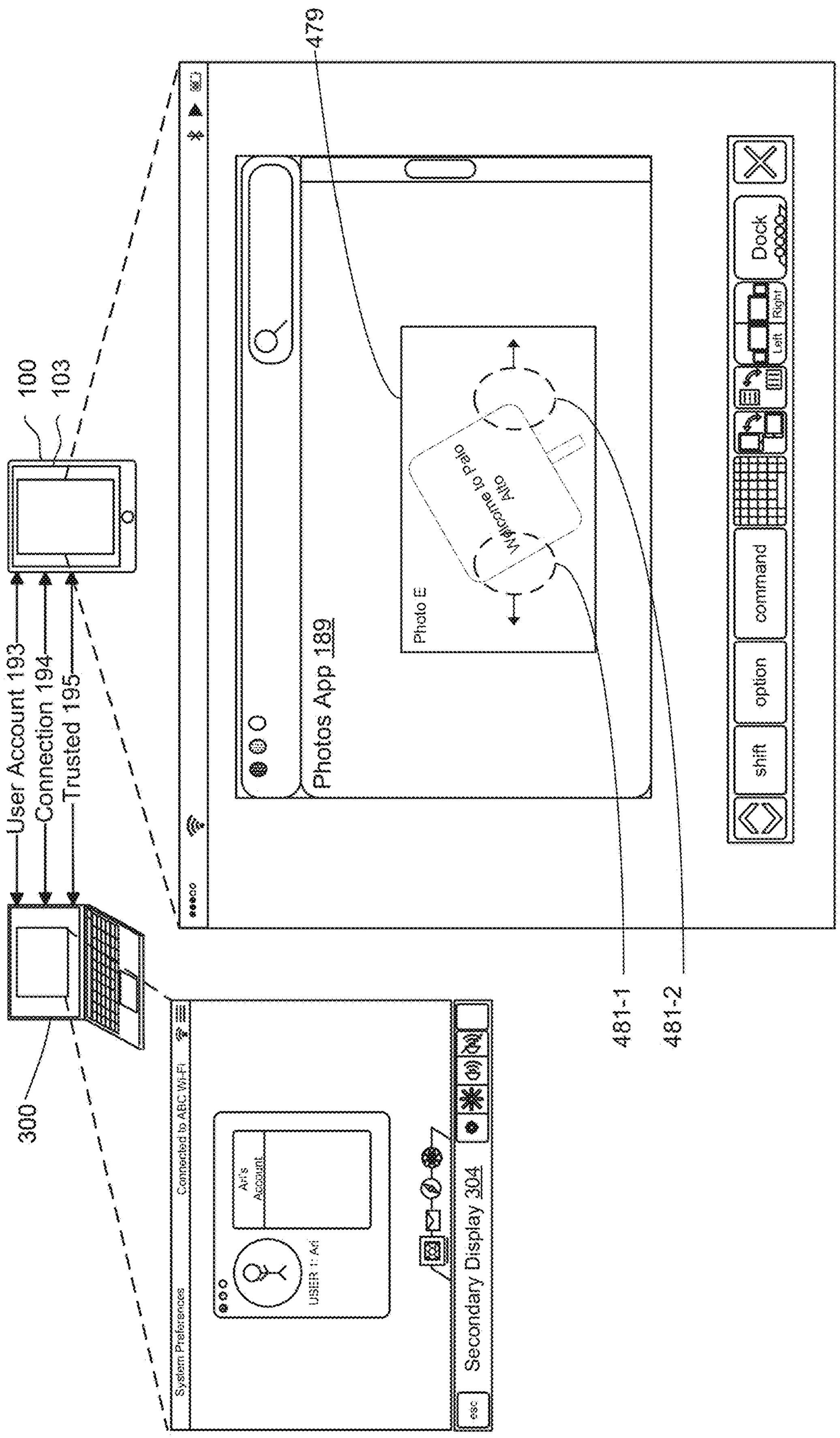
Figure 4FFF

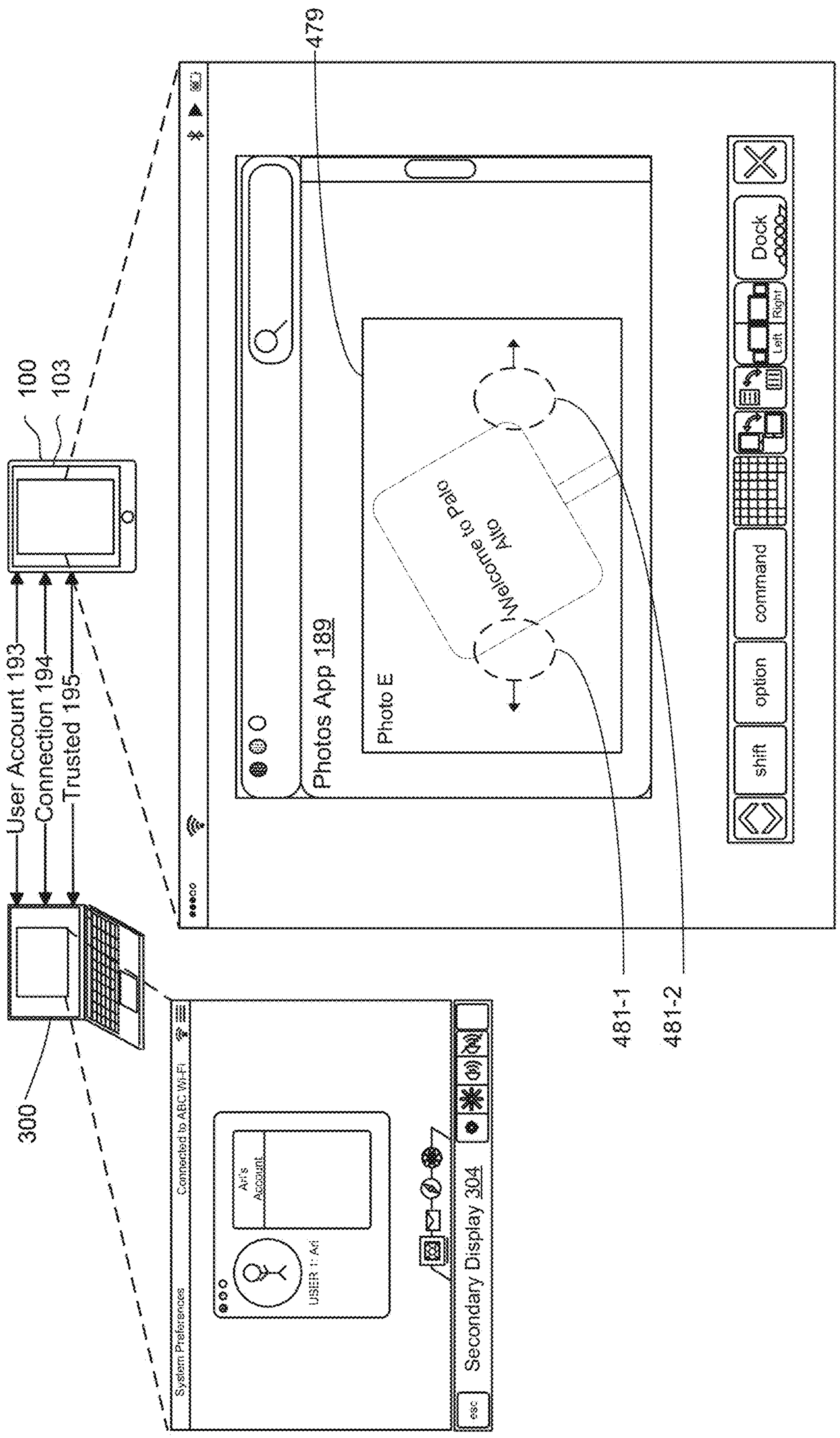
Figure 4GGG

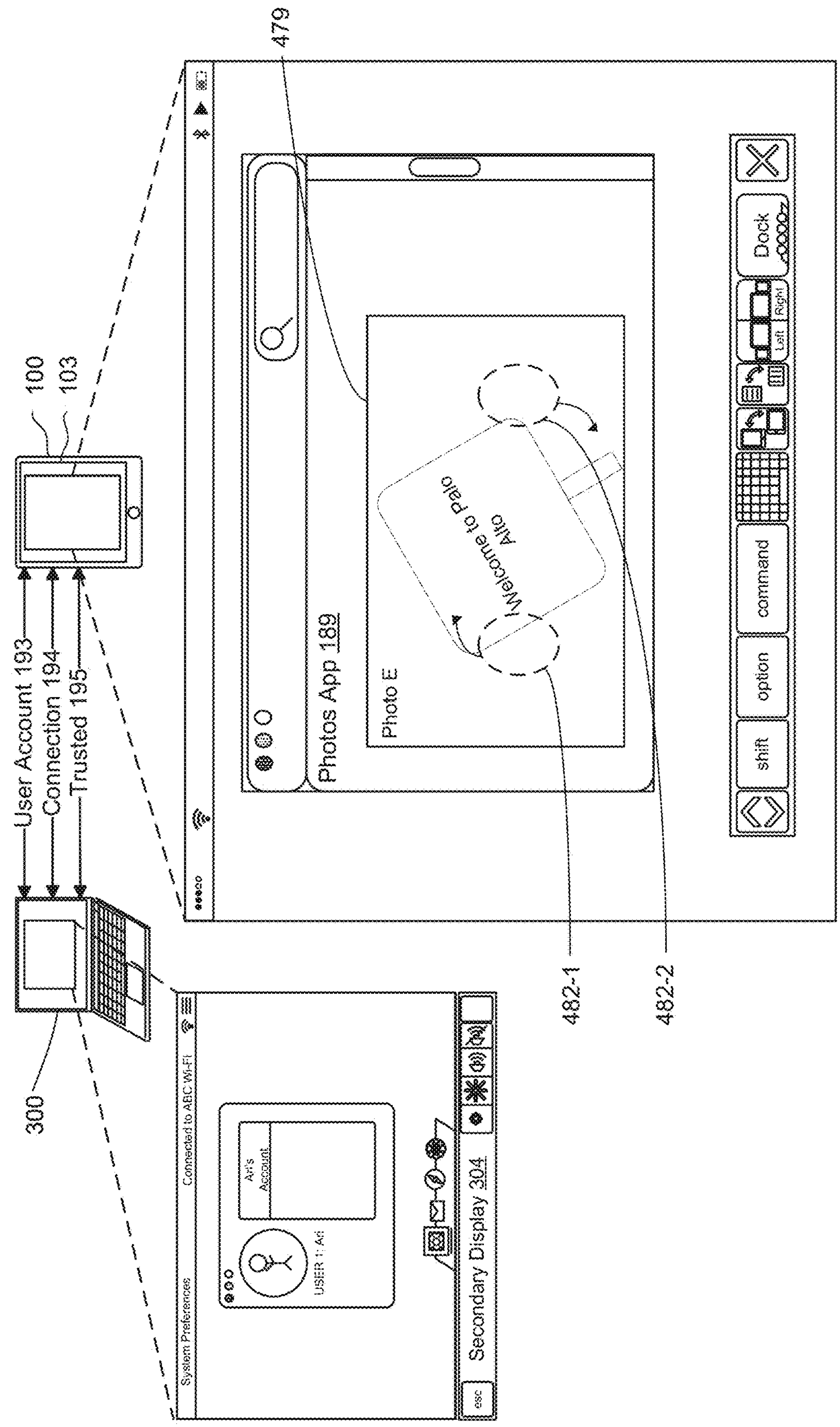
Figure 4HHH

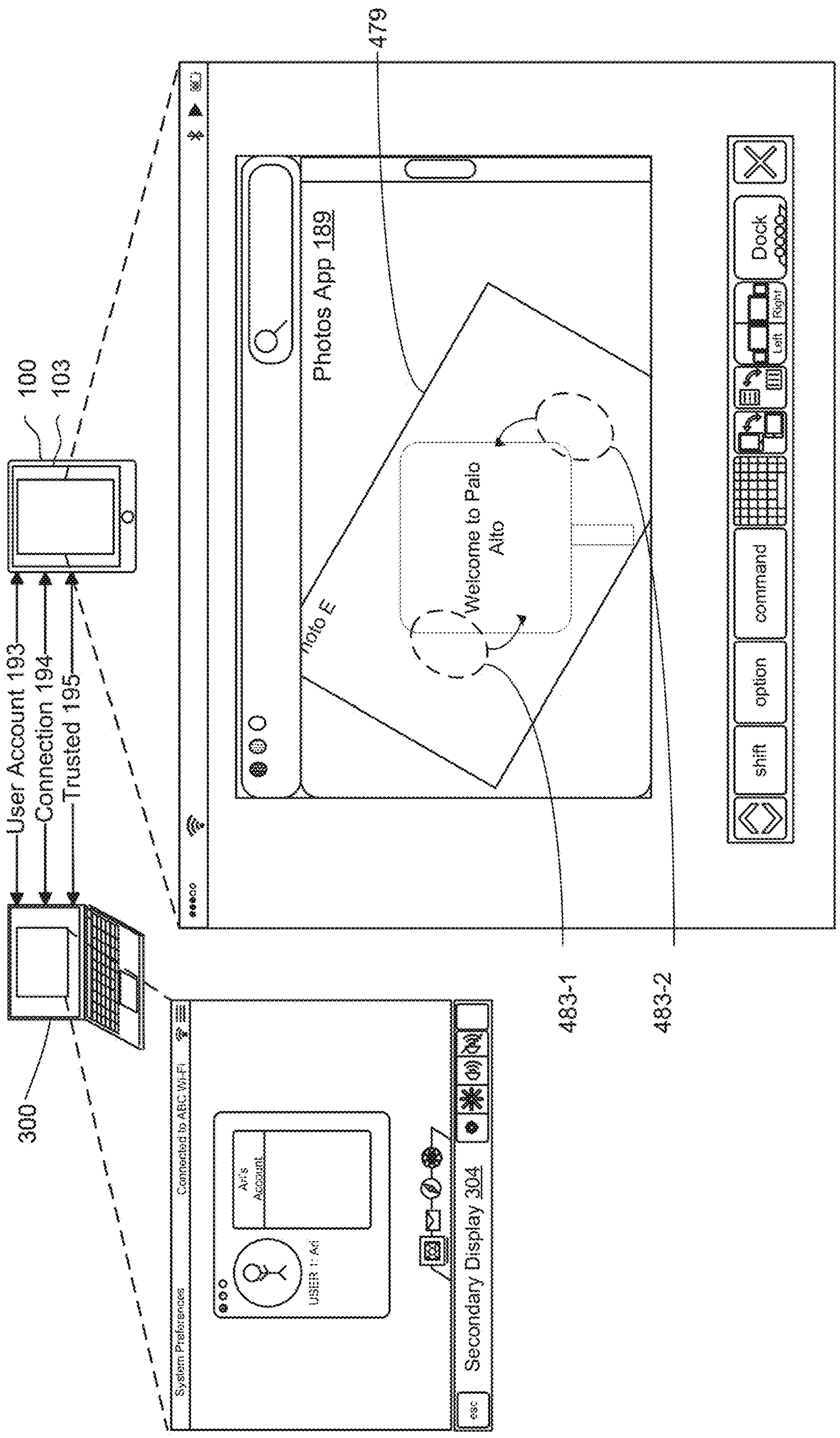
Figure 4III

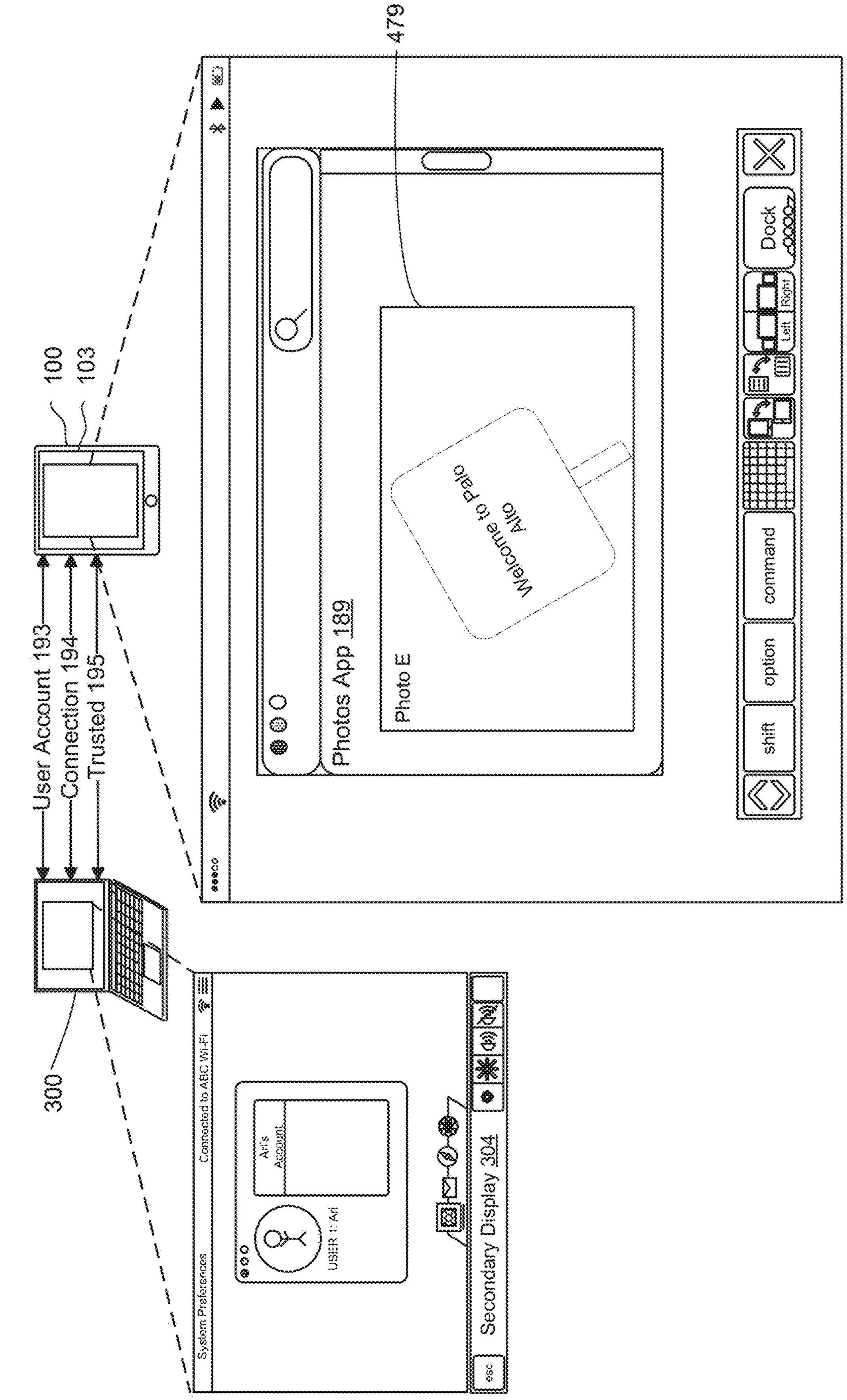
Figure 4JJJ

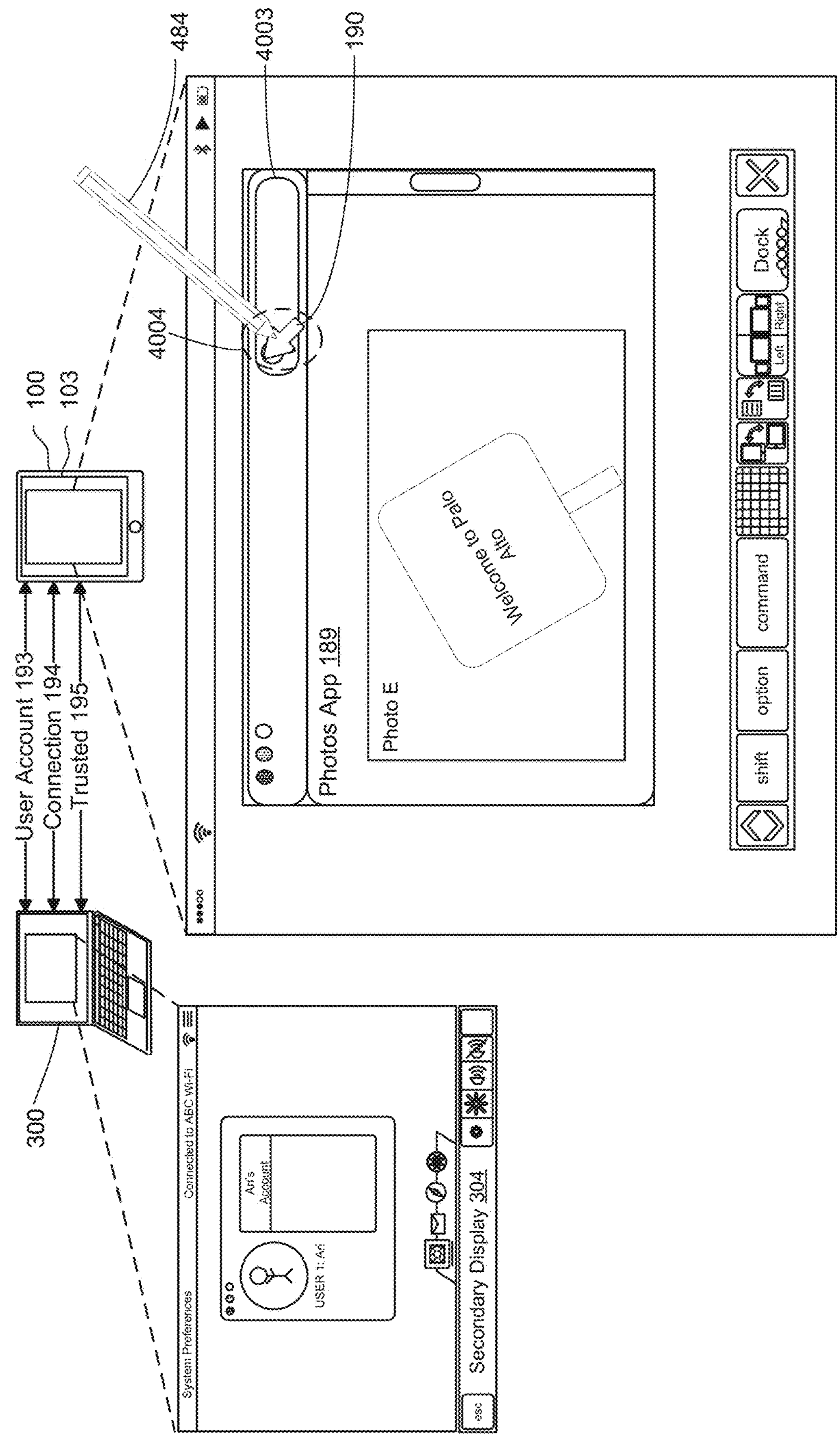
Figure 4KKK

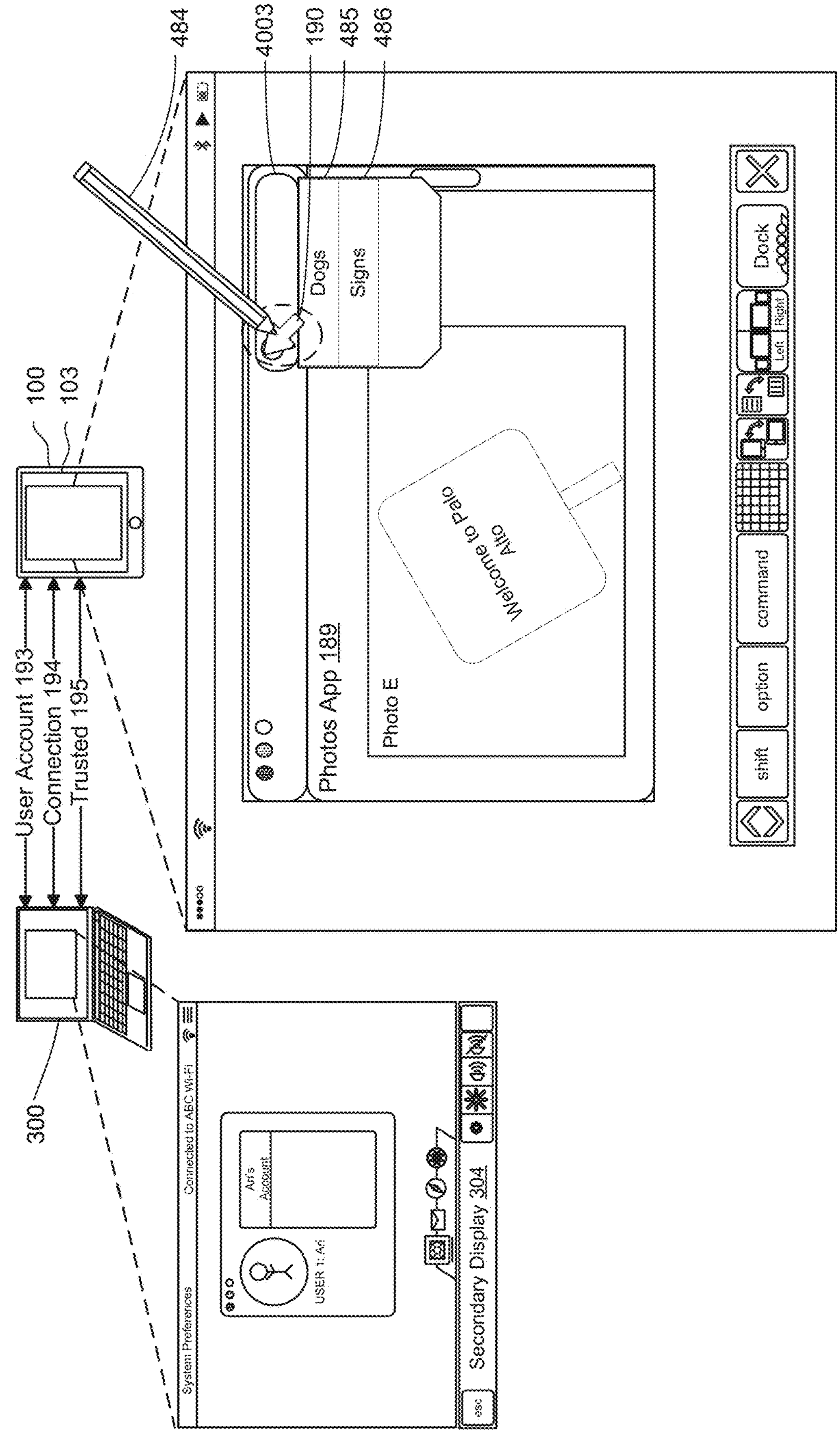
Figure 4LLL

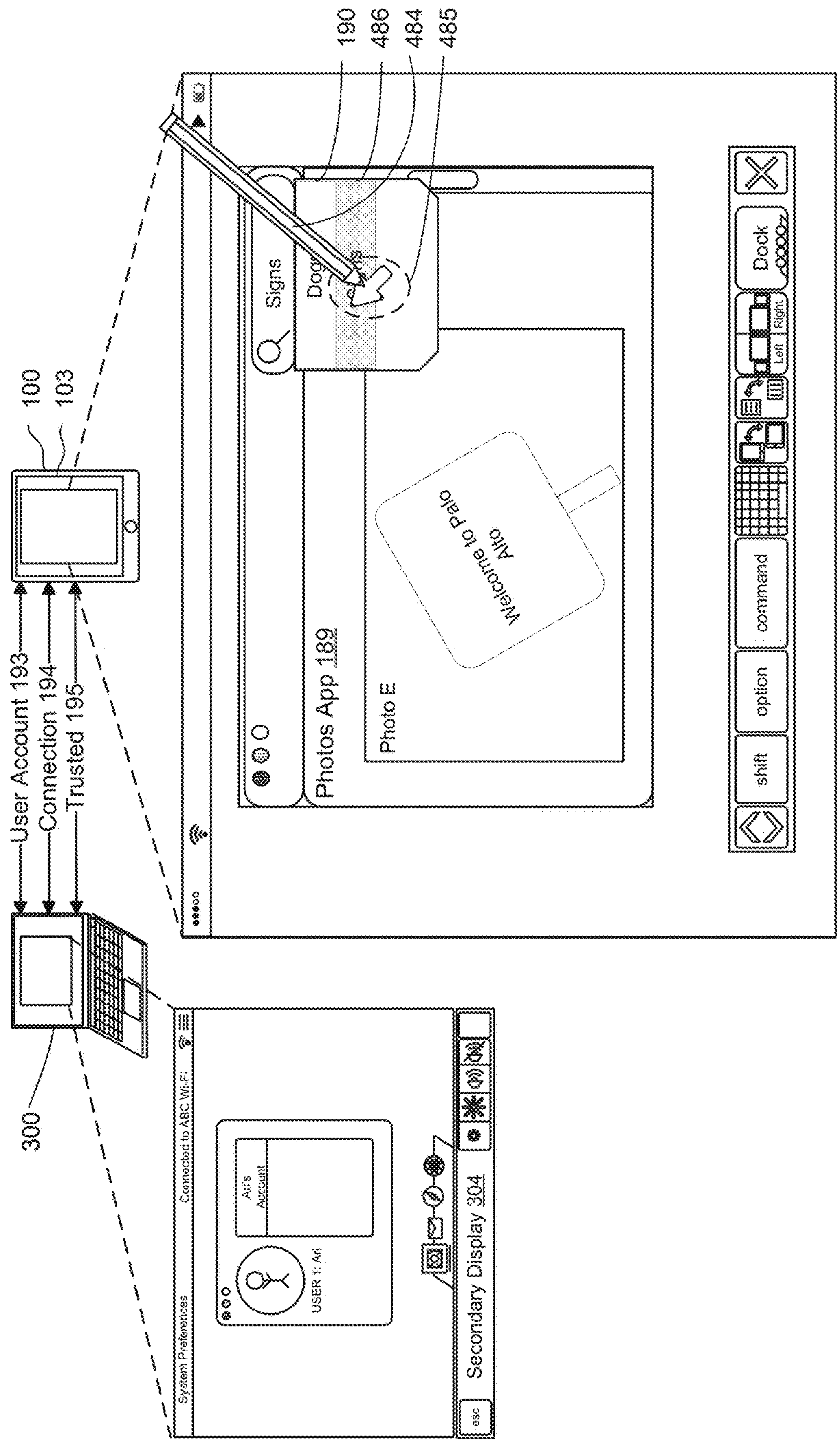
Figure 4MMM

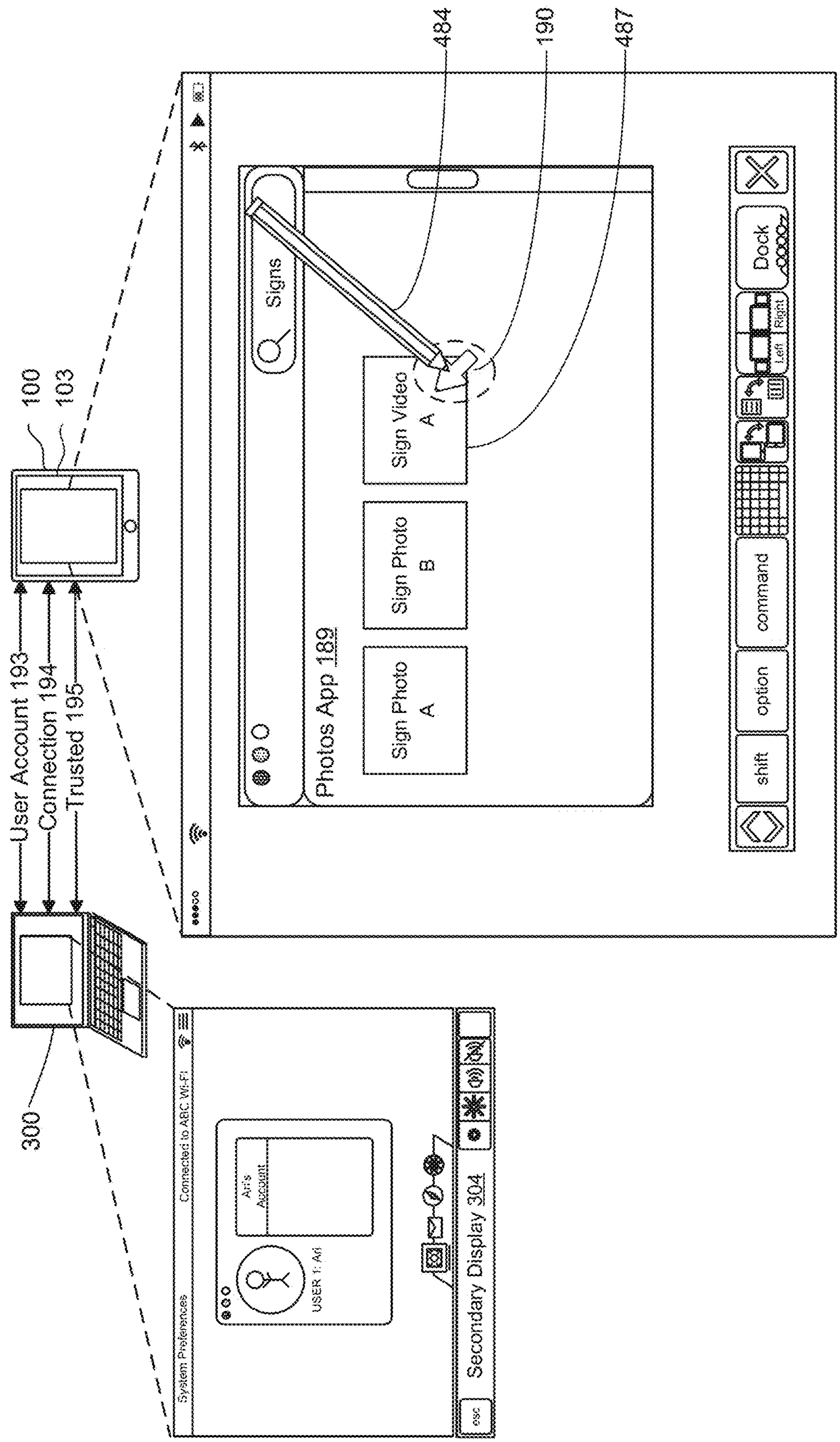
Figure 4NNN

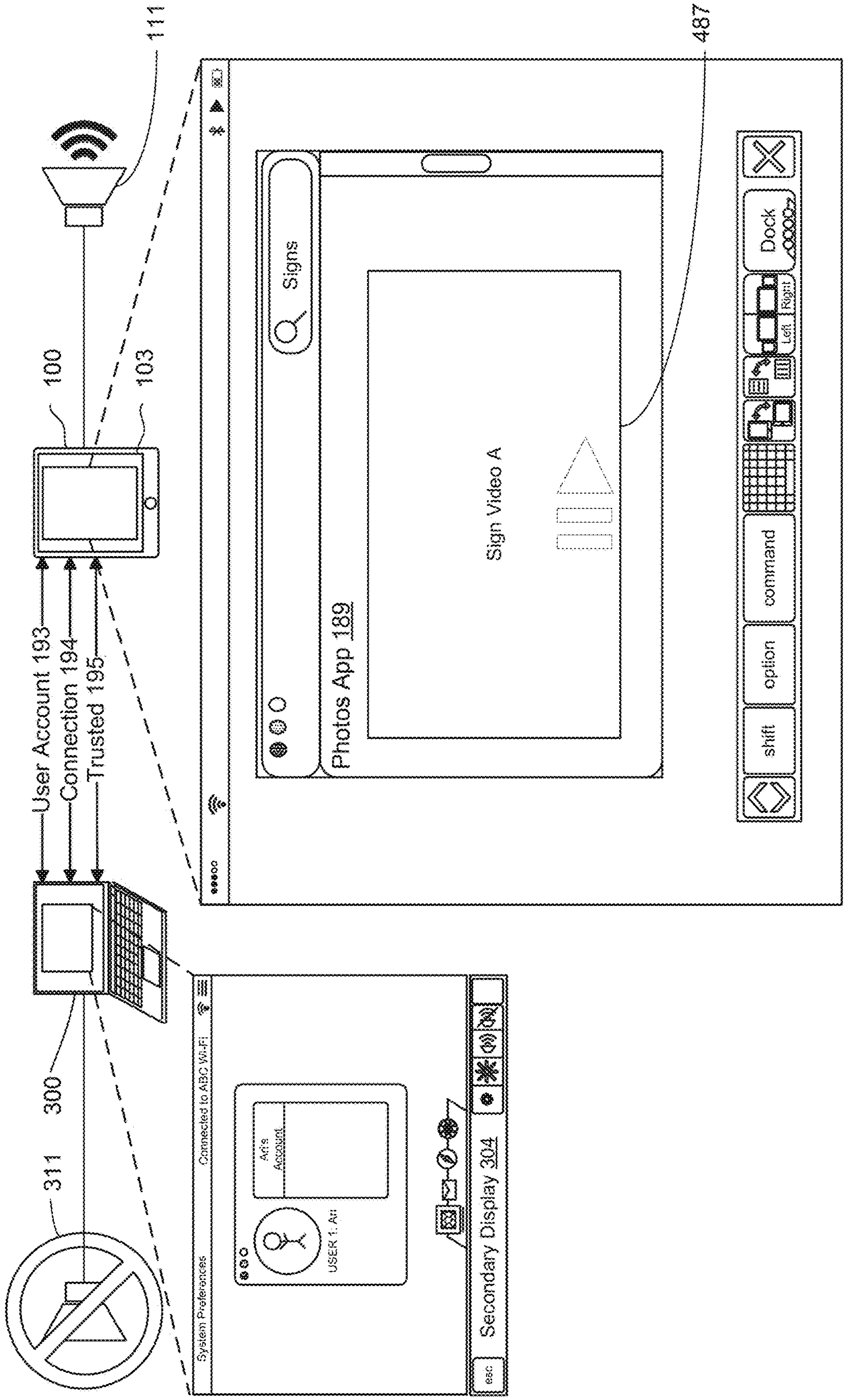
Figure 4000

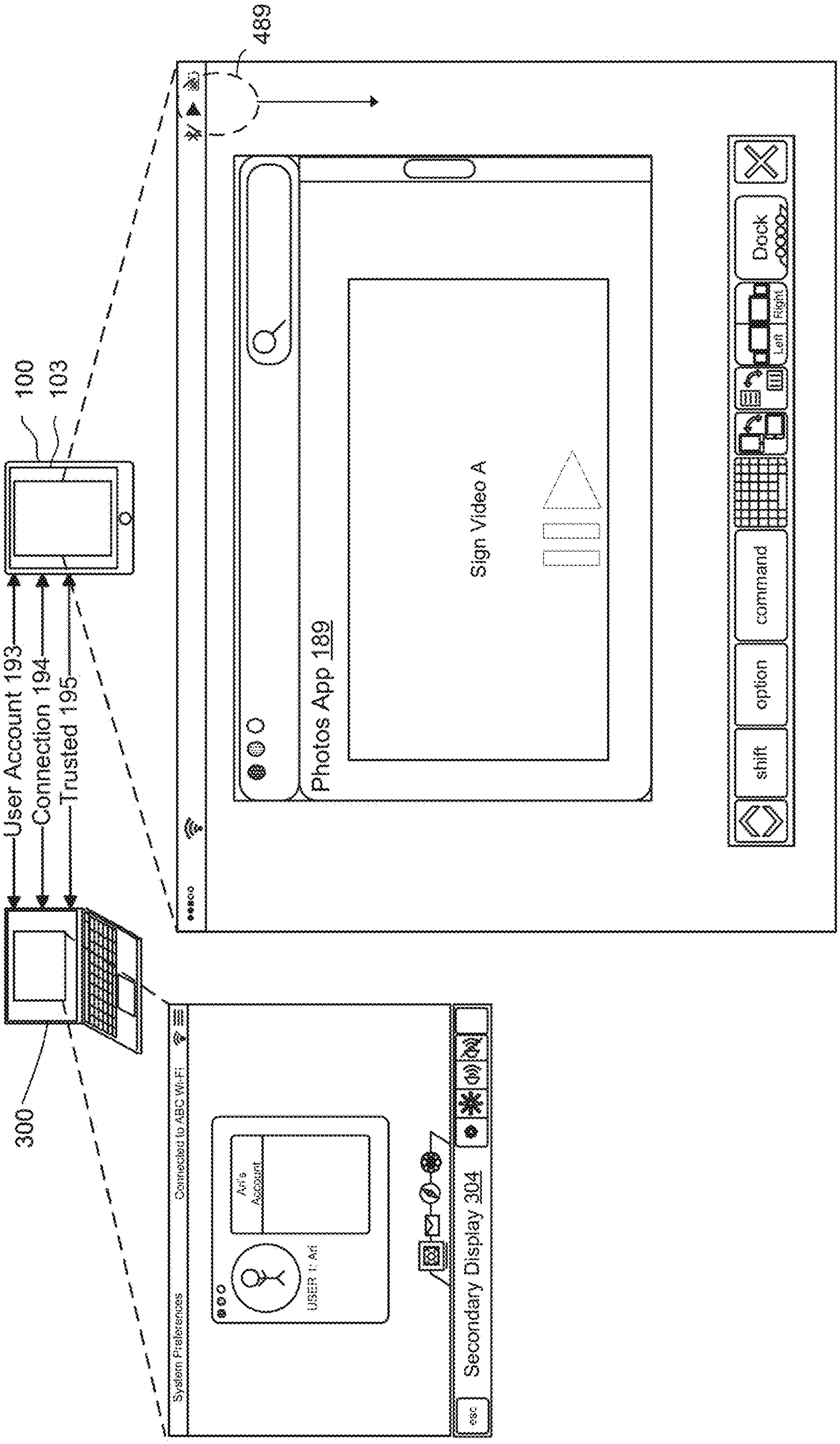
Figure 4PPP

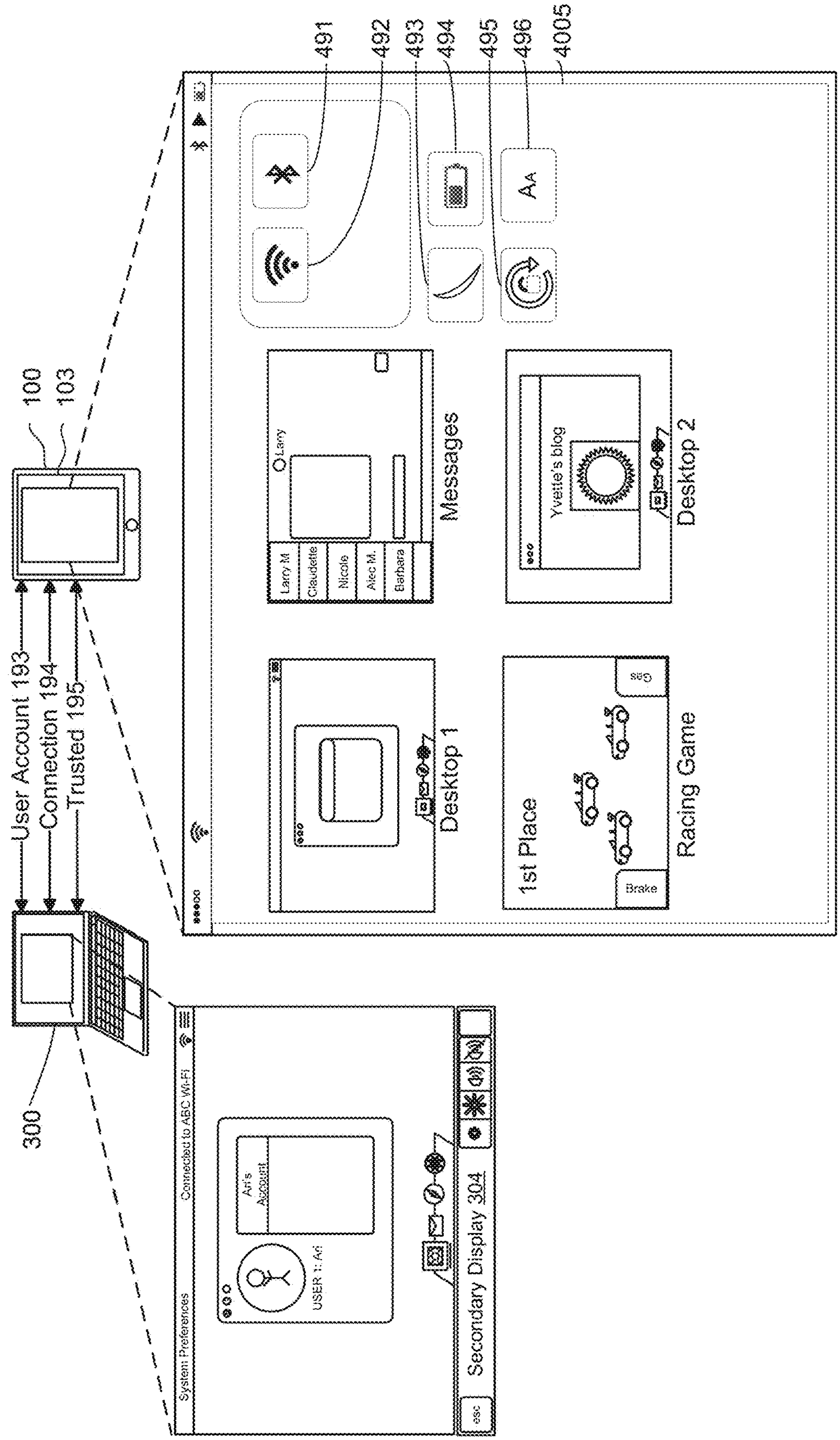
Figure 4QQQ (Finger Input)

(Stylus Input)

(Finger Response)

(Stylus Response)

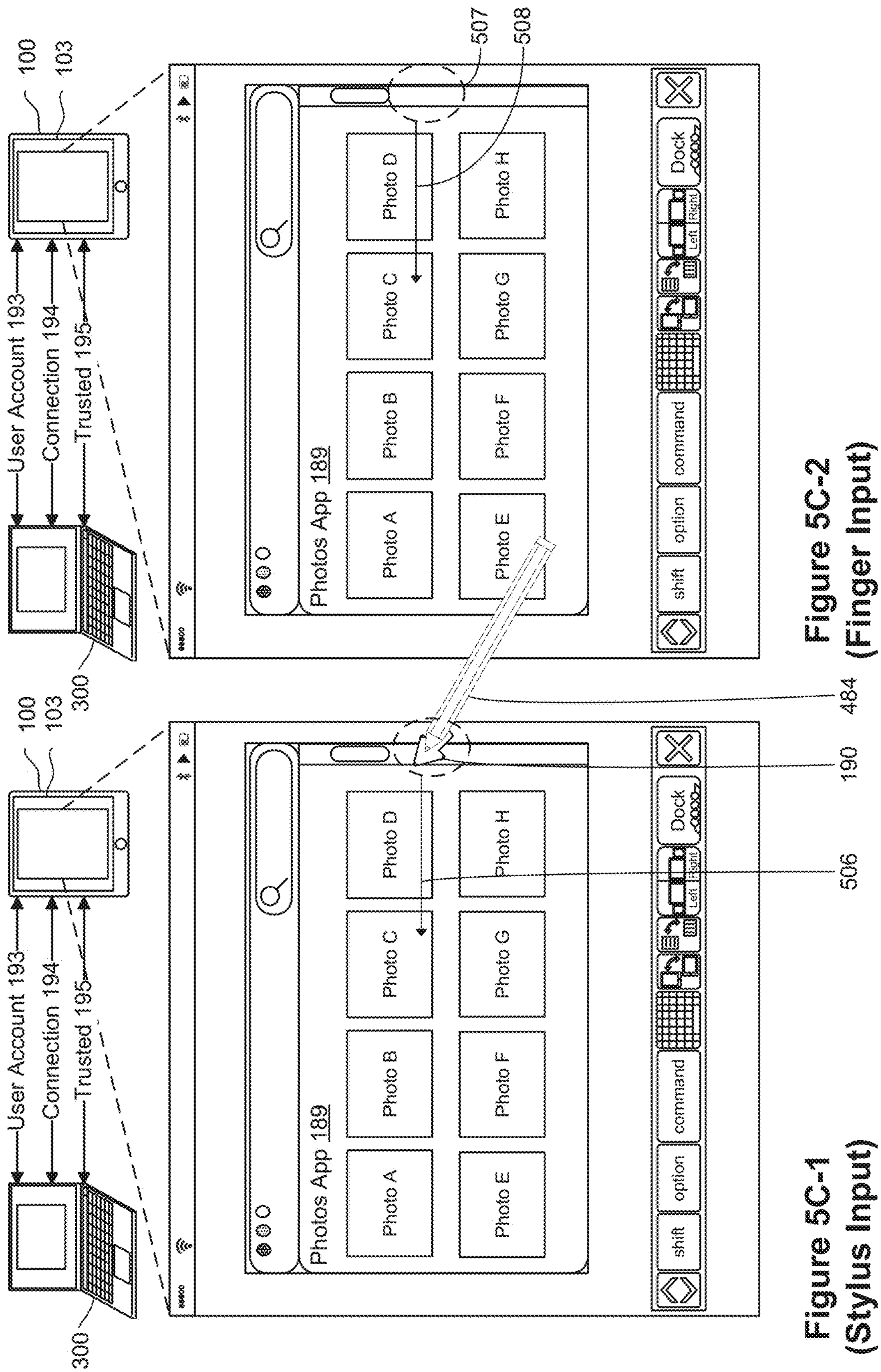
Figure 5C-1 (Stylus Input)
Figure 5C-2 (Finger Input)

(Stylus Response)

(Finger Response)

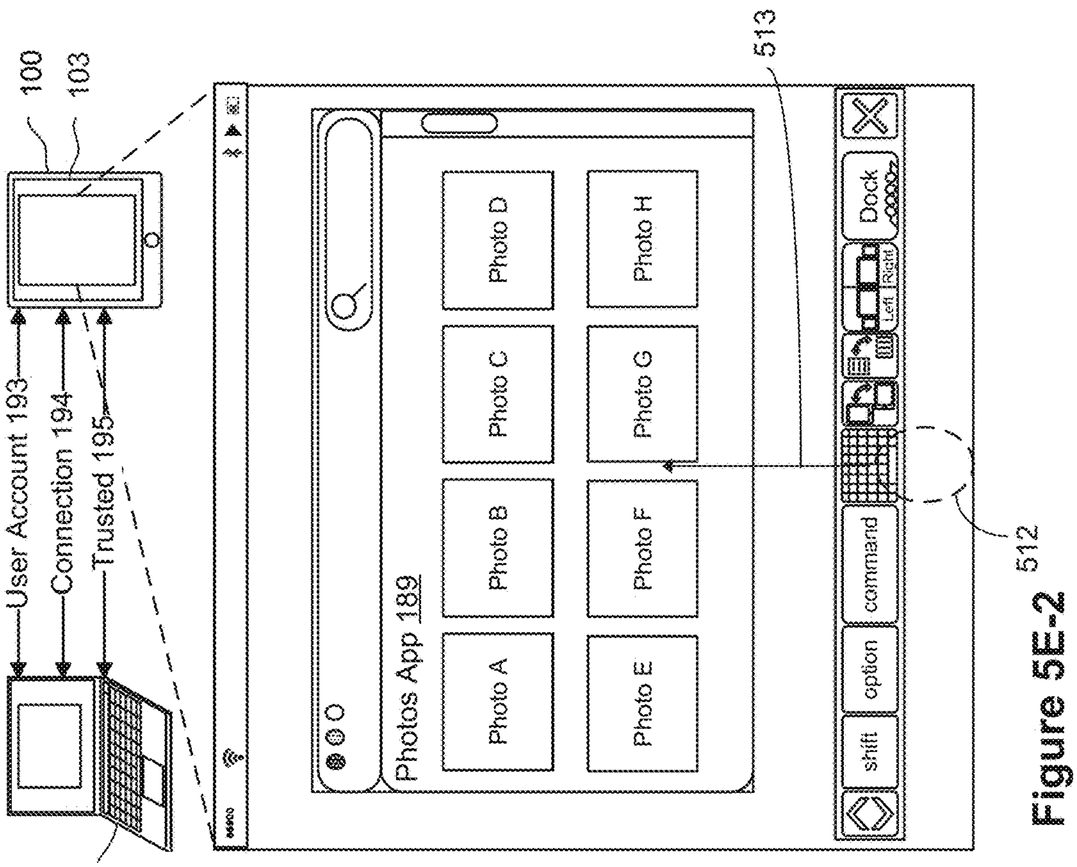
Figure 5E-2 (Finger Input)
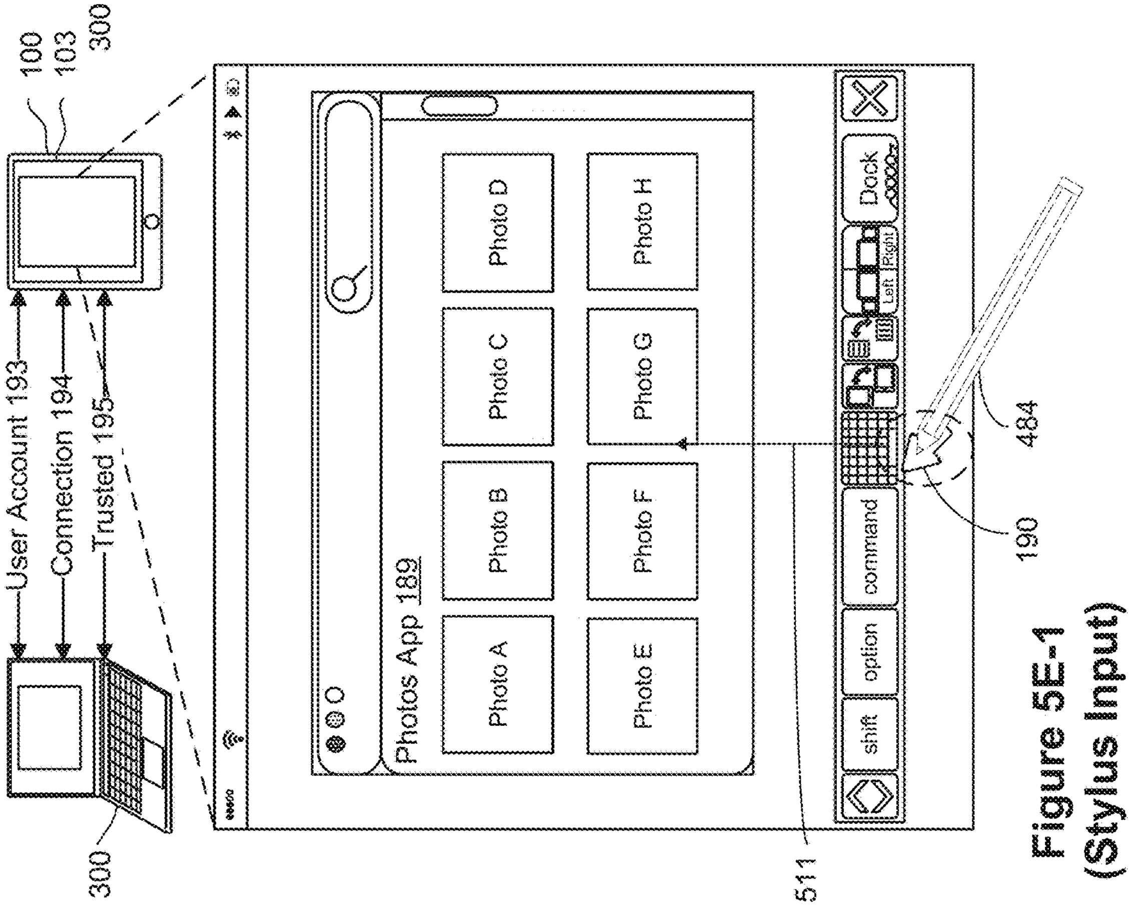
Figure 5E-1 (Stylus Input)

(Finger Response)

(Stylus Response)

800

Figure 8C:
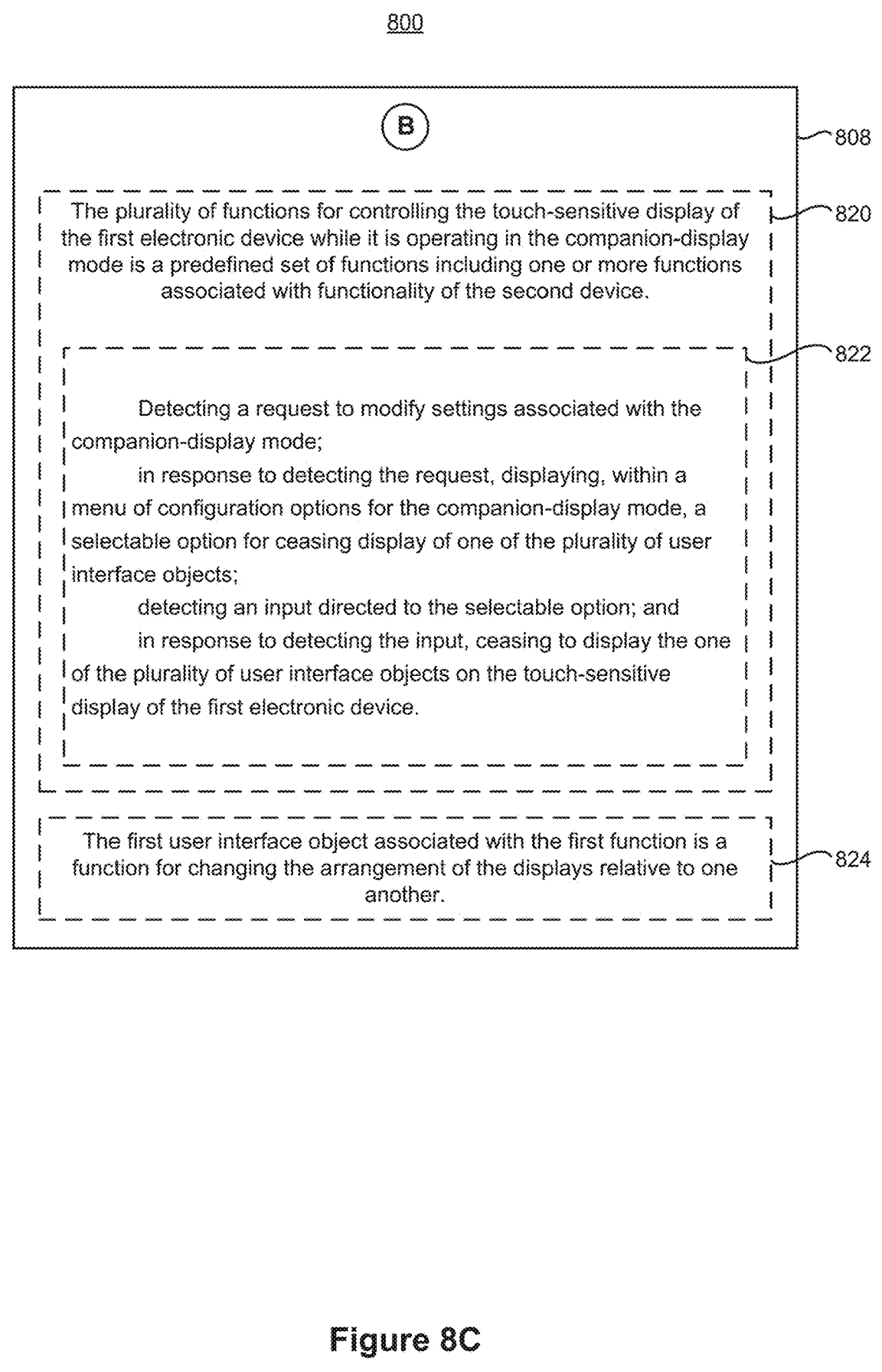

800

808

B

820

The plurality of functions for controlling the touch-sensitive display of the first electronic device while it is operating in the companion-display mode is a predefined set of functions including one or more functions associated with functionality of the second device.

822

Detecting a request to modify settings associated with the companion-display mode;

in response to detecting the request, displaying, within a menu of configuration options for the companion-display mode, a selectable option for ceasing display of one of the plurality of user interface objects;

detecting an input directed to the selectable option; and in response to detecting the input, ceasing to display the one of the plurality of user interface objects on the touch-sensitive display of the first electronic device.

824

The first user interface object associated with the first function is a function for changing the arrangement of the displays relative to one another.

Figure 8D:
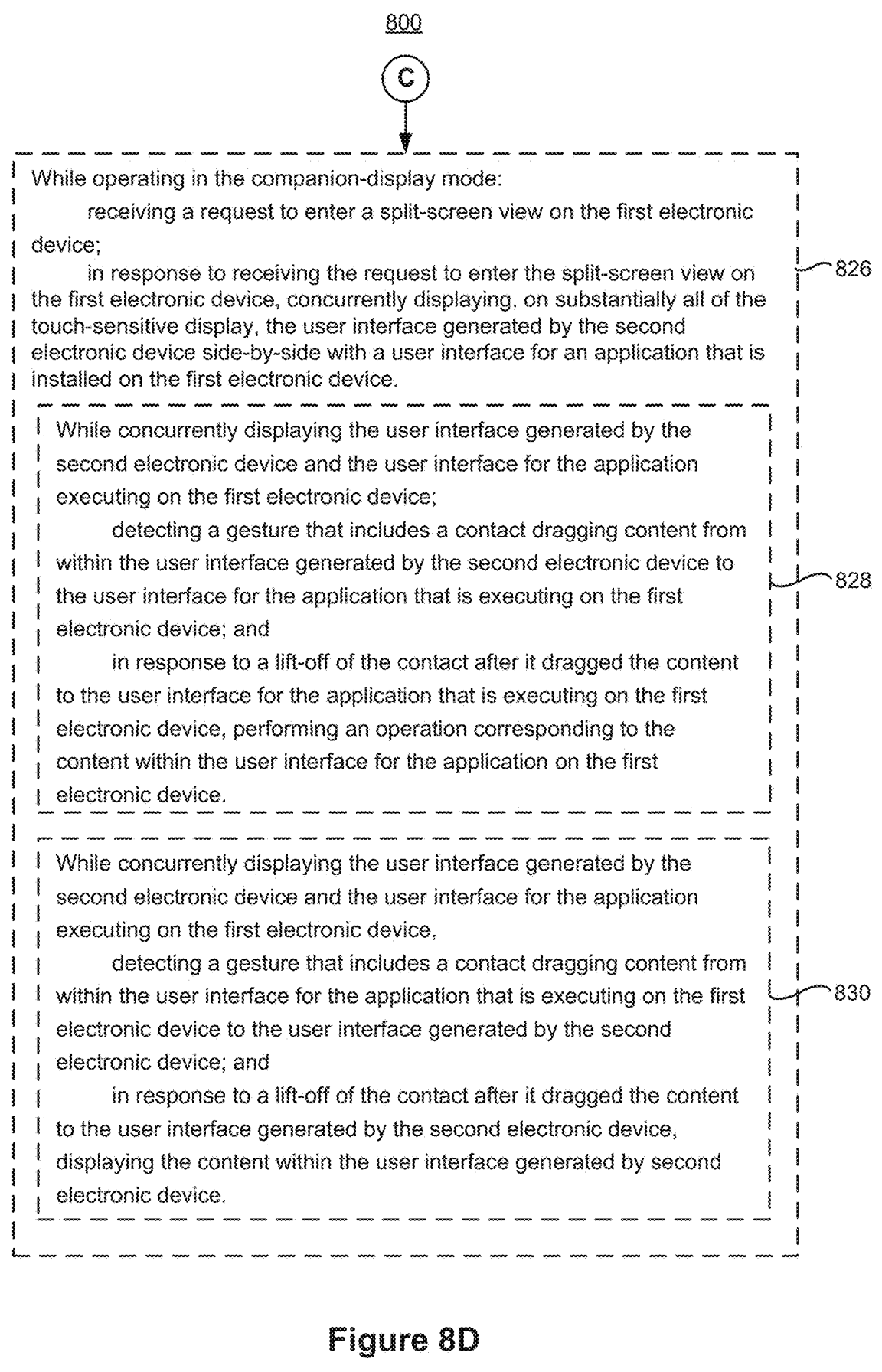

While operating in the companion-display mode:

receiving a request to enter a split-screen view on the first electronic device;

in response to receiving the request to enter the split-screen view on the first electronic device, concurrently displaying, on substantially all of the touch-sensitive display, the user interface generated by the second electronic device side-by-side with a user interface for an application that is installed on the first electronic device.

828

While concurrently displaying the user interface generated by the second electronic device and the user interface for the application executing on the first electronic device;

detecting a gesture that includes a contact dragging content from within the user interface generated by the second electronic device to the user interface for the application that is executing on the first electronic device; and in response to a lift-off of the contact after it dragged the content to the user interface for the application that is executing on the first electronic device, performing an operation corresponding to the content within the user interface for the application on the first electronic device.

830

While concurrently displaying the user interface generated by the second electronic device and the user interface for the application executing on the first electronic device, detecting a gesture that includes a contact dragging content from within the user interface for the application that is executing on the first electronic device to the user interface generated by the second electronic device; and in response to a lift-off of the contact after it dragged the content to the user interface generated by the second electronic device, displaying the content within the user interface generated by second electronic device.

Figure 8F:
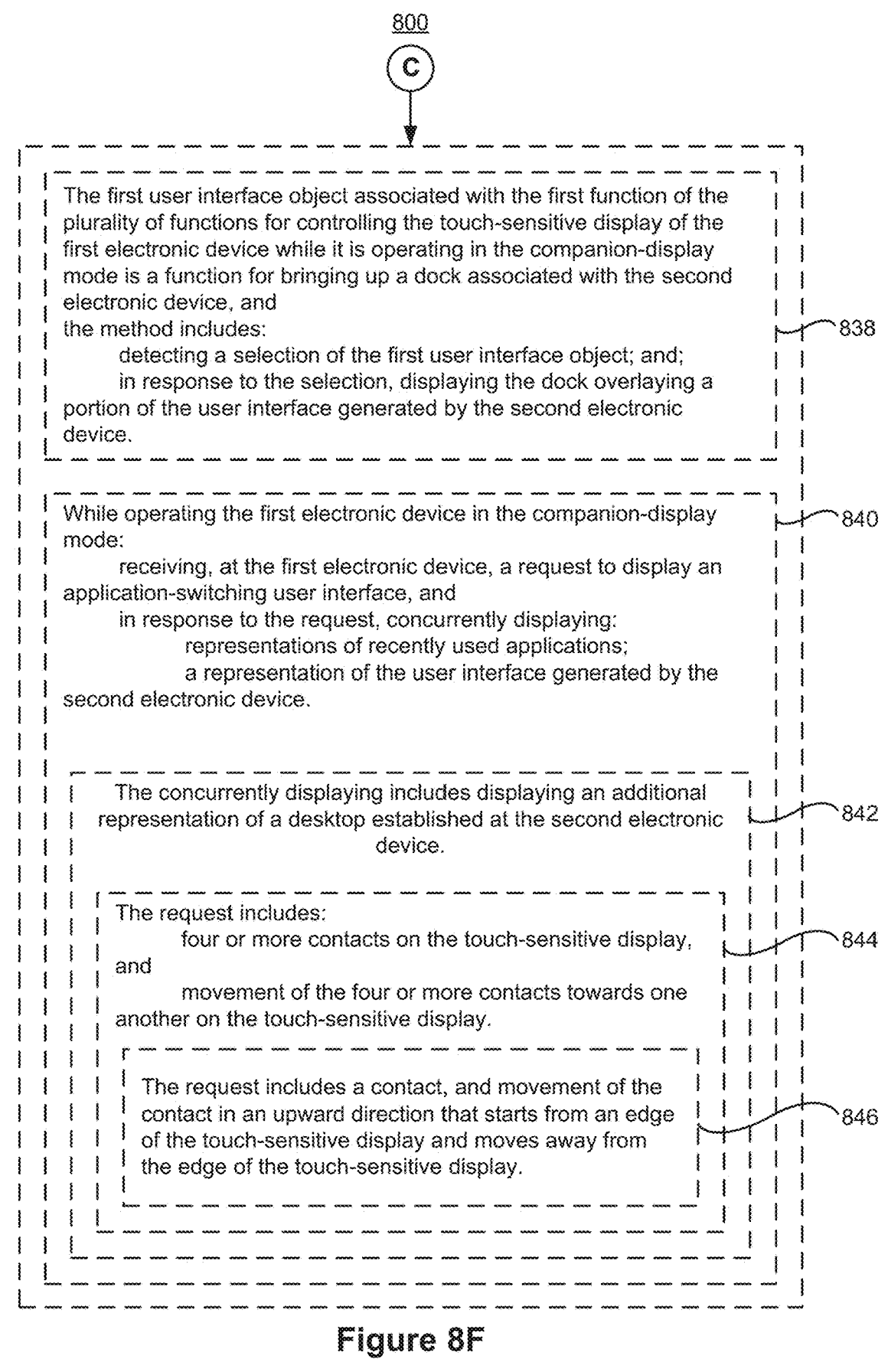

The first user interface object associated with the first function of the plurality of functions for controlling the touch-sensitive display of the first electronic device while it is operating in the companion-display mode is a function for bringing up a dock associated with the second electronic device, and
the method includes:
detecting a selection of the first user interface object; and;
in response to the selection, displaying the dock overlaying a portion of the user interface generated by the second electronic device. 838

While operating the first electronic device in the companion-display mode: 840
receiving, at the first electronic device, a request to display an application-switching user interface, and
in response to the request, concurrently displaying:
representations of recently used applications;
a representation of the user interface generated by the second electronic device.

The concurrently displaying includes displaying an additional representation of a desktop established at the second electronic device. 842

The request includes: 844
four or more contacts on the touch-sensitive display, and
movement of the four or more contacts towards one another on the touch-sensitive display.

The request includes a contact, and movement of the contact in an upward direction that starts from an edge of the touch-sensitive display and moves away from the edge of the touch-sensitive display. 846

Figure 8G:
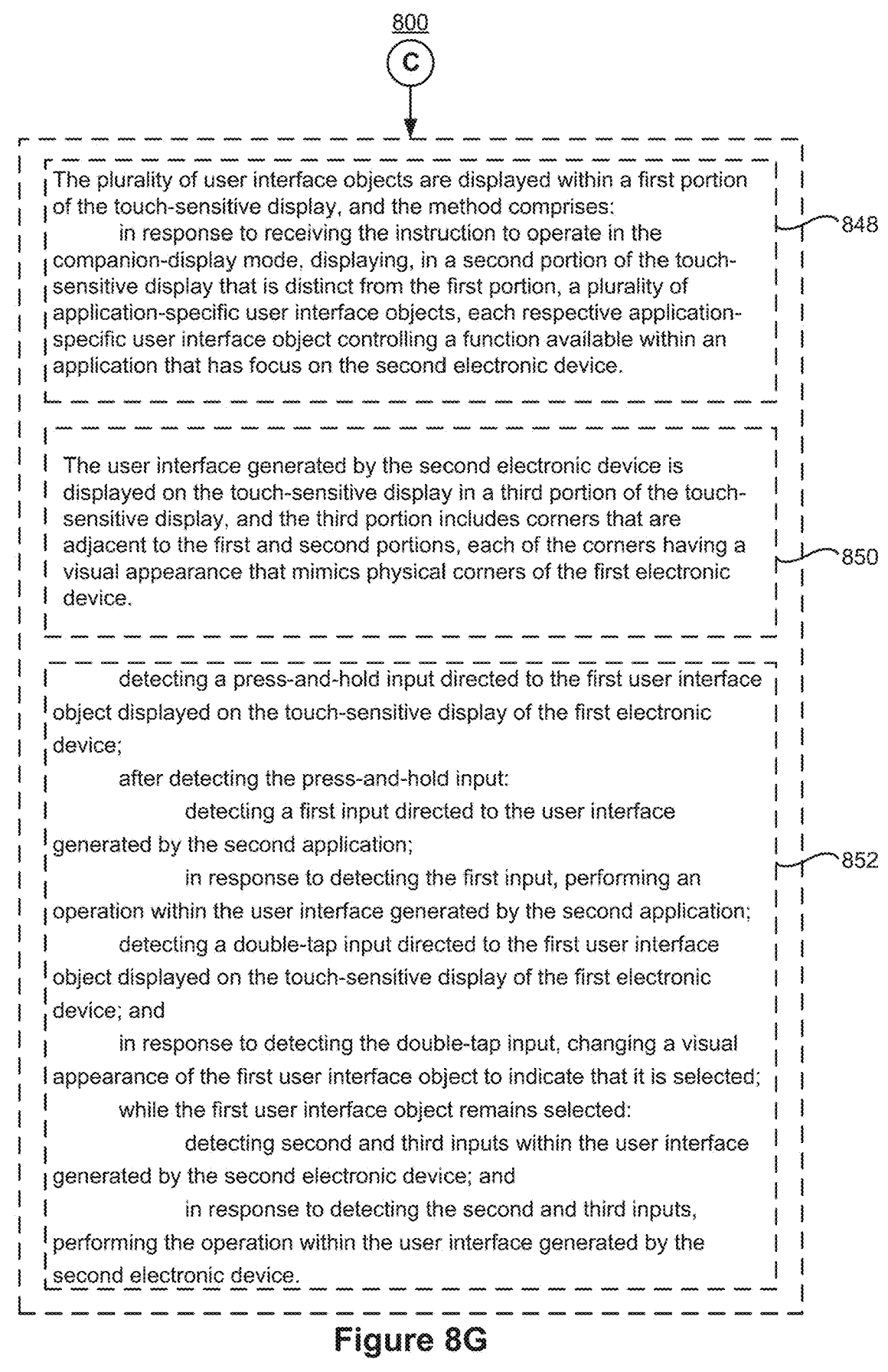

The plurality of user interface objects are displayed within a first portion of the touch-sensitive display, and the method comprises:
in response to receiving the instruction to operate in the companion-display mode, displaying, in a second portion of the touch-sensitive display that is distinct from the first portion, a plurality of application-specific user interface objects, each respective application-specific user interface object controlling a function available within an application that has focus on the second electronic device.

848

The user interface generated by the second electronic device is displayed on the touch-sensitive display in a third portion of the touch-sensitive display, and the third portion includes corners that are adjacent to the first and second portions, each of the corners having a visual appearance that mimics physical corners of the first electronic device.

850 detecting a press-and-hold input directed to the first user interface object displayed on the touch-sensitive display of the first electronic device;
after detecting the press-and-hold input:
detecting a first input directed to the user interface generated by the second application;
in response to detecting the first input, performing an operation within the user interface generated by the second application;
detecting a double-tap input directed to the first user interface object displayed on the touch-sensitive display of the first electronic device; and
in response to detecting the double-tap input, changing a visual appearance of the first user interface object to indicate that it is selected;
while the first user interface object remains selected:
detecting second and third inputs within the user interface generated by the second electronic device; and
in response to detecting the second and third inputs, performing the operation within the user interface generated by the second electronic device.

The gesture includes a contact near a right edge of the touch-sensitive display of the first electronic device and movement of the contact in a leftward direction away from the right edge of the touch-sensitive display, performing the first operation includes overlaying, on the touch-sensitive display of the first electronic device, a user interface for an application executing on the first electronic device on a portion of the user interface generated by the second electronic device, and performing the second operation includes overlaying, on the touch-sensitive display of the first electronic device, a user interface that includes electronic notifications on a portion of the user interface generated by the second electronic device.

924

The gesture includes a contact near a bottom edge of the touch-sensitive display and movement of the contact in an upward direction away from the bottom edge of the touch-sensitive display, performing the first operation includes overlaying, on the touch-sensitive display of the first electronic device, a first dock on the user interface generated by the second electronic device, the first dock including user interface objects each for opening an application installed on the first electronic device; and performing the second operation includes overlaying, on the touch-sensitive display of the first electronic device, a second dock on the user interface generated by the second electronic device, the second dock including a first user interface object for displaying a user interface of a first application on the second electronic device and a second user interface object for displaying a user interface of a second application on the second electronic device.

Figure 9C

SYSTEMS AND METHODS FOR INITIATING AND INTERACTING WITH A COMPANION-DISPLAY MODE FOR AN ELECTRONIC DEVICE WITH A TOUCH-SENSITIVE DISPLAY

RELATED APPLICATIONS

This application is a continuation of U.S. patent application Ser. No. 16/582,765, filed Sep. 25, 2019, which claims priority to U.S. Provisional Application Ser. No. 62/844,087, filed May 6, 2019, and U.S. Provisional Application Ser. No. 62/834,958, filed Apr. 16, 2019. Each of these applications is hereby incorporated by reference in its respective entirety.

TECHNICAL FIELD

The disclosed embodiments relate to initiating and interacting with a companion-display mode for an electronic device with a touch-sensitive display and, more specifically, to extending user interfaces generated by a desktop operating system onto a touch-sensitive display that is controlled by a separate operating system of a portable device, including techniques for determining whether to process inputs as touch inputs or desktop inputs.

BACKGROUND

Utilizing secondary displays allows users to separate various projects they are working on, and to take advantage of capabilities of different types of displays for different types of projects. In certain instances, however, some users are unable to easily utilize secondary displays because these users are unable to recall menu and input sequences needed to utilize a device as a secondary display, and, even if users are able to recall such menu and input sequences, then those users may have to waste too much time going through the required menu and input sequences, which negatively impacts their productivity and satisfaction with their devices. As such, there is a need for features that allow for quickly operating a device as a secondary display.

Moreover, the human-machine interfaces for device operating as secondary displays are typically unintuitive, and do not allow users to ake use of different types of input devices (e.g., finger, stylus, etc.) to perform different functions. As such, there is also a need for more intuitive human-machine interfaces and, in particular, for human-machine interfaces that allow for use of different types of input devices when a device is operating as a secondary display.

SUMMARY

The embodiments described herein address the above shortcomings by providing devices and methods that allow users to easily and quickly operate a first device (e.g., a tablet electronic device) in a companion-display mode in which user interfaces generated by another device (e.g., a laptop electronic device) are displayed. Such devices and methods also require minimal inputs to locate for activating and using the companion-display mode. Such devices and methods also make more relevant information available on a limited screen (e.g., a touch-sensitive display of a tablet electronic device is used to display relevant information from both a desktop operating system and a mobile operating system using limited screen space). Such devices and methods also provide improved human-machine interfaces, e.g., by providing emphasizing effects to make information more discernable (which can be generated by different operating systems) on the touch-sensitive display, by providing sustained interactions so that successive inputs from a user directed to either a desktop operating system or a mobile operating system cause the device (which is operating in the companion-display mode) to provide outputs which are then used to facilitate further inputs from the user, and by requiring fewer interactions from users to achieve desired results. For these reasons and those discussed below, the devices and methods described herein reduce power usage and improve battery life of electronic devices.

In accordance with some embodiments, a method (e.g., for sharing a user interface between different electronic devices) is performed at a first electronic device (e.g., a tablet electronic device). The method includes receiving an instruction to operate the first electronic device in a companion-display mode in which user interfaces generated by a second electronic device (e.g., a laptop electronic device) are displayed at the first electronic device, and the second electronic device is separate from the first electronic device. In response to receiving the instruction to operate in the companion-display mode, the method includes: concurrently displaying, on the touch-sensitive display of the first electronic device: (i) a user interface generated by the second electronic device; and (ii) a plurality of user interface objects, including (i) a first user interface object associated with a first function of a plurality of functions for controlling (only) the touch-sensitive display of the first electronic device while it is operating in the companion-display mode and (ii) a second user interface object associated with a second function of the plurality of functions.

When a user is interfacing with a secondary display, they typically must navigate through complicated menu sequences to adjust the display according to their needs at various points in time. Allowing a plurality of user interface objects (e.g. a control strip 197 that is depicted near the left edge of the illustrated tablet device in the user interface of FIG. 7A, among other figures depicting such a control strip) to be displayed immediately (and without requiring any other human intervention) once the first electronic device (e.g. a mobile device) is placed in a companion-display mode (e.g. a secondary display mode), allows the user to avoid extra inputs to access menus for controlling the touch-sensitive display of the first electronic device. Reducing the number of inputs required for controlling the touch-sensitive display enhances the operability of the device and makes the human-machine interface more efficient (e.g., by helping the user to reduce the number of inputs the user needs to make) which, additionally, reduces power usage and improves battery life of the device by enabling the user to use the device more quickly and efficiently.

In accordance with some embodiments, a method is performed at a first electronic device (e.g., a tablet electronic device). The method includes: operating the first electronic device in a companion-display mode in which user interfaces generated by a second electronic device (e.g., laptop or desktop electronic device) are displayed at the first electronic device, and the second electronic device is separate from the first electronic device. While operating in the companion-display mode, the method includes: displaying, on the touch-sensitive display of the first electronic device, a user interface generated by the second electronic device; and detecting, at the first electronic device, a gesture using an input object. In response to detecting the gesture, the method includes: in accordance with determining that the input object is one or more fingers, performing a first operation on the touch-sensitive display based on the gesture; and in accordance with determining that the input object is a stylus, performing a second operation, distinct from the first operation, on the touch-sensitive display based on the gesture.

When interacting with a touch-sensitive display, a user is usually limited to a certain set of predefined inputs based on the dexterity of the human hand, which limits the number of operations that can be performed. Allowing for single gestures to have multiple purposes depending on the input device (e.g. a finger or a stylus) allows for the user to perform more operations than would typically be possible, and enables efficient interactions for the companion-display mode. Increasing the number of operations that can be performed from a set number of gestures enhances the operability of the device and makes the human machine interface more efficient (e.g., by helping the user to reduce the number of gestures the user needs to make to perform an operation) which, additionally, reduces power usage and improves battery life of the device by enabling the user to use the device more quickly and efficiently.

In accordance with some embodiments, a method is performed at a first electronic device (e.g., a laptop computing device) that includes a display. The method includes: displaying, on the display, a user interface that is associated with an application, the user interface is displayed with a control user interface element (e.g., the green button control element referred to herein) for changing a display property of (only) the user interface (examples of the display property include a size, display location, etc. of the user interface). For example, clicking on a green button on the uppermost left corner of a window maximizes that window. An input directed to (e.g., a hover or right click over) the control user interface element is then detected. The method further includes: in response to detecting the input, and while continuing to display the user interface: concurrently displaying on the display: (i) a first selectable option for changing the display property of the user interface on the display of the first electronic device; and (ii) a second selectable option for requesting display of a user interface that includes content from the user interface at a second electronic device (e.g., at a tablet electronic device), distinct from the first electronic device. In other embodiments, the control user element has a single function, i.e., to request display of a user interface that includes content from the user interface at a second electronic device (e.g., at a tablet electronic device), distinct from the first electronic device.

Moreover, changing the arrangement of user interfaces running on multiple displays can at times require repeated dragging operations or use of multiple keyboard commands to achieve a desired orientation. Allowing a user, to be able to select a single control user interface element that populates a list of a plurality of selectable options for changing a display property (e.g. maximize window, send to another display, etc.) ensures that a minimal number of inputs is utilized to change such display properties. Reducing the number of inputs to change these display properties enhances the operability of the device and makes the human machine interface more efficient (e.g., by helping the user to reduce the number of gestures the user needs to make to perform an operation) which, additionally, reduces power usage and improves battery life of the device by enabling the user to use the device more quickly and efficiently.

In accordance with some embodiments, a method is performed at a first electronic device that includes a display device. The method includes: receiving a request to annotate content on the first electronic device. The method also includes: in response to receiving the request: in accordance with a determination that a second electronic device, distinct from the first electronic device, is available for displaying the content in an annotation mode and that using the second electronic device to display the content in the annotation mode has not previously been approved, displaying, via the display device, a selectable option that, when selected, causes the first electronic device to send an instruction to display the content in the annotation mode at the second electronic device; and in accordance with a determination that the second electronic device is available for displaying the content in the annotation mode and that using the second electronic device to display the content in the annotation mode has previously been approved, sending an instruction to the second electronic device to display the content in the annotation mode automatically without further user intervention. In some embodiments, an annotation mode is a mode in which inputs are received at certain locations over content and then those inputs are used to annotate the content, including to draw lines, circles, handwriting, shapes, etc.).

If a user has already indicated that the second device is approved to display content in the annotation mode, then it would waste time and require superfluous inputs to continuously require a user to reapprove that second device. Accordingly, responding to a request to annotate content by determining whether the second device is available for display content in the annotation mode and whether that second device has been previously approved, ensures that users avoid having to waste time providing extra inputs to reapprove the second device. In this way, the human-machine interface is improved and sustained interactions with the two different devices are made possible.

The descriptions regarding the first and second electronic devices herein are interchangeable. In other words, a description regarding operations at the first electronic device are applicable as well to operations that can be performed at the second electronic device, and vice versa.

In accordance with some embodiments, first electronic device (e.g., a device running a desktop or a mobile operating system, such as a laptop running a desktop operating system or a tablet device running a mobile operating system) includes a display (which can be a touch-sensitive display) and memory storing one or more programs, the one or more programs configured for execution by the one or more processors and the one or more programs include instructions for performing or causing performance of the operations of any of the methods described herein. In accordance with some embodiments, the first electronic device has stored therein instructions that, when executed by the first electronic device, cause the device to perform or cause performance of the operations of any of the methods described herein. In accordance with some embodiments, a graphical user interface on the display of the first electronic device is provided, and the graphical user interface includes one or more of the elements displayed in any of the methods described herein, which are updated in response to inputs, as described in any of the methods described herein. In accordance with some embodiments, the first electronic device includes means for performing or causing performance of the operations of any of the methods described herein. In accordance with some embodiments, an information processing apparatus, for use in the first electronic device, includes means for performing or causing performance of the operations of any of the methods described herein.

The systems and methods described herein improve operability of electronic devices by, e.g., enabling interactions that require fewer inputs, without wasting time searching for affordances that may be difficult to locate.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 5A-1-5F-2 are schematics of displays used to illustrate different example user interfaces responses based on different input types, while operating the tablet device in a companion-display mode. Additional details regarding these figures are also provided below with reference to the descriptions of methods 800, 900, 1000, and 1100.

FIGS. 8A-8G are flowcharts of methods for initiating and interacting with a companion display mode, in accordance with some embodiments.

FIGS. 9A-9E are flowcharts of methods for performing different operations depending on what type of input object is used in conjunction with a companion-display mode, in accordance with some embodiments.

DESCRIPTION OF EMBODIMENTS

Figure 2:
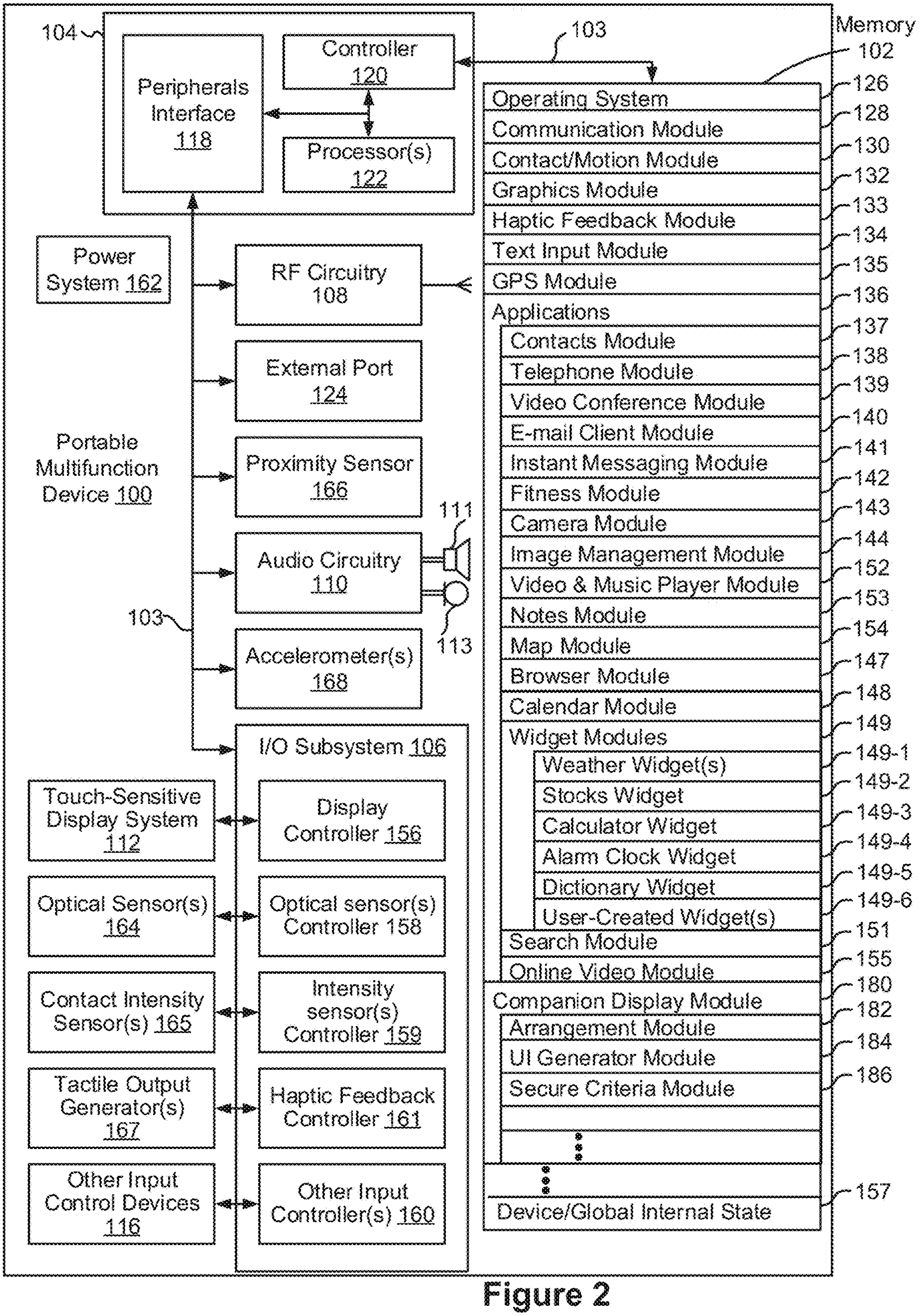
FIG. 2 is a block diagram of an electronic device (e.g., a device running a mobile operating system distinct from the desktop operating system), in accordance with some embodiments.
Figure 3A:
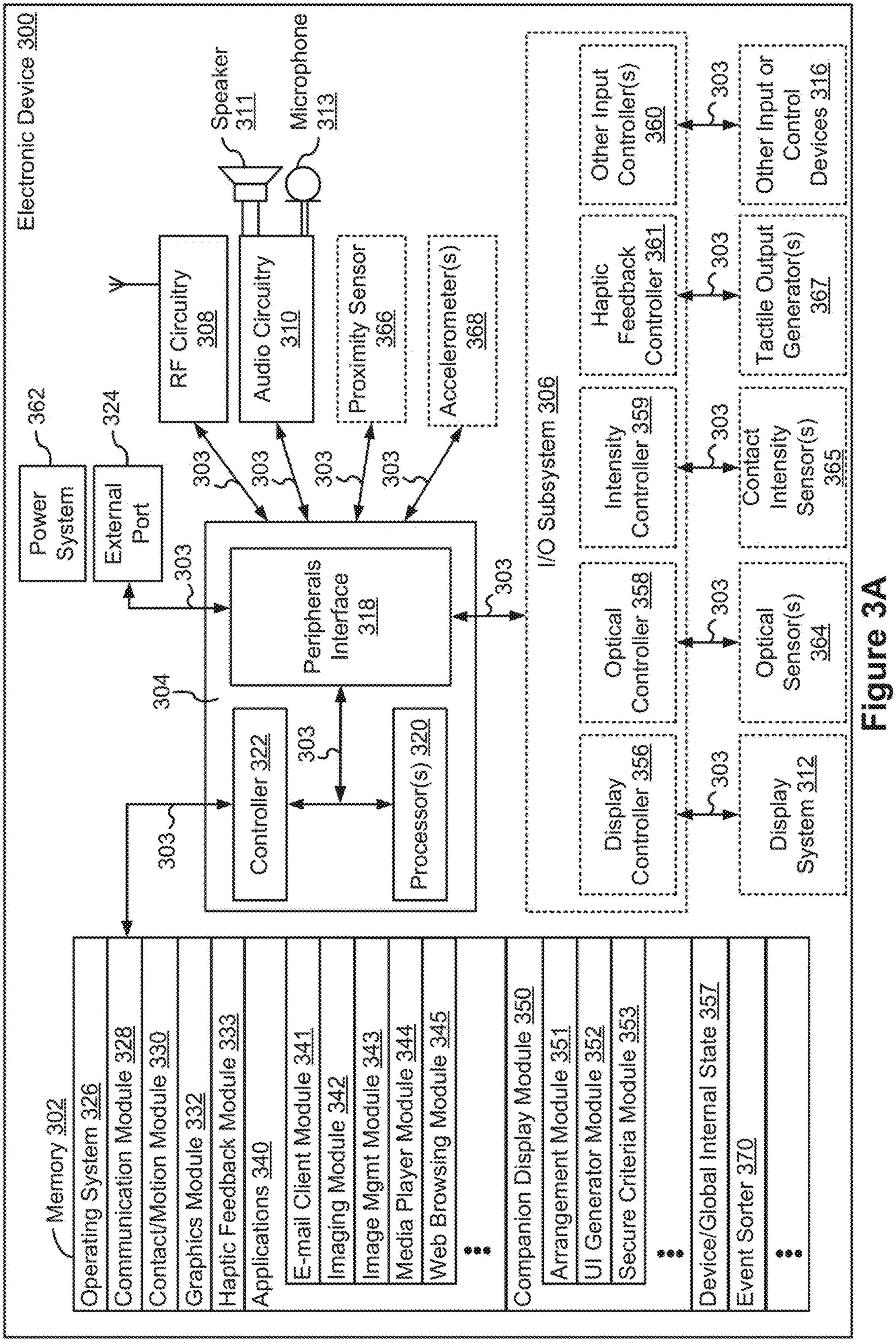
FIG. 3A is a block diagram of an electronic device (e.g., a device running a desktop operating system), in accordance with some embodiments.
Figure 3B:
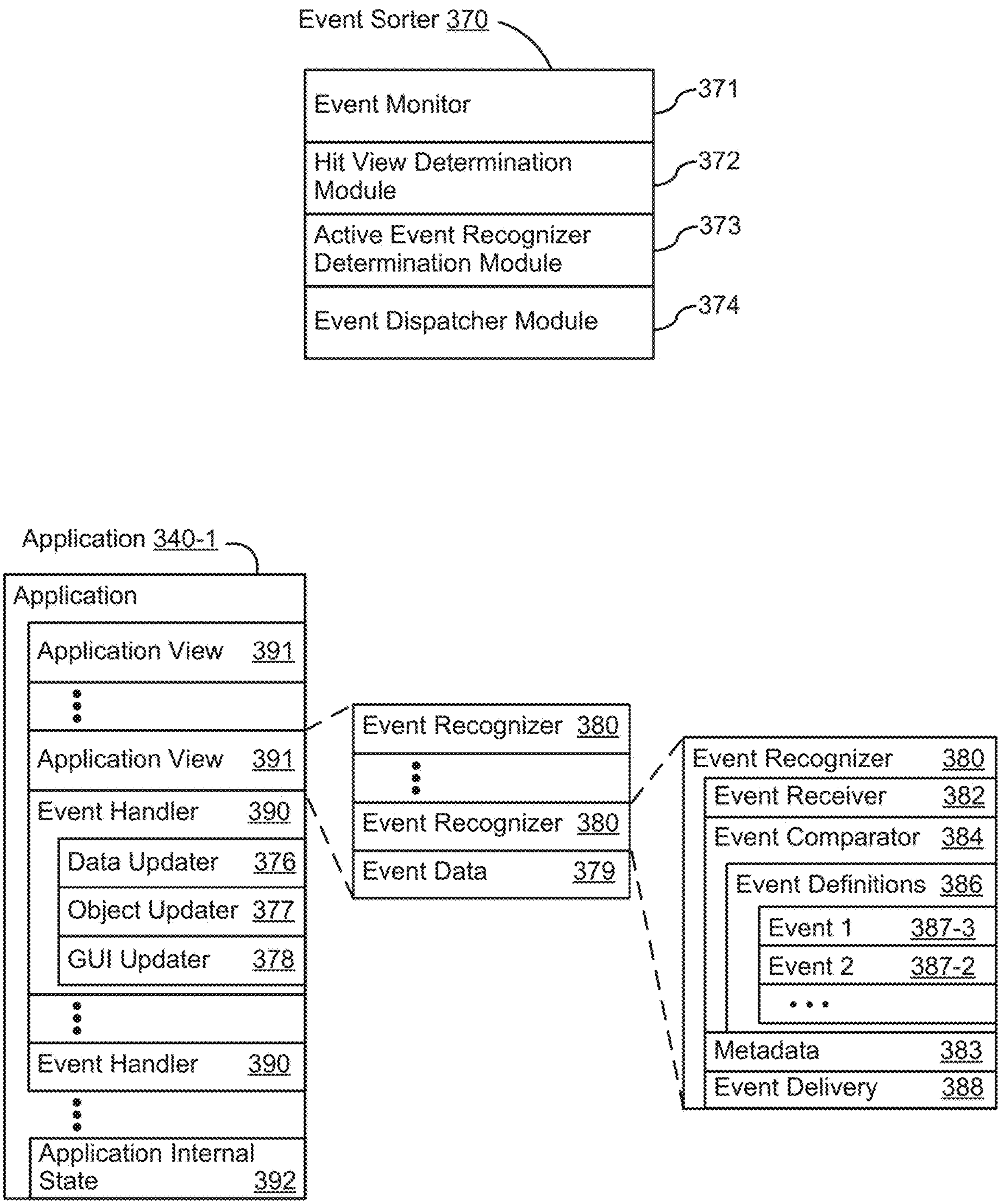
FIG. 3B is a block diagram of components for event handling of FIG. 3A, in accordance with some embodiments.
Figure 4A:
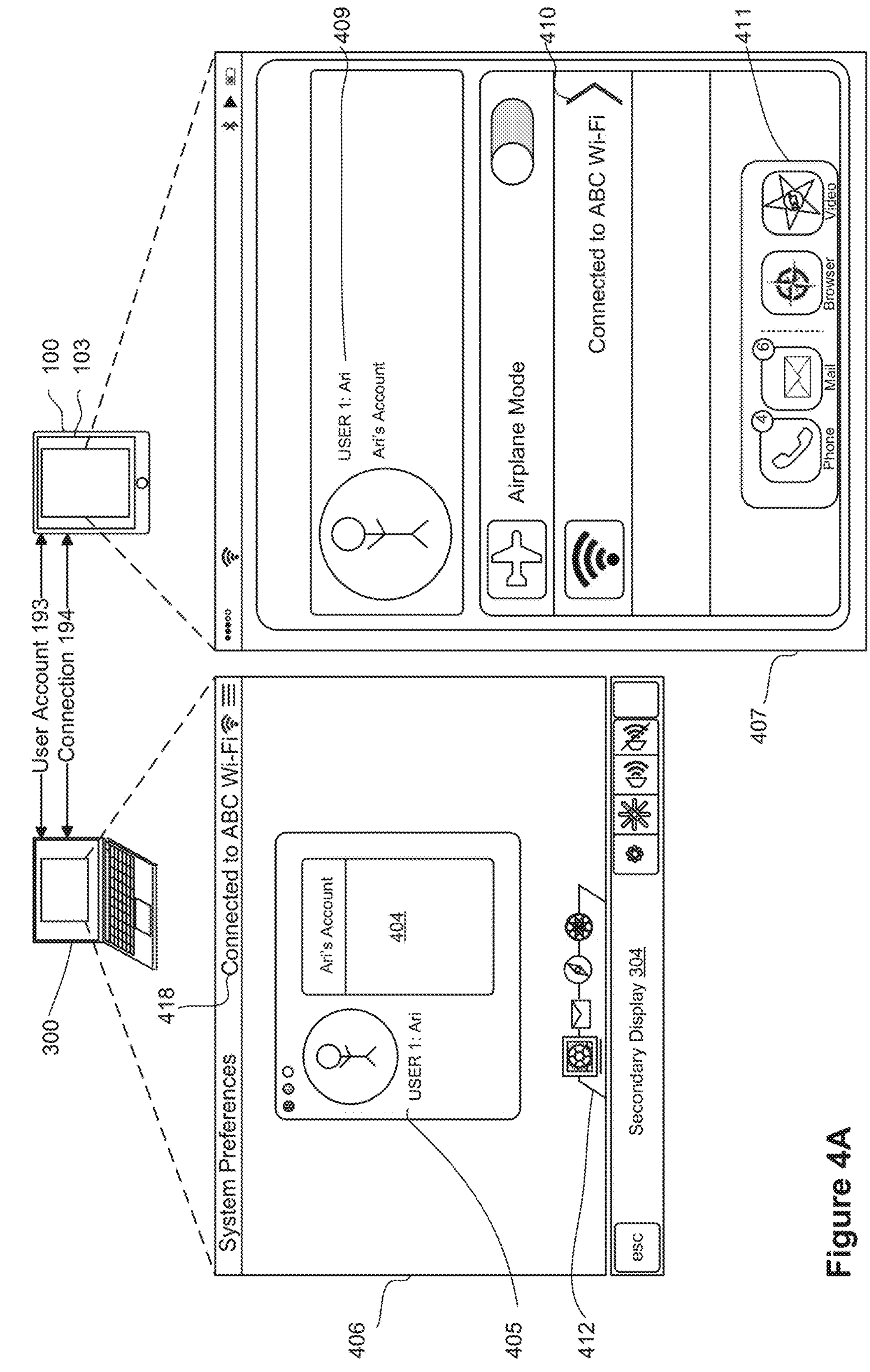
FIGS. 4A-4QQQ are schematics of displays used to illustrate example user interfaces for initiating and interacting with a companion-display mode, in accordance with some embodiments. Additional details regarding these figures are also provided below with reference to the descriptions of methods 800, 900, 1000, and 1100.
Figure 4B:
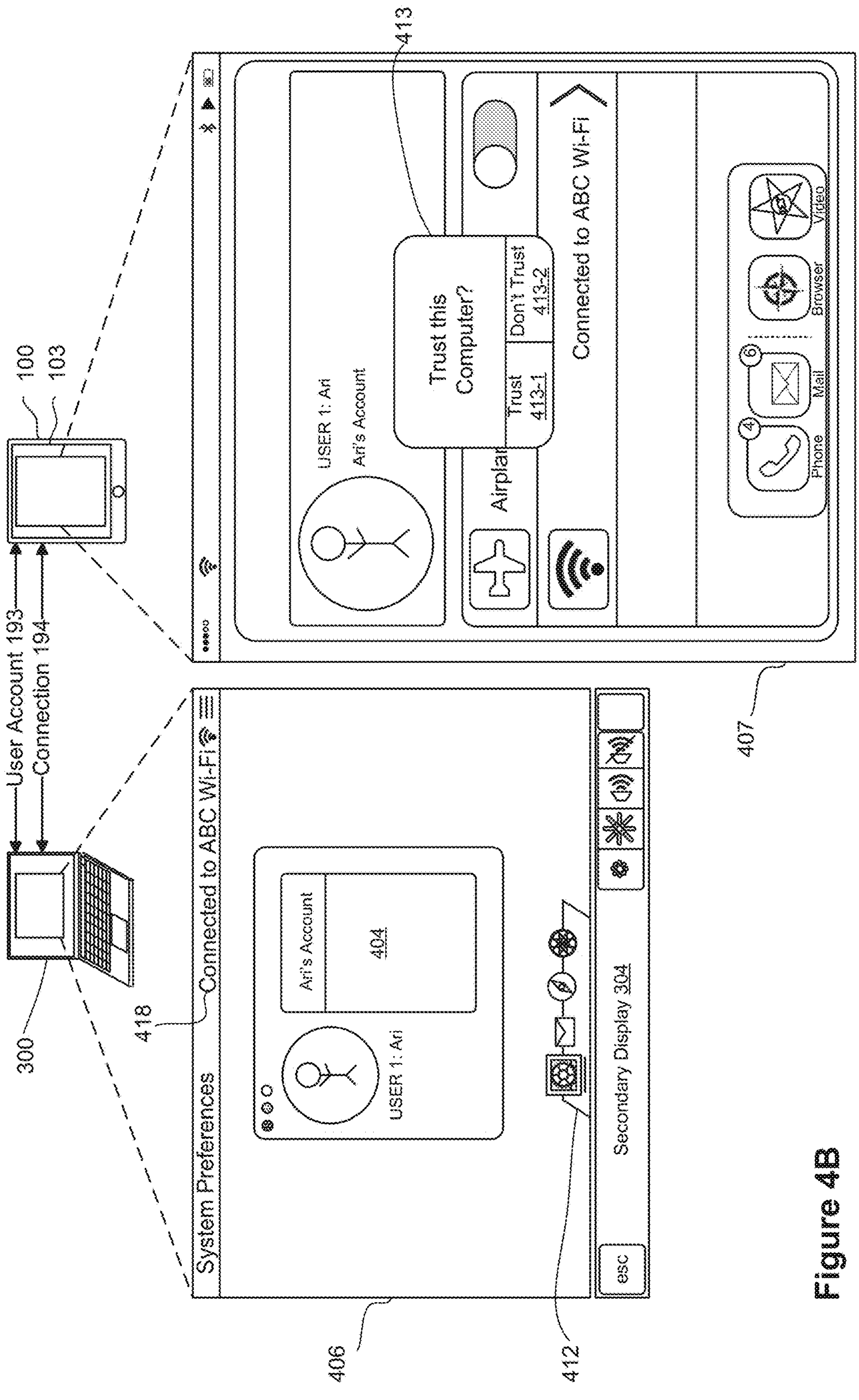
Figure 4C:
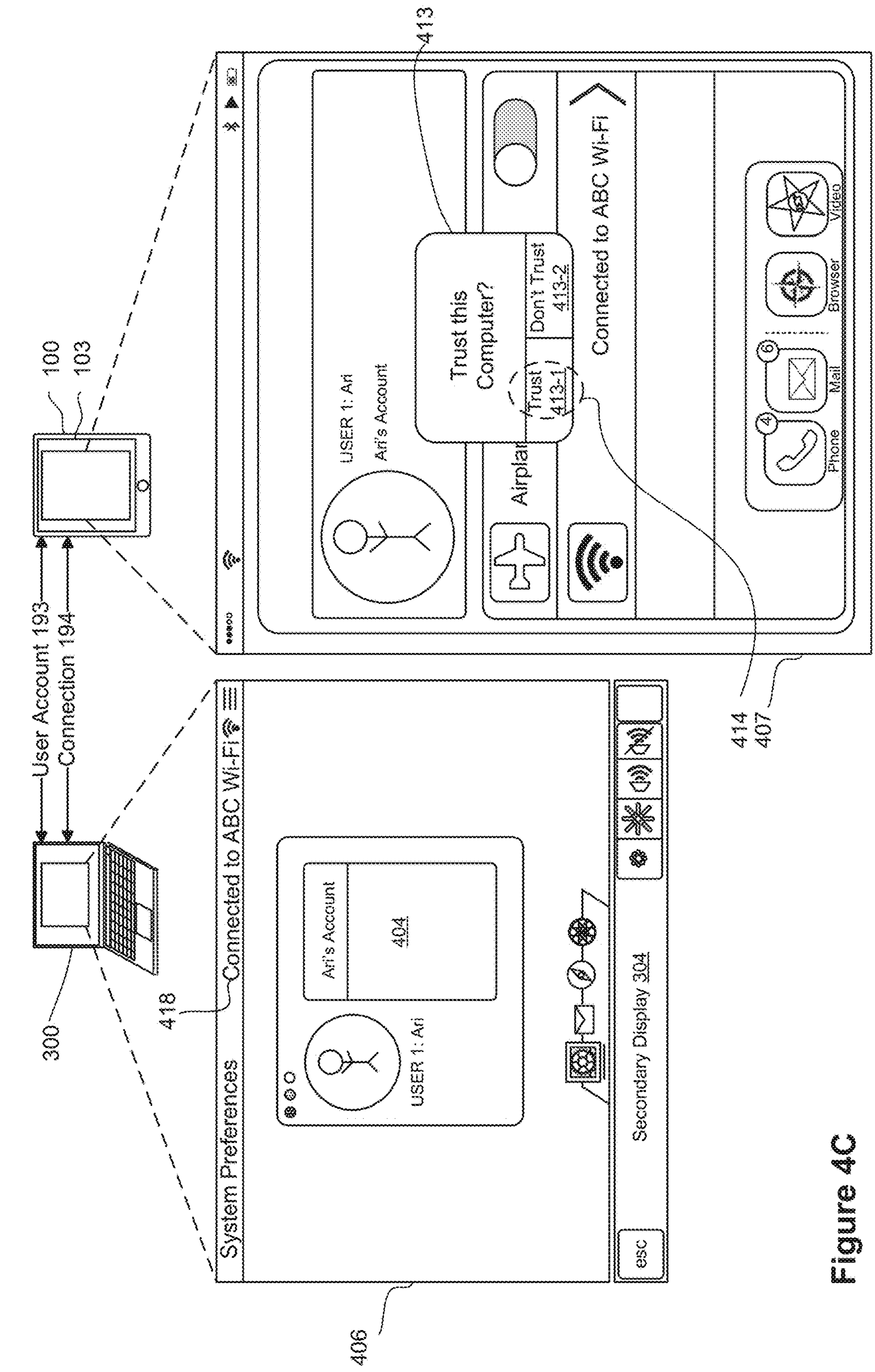
Figure 4D:
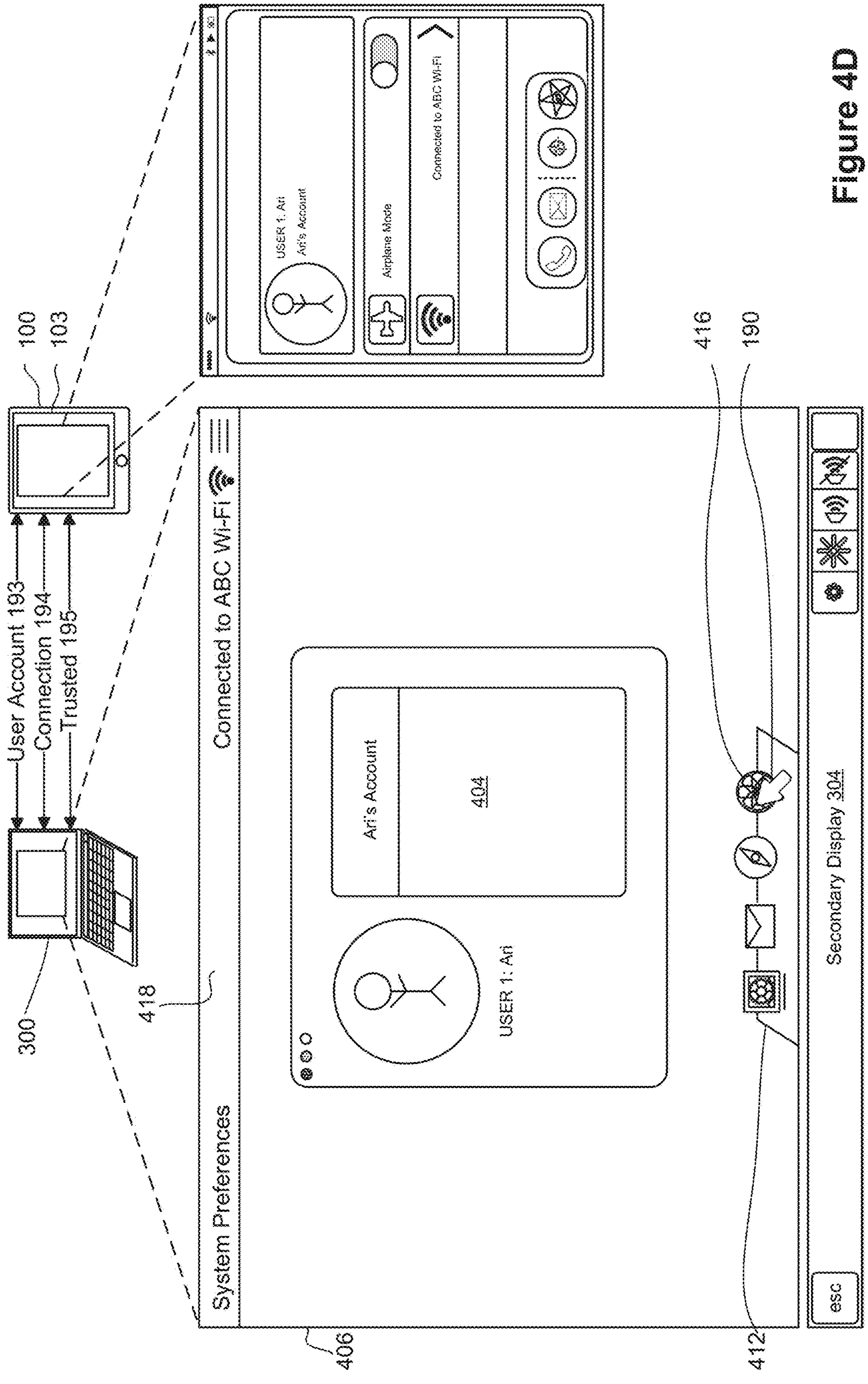
Figure 4E:
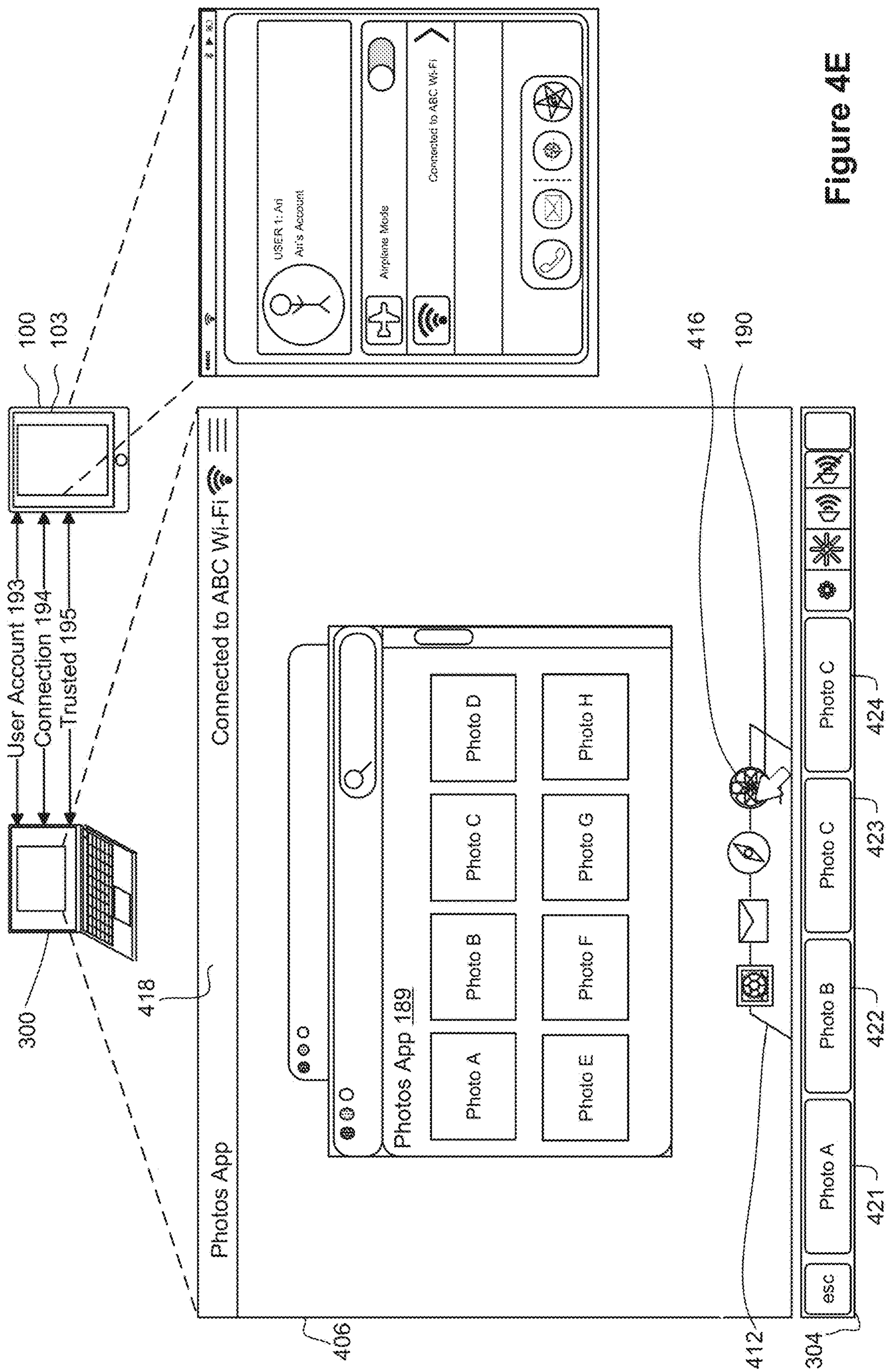
Figure 4F:
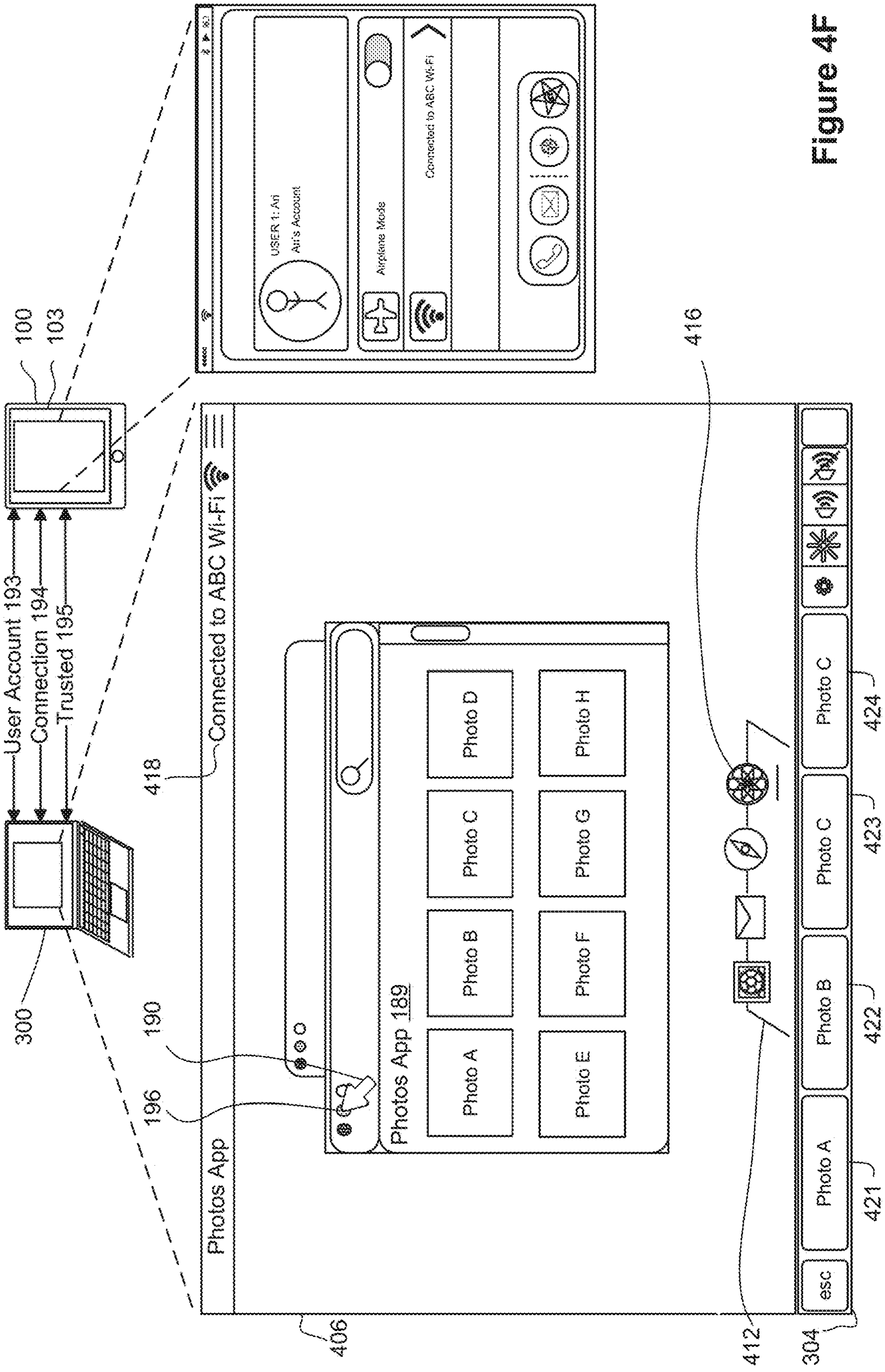
Figure 4G:
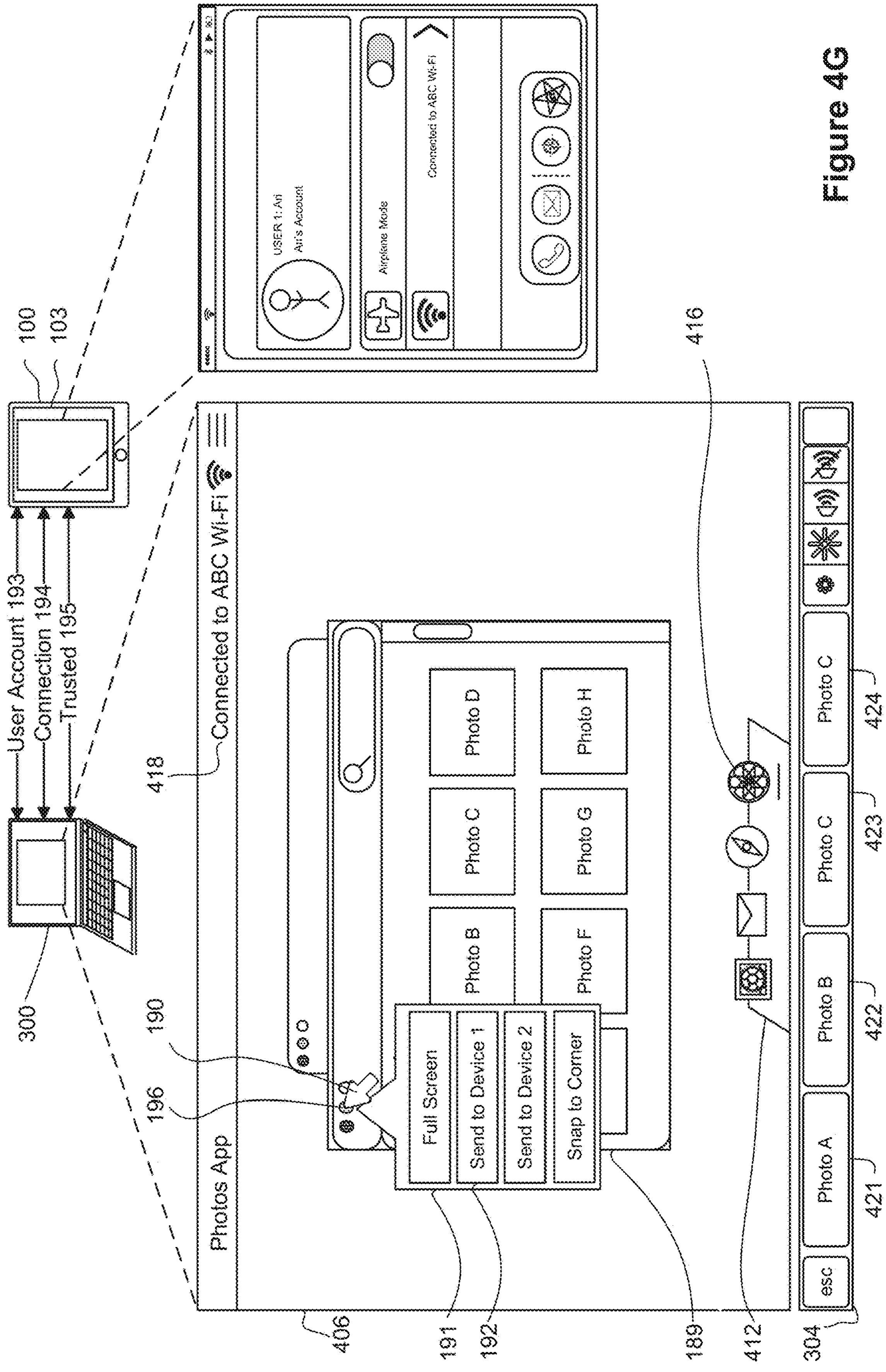
Figure 4H:
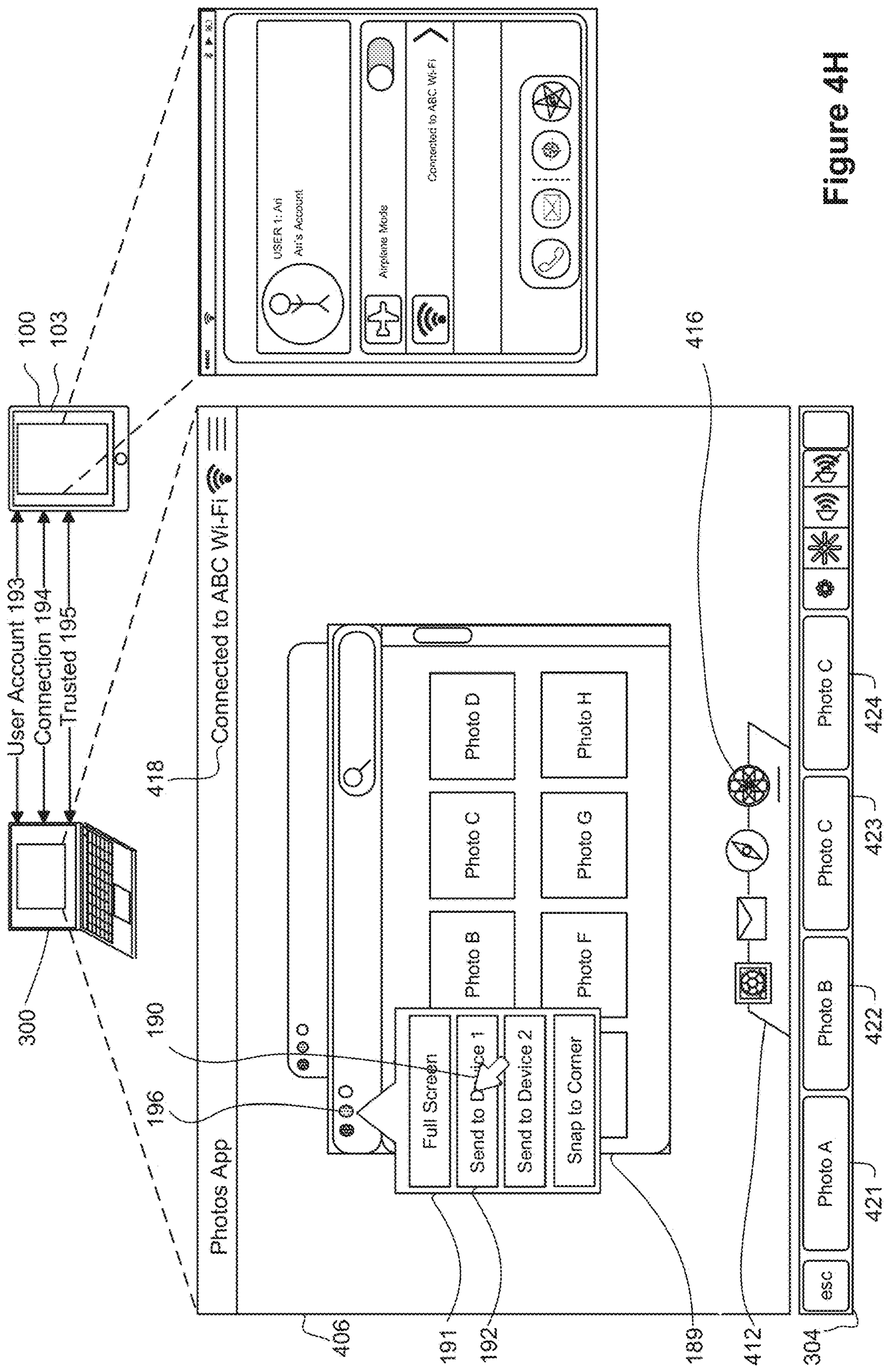
Figure 4I:
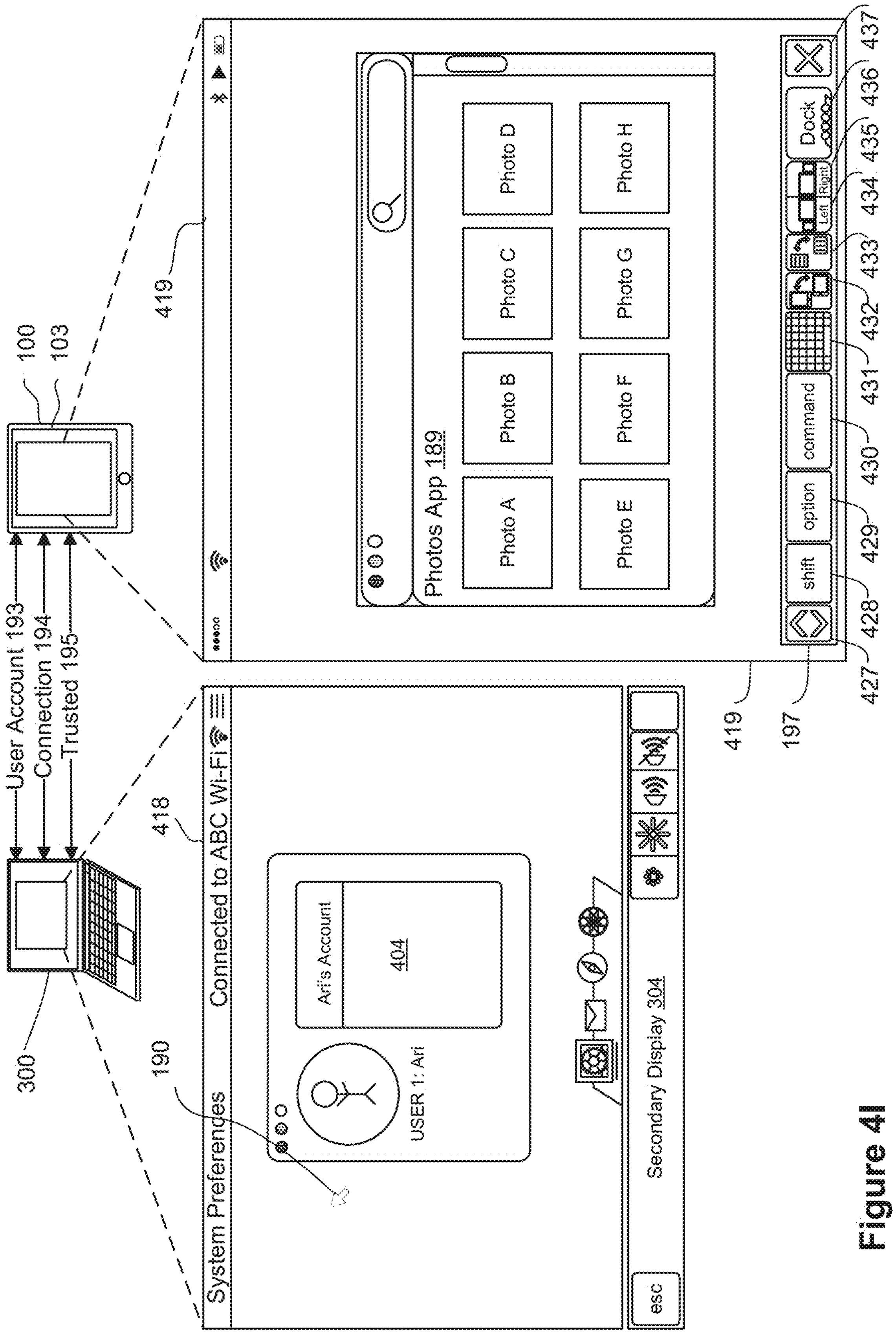
Figure 4J:
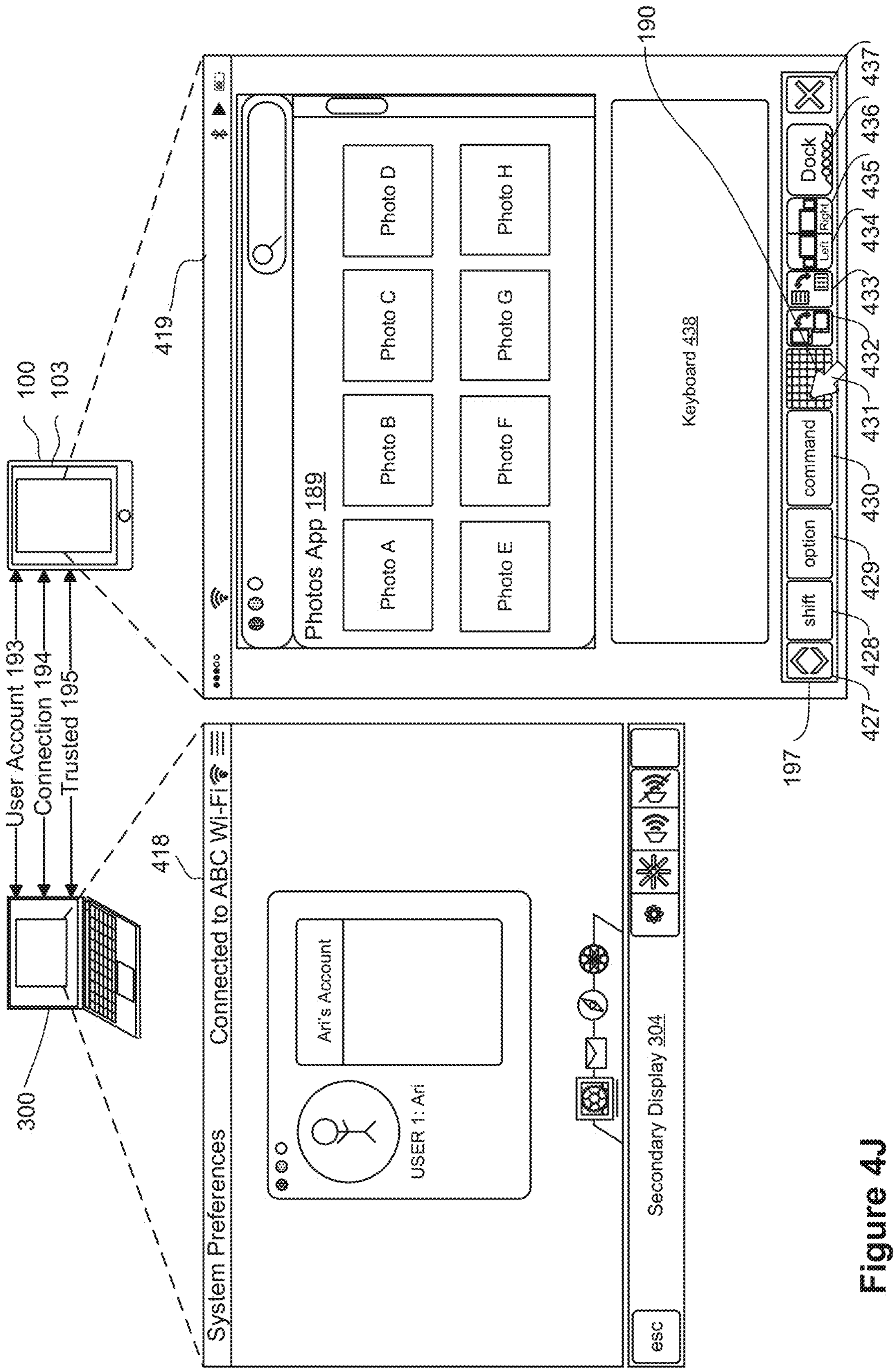
Figure 4K:
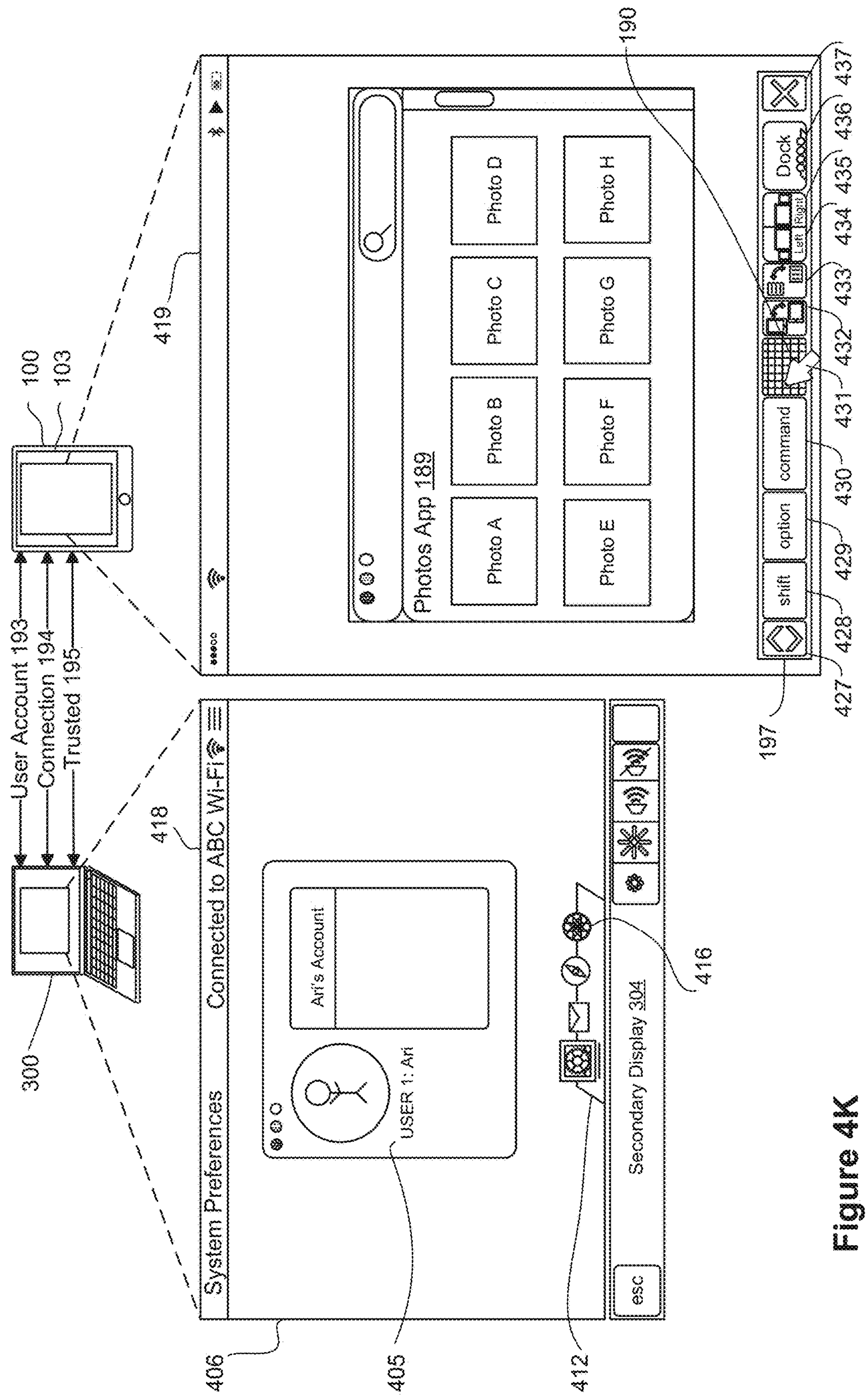
Figure 4L:
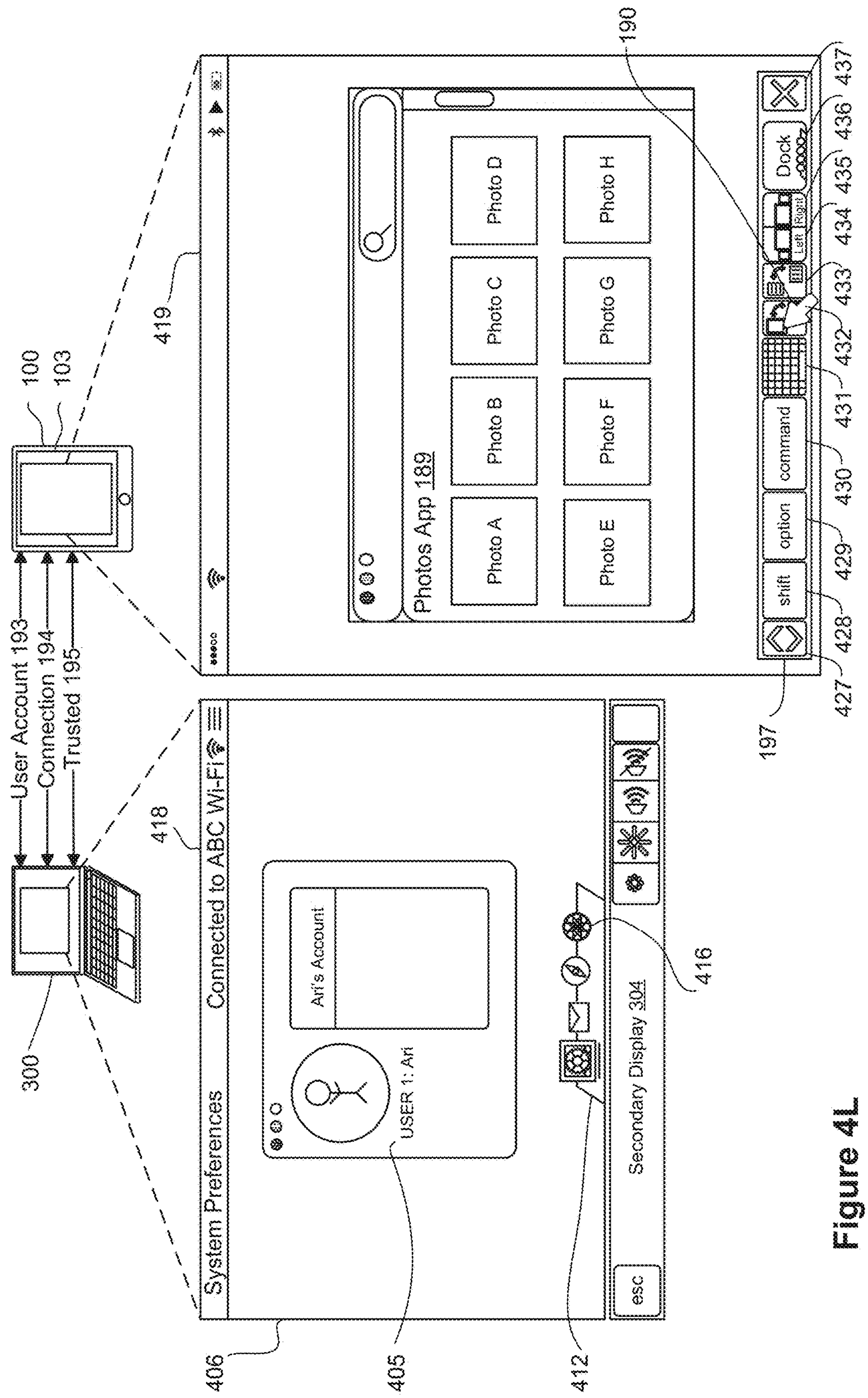
Figure 4M:
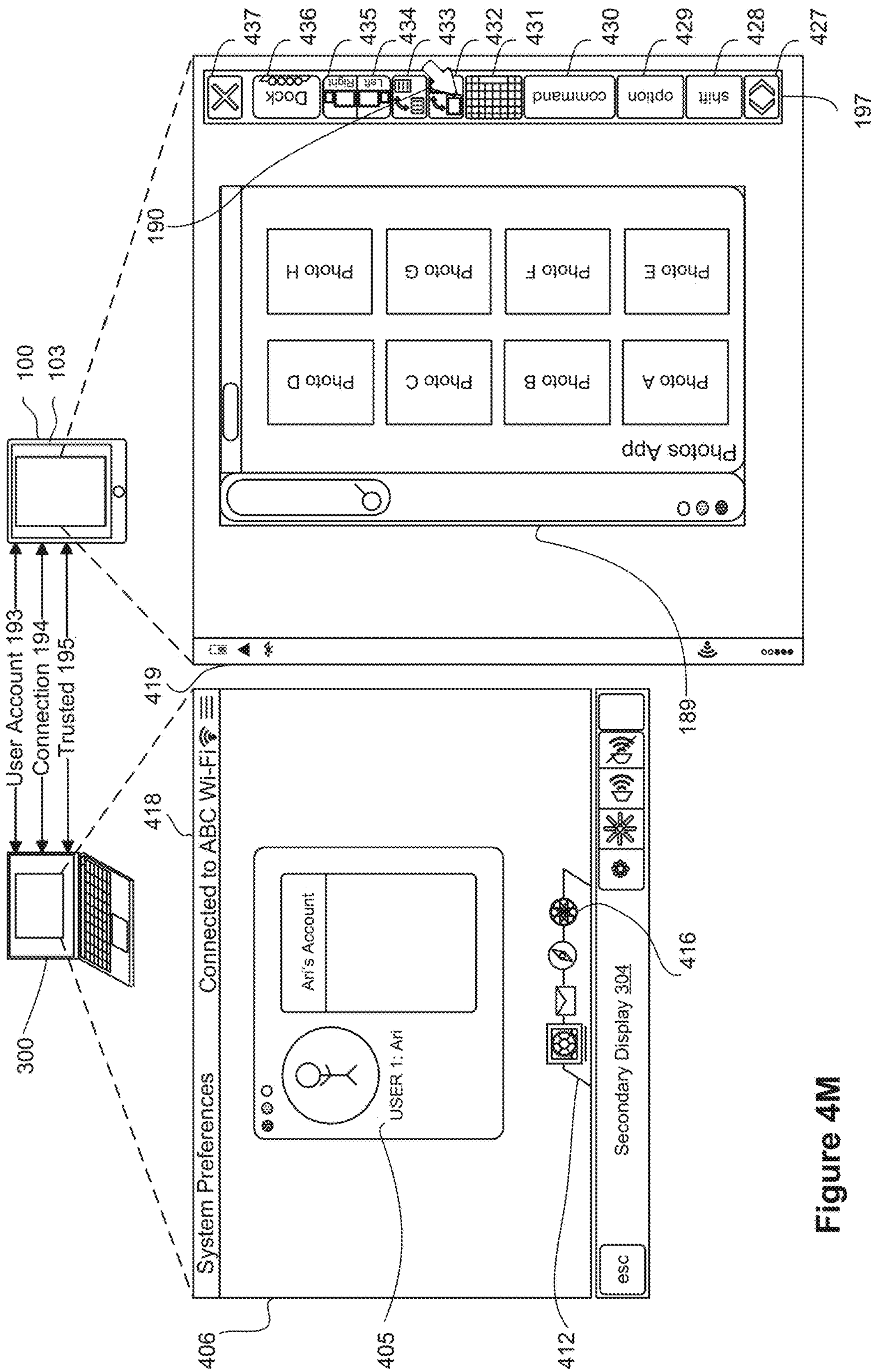
Figure 4N:
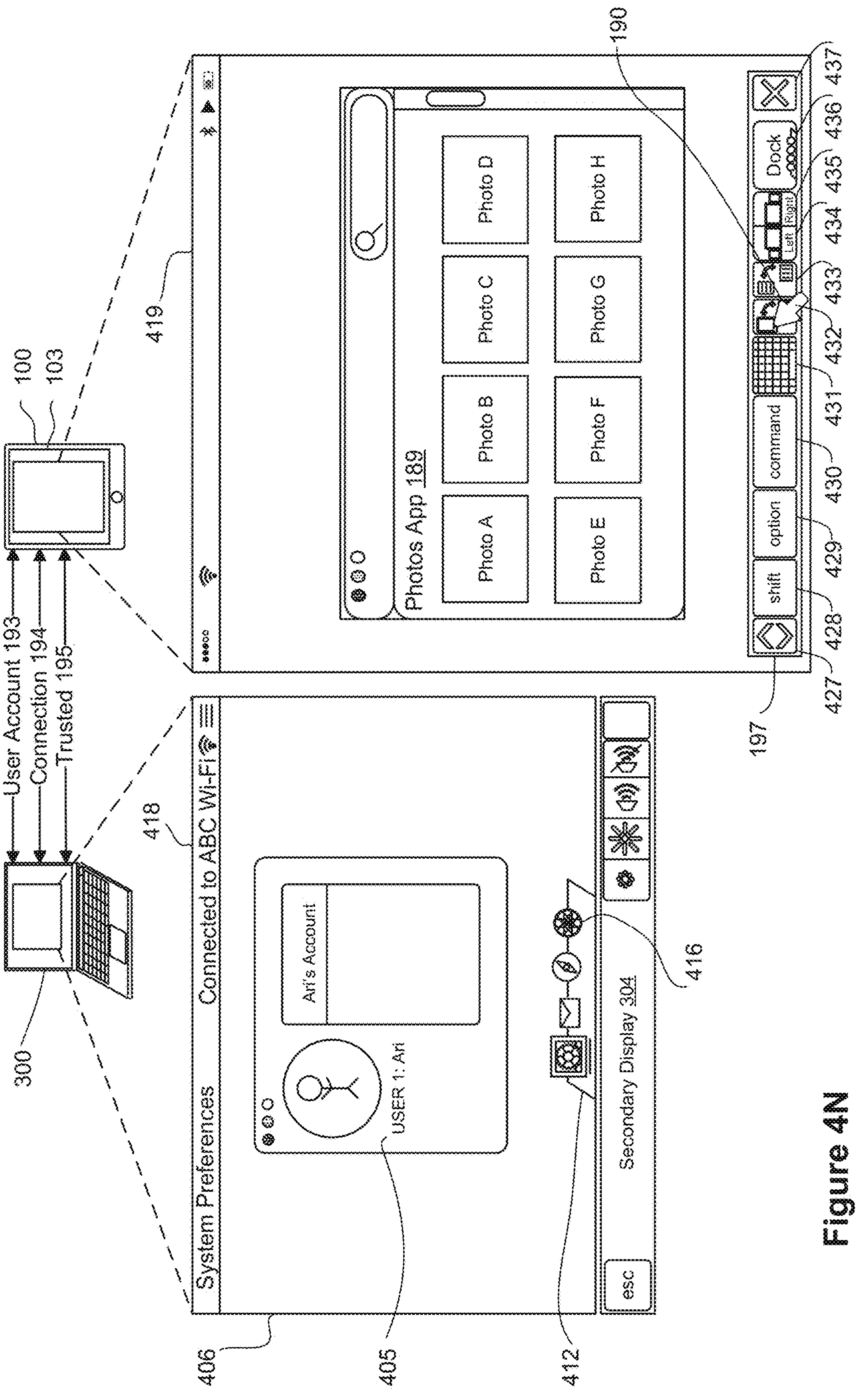
Figure 4O:
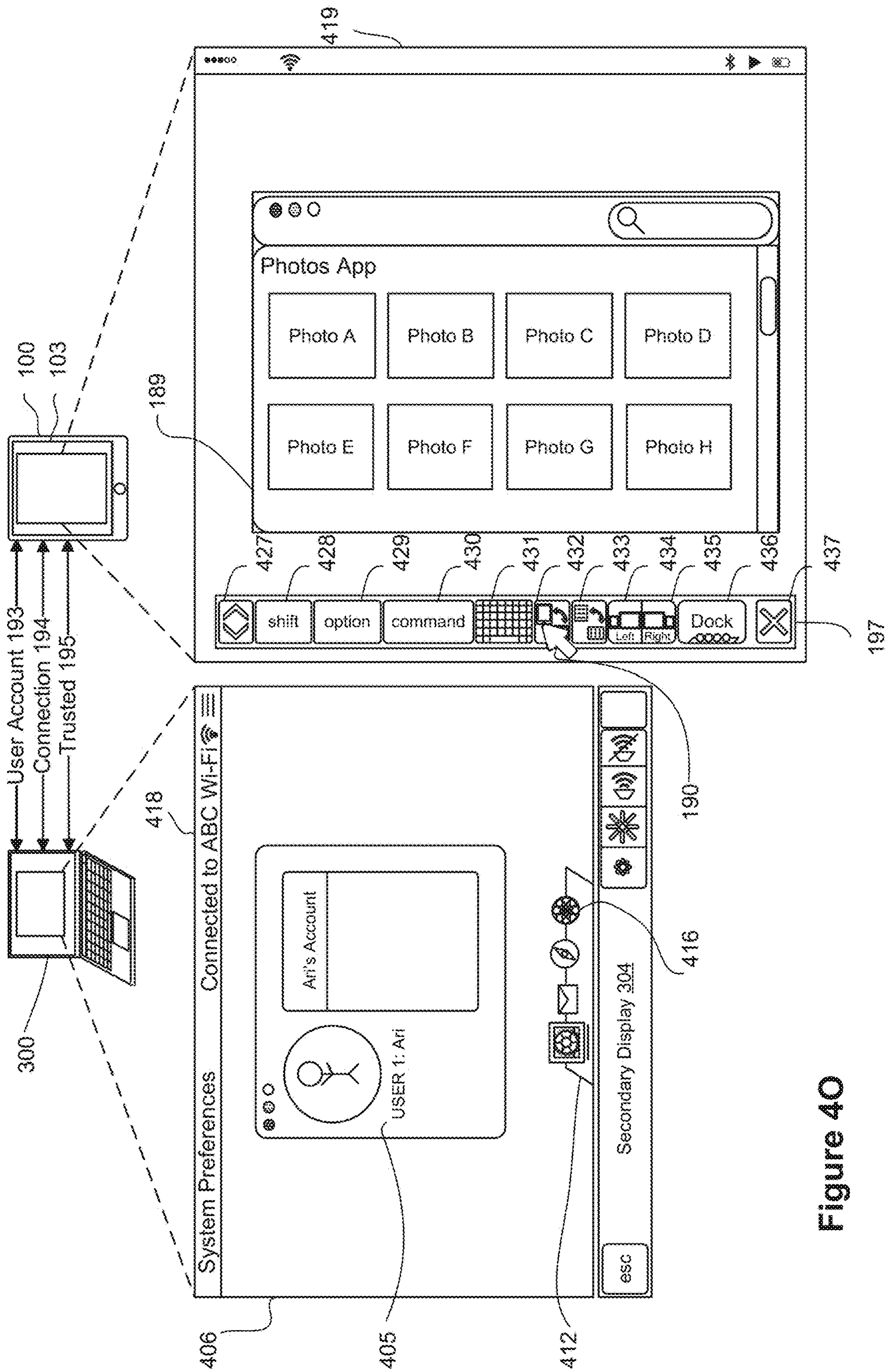
Figure 4P:
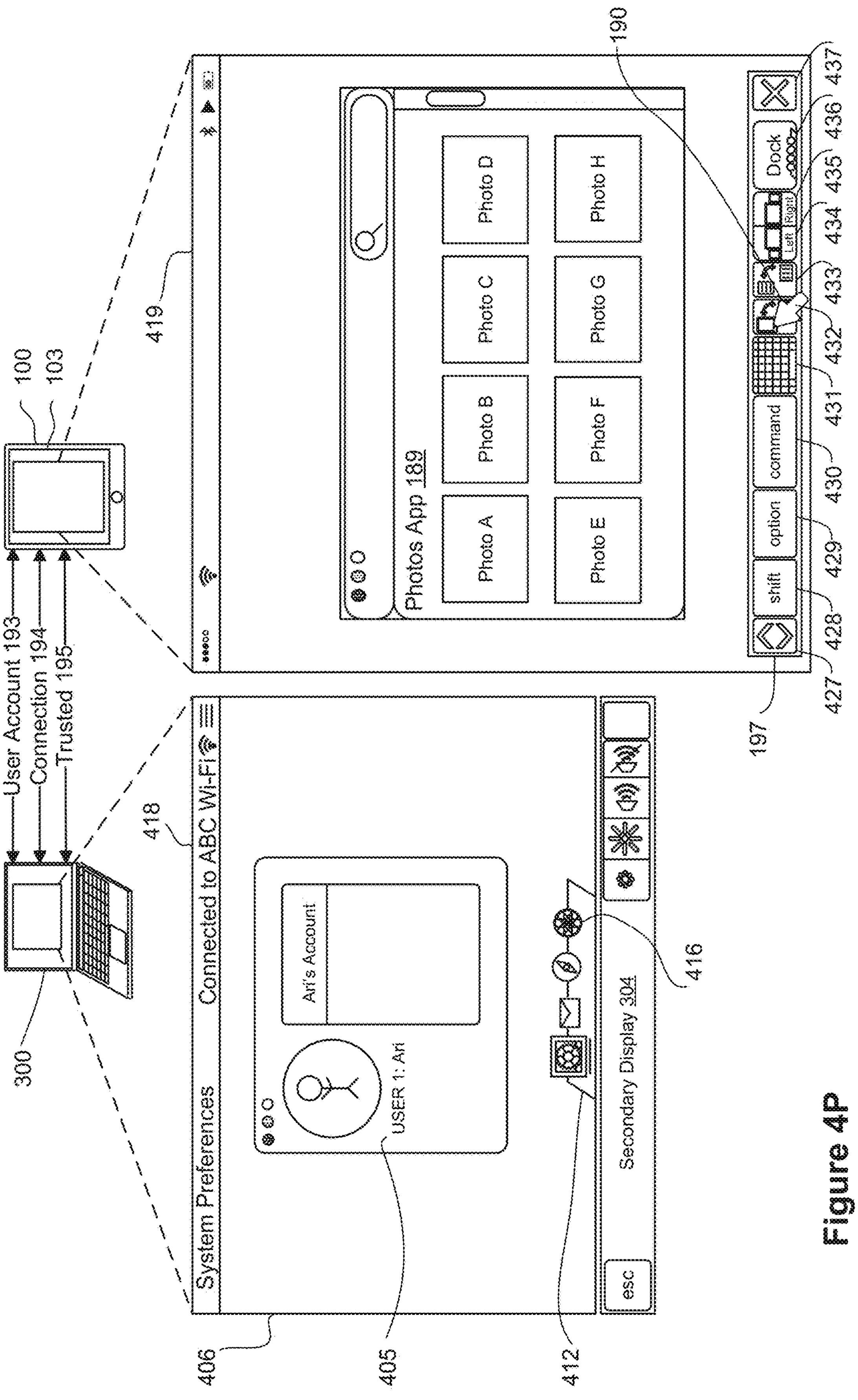
Figure 4Q:
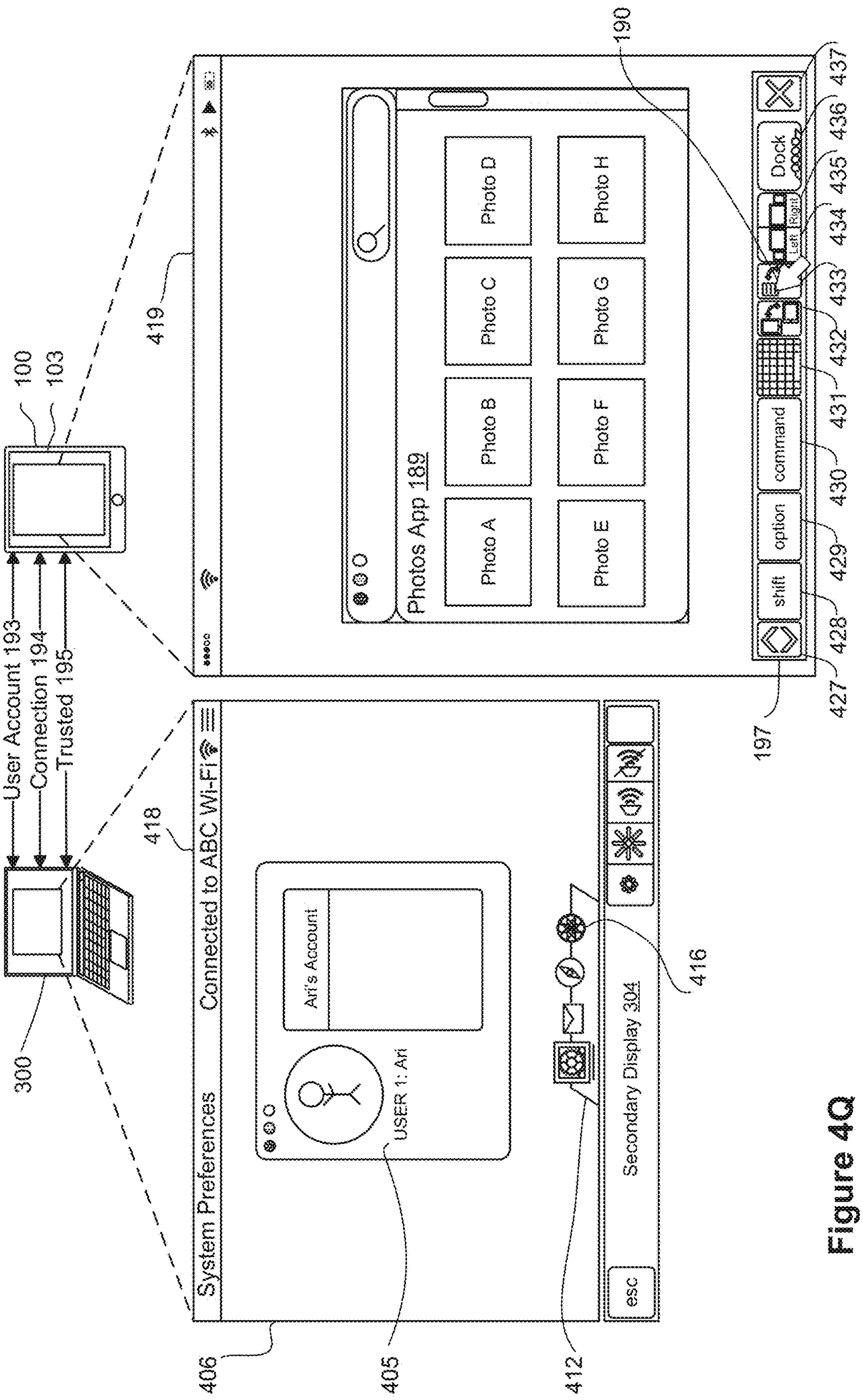
Figure 4R:
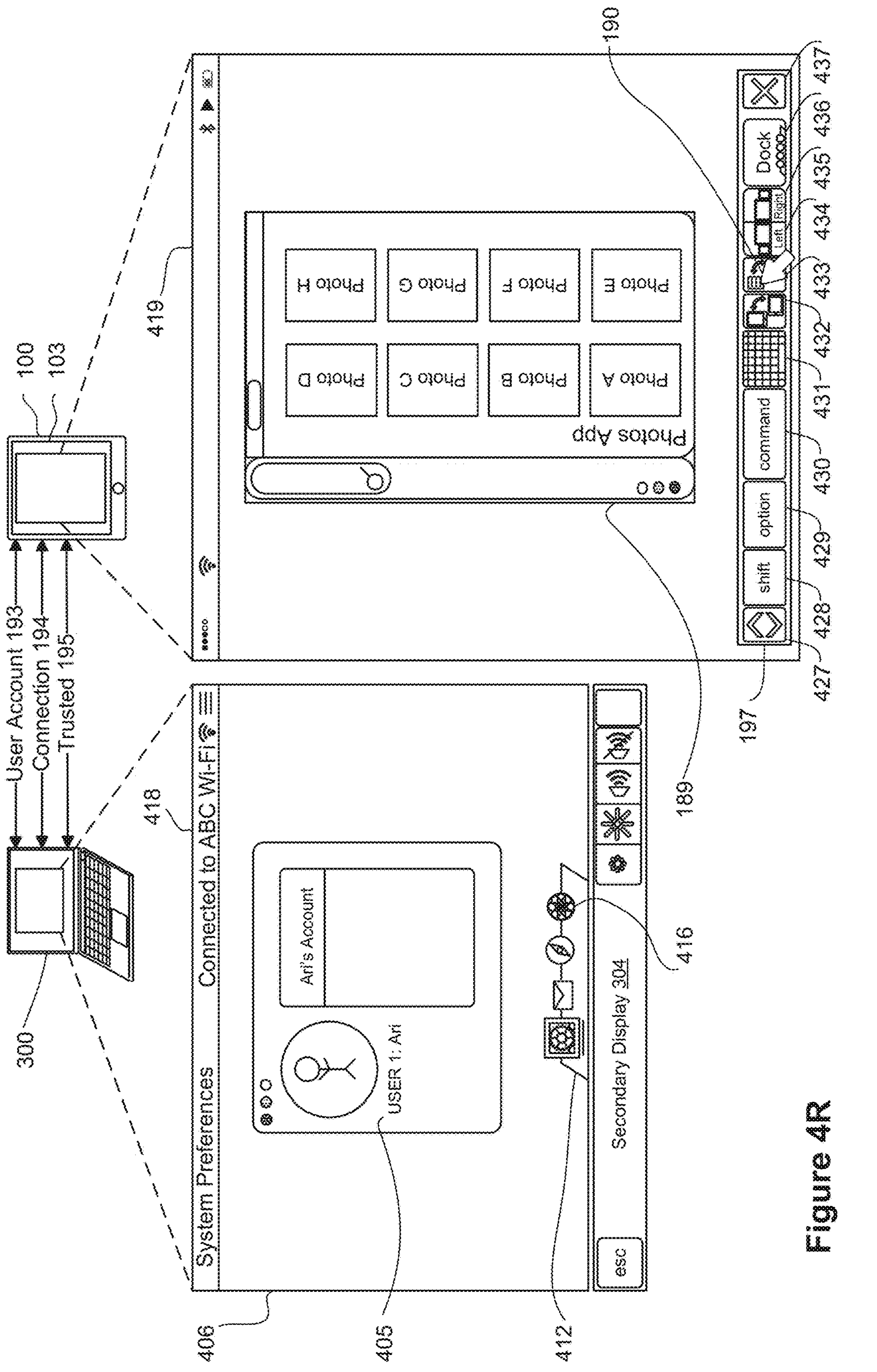
Figure 4S:
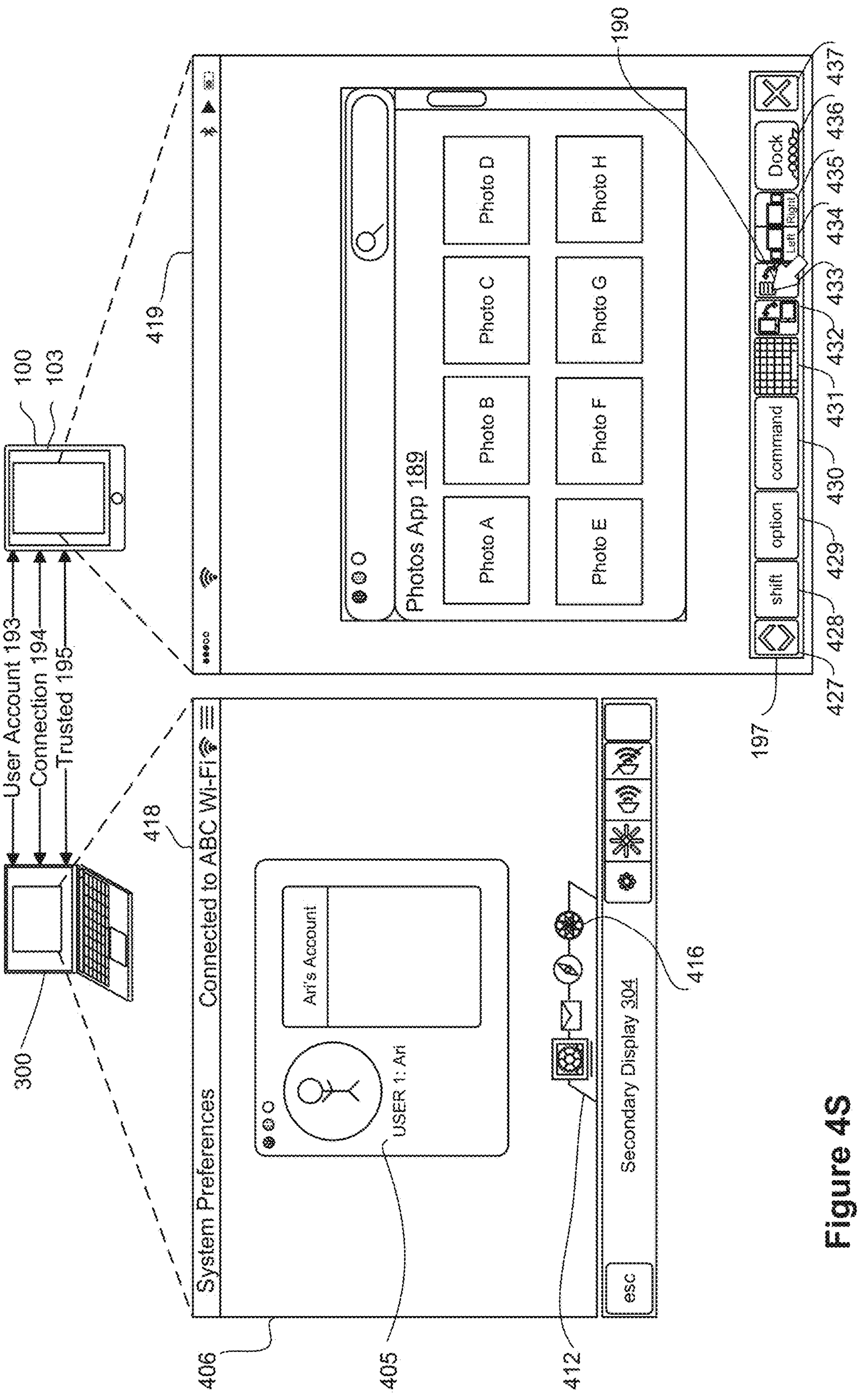
Figure 4T:
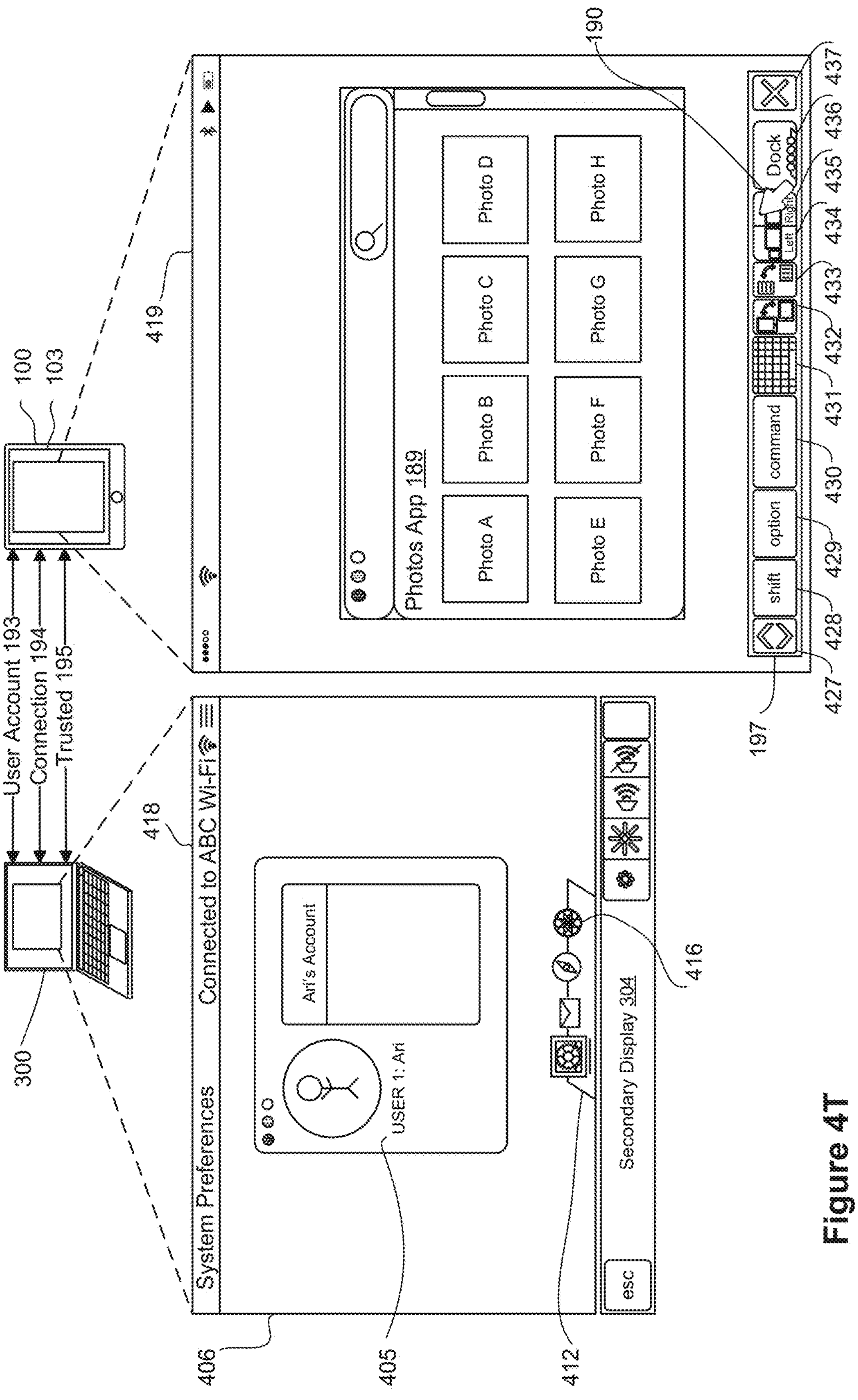
Figures 1, 4T:
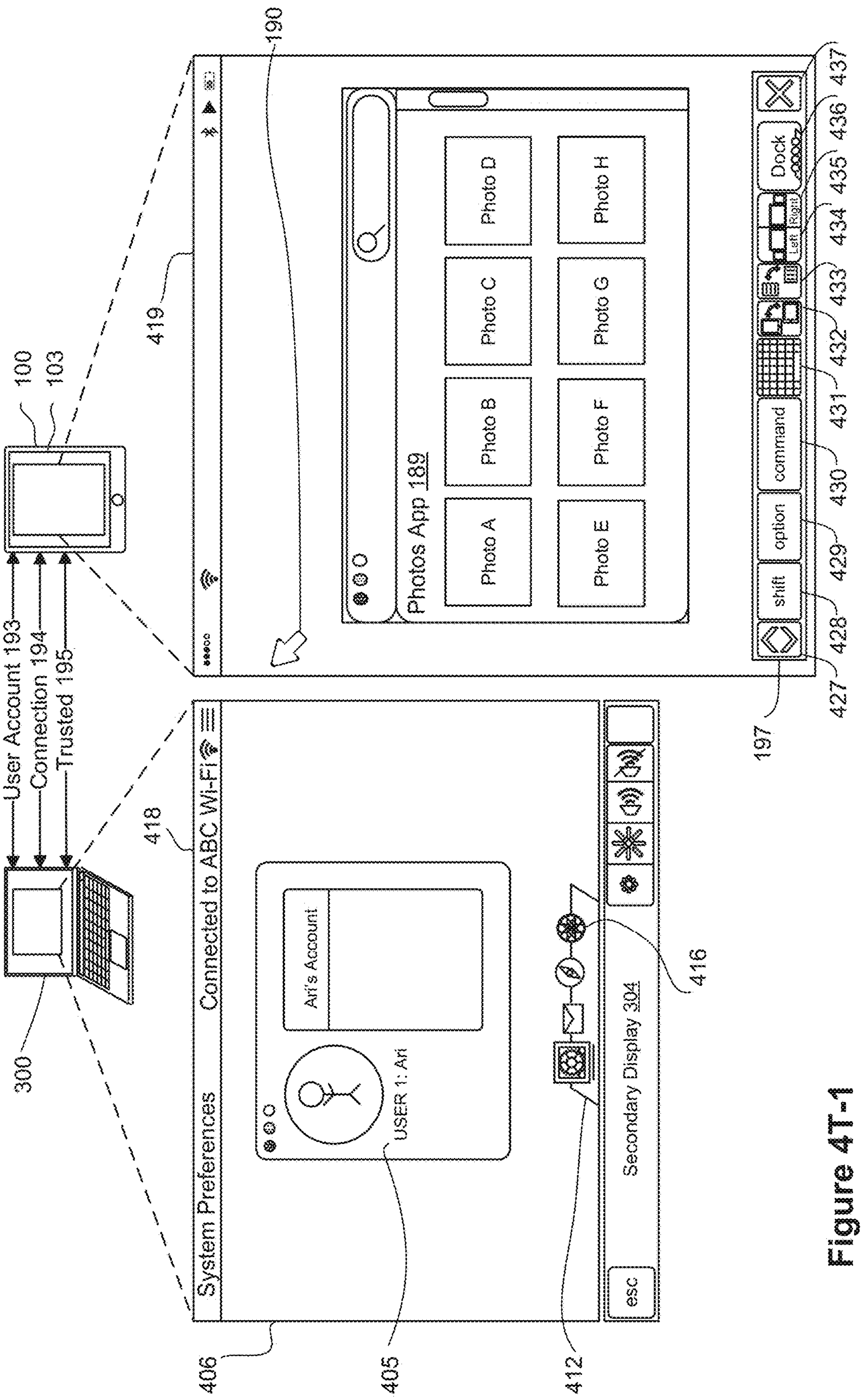
Figures 2, 4T:
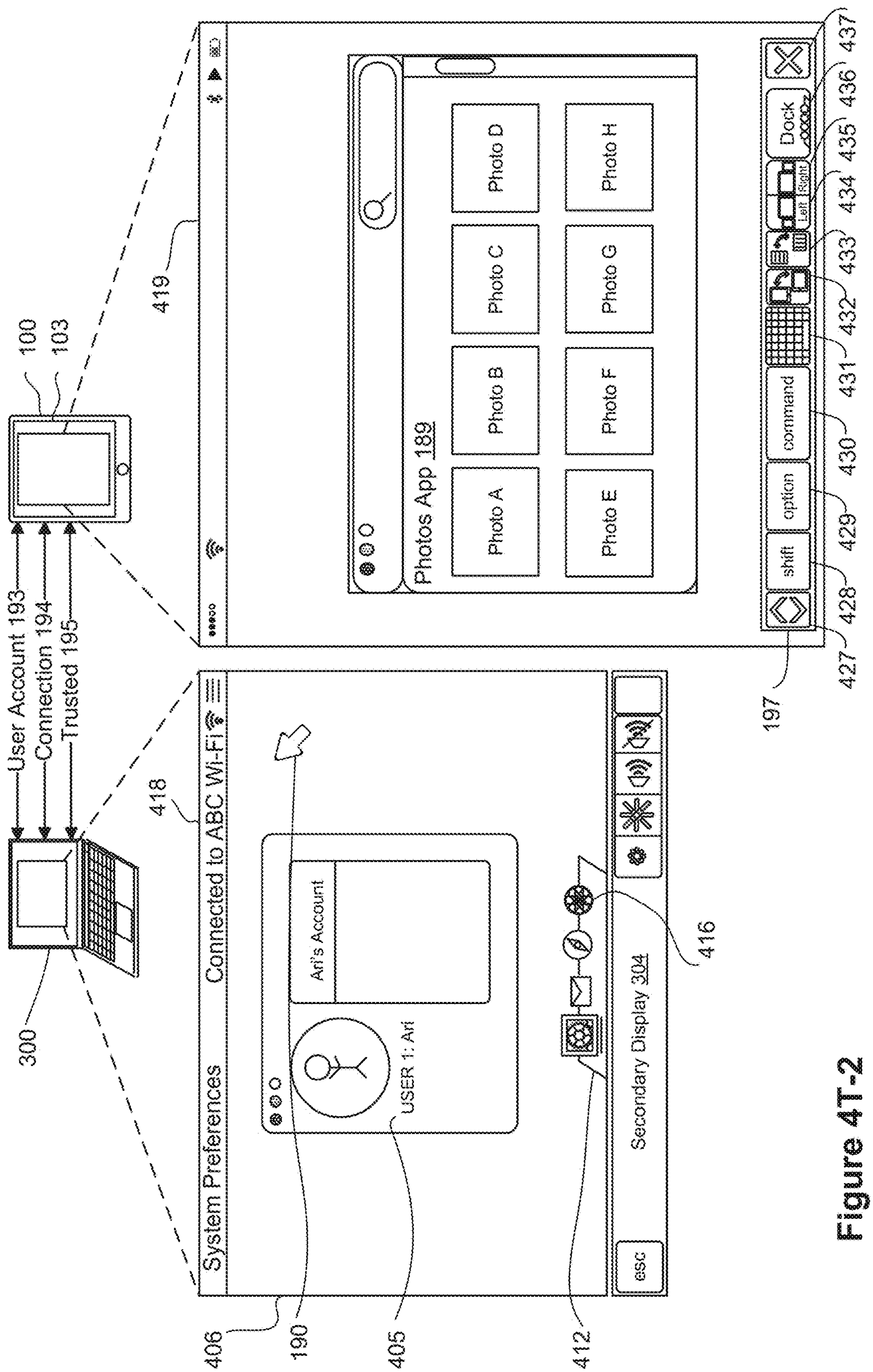

FIGS. 1-3 show example devices on which the methods described herein are implemented and performed. FIGS. 4A-7W are schematics of a display used to illustrate example user interfaces for initiating and interacting with a companion-display mode, and additional descriptions for these user interface figures are also provided with reference to the methods 800, 900, 1000, and 1100 below.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
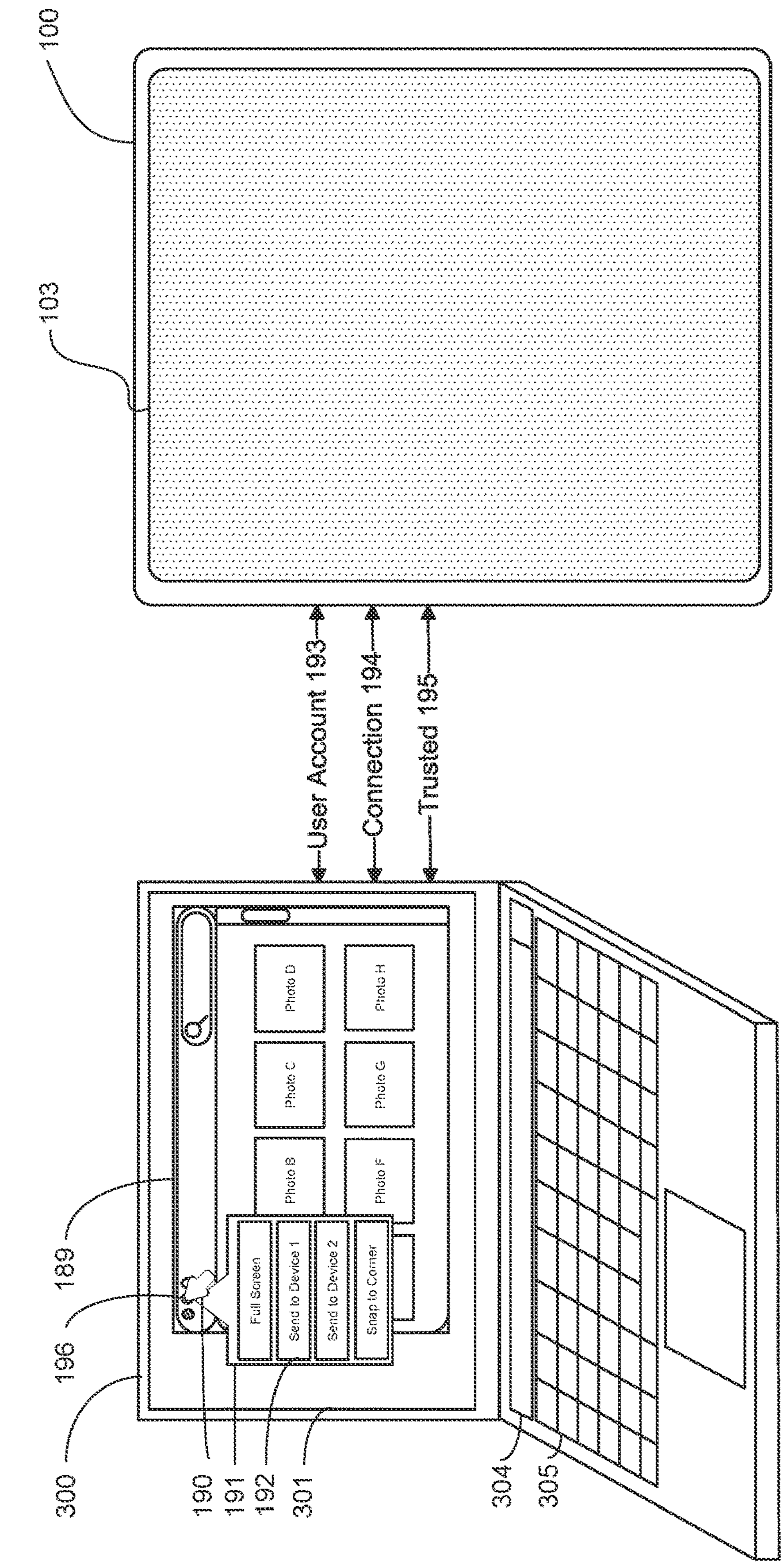
FIG. 1A-1B illustrate an example system in which a first electronic device (e.g., a tablet electronic device) operates in a companion-display mode for a second electronic device (e.g., a laptop computer), in accordance with some embodiments.
Figure 1B:
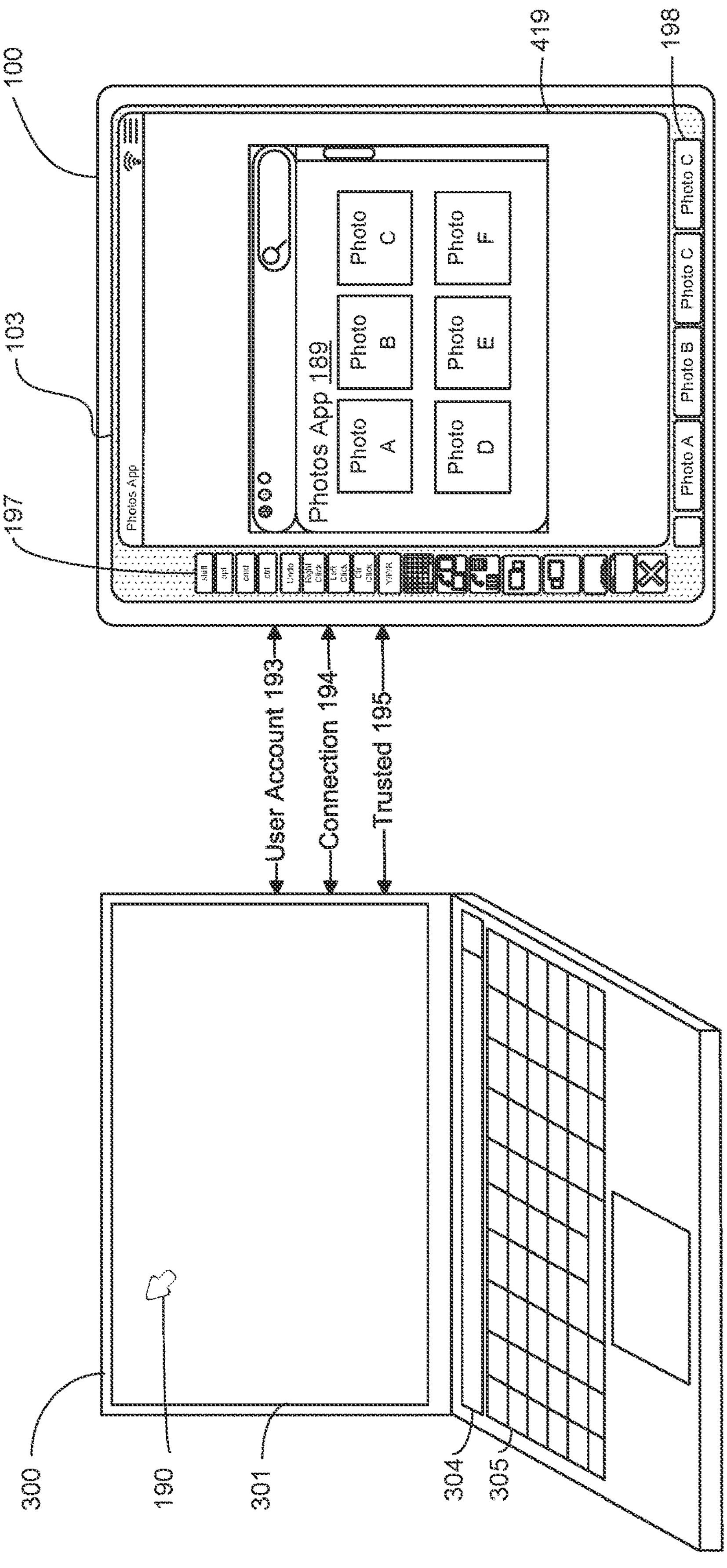

FIGS. 1A-1B show an example system in which a first electronic device (e.g., the illustrated tablet electronic device) is operating in a companion-display mode for a second electronic device (e.g., the illustrated laptop electronic device). Additional details regarding the companion-display mode are provided below. It is also noted that various references are made to first and second electronic devices and, in certain instances, the second device can be the tablet electronic device and first device can be the laptop electronic device. Also, references to tablet and laptop electronic devices are illustrative examples only. The descriptions herein regarding tablet electronic devices also apply to other portable electronic devices running mobile operating systems (e.g., a smartphone such as the IPHONE from APPLE INC. of Cupertino, Calif. that is running the IOS operating system), and the descriptions herein regarding laptop electronic device also apply to other desktop-like devices running a desktop/laptop operating system.

Block diagrams illustrating various components of the first and second electronic devices are shown in FIGS. 2 and 3A-3B.

Attention is now directed toward embodiments of portable electronic devices with touch-sensitive displays. FIG. 2 is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1 are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.11a, IEEE 802.11b, IEEE 802.11g and/or IEEE 802.11n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an example embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1 shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1 shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1 shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1 shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1 shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIG. 1. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (i.e., orientation of the device).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- fitness module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 2, portable multifunction device 100 also includes a companion display module 180 for managing operations associated with a companion-display mode multitasking on device 100. Companion display module 180 optionally includes the following modules (or sets of instructions), or a subset or superset thereof:

- Arrangement module 182 for determining an arrangement of displays for a laptop and a tablet device next to one another in conjunction with the companion-display mode described herein;
- UI Generator Module 184 for generating user interfaces and sharing data related to those user interfaces between different devices in conjunction with companion-display and annotation modes; and
- Secure criteria module 186 for monitoring whether devices have satisfied a set of secure-connection criterion that is used to determine when a companion-display mode is available for use between different devices (e.g., a laptop and a tablet device).

In conjunction with touch screen 112, display controller 156, contact module 130, graphics module 132, and contact intensity sensor(s) 165, PIP module 186 includes executable instructions to determine reduced sizes for video content and to determine an appropriate location on touch screen 112 for displaying the reduced size video content (e.g., a location that avoids important content within an active application that is overlaid by the reduced size video content).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

FIG. 3A is a block diagram of an electronic device 300, in accordance with some embodiments. In some embodiments, electronic device 300 is a laptop or desktop computer that is running a desktop operating system that is distinct from a mobile operating system.

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a web browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 322, one or more processing units (CPU(s)) 320, peripherals interface 318, RF circuitry 308, audio circuitry 310, speaker 311, microphone 313, input/output (I/O) subsystem 306, other input or control devices 316, and external port 324. Electronic device 300 optionally includes a display system 312, which may be a touch-sensitive display (sometimes also herein called a "touch screen" or a "touch screen display"). Electronic device 300 optionally includes one or more optical sensors 364. Electronic device 300 optionally includes one or more intensity sensors 365 for detecting intensity of contacts on a touch-sensitive surface such as touch-sensitive display or a touchpad. Electronic device 300 optionally includes one or more tactile output generators 367 for generating tactile outputs on a touch-sensitive surface such as touch-sensitive display or a touchpad. These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of electronic device 300, such as CPU(s) 320 and peripherals interface 318, is, optionally, controlled by memory controller 322. Peripherals interface 318 can be used to couple input and output peripherals to CPU(s) 320 and memory 302. The one or more processing units 320 run or execute various software programs and/or sets of instructions stored in memory 302 to perform various functions for electronic device 300 and to process data. In some embodiments, peripherals interface 318, CPU(s) 320, and memory controller 322 are, optionally, implemented on a single chip, such as chip 304. In some other embodiments, they are, optionally, implemented on separate chips.

RF (radio frequency) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318. I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313.

Display system 312 provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 optionally uses LCD (liquid crystal display) technology, LPD (light emitting polymer display) technology, LED (light emitting diode) technology, or OLED (organic light emitting diode) technology, although other display technologies are used in other embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, Calif.

Display system 312 optionally has a video resolution in excess of 400 dpi (e.g., 500 dpi, 800 dpi, or greater). In some embodiments, display system 312 is a touch-sensitive display with which the user optionally makes contact using a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touchpad for activating or deactivating particular functions. In some embodiments, the touchpad is a touch-sensitive area of electronic device 300 that, unlike display system 312, does not display visual output. In some embodiments, when display system 312 is a touch-sensitive display, the touchpad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Electronic device 300 optionally also includes one or more optical sensors 364 coupled with optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lens, and converts the light to data representing an image. In conjunction with imaging module 343, optical sensor(s) 364 optionally capture still images or video. In some embodiments, an optical sensor is located on the front of electronic device 300 so that the user's image is, optionally, obtained for videoconferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface.

Electronic device 300 optionally also includes one or more tactile output generators 367 coupled with haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306.

In some embodiments, the software components stored in memory 302 include operating system 326, communication module 328 (or set of instructions), contact/motion module 330 (or set of instructions), graphics module 332 (or set of instructions), applications 340 (or sets of instructions), and touch-bar management module 350 (or sets of instructions). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 and/or a peripheral display system; sensor state, including information obtained from various sensors and input or control devices 316 of electronic device 300; and location information concerning the location and/or attitude of electronic device 300.

Operating system 326 (e.g., DARWIN, RTXC, LINUX, UNIX, OS X, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices over one or more external ports 324 and/or RF circuitry 308 and also includes various software components for sending/receiving data via RF circuitry 308 and/or external port 324. External port 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices.

Contact/motion module 330 optionally detects contact with display system 312 when it is a touch-sensitive display (in conjunction with display controller 356) and other touch sensitive devices (e.g., a touchpad or physical click wheel). Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touchpad.

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Graphics module 332 includes various known software components for rendering and causing display of graphics on primary display 102 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Applications 340 optionally include the following modules (or sets of instructions), or a subset or superset thereof:

- e-mail client module 341 (sometimes also herein called "mail app" or "e-mail app") for receiving, sending, composing, and viewing e-mails;
- imaging module 342 for capturing still and/or video images;
- image management module 343 (sometimes also herein called "photo app") for editing and viewing still and/or video images;
- media player module 344 (sometimes also herein called "media player app") for playback of audio and/or video; and
- web browsing module 345 (sometimes also herein called "web browser") for connecting to and browsing the Internet.

Examples of other applications 340 that are, optionally, stored in memory 302 include messaging and communications applications, word processing applications, other image editing applications, drawing applications, presentation applications, JAVA-enabled applications, encryption applications, digital rights management applications, voice recognition applications, and voice replication applications.

In conjunction with one or more of RF circuitry 308, display system 312, display controller 356, and contact module 330, graphics module 332, e-mail client module 341 includes executable instructions to create, send, receive, and manage e-mail in response to user instructions. In conjunction with image management module 343, e-mail client module 341 makes it very easy to create and send e-mails with still or video images taken with imaging module 342.

In conjunction with one or more of display system 312, display controller 356, optical sensor(s) 364, optical sensor controller 358, contact module 330, graphics module 332, and image management module 343, imaging module 342 includes executable instructions to capture still images or video (including a video stream) and store them into memory 302, modify characteristics of a still image or video, or delete a still image or video from memory 302.

In conjunction with one or more of display system 312, display controller 356, contact module 330, graphics module 332, and imaging module 342, image management module 343 includes executable instructions to arrange, modify (e.g., edit), or otherwise manipulate, label, delete, present (e.g., in a digital slide show or album), and store still and/or video images.

In conjunction with one or more of display system 312, display controller 356, contact module 330, graphics module 332, audio circuitry 310, speaker 311, RF circuitry 308, and web browsing module 345, media player module 344 includes executable instructions that allow the user to download and play back recorded music and other sound files stored in one or more file formats, such as MP3 or AAC files, and executable instructions to display, present or otherwise play back videos.

In conjunction with one or more of RF circuitry 308, display system 312, display controller 356, contact module 330, and graphics module 332, web browsing module 345 includes executable instructions to browse the Internet in accordance with user instructions, including searching, linking to, receiving, and displaying web pages or portions thereof, as well as attachments and other files linked to web pages.

As pictured in FIG. 3A, the device 300 can also include a companion display module 350 for managing operations associated with a companion-display mode multitasking on device 100. Companion display module 350 optionally includes the following modules (or sets of instructions), or a subset or superset thereof:

- Arrangement module 351 for determining an arrangement of displays for a laptop and a tablet device next to one another in conjunction with the companion-display mode described herein;
- UI Generator Module 352 for generating user interfaces and sharing data related to those user interfaces between different devices in conjunction with companion-display and annotation modes; and
- Secure criteria module 353 for monitoring whether devices have satisfied a set of secure-connection criterion that is used to determine when a companion-display mode is available for use between different devices (e.g., a laptop and a tablet device).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

FIG. 3B is a block diagram of components for event handling of FIG. 3A, in accordance with some embodiments. In some embodiments, memory 302 (FIG. 3A) includes event sorter 370 (e.g., in operating system 326) and an application 340-1 (e.g., any of the aforementioned applications 341, 342, 343, 344, or 345).

Event sorter 370 receives event information and determines the application 340-1 and application view 391 of application 340-1 to which to deliver the event information. Event sorter 370 includes event monitor 371 and event dispatcher module 374. In some embodiments, application 340-1 includes application internal state 392, which indicates the current application view(s) displayed on display system 312 when the application is active or executing. In some embodiments, device/global internal state 357 is used by event sorter 370 to determine which application(s) is (are) currently active or in focus, and application internal state 392 is used by event sorter 370 to determine application views 391 to which to deliver event information.

In some embodiments, application internal state 392 includes additional information, such as one or more of: resume information to be used when application 340-1 resumes execution, user interface state information that indicates information being displayed or that is ready for display by application 340-1, a state queue for enabling the user to go back to a prior state or view of application 340-1, and a redo/undo queue of previous actions taken by the user.

Event monitor 371 receives event information from peripherals interface 318. Event information includes information about a sub-event (e.g., a user touch on display system 312 when it is a touch-sensitive display, as part of a multi-touch gesture). Peripherals interface 318 transmits information it receives from I/O subsystem 306 or a sensor, such as proximity sensor(s) 366, accelerometer(s) 368, and/or microphone 313 (through audio circuitry 310). Information that peripherals interface 318 receives from I/O subsystem 306 includes information from display system 312 when it is a touch-sensitive display or another touch-sensitive surface.

In some embodiments, event monitor 371 sends requests to the peripherals interface 318 at predetermined intervals. In response, peripherals interface 318 transmits event information. In other embodiments, peripheral interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373.

Hit view determination module 372 provides software procedures for determining where a sub-event has taken place within one or more views, when display system 312 displays more than one view, where views are made up of controls and other elements that a user can see on the display.

Another aspect of the user interface associated with an application is a set of views, sometimes herein called application views or user interface windows, in which information is displayed and touch-based gestures occur. The application views (of an application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In other embodiments, active event recognizer determination module 373 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver 382.

In some embodiments, operating system 326 includes event sorter 370. Alternatively, application 340-1 includes event sorter 370. In yet other embodiments, event sorter 370 is a stand-alone module, or a part of another module stored in memory 302, such as contact/motion module 330.

In some embodiments, application 340-1 includes a plurality of event handlers 390 and one or more application views 391, each of which includes instructions for handling touch events that occur within a respective view of the application's user interface. Each application view 391 of the application 340-1 includes one or more event recognizers 380. Typically, an application view 391 includes a plurality of event recognizers 380. In other embodiments, one or more of event recognizers 380 are part of a separate module, such as a user interface kit (not shown) or a higher level object from which application 340-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in an application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across display system 312 when it is a touch-sensitive display, and lift-off of the touch (touch end). In some embodiments, the event also includes information for one or more associated event handlers 390.

In some embodiments, event definition 387 includes a definition of an event for a respective user-interface object. In some embodiments, event comparator 384 performs a hit test to determine which user-interface object is associated with a sub-event. For example, in an application view in which three user-interface objects are displayed on display system 312, when a touch is detected on display system 312 when it is a touch-sensitive display, event comparator 384 performs a hit test to determine which of the three user-interface objects is associated with the touch (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 340-1. For example, data updater 376 stores a video file used by media player module 344. In some embodiments, object updater 377 creates and updates objects used by application 340-1. For example, object updater 376 creates a new user-interface object or updates the position of a user-interface object. GUI updater 378 updates the GUI. For example, GUI updater 378 prepares display information and sends it to graphics module 332 for display on display system 312.

In some embodiments, event handler(s) 390 includes or has access to data updater 376, object updater 377, and GUI updater 378. In some embodiments, data updater 376, object updater 377, and GUI updater 378 are included in a single module of an application 340-1 or application view 391. In other embodiments, they are included in two or more software modules.

It shall be understood that the foregoing discussion regarding event handling of user touches on touch-sensitive displays also applies to other forms of user inputs to operate electronic device 300 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

As used herein, the term “focus selector” refers to an input element that indicates a current part of a user interface with which a user is interacting. In some implementations that include a cursor or other location marker, the cursor acts as a “focus selector,” so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display that enables direct interaction with user interface elements on the touch-screen display, a detected contact on the touch-screen acts as a “focus selector,” so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user’s intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term “intensity” of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has “clicked” on an icon). In some embodiments, at least a subset of the intensity thresholds are determined in accordance with software parameters (e.g., the intensity thresholds are not determined by the activation thresholds of particular physical actuators and can be adjusted without changing the physical hardware of the portable computing system 100). For example, a mouse “click” threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click “intensity” parameter).

As used in the specification and claims, the term “characteristic intensity” of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include (i) a contact detection intensity threshold $IT_0$, (ii) a light press intensity threshold $IT_L$, (iii) a deep press intensity threshold $IT_D$ (e.g., that is at least initially higher than $I_L$), and/or (iv) one or more other intensity thresholds (e.g., an intensity threshold Ix that is lower than $I_L$). In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UIs") and associated processes that may be implemented on a system that includes a laptop 300 (FIG. 1A) and tablet device 100 (FIG. 2A-2B), in which user interfaces generated by one device (e.g., laptop 300) are presented at another device (e.g., tablet device 100). In the descriptions that follow, a mode in which such user interfaces generated by one device are presented at another device is referred to herein as a companion-display mode. Although a laptop is used as an illustrative example in the descriptions that follow, one of skill in the art would readily understand that the techniques described here are equally applicable to any device that is running a desktop/laptop operating system, or in some instances the operations that are described as being performed on the laptop can also be performed by a tablet device, and vice versa. The examples that follow depict one or more embodiments.

FIG. 1A illustrates that laptop 300 has a connection 194 (e.g., a wired or wireless connection), is associated with (e.g., logged into) a same user account as the tablet device 100, and has established a trusted connection with the tablet device (e.g., a trust prompt, such as that described below has been accepted by a user of the devices). The laptop includes a display 301, which can also be a touch-sensitive display. Additionally, in some embodiments, the laptop can also include a dynamic function row 304, for displaying additional information (additional details regarding such a dynamic function row 304 are provided in U.S. patent application Ser. No. 15/655,707, which application is hereby incorporated by reference in its entirety). Furthermore, the laptop also includes a keyboard 305. With respect to the tablet device 100, tablet device 100 includes a touch-sensitive display 103, which can be capacitive sensing, and the device 100 is also able to receive inputs from input devices such as a stylus or a user's finger. FIG. 1A also illustrates performing a selection operation with a cursor 190 (e.g., by hovering or performing a right click) on a maximize button 196 (e.g., a button that is displayed in between two other buttons in a corner of a user interface window, and that maximize button can also be presented in a green color). In the examples that follow, the laptop can display a photos application window 189 (this is one example for explanatory purposes, but other application user interfaces can also be displayed and utilized with the companion-display mode discussed herein).

As FIG. 1A shows, an input at the maximize button 196 causes display of a menu 191 that includes selectable options that each control a display property associated with the photos application window 189. For example, selectable option 192, when selected, causes the photos application window 189 to be sent to the tablet device 100 for display on the touch-sensitive display 103. The other selectable options displayed in the menu 191 control a respective display property for the photos application window 189, (e.g., "Full Screen" selectable option, when selected, causes the photos application window 189 to be display in a full-screen mode on the display 301; "Send to Device 2" selectable option, when selected, causes the photos application window 189 to be displayed on Device 2, and "Snap to Corner or Edge" selectable option, when selected, causes the photos application window 189 to be displayed covering either the left, the right, the top, or the bottom of the display 302 of the laptop device 300).

In some embodiments, both devices 100 and 300 run their own respective operating systems, and when the companion-display mode is activated the tablet device will continue to run its operating system, but will then receive information from the device 300 that allows the device 100 to display user interfaces generated by the device 300 (in some instances, the device 100 also ceases to display any user interface elements associated with its operating system when the companion-display mode is initiated). In some embodiments, both devices can be running the same operating system (e.g., two table devices running a mobile operating system or two laptop devices running a desktop operating system).

FIG. 1B illustrates that after selection of selectable option 192 depicted in FIG. 1A (e.g., "Send to Device 1"), the tablet device is caused to enter a companion-display mode. The companion-display mode allows the laptop 300 to utilize the tablet device as an additional monitor/display system, including sending user interfaces to the tablet device (and to also receive information from the tablet device 100 regarding interactions with user interfaces generated by the device 300 that are presented on the device 100 during the companion-display mode). In some embodiments, when a companion-display mode is operating on the tablet device 100, the touch-sensitive display 103 will show a companion-display mode user interface 419, a control strip 197 that displays at least one control for controlling companion-display mode functions (e.g., control strip 197 aids the user in changing display properties of the companion-display mode without having to navigate buried menus to change companion-display mode properties), and a tablet-device dynamic function row 198, which can include application-specific controls that control functionality within, e.g., the photos app 189 or another application associated with the device 300. In some embodiments, the dynamic function row 198 includes controls that are the same as those provided at a touch-sensitive secondary display of a laptop (additional details regarding such controls are provided in application Ser. No. 15/655,707, which was incorporated by reference in its entirety above.)

The placement of the control strip 197, and the tablet dynamic function row 304, in FIG. 1B is merely illustrative, as these control bars can be oriented in many different ways. For example, the control strip can also be placed on the right of the touch-sensitive display 103. In another example, the control strip can be placed at either the top or bottom of the touch-sensitive display 103. When the control strip is placed at different locations the companion-display mode user interface 419 can be resized to fill the empty areas of the display. The user can choose to display the control strip 197, and the tablet dynamic function row 198 in different locations based on their preferences, which can be provided in a companion-display mode settings user interface 750 (such as that shown in FIG. 7W). Further, it is also possible turn off display of either the control strip 197, or the tablet device's dynamic function row 198. When this occurs the companion-display mode user interface 419 resizes to fill the now empty area that previously was occupied by either the control strip 197, or the dynamic function row 198 that is displayed on the tablet device 100.

FIGS. 4A-4QQQ are schematics of the laptop's display and the tablet device's touch-sensitive display 103, which are used to illustrate example user interfaces in accordance with some embodiments. The user interfaces in these figures are used to illustrate the methods and/or processes described below. One of ordinary skill in the art will appreciate that the following user interfaces are merely examples, and that the user interfaces depicted in each of the figures can be invoked in any particular order. Moreover, one of ordinary skill in the art will appreciate that a different layouts with additional or fewer affordances, user interface elements, or graphics can be used in various circumstances. It should also be understood that any one of the following example user interfaces can correspond to separate embodiments, and do not need to follow any particular order.

FIG. 4A illustrates two devices, the laptop 300, and the tablet device 100, that are both signed into the same user account 193 (e.g., a same ICLOUD account from APPLE INC. of Cupertino, Calif., such as the "Ari's Account" 404 that is shown in FIG. 4A on both of the displays for the two devices), and have an established connection 194 (e.g., a wired or wireless connection). When the two devices are logged into the same user account and have the established connection, the companion-display mode may not yet be available until the devices have a trusted connection. For context, FIG. 4A illustrates small representations of the laptop 300, and the tablet device 100, with both of their respective displays being shown in a larger form below the associated small representation. FIG. 4A shows both laptop and the tablet device running their respective operating systems, and their displayed user interfaces 406, and 407, respectively. The display of the laptop 300 shows a dock 412 with some applications that are available for use on the laptop, and the display of the tablet device 100 shows a separate dock 411 with some applications that are available for use on the tablet.

The laptop 300 and the tablet device 100 are both connected to the same Wi-Fi wireless network, to show that the devices have an established connection 194. For example, in FIG. 4A both devices are connected to the same wireless network "ABC Wi-Fi", as shown in 418 within the user interface for the laptop 406, and 410 within the user interface for the tablet device 407. In some embodiments, the user may not need to be on the same Wi-Fi network, and other forms of connection between the two devices may be possible, such as Near Field Communication (NFC), Bluetooth, or other short-range communication protocols.

FIG. 4B illustrates a prompt 413 that is overlaid on top of the user interface for the tablet device 407, which asks whether to "Trust this computer?" The prompt includes two selectable user interface elements: "trust" 413-1, and "Don't trust" 413-2. The prompt 413 is activated when the devices have formed a connection with one another (e.g., by a Universal Serial Bus (USB) cable, or via a wireless communication protocol).

FIG. 4C illustrates an input 414 received at the "trust" user interface element 413-1 within the prompt 413. In response, a trusted connection is created between the two devices, which is illustrated with the addition of a bidirectional arrow that includes the label "Trusted 195" between the laptop 300 and tablet device 100, as illustrated in FIG. 4D. The bidirectional arrows 193, 194, and 195 each represent a secure-connection criterion that must be satisfied before the companion-display mode is made available for use. In some embodiments, more of fewer criterion can be utilized, e.g., devices could only need to be logged into a same user account and have a connection, without needed the additional trusted criterion. In some embodiments, when the devices have established a trusted connection, the prompt will not be displayed again if the devices are connected to each other again at a later time.

FIG. 4D illustrates a mouse pointer 190 (also referred to as a cursor 190 herein) (e.g., an arrow pointing towards an element that can be selected using a mouse click or other like interactions) on the display of the laptop 300. The pointer can be used to select an icon (e.g., the photos application icon 416) of an application (e.g., the photos application) from the laptop's dock 412. Once a selection is made, the laptop 300 executes the photos application, and displays photos application window 189, as depicted in FIG. 4E.

In particular, FIG. 4E illustrates photos application window 189, which overlays a portion of another user interface within the user interface 406 for the laptop 300. FIG. 4E also illustrates a dynamic function row for the laptop 304, which updates to provide controls based on the state of an application that is in focus on the display of the laptop 300. For example, the photos application window 189 is in focus, so application-specific user interface elements associated with the photos application window are displayed (e.g., "Photo A" 421, "Photo B" 422, "Photo C" 423, and "Photo D" 424). In some embodiments, the dynamic function row also includes controls for controlling system level functions for the laptop 300, such as escape control 304, volume controls, and brightness controls, as depicted in FIG. 4E.

Next, in FIG. 4F, the pointer 190 is moved to hover over the maximize button 196 (e.g., a button that controls a display property of the photos application window, which button can be displayed in a green color) associated with photos application user interface 189. In some embodiments, the appearance of the maximize button may differ if the tablet device has made a trusted connection with the laptop or not. As shown, the maximize button 196 is positioned between a close window button and a minimize window button, but the maximize button may be placed elsewhere and not in conjunction with the other two buttons.

In response to a selection of the maximize button 196 by the pointer 190, FIG. 4G shows that a user interface 191 for manipulating display properties of the window 189 is then displayed. In some embodiments the selection can be made by either performing a right click on the maximize button 196 with pointer 190, or may appear when the cursor 190 hovers over the maximize button 196 for a predetermined period of time (e.g., greater than 0.5 seconds). The user interface 191 may include a plurality of selectable options, some examples of the options available are putting the photos application window 189 into a "full screen mode" on the laptop's display, sending the photos application window 189 to a another device (e.g., "Send to Device 1" 191, "Send to device 2"), or snapping the photos application window 189 to another portion of the laptop display. In some embodiments, when snapping to a corner, the photos application window 189 can be displayed on half of the display of the laptop, on either the right or left side.

The pointer 190 can be moved to select one of the options, e.g., the option 192 ("Send to Device 1") within the user interface 191, as is shown in FIG. 4H. The user interface 191 may contain more than one device to which the user interface can be sent. So long as the devices have satisfied secure-connection criteria (e.g., one or more of having a trusted connection, a trusted user account), then those devices can be displayed within user interface 191. User selection of the selectable option 192 (e.g., "Send to Device 1") causes the tablet device 100 to enter a companion-display mode. The companion-display mode allows the tablet device to act as a secondary display for the laptop. In some embodiments, the display may be a screen extension, or another desktop utilized and managed by the laptop's 300 operating system.

Turning now to FIG. 4I, in response to the pointer making a selection of selectable option 192 (e.g., "Send to Device 1"), the user interface for the photos application is ceased to be displayed on the laptop, and is sent for display on the tablet device 100. Additionally, when the photos application window 189 from the laptop is sent to the tablet device 100, the tablet device enters a companion-display mode, and the companion-display mode user interface 419 is displayed. When operating in the companion-display mode, a control strip 197 that includes controls for changing display properties of the companion-display mode is displayed. The controls within the control strip 197 are represented by user interface elements 427-437, and each user interface element has a function for controlling an aspect of the companion-display mode. For example, the control strip 197 may include: a shift function 428, an option function 429, a command function 430, a software keyboard (e.g., a virtual keyboard) 431, a rotate the display function 432, a rotate content function 433, a function for manually arranging the tablet to the left or right of the laptop 434 and 435, a function to bring up the dock from the laptop 436, and a function to exit the companion-display mode 437. In some embodiments, toggle 427 is also displayed, which allows a user to switch between different functions of the control strip 197. It should also be understood that the control strip could be placed in different locations such as being placed horizontally at either the top or bottom of the display, or vertically on the left or right of the display. Also, in some embodiments, the control strip 197 is displayed next to and outside of the user interface 419 (and not on top of it), as is depicted for the control strip 197 of FIG. 7A which is displayed on a left side of the user interface 419.

With reference now to FIG. 4J, an input made by pointer 190 at the on-screen keyboard function 431 is depicted, which causes an on-screen-keyboard 438 to be displayed. With respect to inputs received at the control strip 197, although pointer 190 is shown in this example, a finger, a stylus, or any other type of input device can make the input in various different circumstances. In some embodiments, the on-screen-keyboard 438 can cause a resize of the displayed user interfaces (e.g., the photos application window 189) to avoid overlap with the on-screen-keyboard 438. In another embodiment, the on-screen-keyboard 438 may overlap the displayed user interfaces (e.g., the photos application window 189). Although a pointer 190 is shown in FIG. 4J as being used in conjunction with a companion-display mode, it should be understood that inputs could also be made by a stylus 484 or a finger without displaying any pointer 190 (e.g., an example of such an interaction without a pointer can be seen in FIG. 7F with input 711, and FIG. 7J with input 715). For example, in some embodiments, touch-sensitive device inputs made with fingers, such as dragging gestures, tapping gestures, pinching gestures, de-pinching gestures, and rotating gestures can be used with the companion display mode, and no pointer 190 is displayed during such touch-sensitive device inputs. In some embodiments, for inputs provided over the control strip 197 or the dynamic function row 198, no pointer 190 is displayed.

As FIG. 4K shows, a user can provide another input at the on-screen-keyboard function 431 to cause the on-screen-keyboard 438 to be removed from the display of the tablet device 100. In some embodiments, if the keyboard caused a user interface element to be resized, then the resized user interface elements will be resized to their original dimensions once the on-screen-keyboard 438 ceases display.

FIG. 4L illustrates the selection by a pointer 190 of the rotate the display function 432 at the control strip 197. In some embodiments, the degree of rotation may be predefined in the user settings. In such an embodiment, the direction of the rotation can also be predefined in the user's settings. Additionally, there might be two buttons for rotating the display, one in the clockwise direction, and one in the counterclockwise direction.

FIG. 4M illustrates the response to selecting the rotate the display function 432. When the rotate the display function 432 is selected, the companion-display mode user interface 419 is rotated in a counter-clockwise direction of 90 degrees. FIG. 4M also shows a second selection of the function for rotating the tablet device's user interface.

FIG. 4N shows the response to a second selection of the rotate the display function 432, which causes user interface 419 to be rotated in a clockwise direction of 90 degrees. In some embodiments, the user may be able to specify how the user interface is rotated when the rotate function is selected. FIG. 4N also shows a third selection of the rotate the display function 432.

FIG. 4O illustrates the response to the third selection of the rotate the display function 432, in which, companion-display mode user interface 419 is rotated in a clockwise direction of 90 degrees. FIG. 4O also shows a fourth selection of the function for rotating the tablet device's user interface.

FIG. 4P illustrates the response to the fourth selection of the rotate the display function 432, where the companion-display mode user interface 419 is rotated in a counter-clockwise direction of 90 degrees Next, in FIG. 4Q, a selection is made via the point 190 of the rotate content function 433. Content may refer to an application's user interface or content within a user interface (e.g., an image). For illustrative purposes, the user interface of the photos application is rotated.

FIG. 4R illustrates the photos application window 189 rotated 90 degrees in a counterclockwise direction in response to the input depicted in FIG. 4Q. The rotate content function 433 can also be used to rotate content within a user interface. For example, a photo within the photos application window 189 can be rotated. In some embodiments, the degree of rotation can be predefined in the user settings. In such an embodiment, the direction of the rotation can also be predefined in the user's settings. FIG. 4R also shows a second input at the rotate content function 433.

FIG. 4S illustrates the response to the second input at the rotate content function 433, where the content is rotated 90 degrees in a clockwise direction. In some embodiments, the user can specify how the content is rotated when the rotate content function is selected (e.g., by performing a right click operation on the rotate content function 433, to display more detailed rotation functions.) Additionally there can be two buttons for rotating the content within the control strip 197, one for causing rotation in the clockwise direction, and one for causing rotation in the counterclockwise direction.

FIG. 4T illustrates an input over the function 435 for manually arranging the tablet's display to the right of the laptop's display. In some embodiments, this ensures that a user's cursor and other user interface elements travel between the displays in a logical manner that is consistent with the user's expectations. Users may find it useful in some situations to override a default arrangement of the displays by using the buttons 434 and 435. Inputs over the buttons 434 and 435 causes rearranging the displays. In the example of FIGS. 4T, 4T-1, and 4T-2, having the tablet's display to the right of the laptop's display allows a user to move the pointer from a left edge of the tablet over to the right edge of the laptop's display, which is illustrated in FIGS. 4T-1 and 4T-2.

Figure 4U:
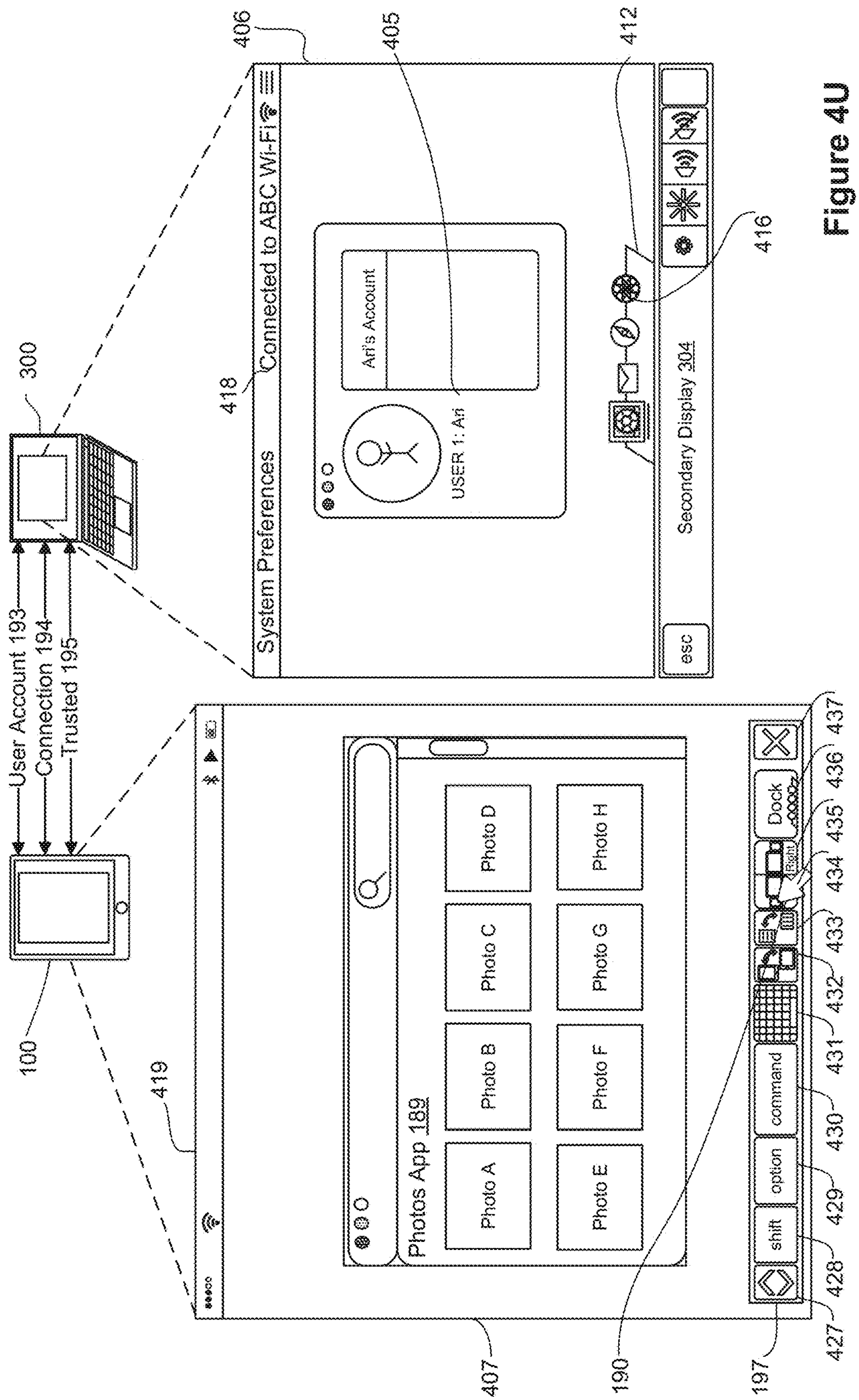
Figures 1, 4U:
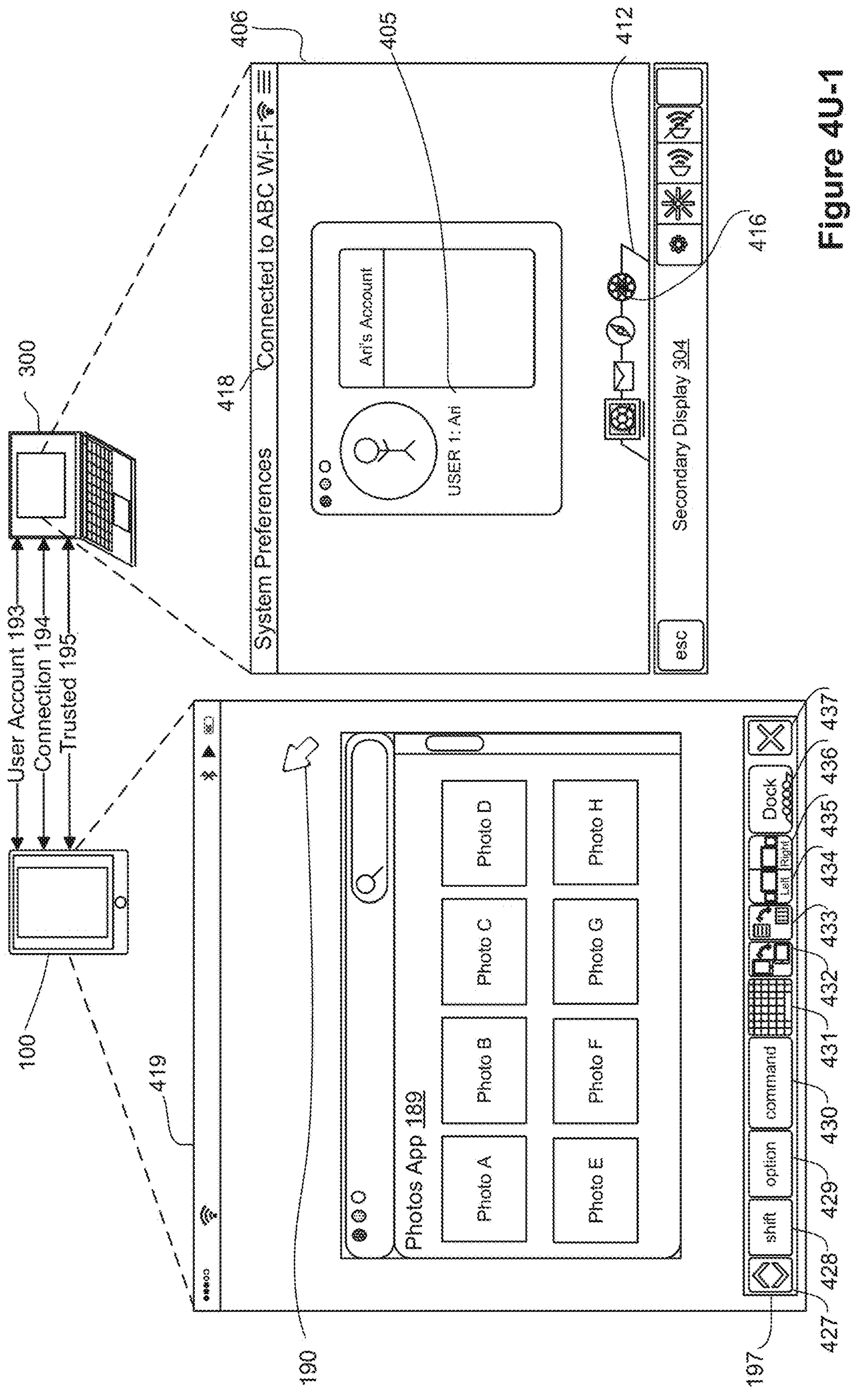
Figures 2, 4U:
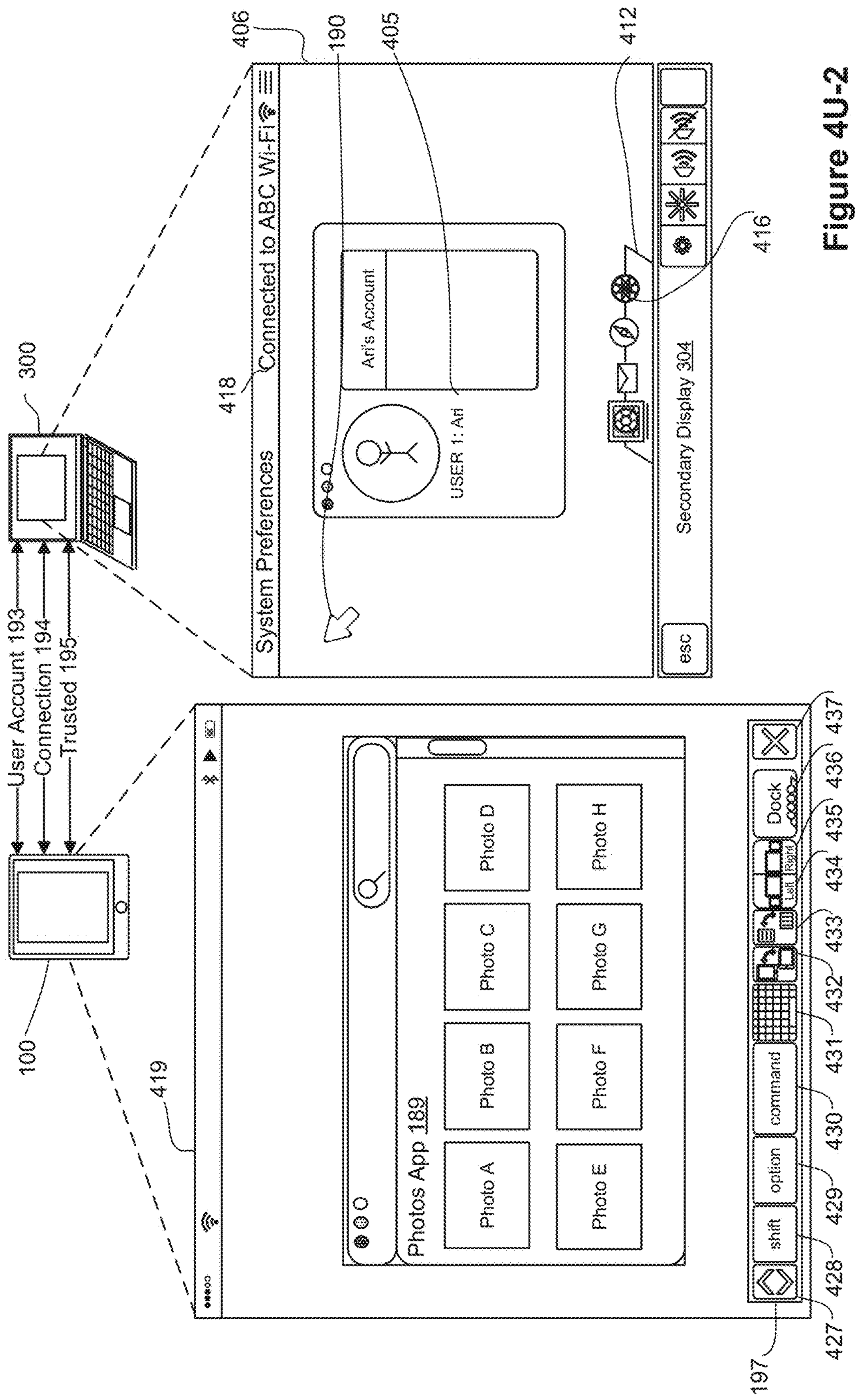

FIG. 4U illustrates the response to the selection of the function 434 for manually arranging the tablet to the left of the laptop, where the tablet's display is now to the left of the laptop's display in the companion-display mode arrangement. As shown in FIGS. 4U-1 and 4U-2, movement of the pointer 190 goes from a right edge of the tablet's display and to a left edge of the laptop's display.

Figure 4V:
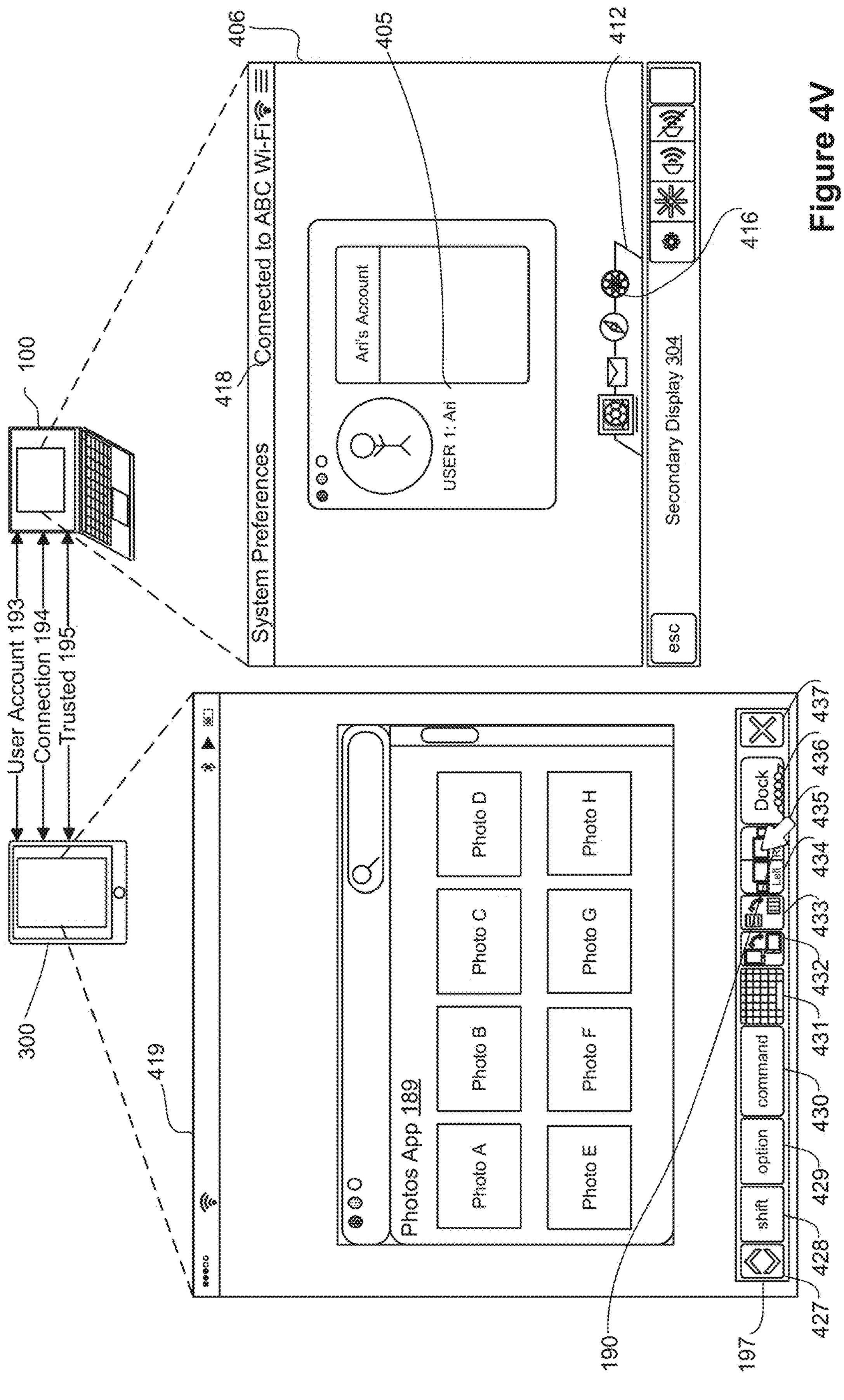
Figure 4W:
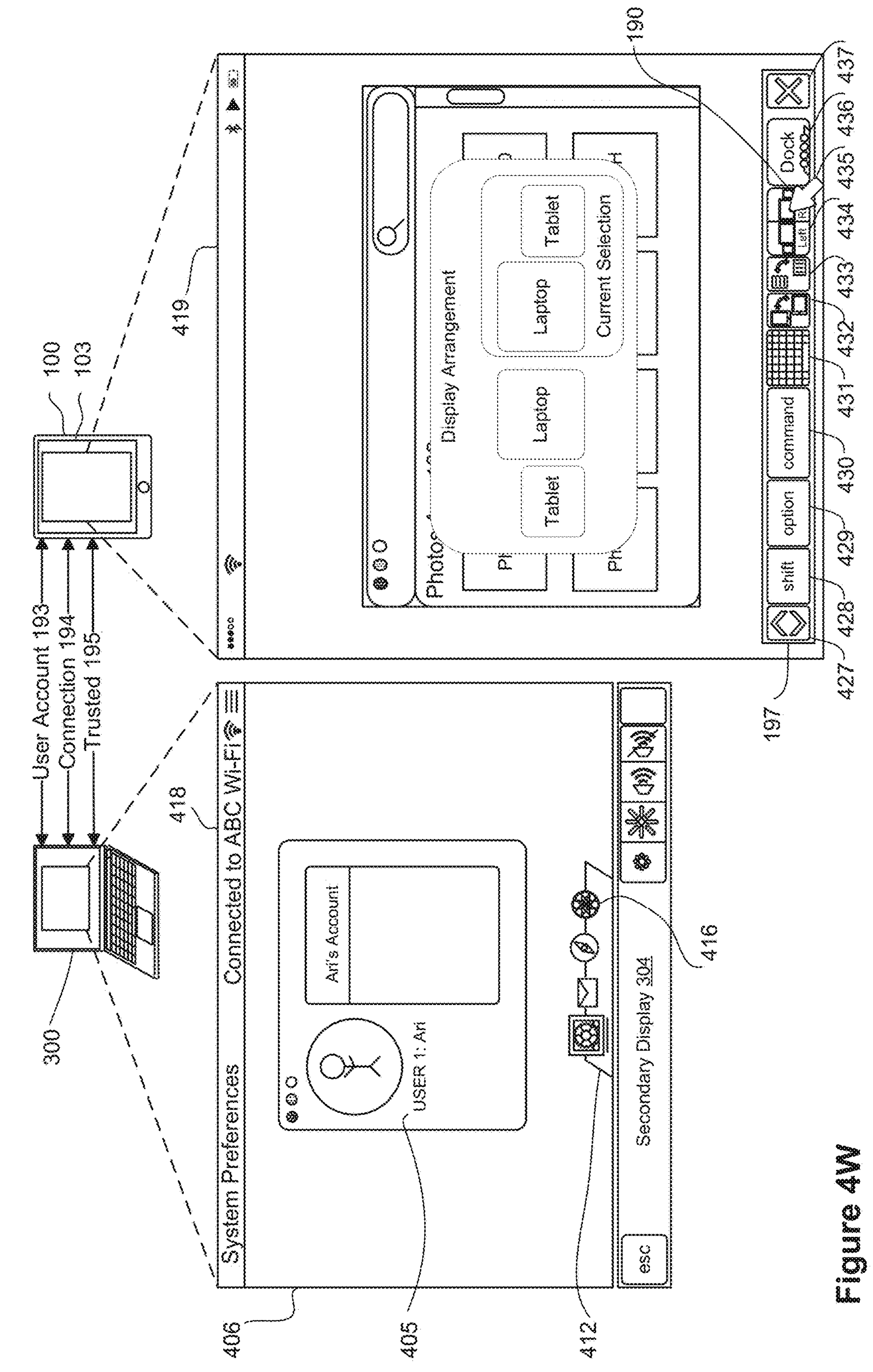

FIG. 4V illustrates an input over the function 435 for manually arranging the tablet to the right of the laptop, which causes the tablet's display to move back to a right side of the laptop's display as is shown in FIG. 4W.

Figure 4X:
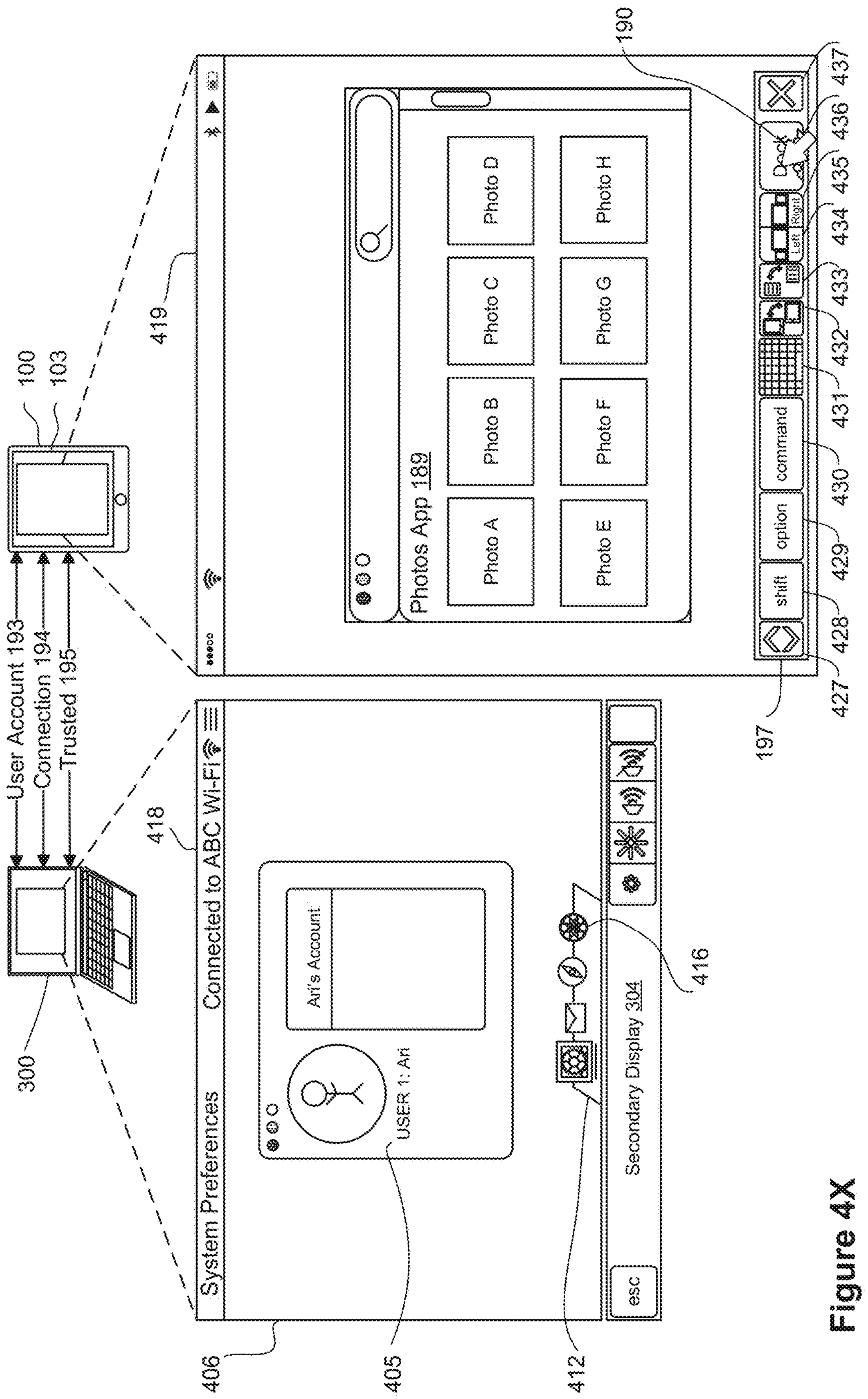

FIG. 4X illustrates an input over the function 436 to bring up a dock associated with the laptop's operating system (e.g., dock 412 depicted on the laptop's display in FIG. 4X)

Figures 1, 4Y:
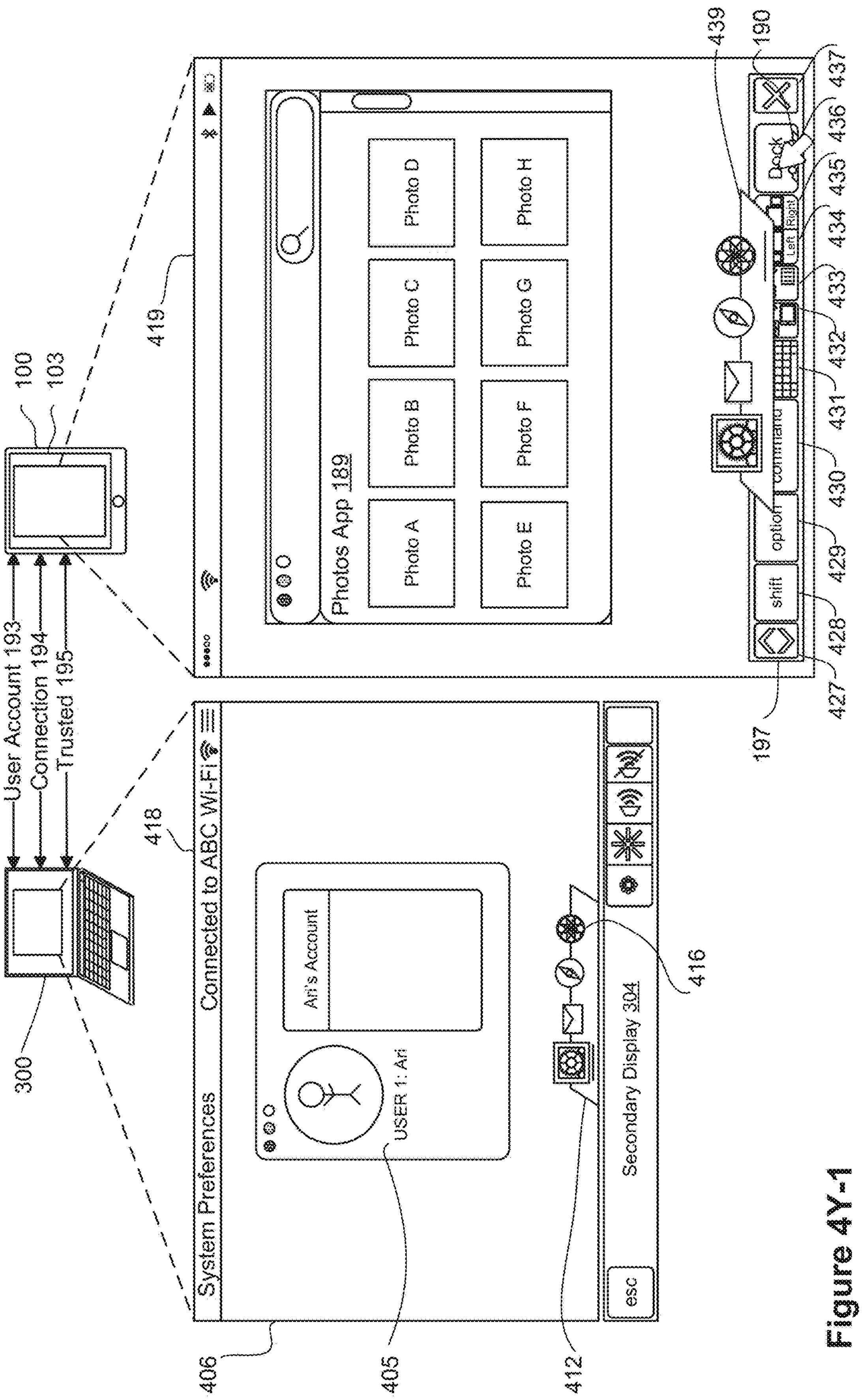
Figures 2, 4Y:
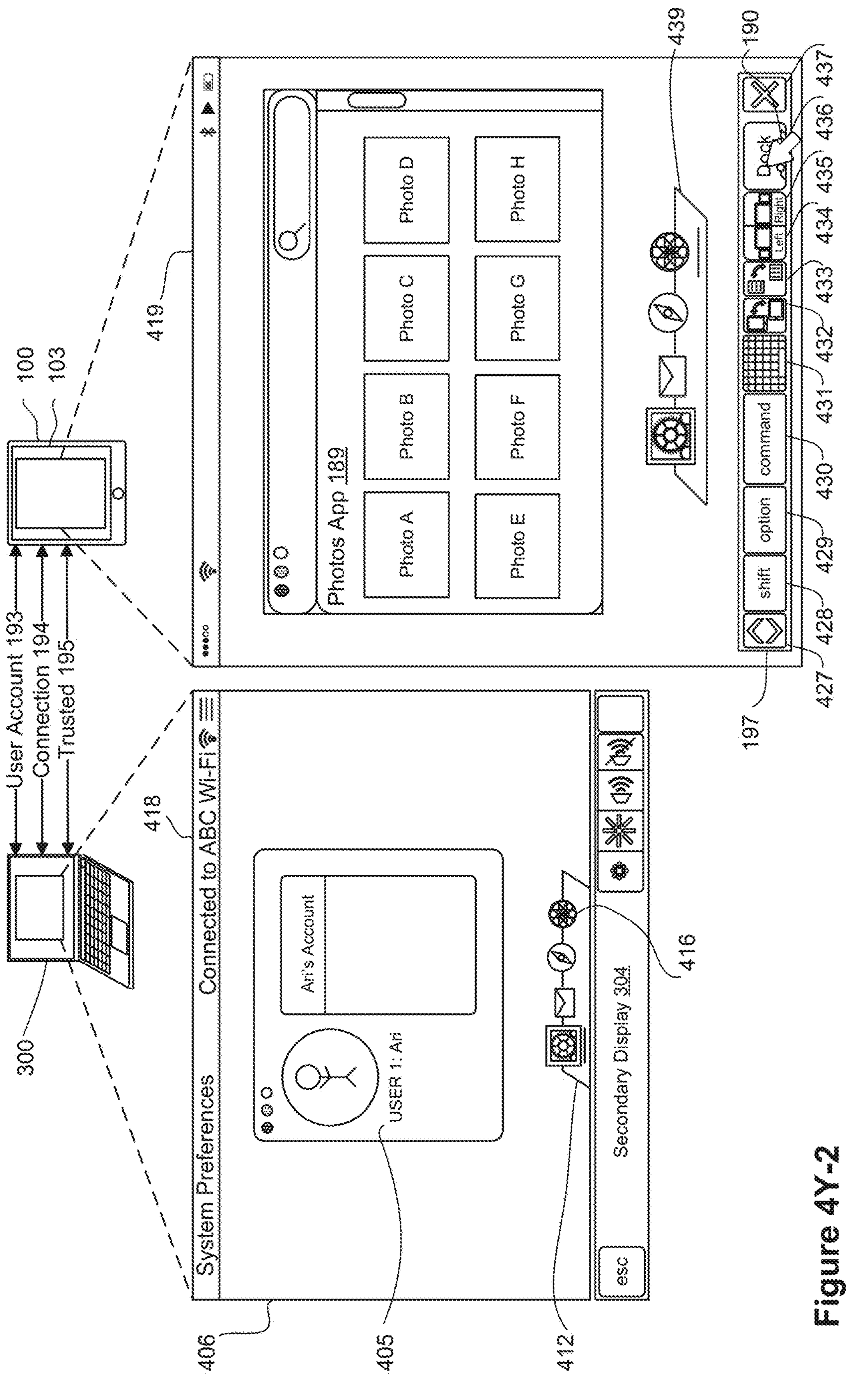

In response to the input over function 436, FIGS. 4Y-1 and FIG. 4Y-2 depict the dock 412 moving into position on the display of the tablet device 100. The dock 412 from the laptop is moving into position in FIG. 4Y-1 (now referred to as a dock 439 when it is displayed on the tablet 100), as it floats over the control strip 197. In FIG. 4Y-2, the dock 439 has moved into its display position above the control strip 197. In some embodiments, the dock 439 may move the content on the tablet's display to make room for the dock. Alternatively, the dock 439 may overlay a portion of the content that is displayed on the tablet's display To remove dock 439 from the tablet's display, an additional input is provided over the user interface object 436, as is depicted in FIG. 4Y-2, and then the dock 439 is no longer displayed in FIG. 4Z.

FIG. 4AA illustrates the photos application window 189 reverting to its original position once the dock 439 generated by the laptop disappears.

FIG. 4BB illustrates a selection with pointer 190 at a toggle switch 427 for switching between different function modes for the control strip 197. In embodiments in which the dynamic function row 198 is concurrently displayed with the control strip 197 on the tablet's display, the toggle switch 427 may not be displayed within the control strip 197 at all.

In response to the input at toggle switch 427 of FIG. 4BB, FIG. 4CC shows that a dynamic function row 198 is then displayed, which allows for controlling application-specific functions of a currently displayed application (e.g., for selecting photos within the photos application window 189).

FIG. 4DD illustrates a swipe-up-gesture on the display of the tablet device 100. Although the tablet device is running in a companion-display mode, users can still access gestures that are processed by the tablet device's operating system. Therefore, in some embodiments, the tablet device distinguishes between different input types (e.g., a stylus, or a finger), which different input types are processed by one of the tablet device's operating system or the laptop device's operating system. The illustrated swipe-up-gesture of FIG. 4DD starts anywhere at a bottom edge of the display 440, and moves in an upward direction substantially perpendicular to the bottom edge of the display. The gesture 441 travels until it reaches a predetermined distance away from the edge (e.g., slightly below a midpoint of the tablet's display), as is shown in FIG. 4DD, at which point a contact associated with the swipe gesture 441 is lifted-off from the tablet's display.

FIG. 4EE depicts the response to receiving a swipe-up-gesture 441 of FIG. 4DD. In response to the swipe-up-gesture 441, an application-switching user interface is displayed at the tablet's display 103. The application-switching user interface includes representations of recently-used applications (e.g., the representation of "Messages Application" 446), as well as representations of one or more desktops from the laptop computer (e.g., representations of desktops for "Racing Game" 443, "Desktop 2" 444, and "Desktop 1" 445). These representations are all displayed simultaneously within a same application-switching user interface, allowing users to easily switch between recently used applications from the tablet device or to switch to use various desktops from the laptop device. Additionally, the tablet device's dock 411 is also displayed at the bottom of the touch-sensitive display, which can be used to execute additional applications that may be different from the ones shown in the multitasking view.

An input 447 (e.g., a tap input in which a contact touches the representation 445 and then lifts-off from the tablet's display) is received at the representation of "Desktop 1" 445, which was the previously displayed desktop running within the companion-display mode.

FIG. 4FF illustrates the device returning to display of user interfaces associate with the laptop's "Desktop 1." After returning to "Desktop 1" of the companion-display mode, a second swipe-up-gesture is received, where the second swipe-up gesture 442 travels a longer distance than the first swipe-gesture 441 discussed above. The second swipe up gesture begins anywhere at the bottom edge, and moves in an upward direction substantially perpendicular to the bottom edge of the display. In some embodiments, the gesture ends beyond the midpoint the tablet's display.

FIG. 4GG shows a home screen of the tablet device that is displayed in response to the swipe-up-gesture 442. The home screen includes the tablet device's dock 411, and a plurality of representations of applications than can be launched on the tablet device. Additionally, within the plurality of representations, there is one representation for returning to the companion-display mode 443. In some embodiments, this icon 443 is only available while the tablet device is capable of operating in the companion-display mode. The representation for returning to the companion-display mode 443 may be placed in the next available location for displaying representation of applications on the tablet device's home screen. As compared to the plurality of representations, the icon 443 appears, in some embodiments, only while the companion-display mode is being utilized, and the icon 443 does not correspond to an application that was installed on the tablet device through an application store or the like.

Alternatively or in addition to displaying the icon 443 near the plurality of representations on the home screen, the icon 443 can be displayed within the dock 411, as is shown in FIG. 4HH. In some embodiments, the icon 443 for returning to the companion-display mode may be temporary, and remain so long as the device is capable of operating in the companion-display mode.

FIG. 4II depicts an input 444 over the representation for returning to the companion-display mode 443 in the dock 411. Alternatively, this input could have been made over the representation for returning to the companion-display mode 443 when it was displayed with the plurality of representations, instead of being within the dock.

FIG. 4JJ shows the tablet device ceasing to display its home screen, and returning to the companion-display mode user interface 419. The companion-display mode user interface 419 shows the same photos application window 189 discussed with reference to some of the preceding figures, and the control strip 197 with the plurality of functions for controlling the display properties of the companion-display mode is also displayed again. In some embodiments, pointer 190 is placed in the same position it previously was in, prior to the tablet device 100 going to its home screen.

As illustrated in FIG. 4KK-1, the tablet device's dock may be brought up initially by a short swipe gesture (e.g., a swipe gesture that travels a distance that is less than one fourth of the tablet device's touch-sensitive display's vertical length). This short swipe gesture is depicted by swipe-up gesture 4002.

In some embodiments, as shown in FIG. 4KK-2, the tablet device's dock 411 can overlay a portion of the companion-display mode user interface 419. After bringing up the tablet device's dock 411 a swipe gesture 448 starting over the e-mail application 444 can be used to activate a split-screen view in which two applications are displayed side-by-side on the tablet's display.

FIG. 4LL illustrates the response to invoking a split-screen view with the representation of the e-mail application 444. Once the split-screen-view request is received at the representation of the e-mail application 444, the tablet device's e-mail application takes up half of the display, with the other half of the display being utilized to display the companion-display mode user interface. In some embodiments, the two interfaces are divided by dividing line 467. As illustrated in FIG. 4LL, the companion-display mode user interface 419 can be resized to accommodate the tablet device's e-mail application user interface 450. Within the companion-display mode, both the photos application window 189, and the control strip 197 are reduced in size. In such embodiments in which the control strip is reduced in size, the control strip 197 can then include an expand more functions icon 449 to allow the user to still interact with the control strip functions that disappeared due to the resizing. In other embodiments, the control strip 197 can be displayed in a bottom portion of the tablet's display, and can span between the two different user interfaces so that no reduction in its horizontal width is necessary.

As depicted in FIG. 4LL, the e-mail application user interface includes e-mails 451-1, 451-2, and 451-3, and there is a write a new e-mail icon 452 in the bottom right of the e-mail application user interface 450. Further, an input 453 is depicted in FIG. 4LL over the write a new e-mail icon 452 in the bottom right of the e-mail application user interface 450.

FIG. 4MNI illustrates a resulting new message user interface 454 within the e-mail application 450. The new message user interface includes: a "To:" portion 454-1 for addressing who the e-mail is to be sent to; "Subject" portion 454-2 for stating what the subject of the e-mail; and a "Body" portion 454-3 for including a body of an e-mail.

Notably, in some embodiments, the companion-display mode allows for bidirectional drag-and-drop operations between different operating systems (e.g., between a mobile operating system of the tablet device, and a desktop operating system of the laptop device). This allows for dragging files (e.g., images, text documents, etc.) from a user interface generated by one device (e.g., the companion-display mode user interface 419 generated by the laptop 300) to a user interface generated by another device (e.g., the e-mail application user interface 450 generated by the tablet device 100). In other words, a user can drag a file from one operating system (e.g., a desktop/laptop operating system) to another operating system (e.g., a tablet device operating system) using a single gesture.

FIG. 4MM, further illustrates that a swiping gesture 458 beginning over the representation of "Photo H" 457 and moving to the right is received. The purpose of such gesture is to copy or move the image to the body portion 454-3 of the e-mail.

FIG. 4NN illustrates the swipe gesture 458 continuing to ultimately end within body portion of the e-mail 451-3. Specifically, in FIG. 4NN, "Photo H" 457 crosses the dividing line 467 between the two user interfaces (e.g., the companion-display mode user interface 419, and the e-mail application user interface 450). As a result, the user can quickly transfer files from one user interface generated by the laptop, and another user interface generated by the tablet device 300. In some embodiments, the representation of the photo within the photos application window 189 may change its appearance as a result of being selected and dragged (e.g., "Photo H" 459 has a dashed line around it when it is being dragged over to the e-mail application).

FIG. 4OO illustrates the "Photo H" 457 passing the dividing line 467, and entering the user interface of the e-mail application 450. Specifically, the "Photo H" is dragged to the body portion 454-3 of the e-mail.

FIG. 4PP illustrates what occurs once the gesture ends (e.g., a contact associated with the gesture is lifted-off from the tablet's display), and the "Photo H" is placed within the body portion 454-3 of the e-mail. In some embodiments, the "Photo H" will no longer be a representation, and will display expanded "Photo H" 459 within the body portion 454-3 of the e-mail.

FIG. 4QQ illustrates an input over the Send 456 user interface element for sending an e-mail to the addresses included within the "To" portion of the e-mail 454-1.

FIG. 4RR illustrates the new message user interface 454 being replaced with the previous user interface, which is the Inbox user interface within the e-mail application 450. FIG. 4RR illustrates a user input 462 selecting e-mail 451-2, which is an e-mail form "friend@e-mail.com" with a portion of the subject or the body of the e-mail being displayed.

FIG. 4SS illustrates the user interface updating to show the e-mail associated with the representation of e-mail 451-2. Within the e-mail a body portion of the received e-mail 461 is shown, and included within the body portion of the received e-mail is a receipt image 463.

FIG. 4TT illustrates a swiping gesture 464 starting at receipt image 463, and moving towards the dividing line 467. As described above, an improved human-machine interface is enable when a user is able to transfer files using a single gesture from one user interface generated by one device (e.g., the tablet device e-mail application) to another user interface generated by another device (e.g., the laptop companion-display mode), because users avoiding wasting time with inefficient ways to transfer content between the different devices.

FIG. 4UU illustrates continuation of the swipe gesture 464. The receipt image 463 changes to a reduced image size 465 to be dragged around more conveniently. The receipt image 463 may change its appearance state in response to the dragging gesture, which is illustrated by the dashed lines now surrounding receipt image 463.

FIG. 4VV illustrates receipt image 465 passing the dividing line 467, and entering the user interface of the companion-display mode 419. Specifically, the receipt image is dragged to the photos application window 189.

FIG. 4WW illustrates the receipt now completely within the companion-display mode user interface 419, and no longer interacting with the tablet device's e-mail application user interface 450.

FIG. 4XX illustrates a swiping gesture 468 beginning at the dividing line 467, which gesture allows for dismissing the mail application user interface 450, as is shown in FIGS. 4YY-4ZZ.

FIG. 4YY also illustrates that the user interfaces in the split-screen view can be resized using the swipe gesture 468 (in the depicted example of FIG. 4YY, companion-display mode user interface 499 is resized to a larger size, and the e-mail application user interface 450 is resized to a reduced size).

Figure 4Z:
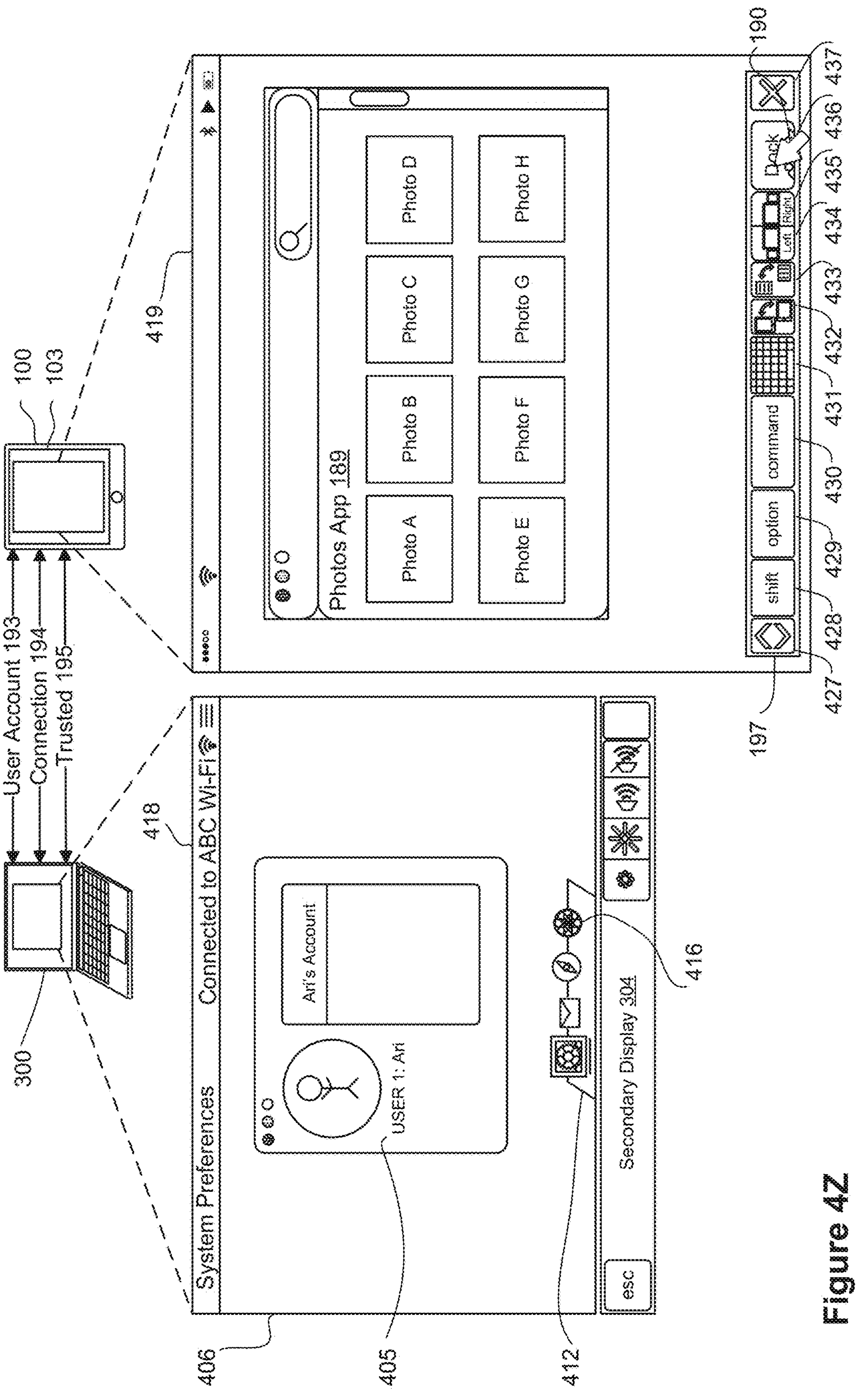
Figure 4A:
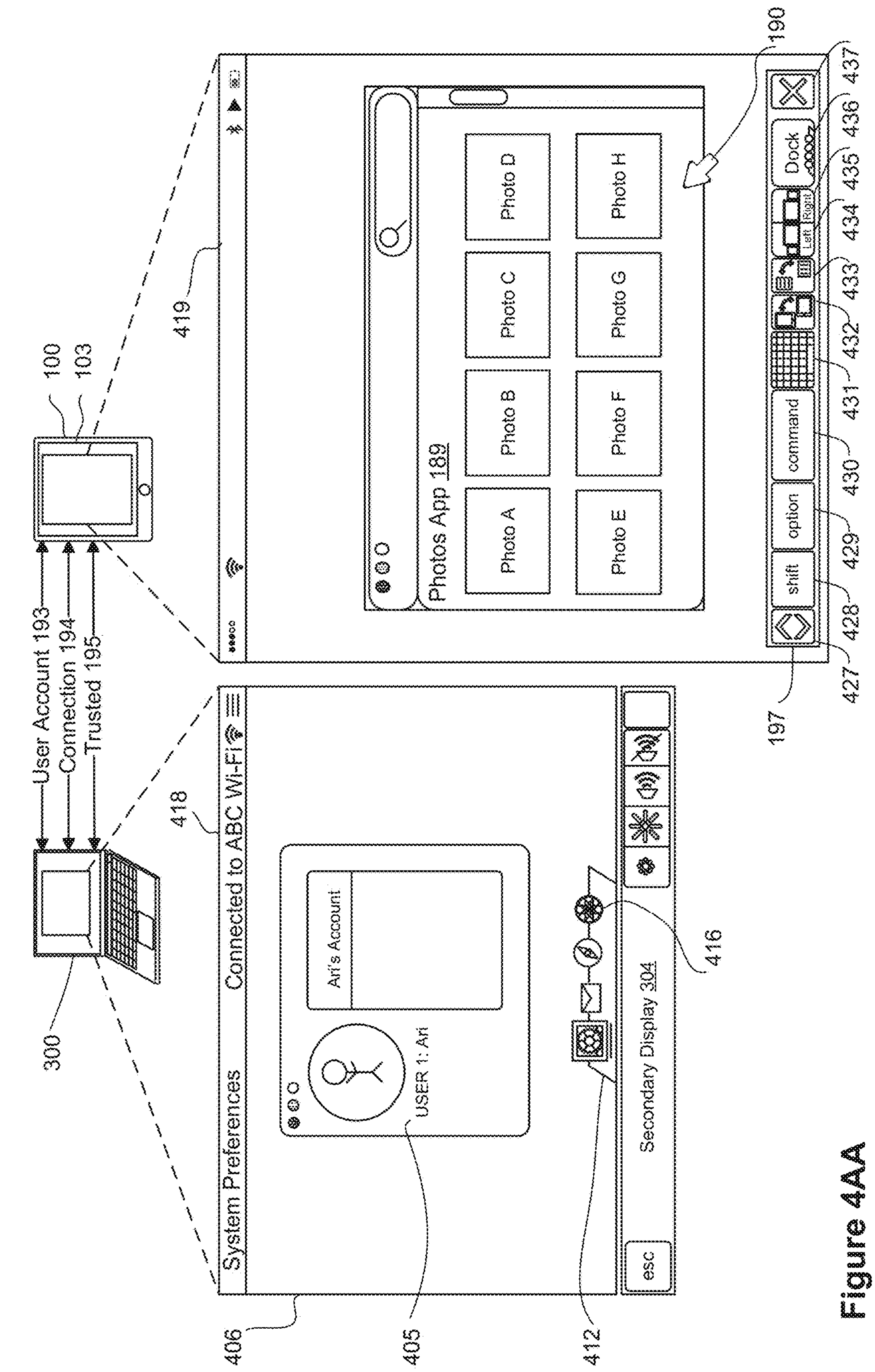
Figure 4B:
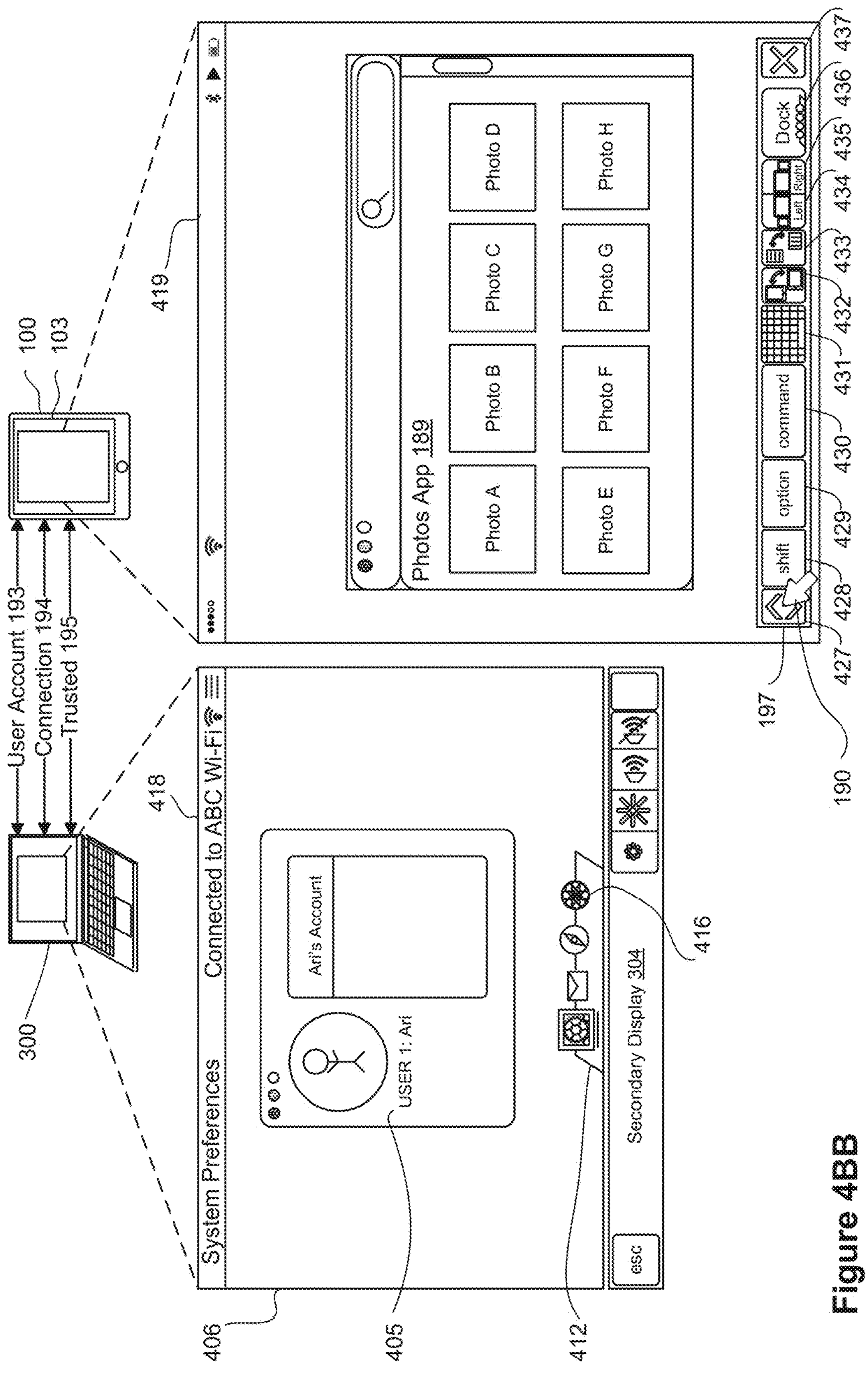
Figure 4C:
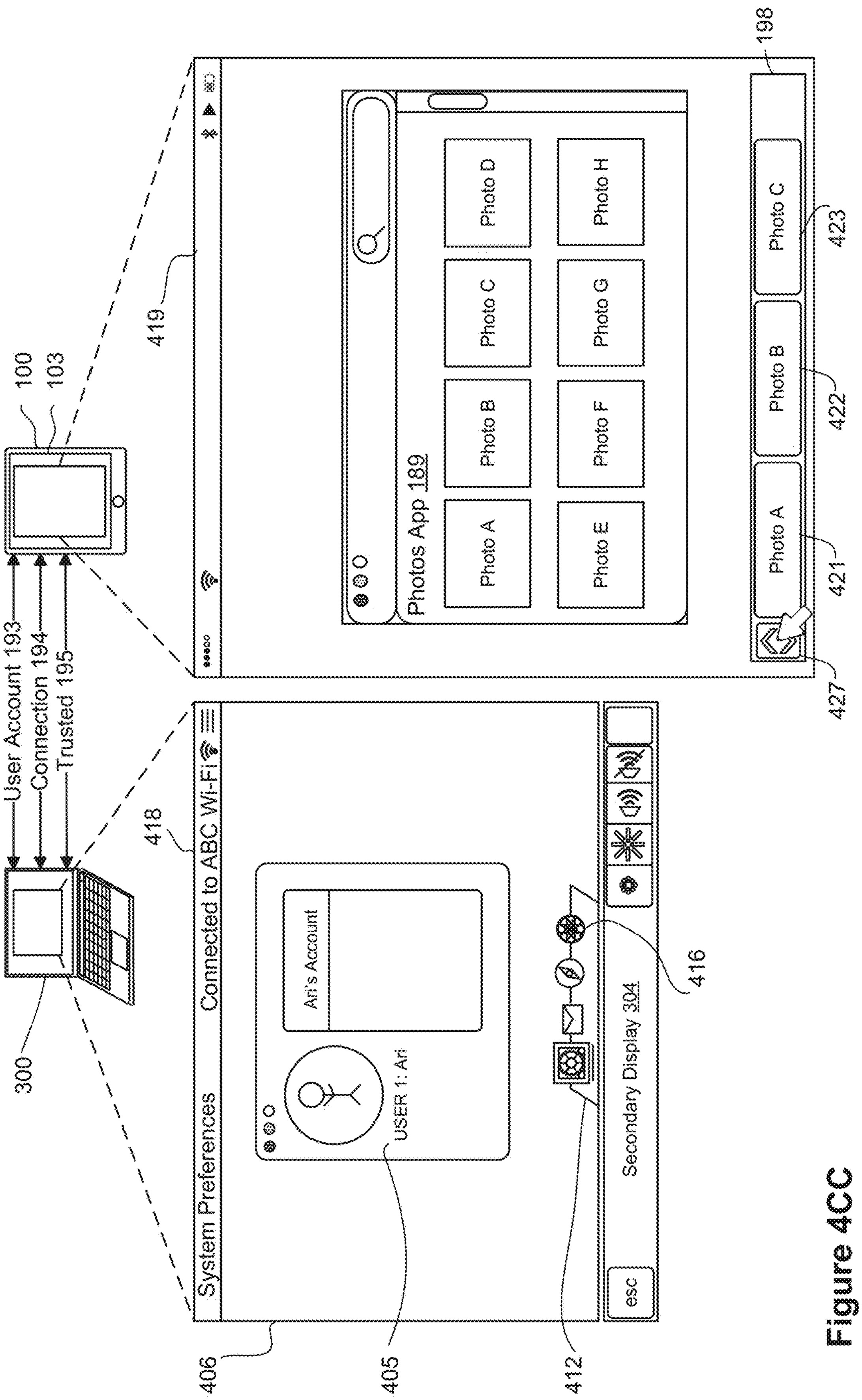
Figure 4D:
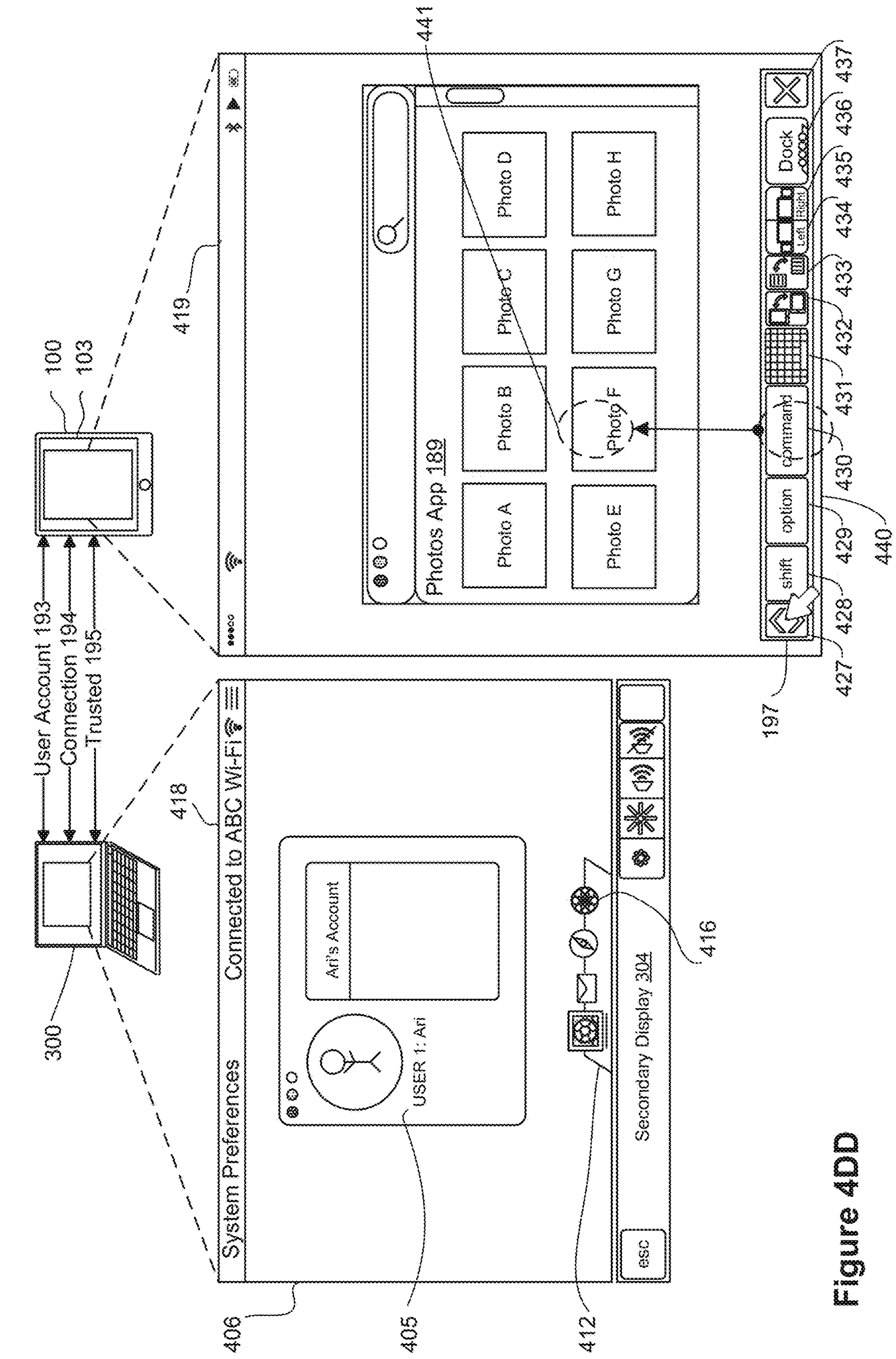
Figure 4E:
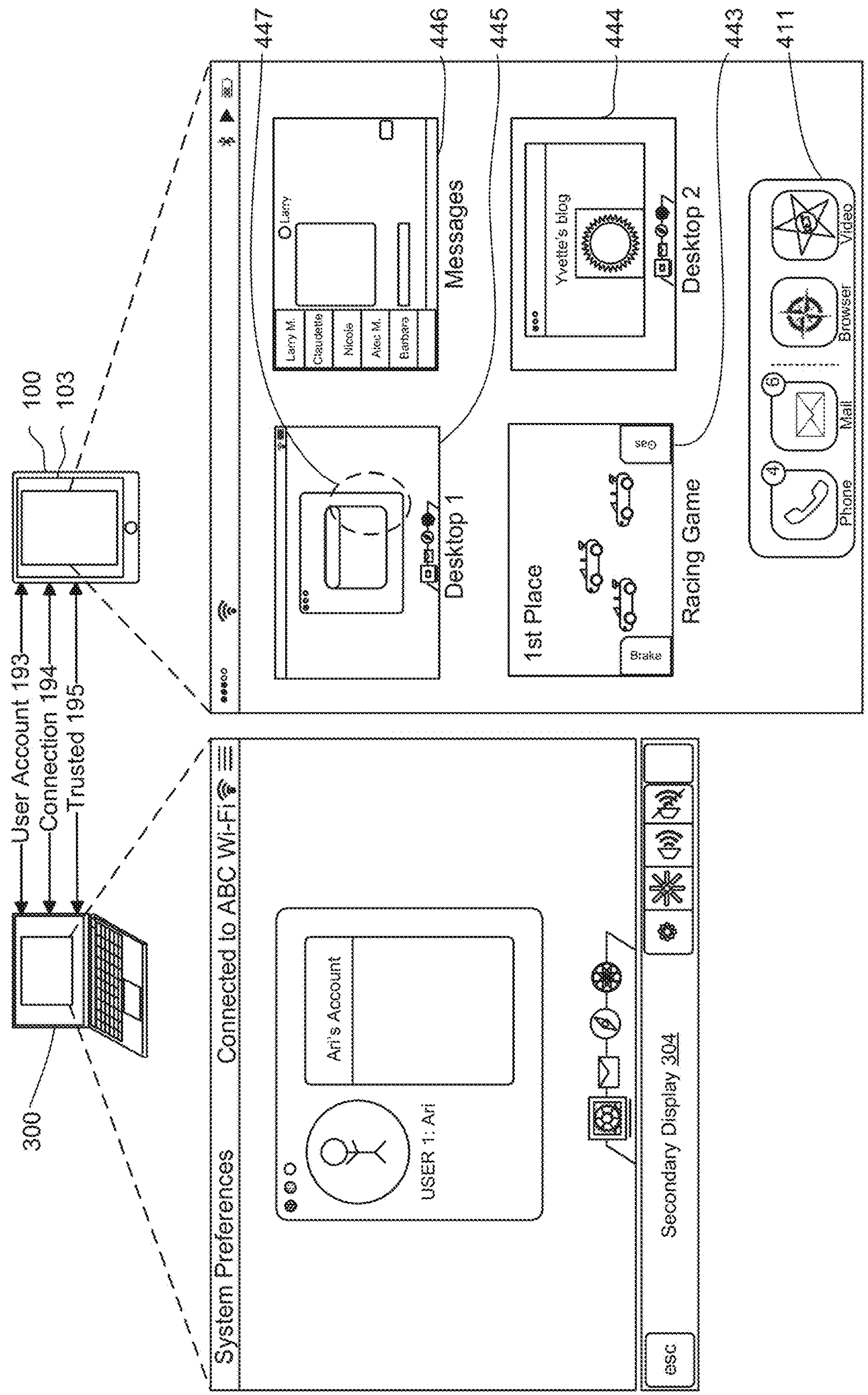
Figure 4F:
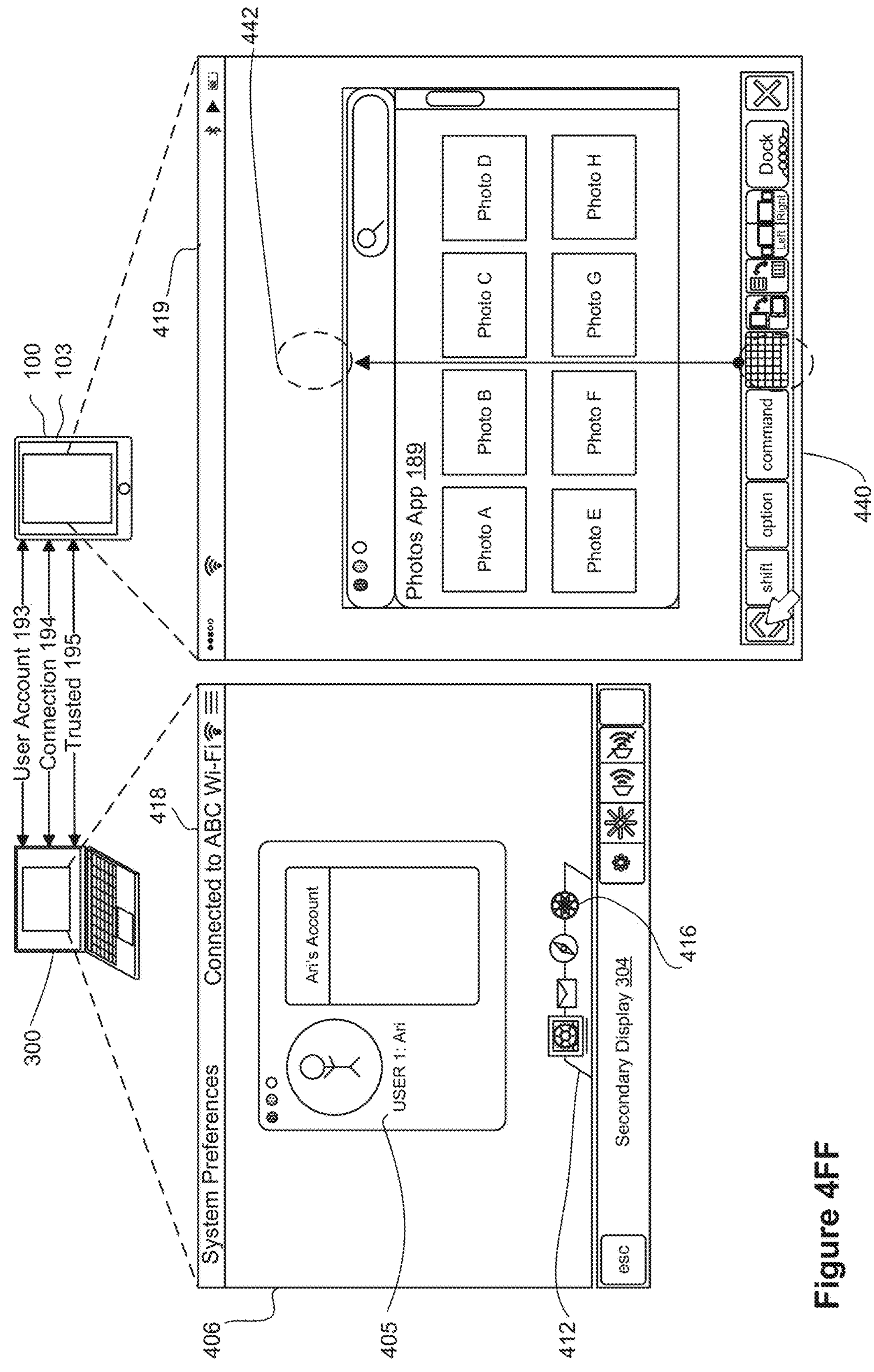
Figure 4G:
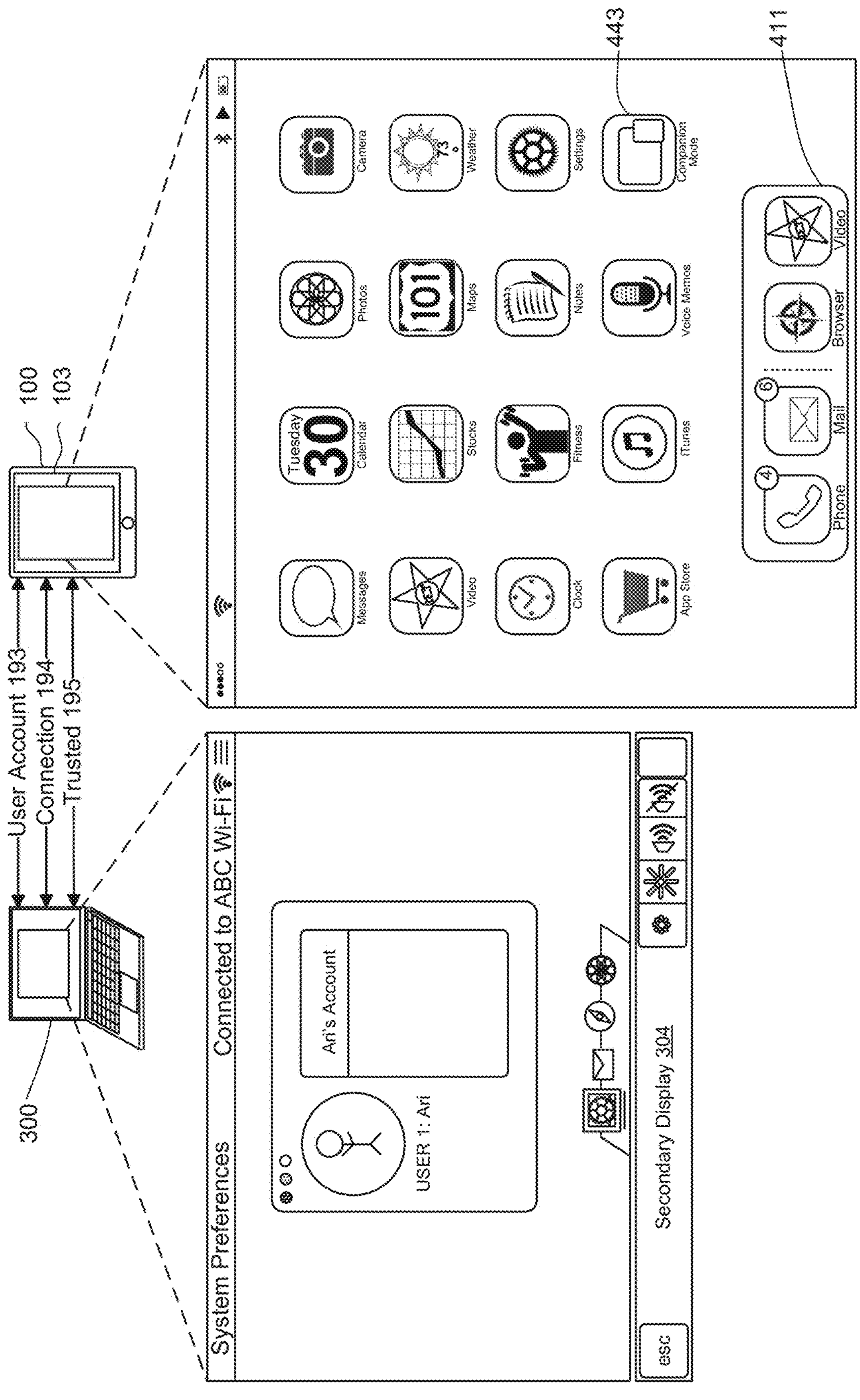
Figure 4H:
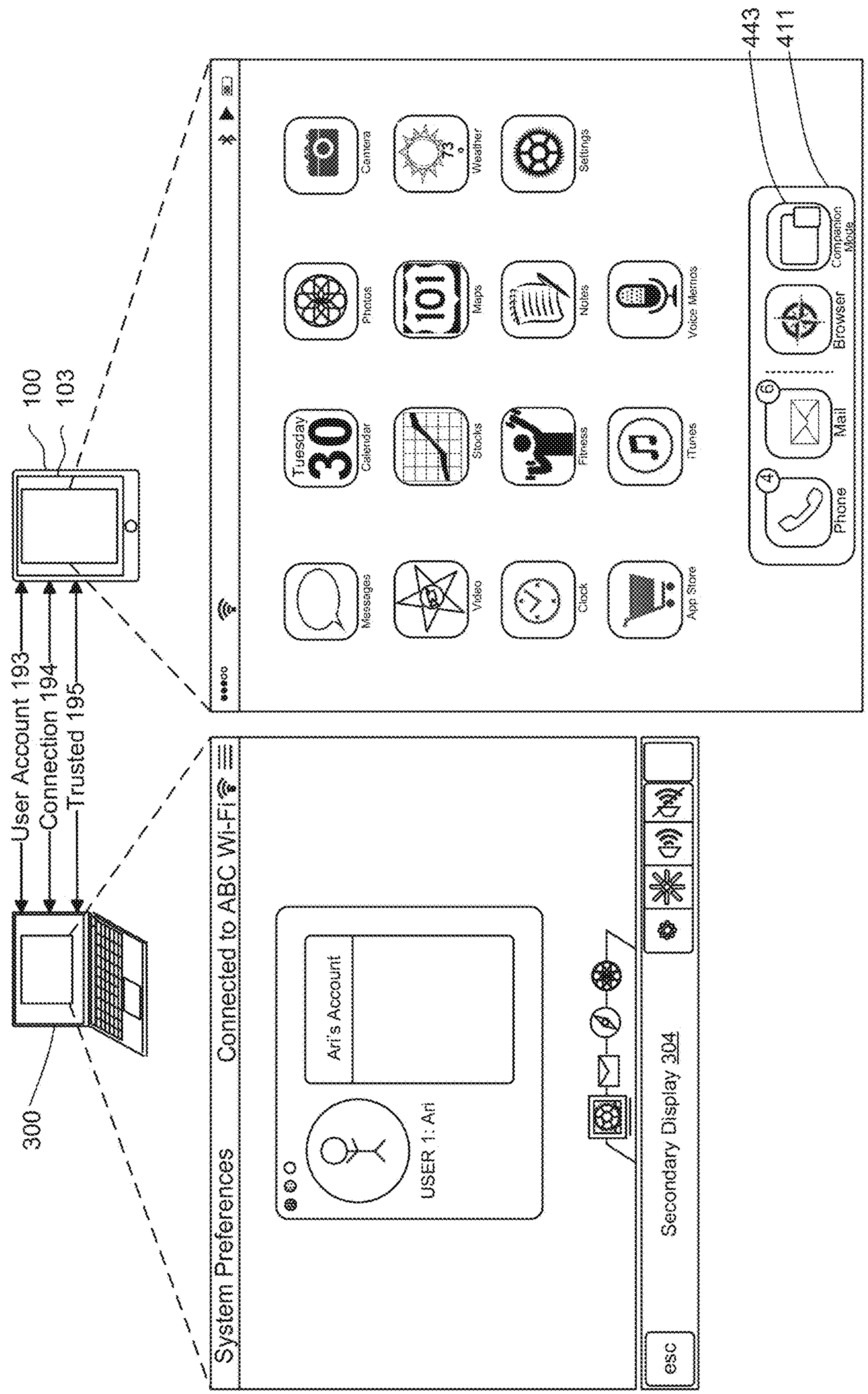
Figure 4I:
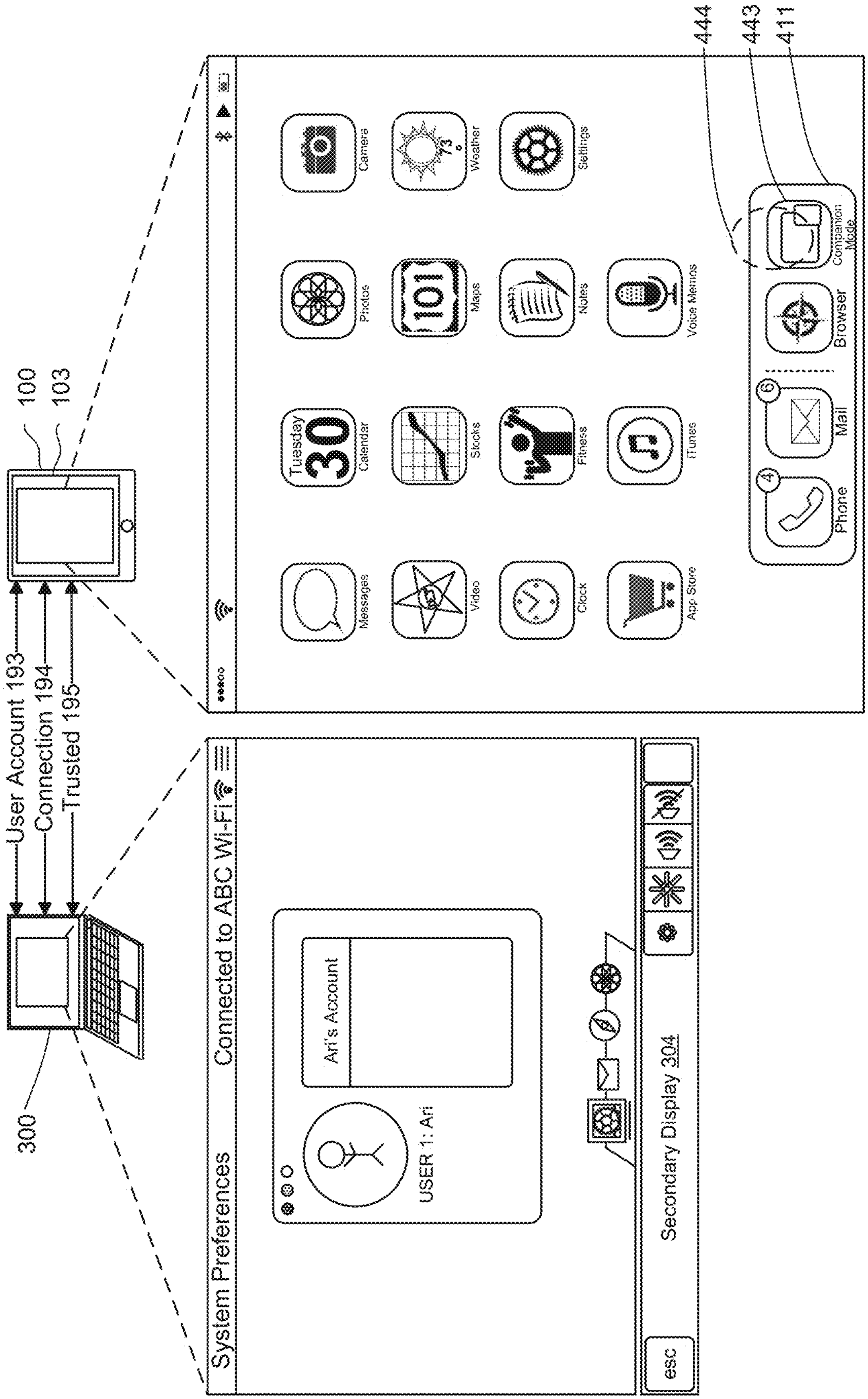
Figure 4J:
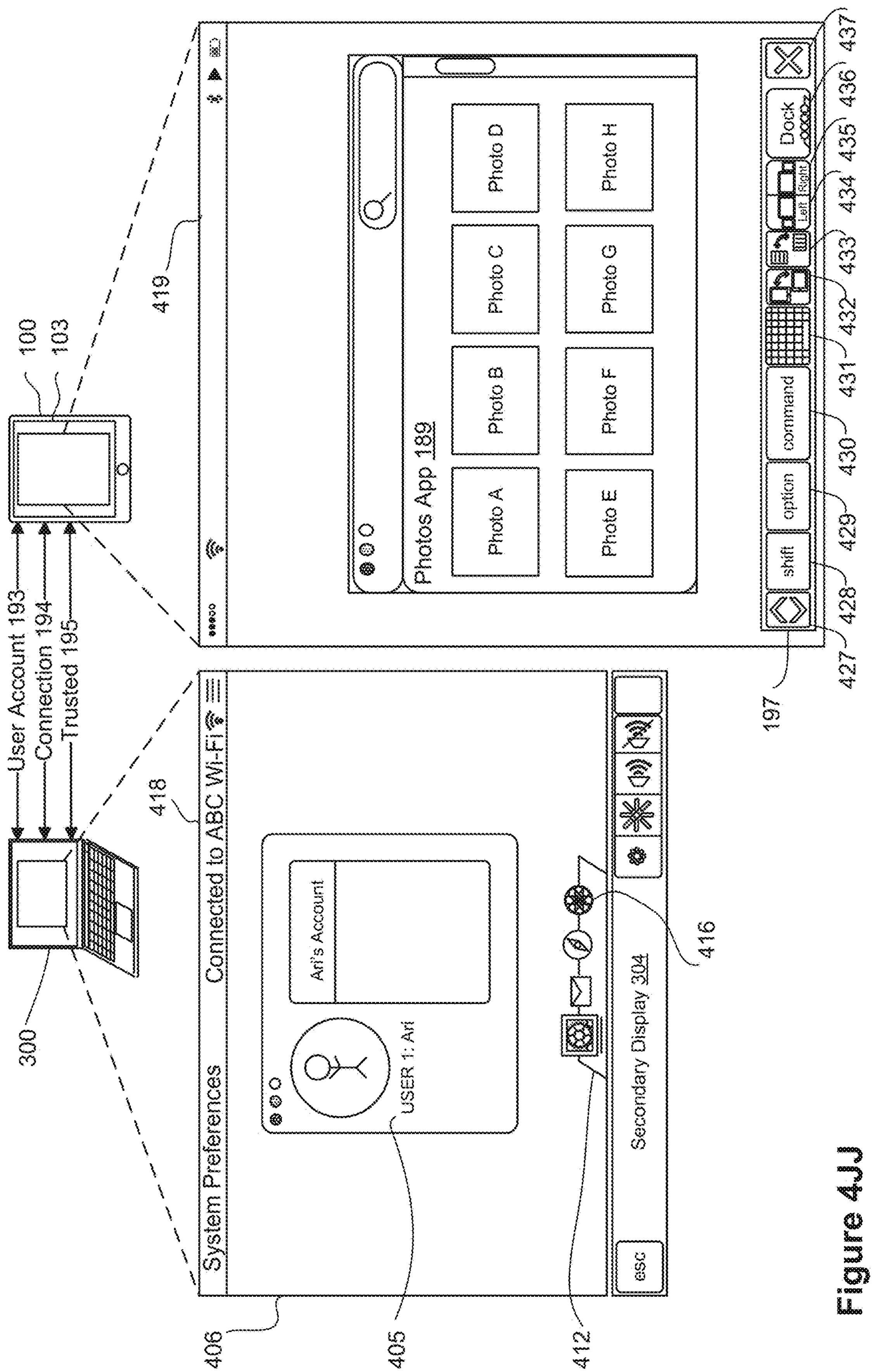
Figure 4K:
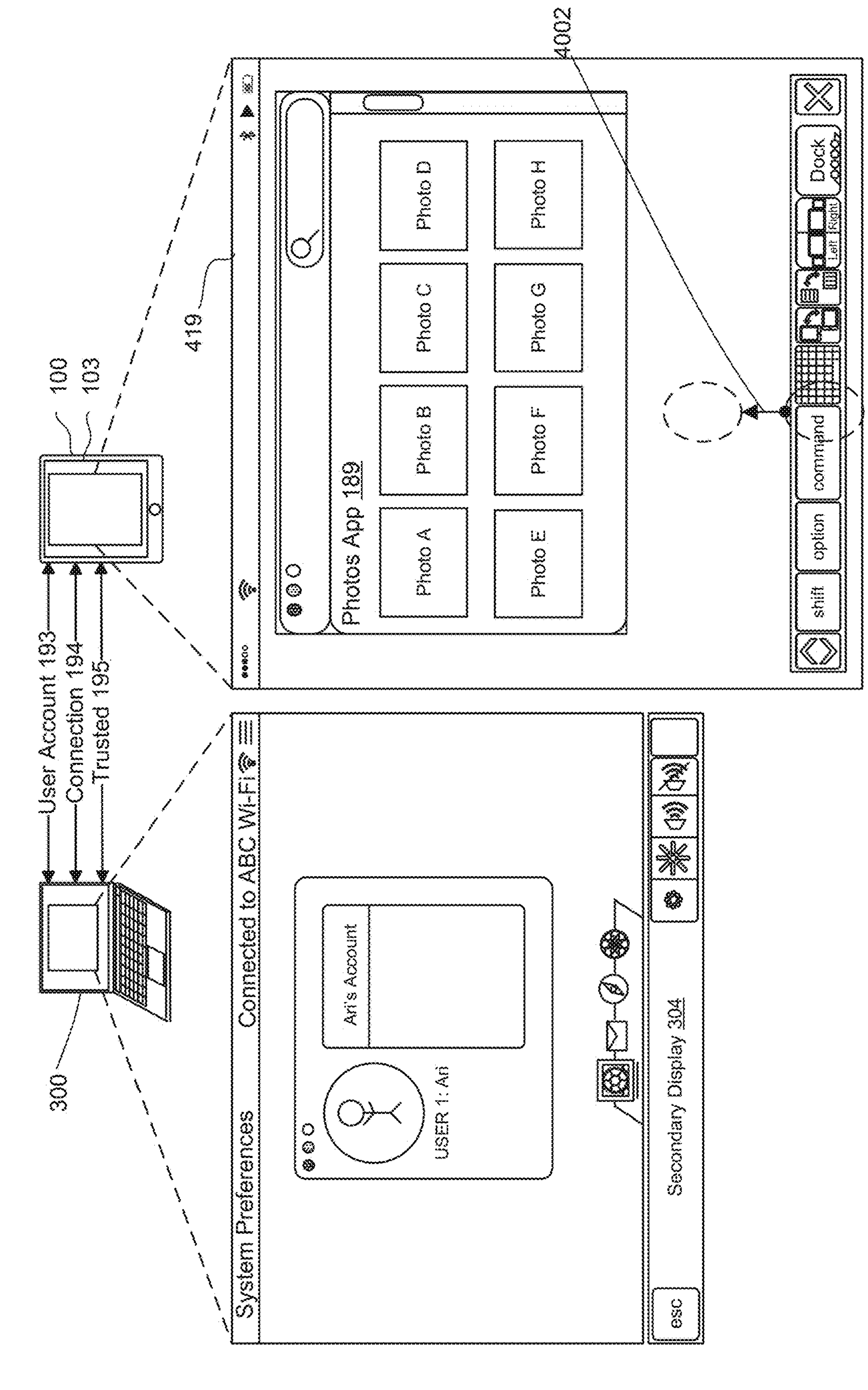
Figure 4K:
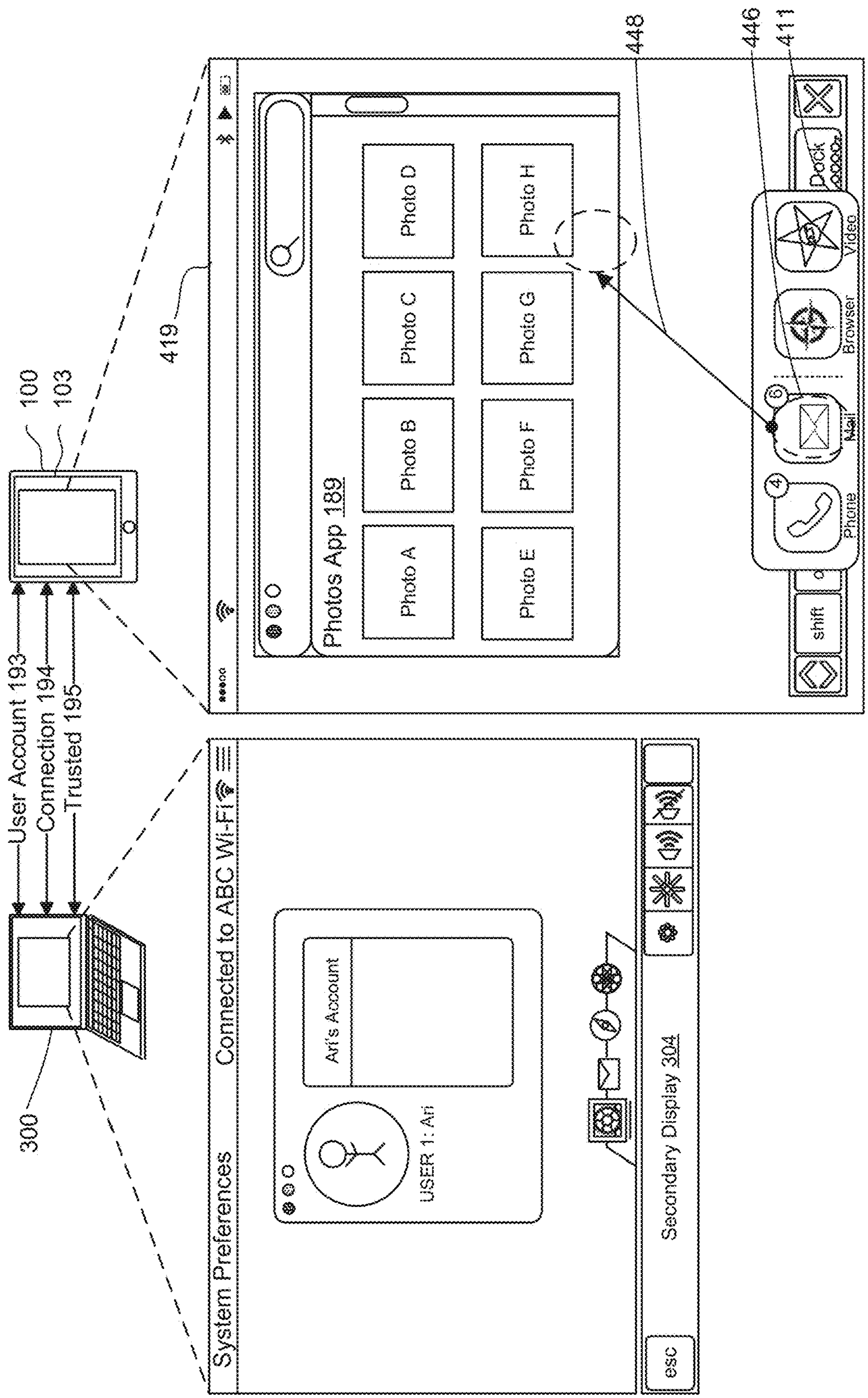
Figure 4L:
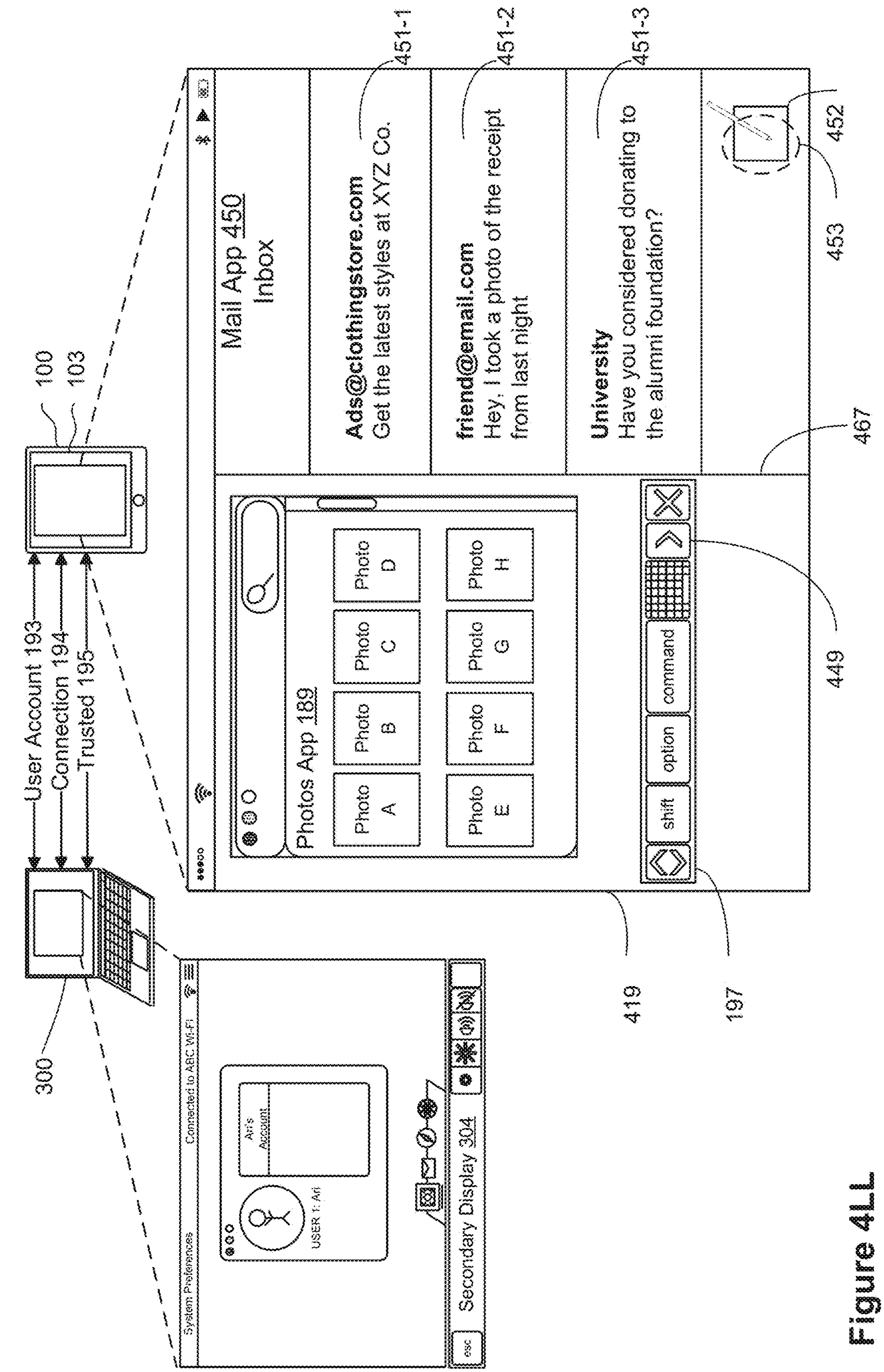
Figure 4M:
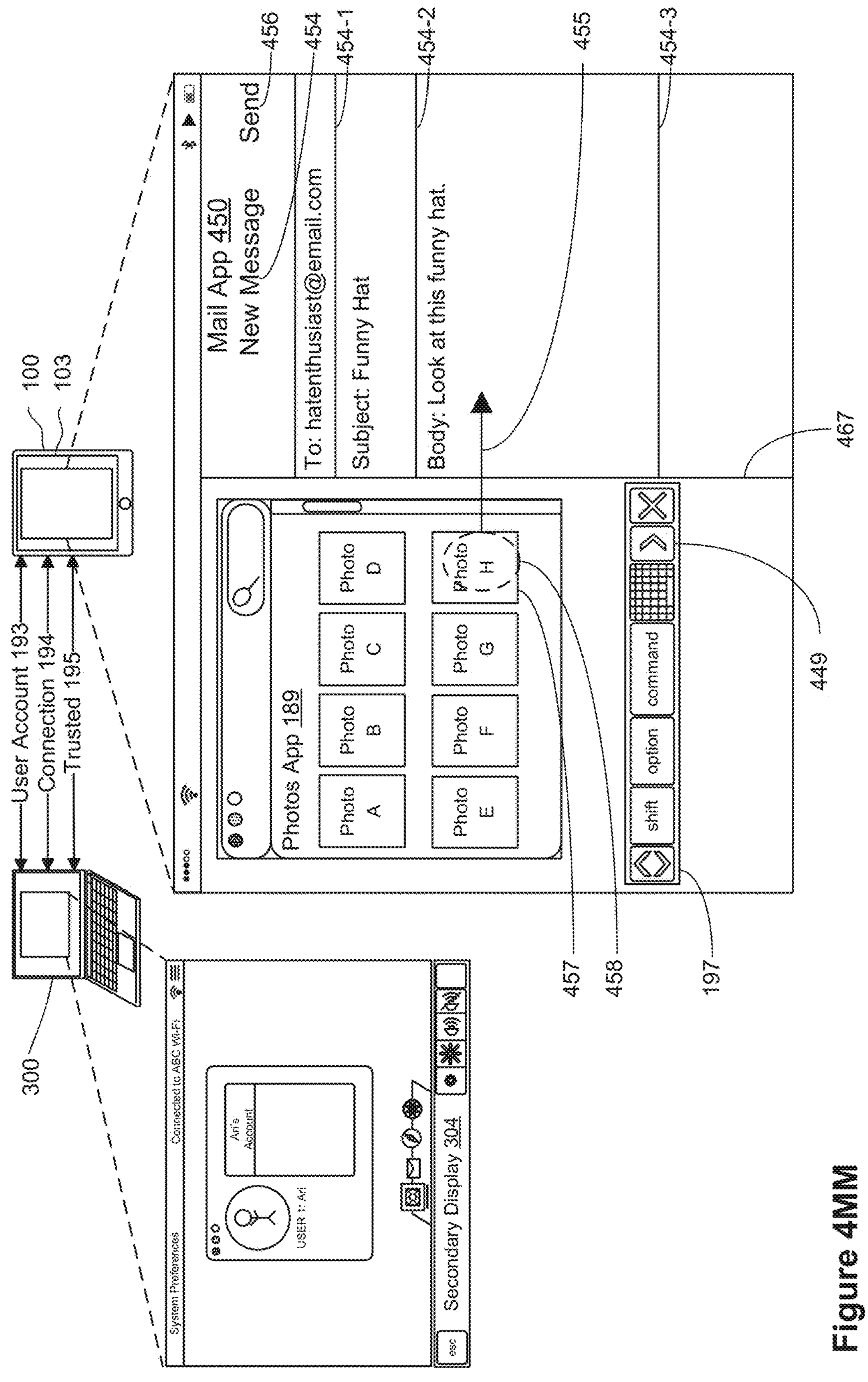
Figure 4N:
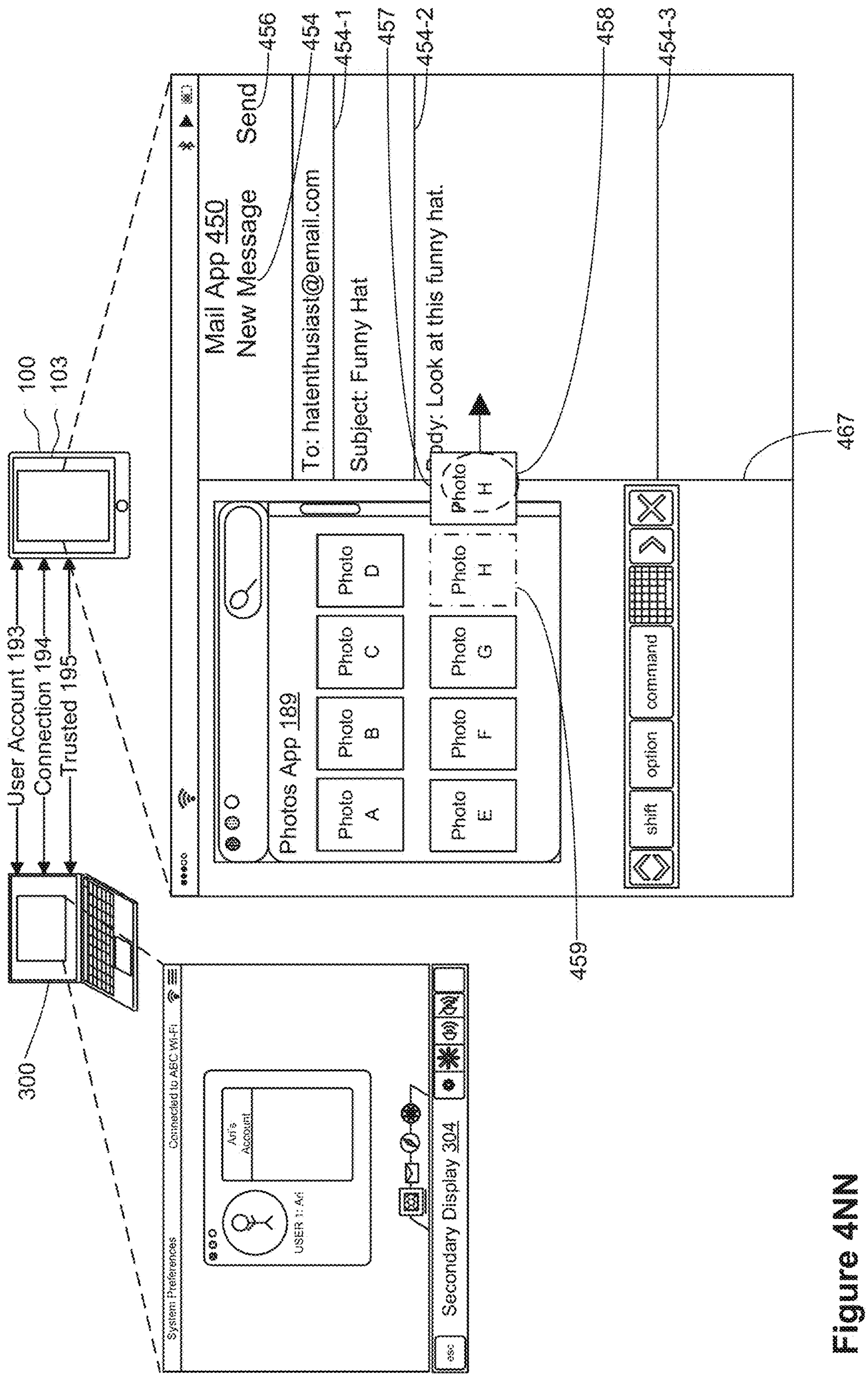
Figure 4O:
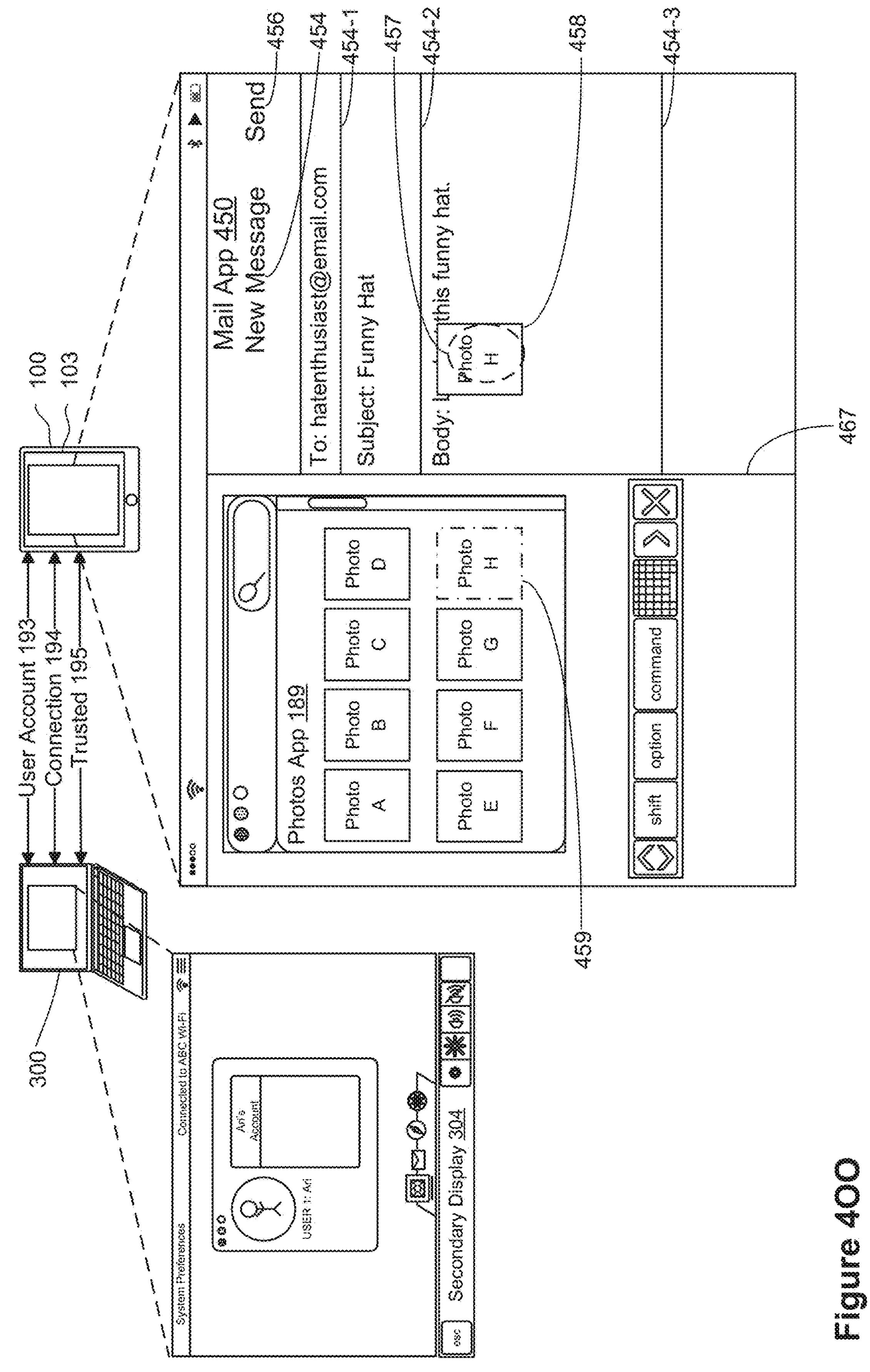
Figure 4P:
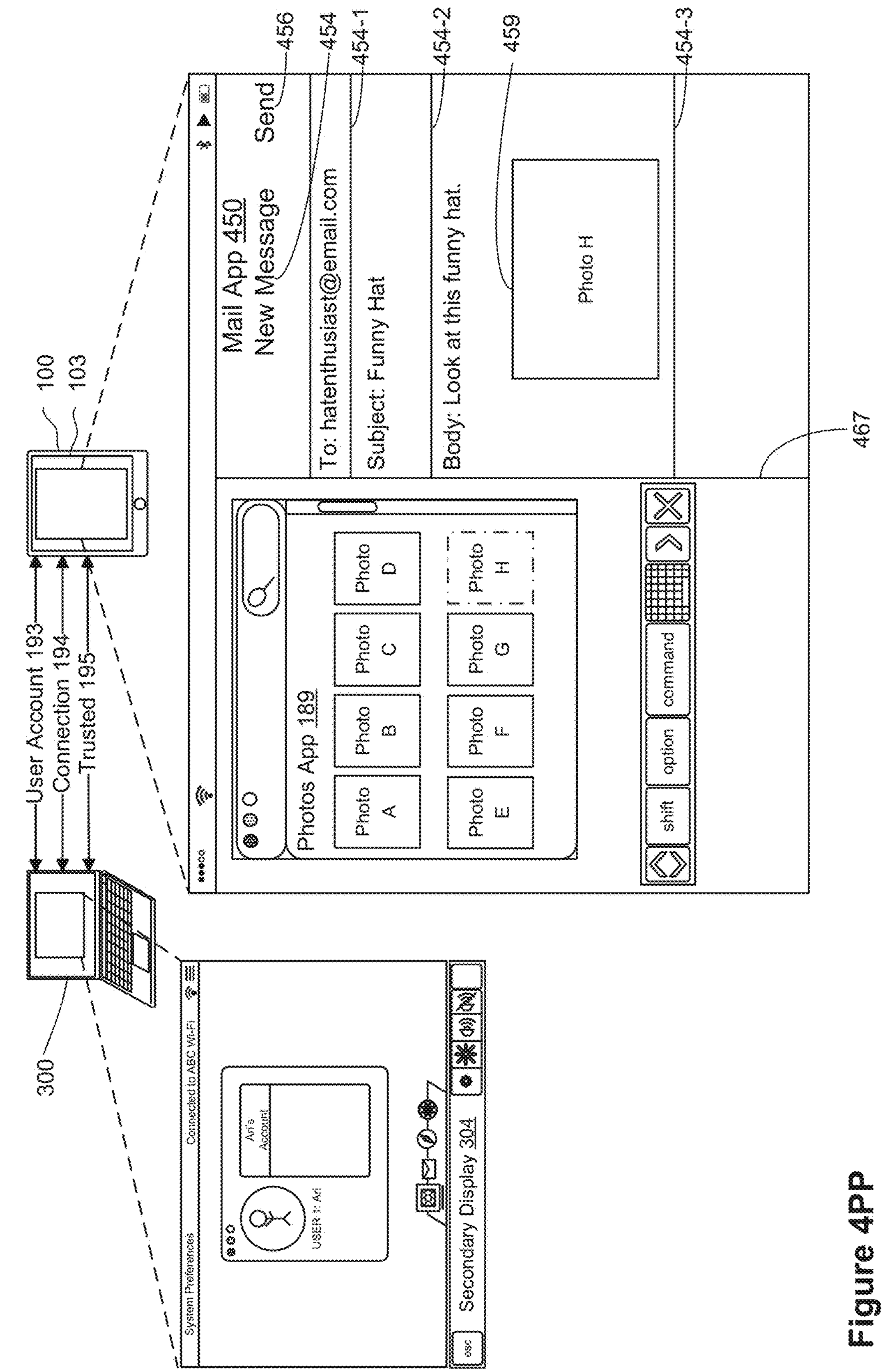
Figure 4Q:
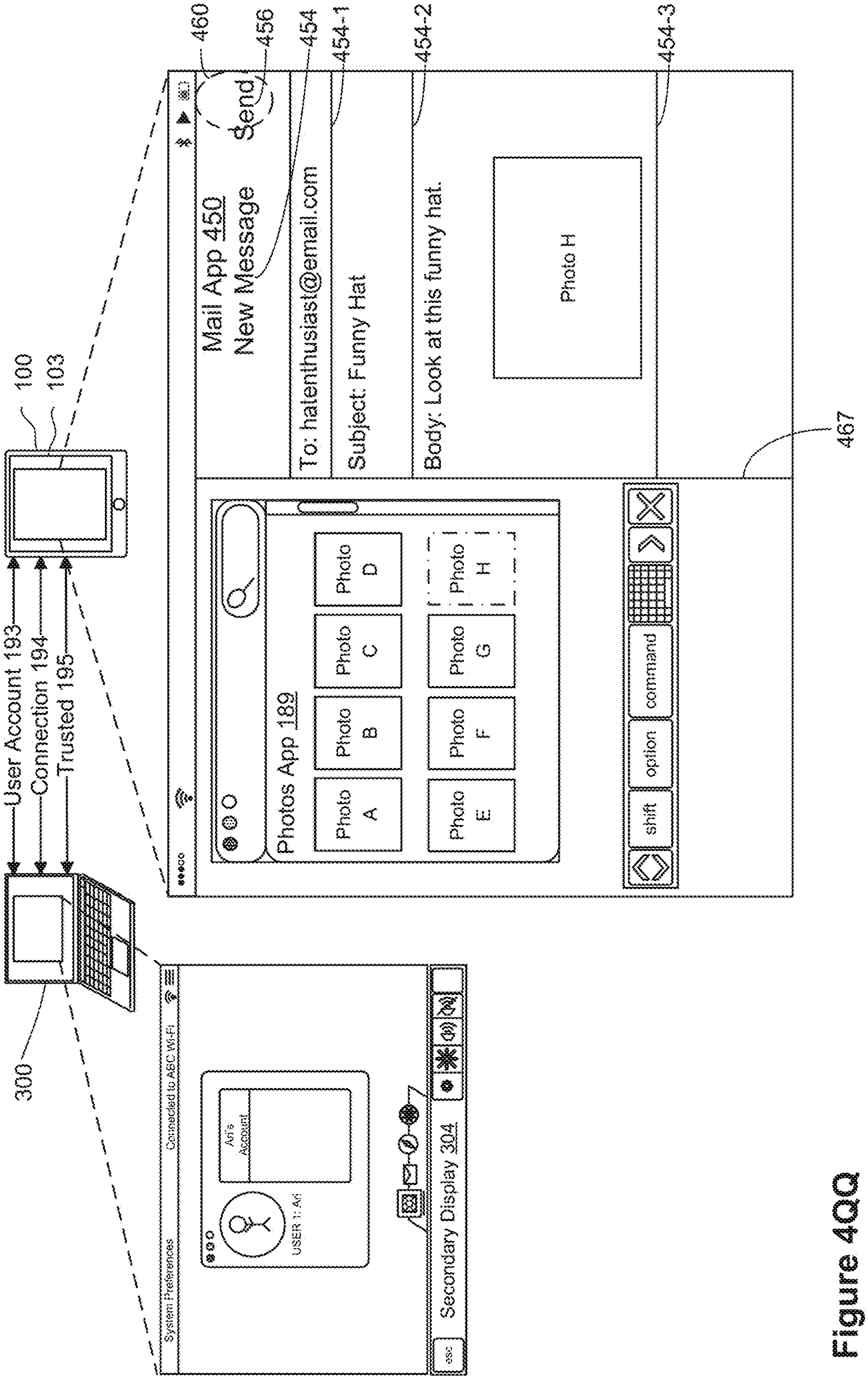
Figure 4R:
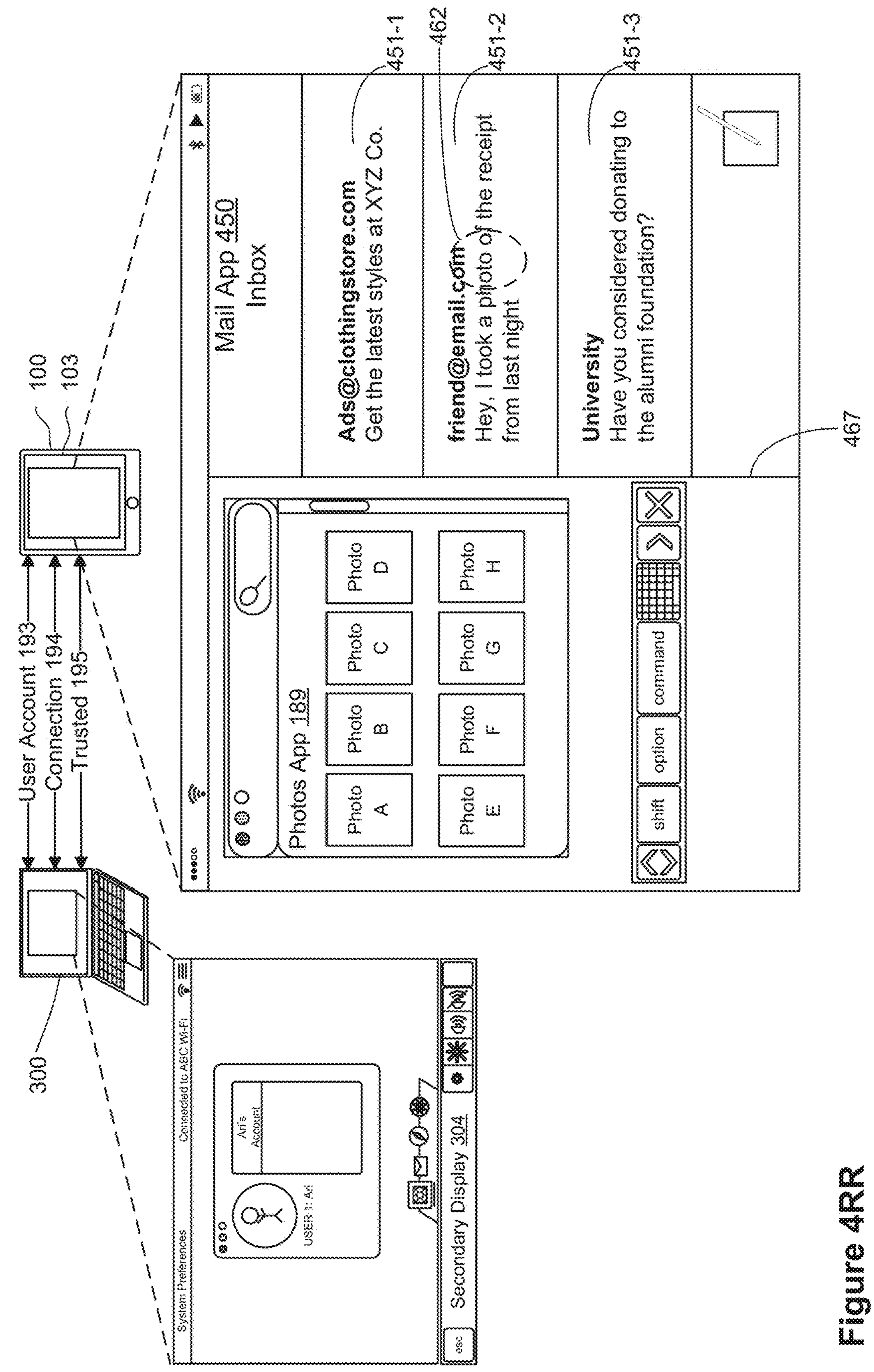
Figure 4S:
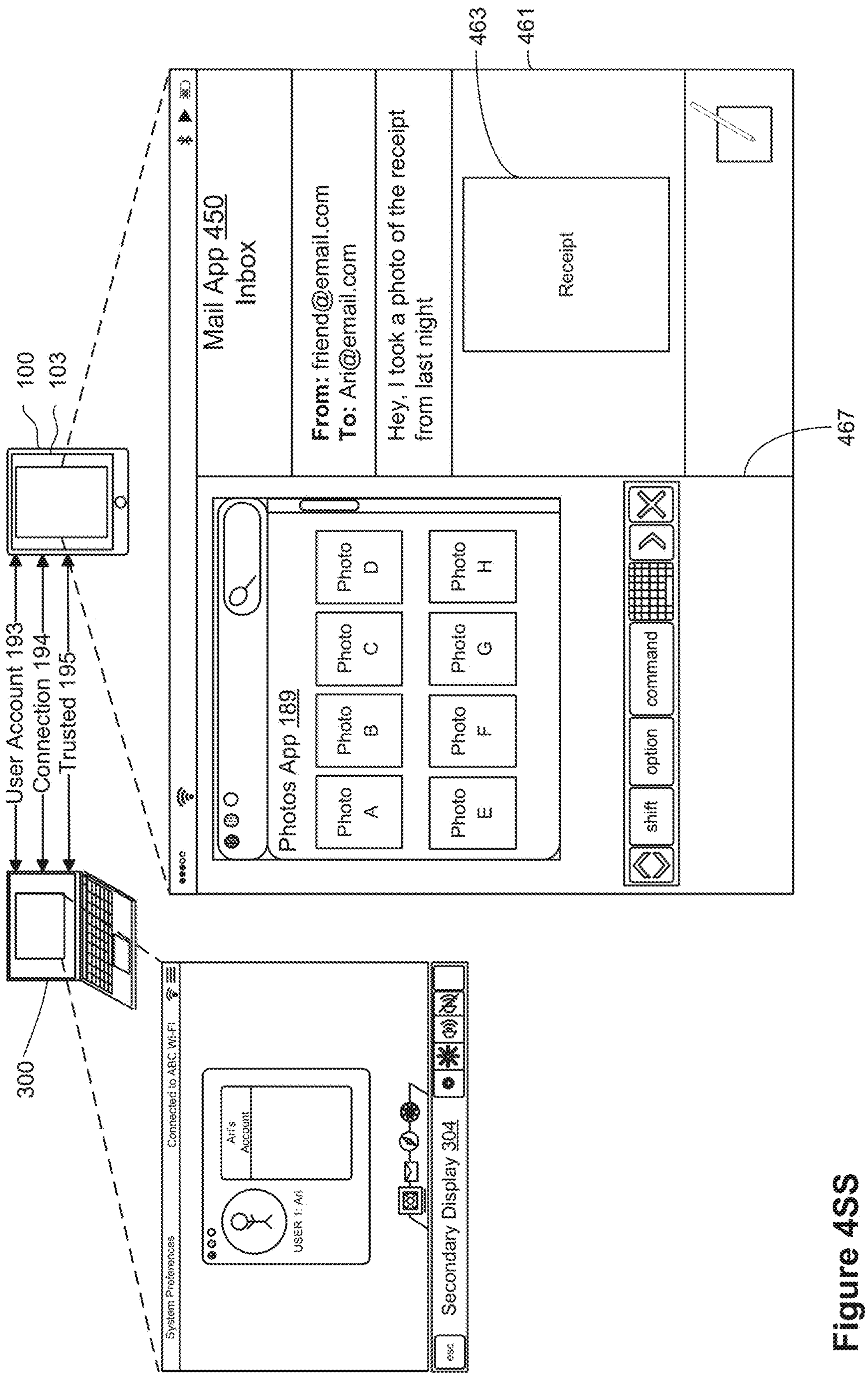
Figure 4T:
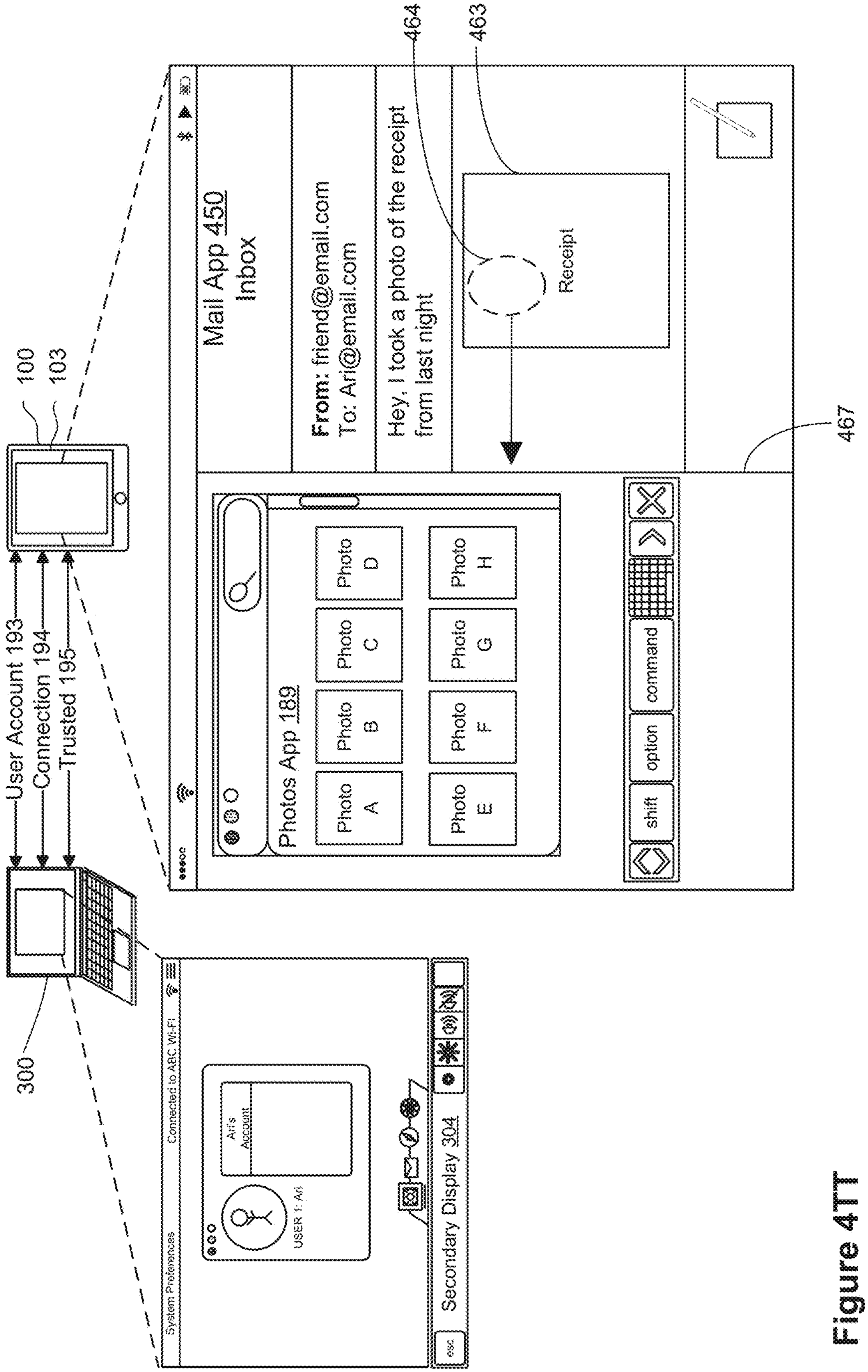
Figure 4U:
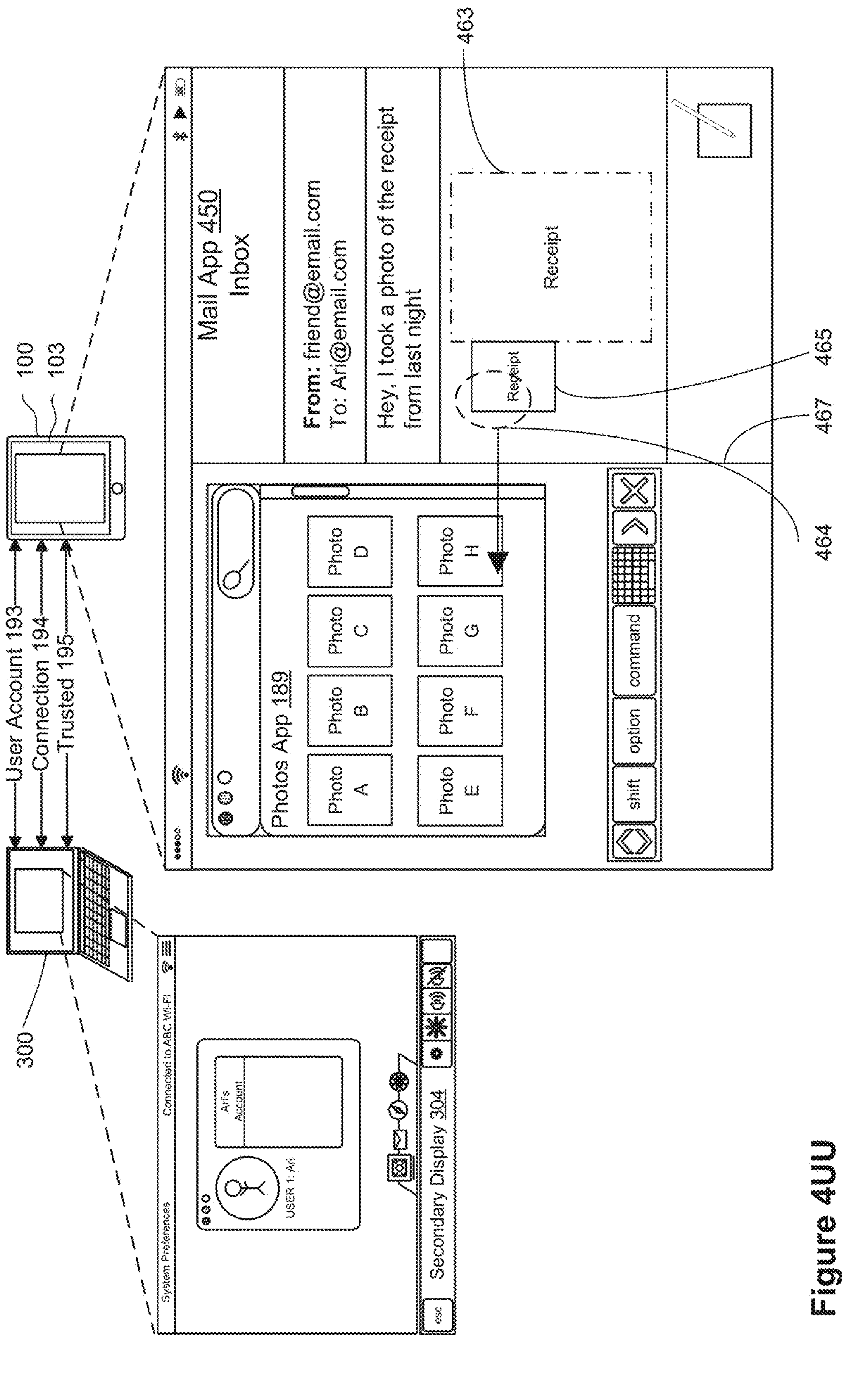
Figure 4V:
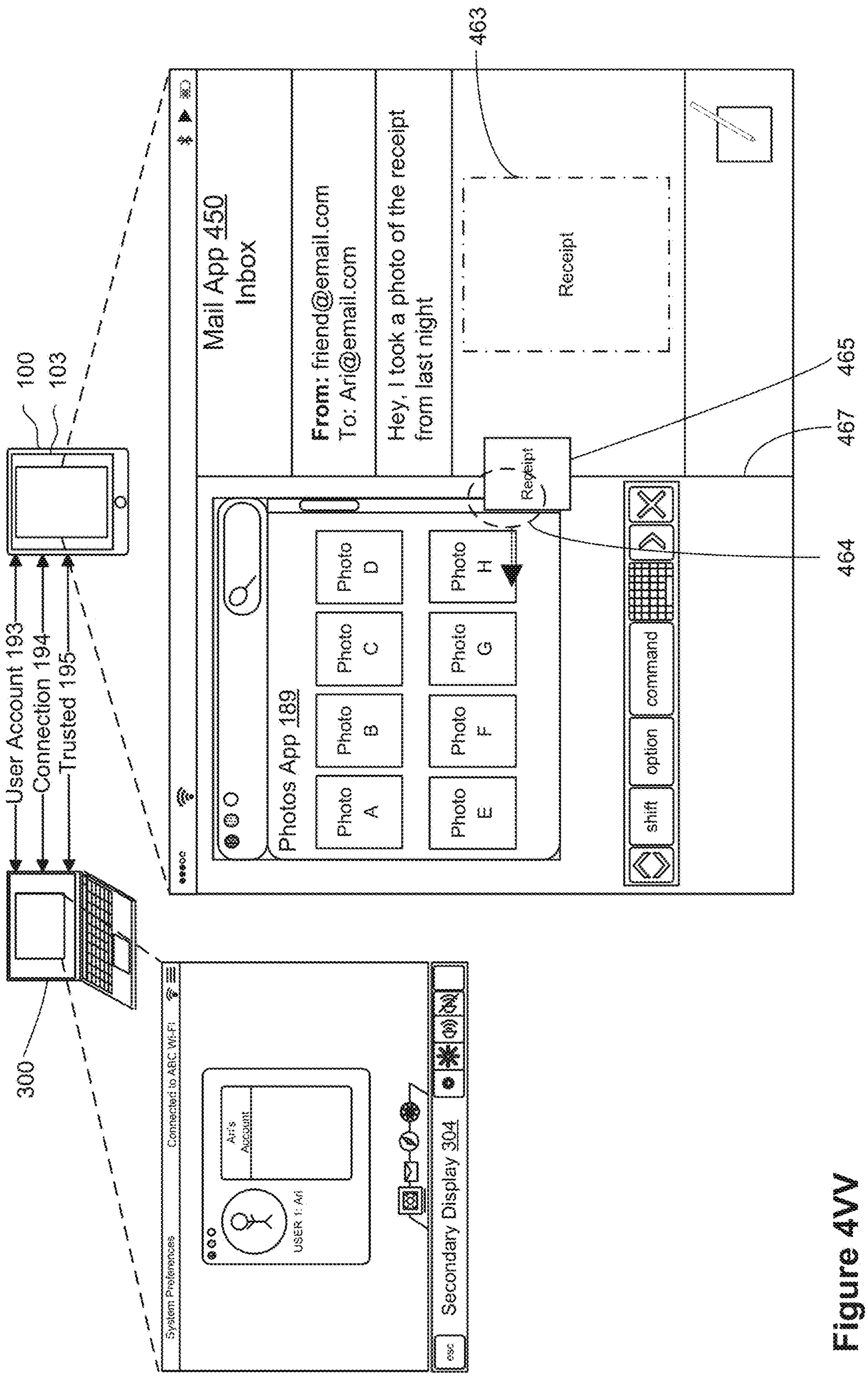
Figure 4W:
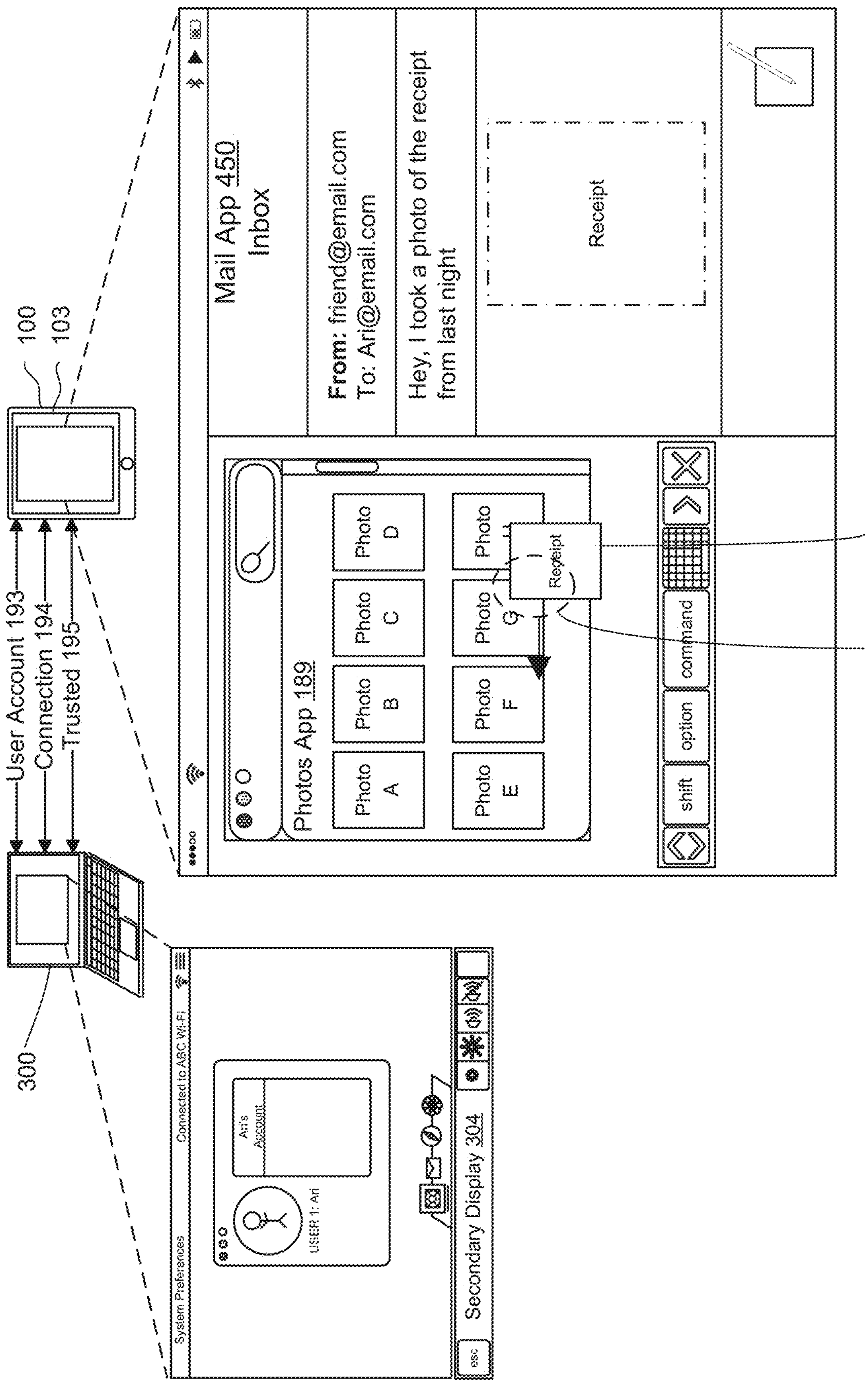
Figure 4X:
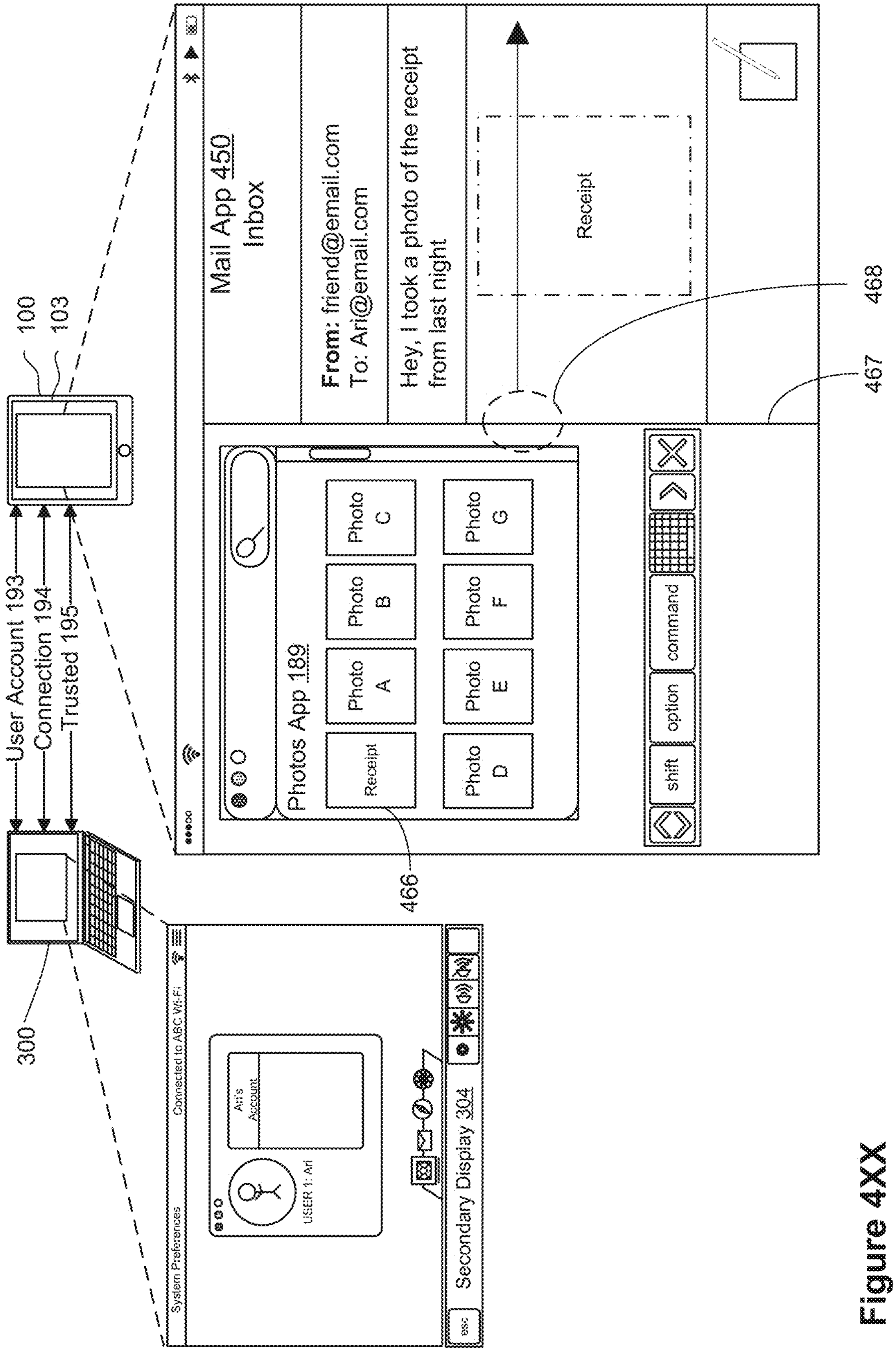
Figure 4Y:
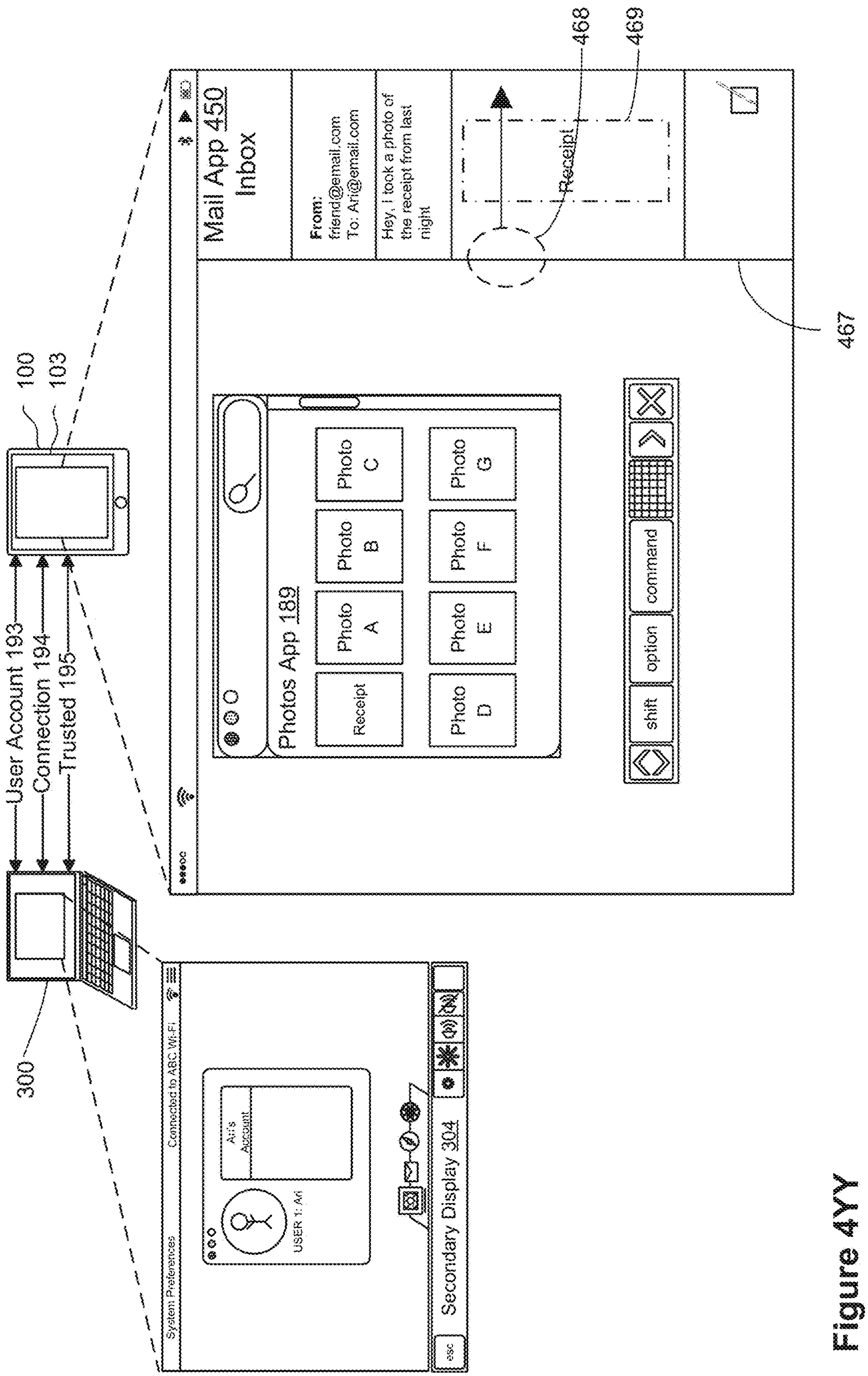
Figure 4Z:
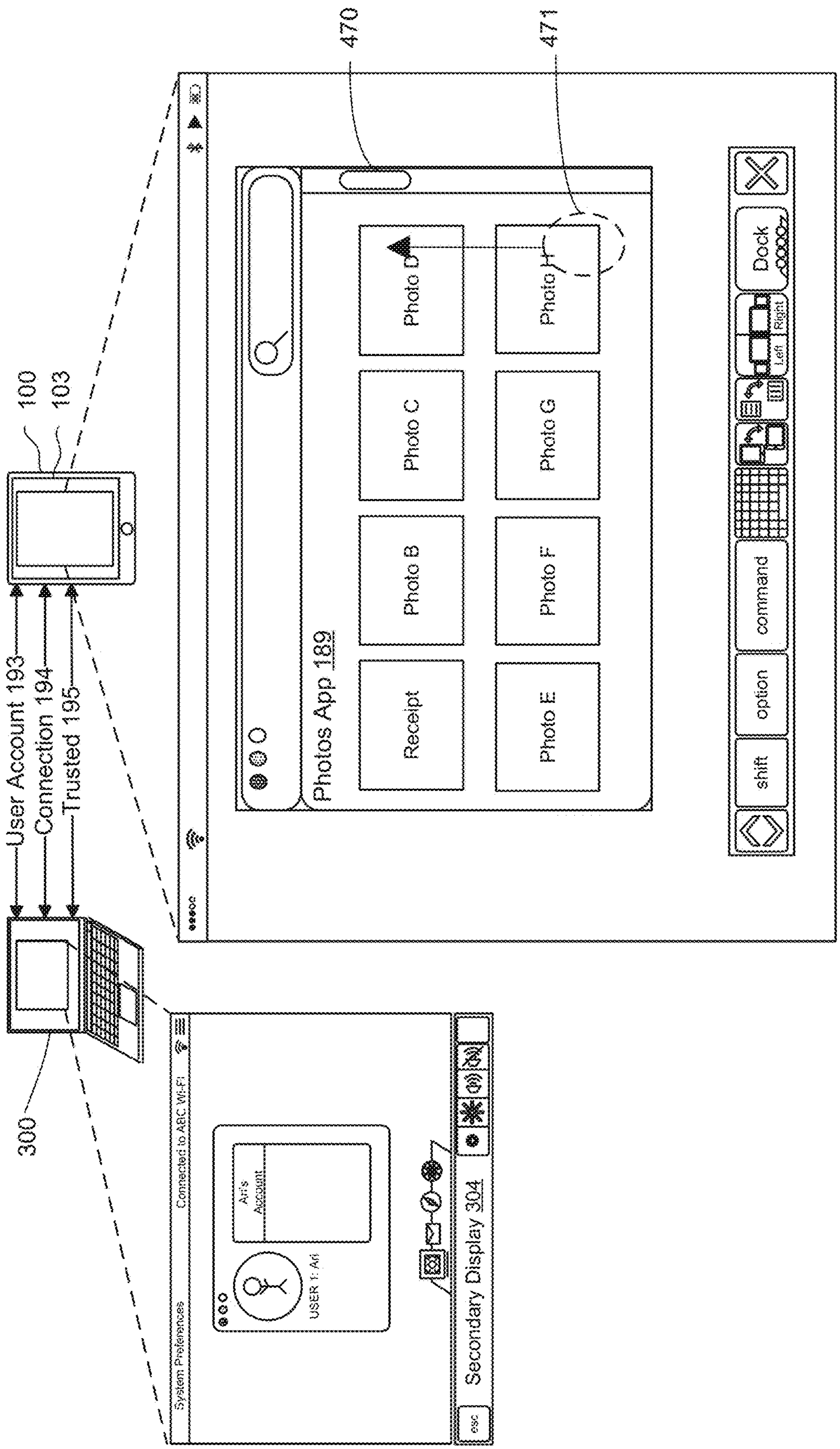

FIG. 4ZZ shows the resulting user interface when the swiping gesture 468 beginning at the dividing line 467 ends near the edge of the display. As discussed the e-mail application user interface 450 is dismissed (e.g., is no longer displayed), and the companion-display mode user interface 419 takes up substantially all of the display once again (e.g., all of the display excluding a status bar portion at the top of the display). FIG. 4ZZ further illustrates the user scrolling the photos application window 189 by the swiping gesture 471, which can be made by a finger. Scrollbar 470 indicates what position the user interface is currently in, and updates in response to the finger swipe gesture 471.

When operating in a companion-display mode the possibility exists to interact with two different operating systems (e.g., the laptop's operating system (e.g., the companion-display mode), and the tablet's device operating system), it can be beneficial to only allow some inputs to correspond to only one operating system and not the other. For example, in some situations a finger input may be better suited to control the tablet device operating system, while stylus inputs are better suited for controlling the user interface generated by the laptop 300. Despite this, users may have become accustomed to using some inputs with fingers to manipulate content, and not allowing such inputs to be made can be frustrating to the user. As such, a finger input although usually directed to the tablet device's operating system, may be mapped to the laptop device's operating system instead, to avoid frustration, and confusion. Thus, in some embodiments, certain finger inputs may be received by the companion-display mode, and may be used to manipulate content within the companion-display mode (e.g., the laptop's operating system)

FIG. 4AAA illustrates the photos application being scrolled through, and a new set of photos being displayed in response to the scrolling (e.g., Photos I-L). Additionally, scrollbar 470 moves in response to the swiping gesture being received within the photos application window 189.

FIG. 4BBB illustrates a two-finger tap gesture 472 received at representation of "Photo E" 473, and this two-finger tap gesture can allow users to access secondary options (e.g., a menu associated with right-click functionality). In response to this two-finger tap gesture, a right-click menu is displayed that contains: "Get info" user interface element 474 that, when selected, causes the device to display a separate user interface that displays info about "Photo E" 473; Rotate user interface element 475 that, when selected, causes the photo to rotate a predetermined amount; "Edit" user interface element 476 that, when selected, causes the photo to enter an editing mode; and "Delete" user interface element 477 that, when selected, causes the photo to be removed from the photos window 189.

FIG. 4CCC illustrates an input 478 received at the edit user interface element 476, which causes the photo to enter an editing mode. The photo-editing mode may cause the photo to be expanded on the tablet's display.

FIG. 4DDD illustrates the resulting user interface that occurs when the representation of "Photo E" 473 is put in an editing mode. In the photo editing mode the thumbnail representation of "Photo E" 473 is no longer shown, and the full "Photo E" 473-1 is displayed.

FIG. 4EEE illustrates while "Photo E" 479 is in an editing mode, the Photo may be manipulated by a two finger pinch gesture using contacts 480-1 and 480-2 that are received over "Photo E" 479. In response to such a pinch gesture, "Photo E" is resized to a reduced display size, as FIG. 4EE shows.

FIG. 4FFF illustrates the "Photo E" 479 receiving a two finger de-pinch gesture from contacts 481-1 and 481-2, which de-pinch gesture is used to expand (e.g., zoom in) the "Photo E" 479.

FIG. 4GGG illustrates the resulting change from receiving the two finger de-pinch gesture at "Photo E" 479, where "Photo E" 479 is expanded to a new larger display size.

FIG. 4HHH illustrates two contacts 482-1, and 482-2 at "Photo E" that are each moving in a clockwise direction and rotating around one another. Such an input causes the "Photo E" 479 to be rotated in a clockwise direction. If the two finger inputs 482-1, and 482-2 were moving in a counter-clockwise direction, "Photo E" would be rotated in a counterclockwise direction instead.

FIG. 4III illustrates the response to receiving two contacts 482-1, and 482-2 at "Photo E" that are each rotating around one another in a clockwise direction. As illustrated, the "Photo E" is rotated a certain amount in accordance with a distance travelled by the clockwise rotation of the two contacts 482-1 and 482-2.

Additionally, FIG. 4III depicts that two contacts 482-1 and 482-2 at "Photo E" rotate around one another in a counterclockwise direction, which will result in the "Photo E" being rotated in the counterclockwise direction, which counterclockwise rotation is then shown in FIG. 4JJJ.

FIG. 4KKK illustrates the same companion-display mode user interface 419 with the photos application window 189, and also shows that a stylus 484 can be used as an input device. When the stylus is physically in contact with the tablet's display 103, and dragged along the tablet's display 103, or moved at a predefined distance above the display (e.g., a hover movement during which the cursor is above the display but does not contact the display) the pointer 190 follows movement of the stylus. In some embodiments, the stylus is used to control pointer 190's movement, but a user's finger does not control the movement of the pointer 190. Additionally, FIG. 4KKK shows a tap input 4004 made by stylus 484 at the search bar 4003. In response to the tap input of stylus 484, a left-click operation can be performed.

FIG. 4LLL illustrates the response to receiving a tap input 4004 made by stylus 484 at the search bar 4003 to perform a left-click operation. In response to such an input, the search bar 4003 expands to show previously made searches, such as "Dogs" 485, and "Signs" 486. These previously made searches may be selected, and the displayed photos (or representations of photos) will include photos related to the search criteria.

FIG. 4MMM illustrates a stylus 484, and pointer 190 being moved by the stylus 484 to cause selection of the previously made search "Signs" 486. In response to this selection, which can be made by a tap input by stylus 484, the "Signs" 486 box is grayed out to show it has been selected.

FIG. 4NNN illustrates the response to selecting the previously made search of "Signs" 486. Such a selection causes the photos application window 189 to display photos and videos associated with the previously made search for "Signs." The previously displayed photos are no longer shown, unless they were associated with signs. FIG. 4NNN also shows that movement of the stylus 484 cause the pointer 190 to move to select "Sign Video A" 487 of FIG. 4NNN. A single tap gesture can be made with the stylus to indicate a left click is desired on top of the "Sign Video A" 487 to open the "Sign Video A" 487. Notably, the "Sign Video A" 487 is a video that is accessed from the laptop 300, and not accessed form the tablet device 100.

FIG. 4000 illustrates "Sign Video A" 487 playing on the tablet device, and using the speakers of the device that the video is displayed on (e.g., the tablet device). Despite the video content being generated by the laptop 300, it can be confusing to the viewer to look at one device (e.g., the tablet device 100) to watch "Sign Video A" 487, but listen to the associated audio of "Sign Video A" 487 on another device (e.g., the laptop 300). As result, FIG. 4000 illustrates that the laptop's speakers 311 can be muted, while the tablet device 100 plays the associated audio of "Sign Video A" 487 on only its speakers 111. In other embodiments, speakers of both the laptop and the tablet can be utilized together.

FIG. 4PPP illustrates a swipe-down-gesture 489 starting from a top-right corner of the tablet's display to causer display of a control-center user interface 4005 with a plurality of controls for controlling functionality of the tablet device. The control-center user interface 4005 can include controls such as: a Bluetooth toggle 491 for turning on or off the tablet device's Bluetooth; a Wi-Fi toggle 492 for turning on or off the tablet device's Wi-Fi; a do not disturb toggle 493 for putting the device in a mode that does show notifications to the user; a low power mode toggle 494 for preserving battery life; a lock orientation toggle for either allowing the devices user interface to rotate based on sensor data or not; and text size icon 496 for entering a user interface to quickly adjust the size of text within the tablet device's user interface. In some embodiments, the control-center user interface is displayed overlaying the companion-display mode user interface (e.g., the control-center user interface is displayed overlaying the companion-display mode user interface shown in FIG. 4PPP). In some embodiments, the control-center user interface can overlay or include an application-switching user interface if the application-switching user interface was previously displayed (an example of which is depicted in 4QQQ), such as that described in reference to FIG. 4EE.

FIGS. 5A-1-5E-2 are schematics of the laptop's display and the tablet device's display, which are used to illustrate example user interfaces in accordance with some embodiments. The user interfaces in these figures are used to illustrate the methods and/or processes described below. One of ordinary skill in the art will appreciate that the following user interfaces are merely examples. Moreover, one of ordinary skill in the art will appreciate that a different layouts with additional or fewer affordances, user interface elements, or graphics can be used in various circumstances.

FIGS. 5A-1 to 5E-2 illustrate how a same input can result in two different responses depending on whether the input was made by a user's finger or a stylus device 484. The following figures are shown together to illustrate that the same input is received at the same device, and depending on the input type (e.g., a stylus or a finger), a different response occurs.

FIGS. 5A-1 to 5E-2, omit the enlarged display of the laptop device 100 to emphasize differences made between the gestures as they occur on the tablet's device. Despite this, a representation of the laptop 100 is shown connected to the tablet device 300, to signify that the devices are still operating in a companion-display mode.

Figures 2, 5A:
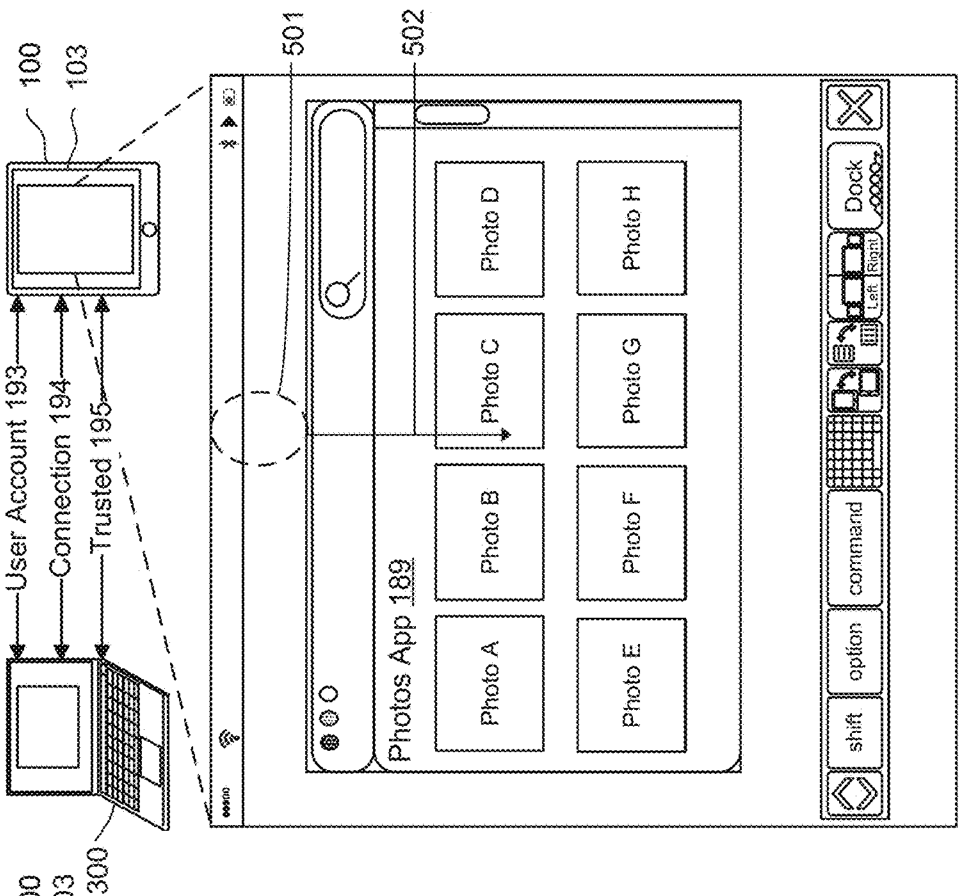
Figures 1, 5A:
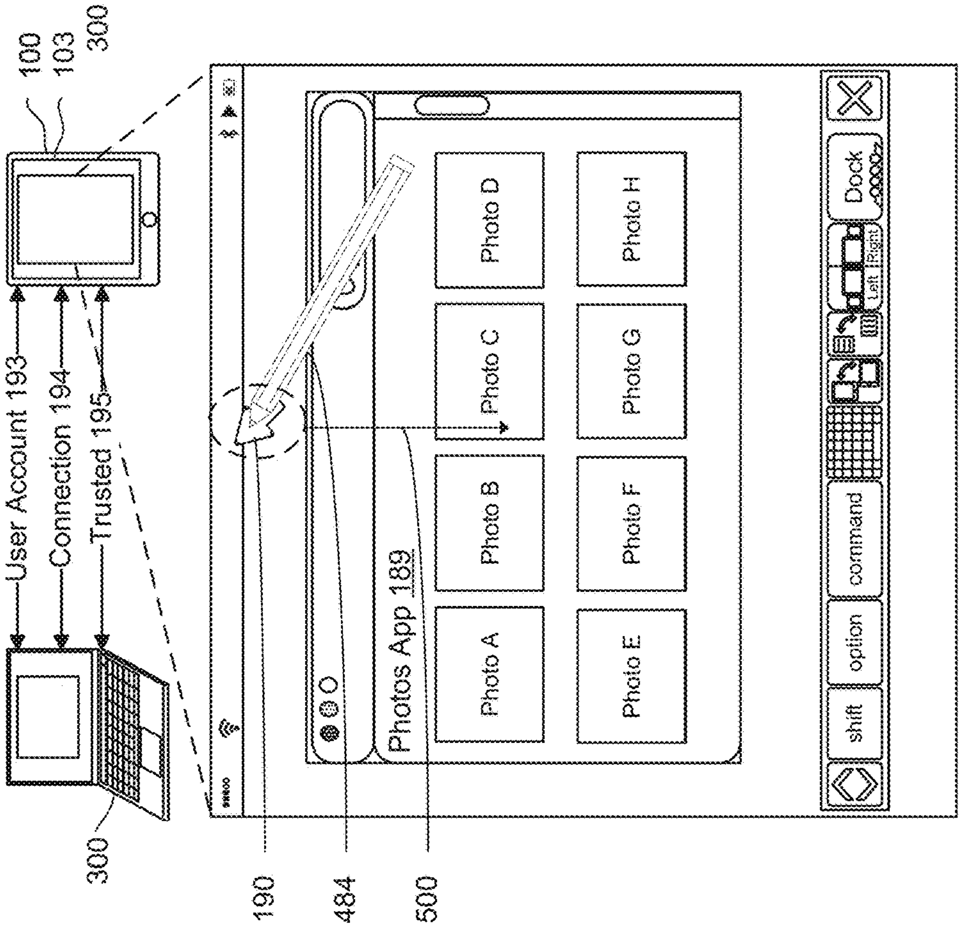

FIG. 5A-1 and FIG. 5A-2 both illustrate swipe-down gestures made from a top-center region of the display. FIG. 5A-1 illustrates a swipe down gesture 500 made with the stylus 484 (e.g., APPLE PENCIL designed by APPLE INC. in CUPERTINO, Calif.). Additionally, the gesture moves in a downward direction that is substantially perpendicular (e.g., within +/−5 degrees of perpendicular) to the top of the display. FIG. 5A-2 illustrates a swipe down gesture 502 made with a user's finger 501 moving in the downward direction indicated by direction arrow 502.

Figures 2, 5B:
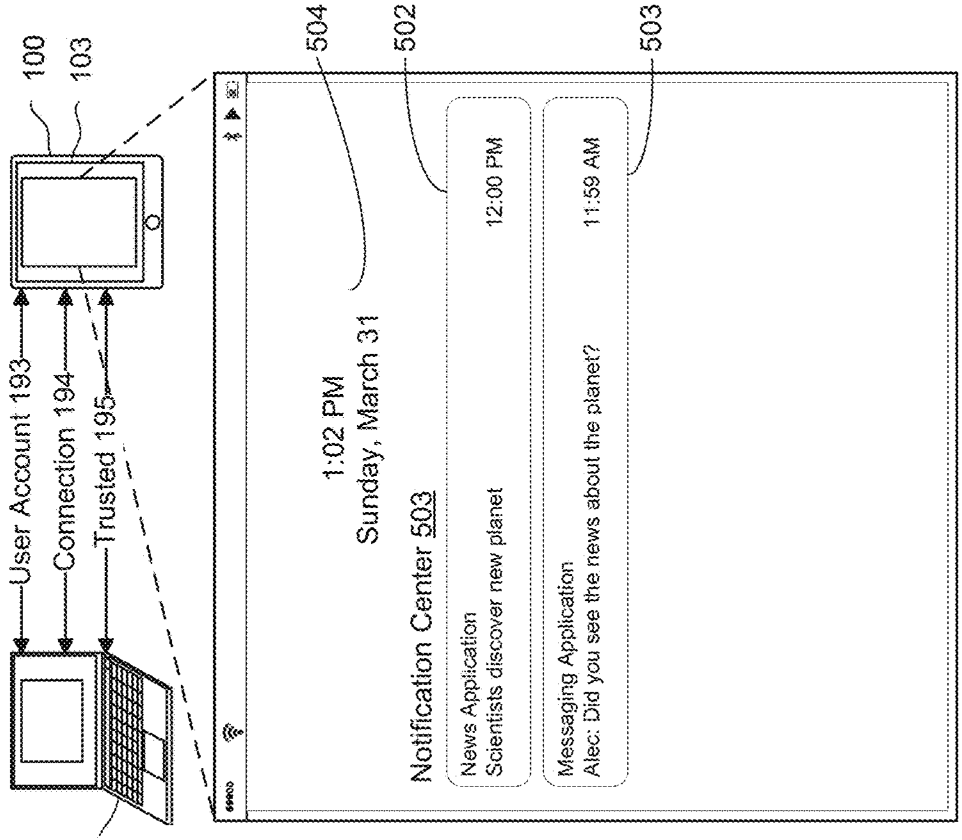
Figures 1, 5B:
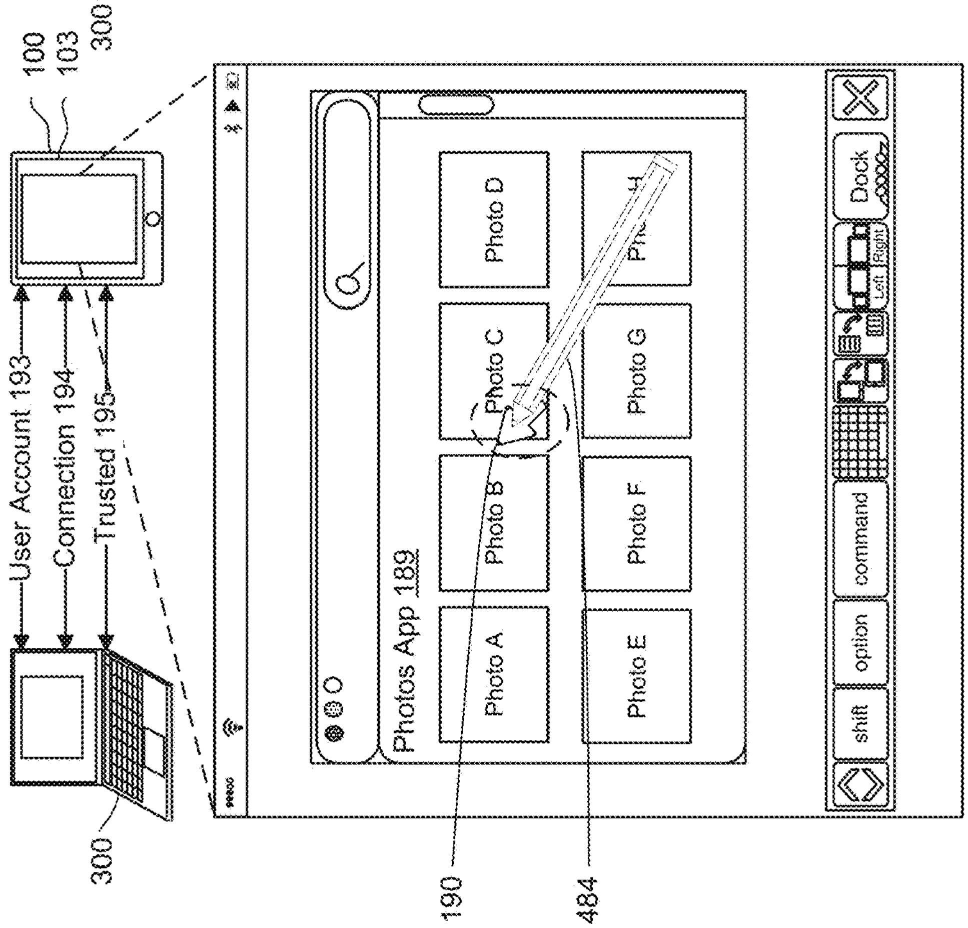

FIG. 5B-1 and FIG. 5B-2 both illustrate responses to the swipe down gestures. As illustrated in FIG. 5B-1, in response to determining that the gesture was made using the stylus, the cursor 190 moves to a second location on the display in accordance with the illustrated movement of the stylus. As illustrated in FIG. 5B-2, in response to determining that the gesture was made using a user's finger, a tablet device's notification center user interface 503 is displayed on top of the companion-display mode. The tablet device's notification center user interface includes a time and date indicator 504, and can contain a plurality of notifications (e.g., a news application user interface element 502, and a messaging application user interface element 503).

Figures 1, 5D:
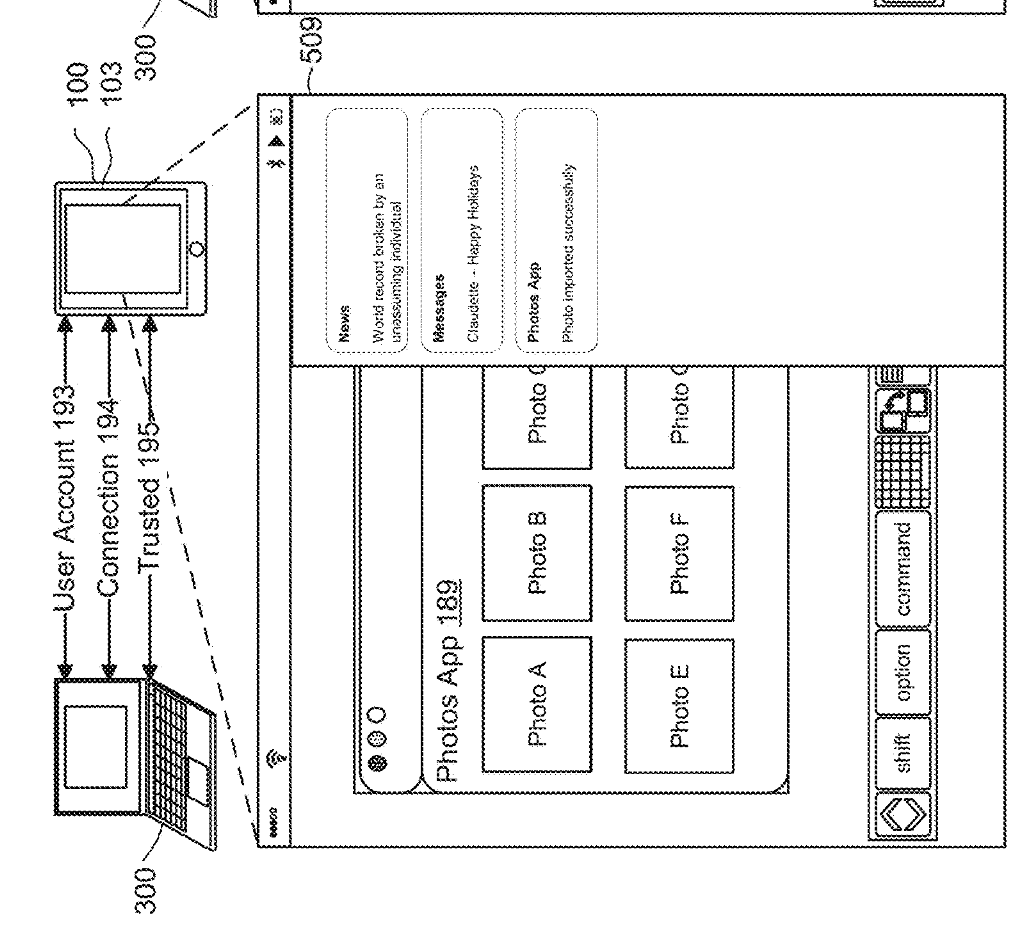
Figures 2, 5D:
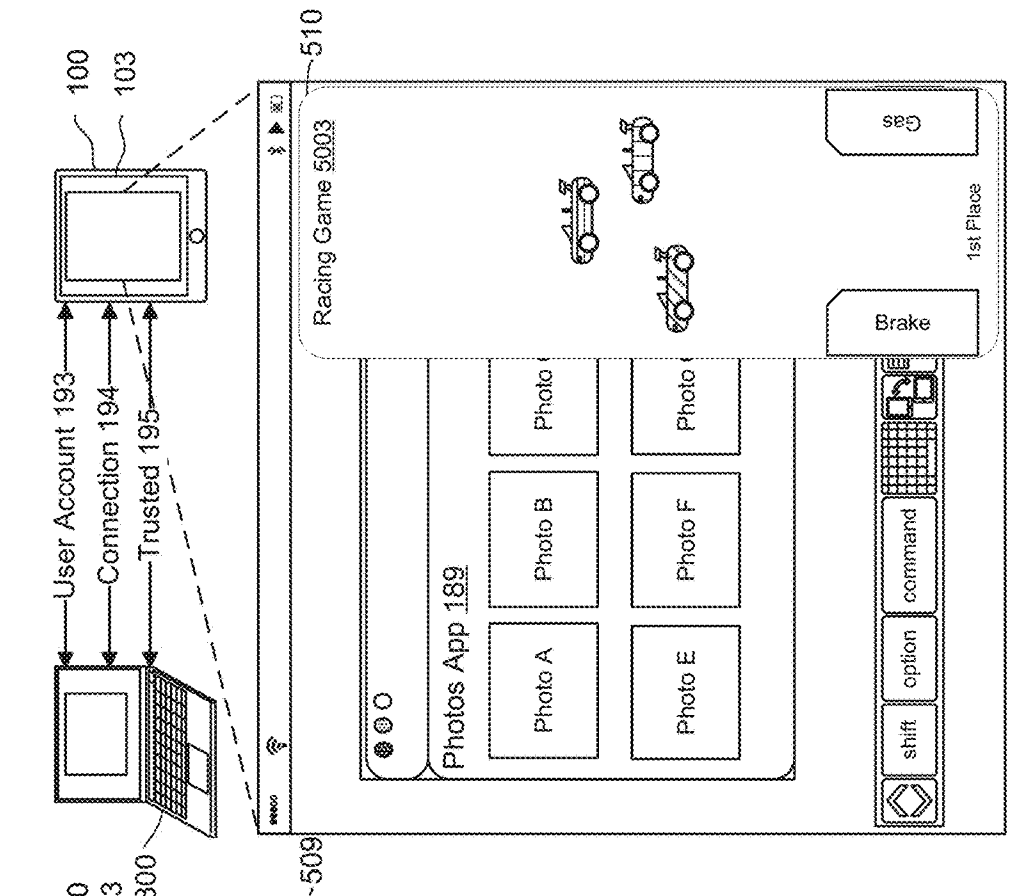

FIG. 5C-1 and FIG. 5C-2 both illustrate left-moving edge-swipe gestures made from the right side of the tablet's display. FIG. 5C-1 illustrates stylus 484, contacting a right edge of the tablet's display 103, and when the stylus 484 makes contact with the display, pointer 190 is shown at the position where the contact is made (in some embodiments, the pointer 190 can also follow the stylus as it hovers over the tablet's display). After contact, the stylus moves in the leftward direction 506 to reveal a laptop 300 notification center user interface (FIG. 5D-1). FIG. 5C-2 illustrates a user's finger making contact 507 near the right edge of the tablet's display 103, and then that contact 507 moves in a leftward direction 508, to reveal a slide over user interface that overlays a portion of the companion-display mode (FIG. 5D-2).

FIG. 5D-1 and FIG. 5D-2 both illustrate responses to the left-moving edge-swipe gestures. As illustrated in FIG. 5D-1, the laptop 300 notification center user interface is displayed over the companion-display mode user interface in response to determining that the gesture was provided with a stylus device. The notification center user interface can include plurality of notifications. As illustrated in FIG. 5D-2, a slide over user interface for partially covering a portion of the companion-display mode with a previously executed application 510 is displayed in response to determining that the gesture was provided with a user's finger. For example, the slide over user interface can include a "Racing Game" 5003.

FIG. 5E-1 and FIG. 5E-2 both illustrate bottom-edge-swipe gestures that start from a bottom edge of the tablet's display. In FIG. 5E-1, the bottom-edge swipe gesture is performed using the stylus 484 (contact is made by the stylus near a bottom edge of the tablet's display and moves in the upward direction 511), while in FIG. 5E-2, the bottom-edge swipe gesture is performed using a user's finger (contact 512 is made near a bottom-edge of the display and moves in the upward direction 513).

Figures 2, 5F:
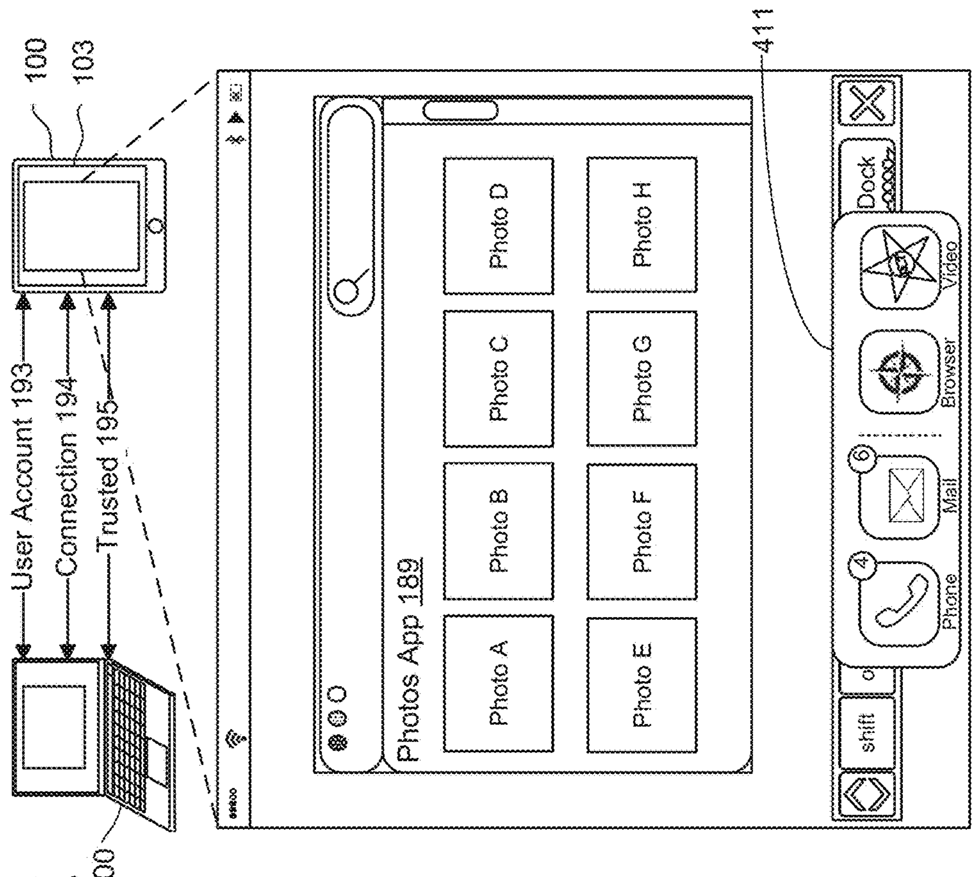
Figures 1, 5F:
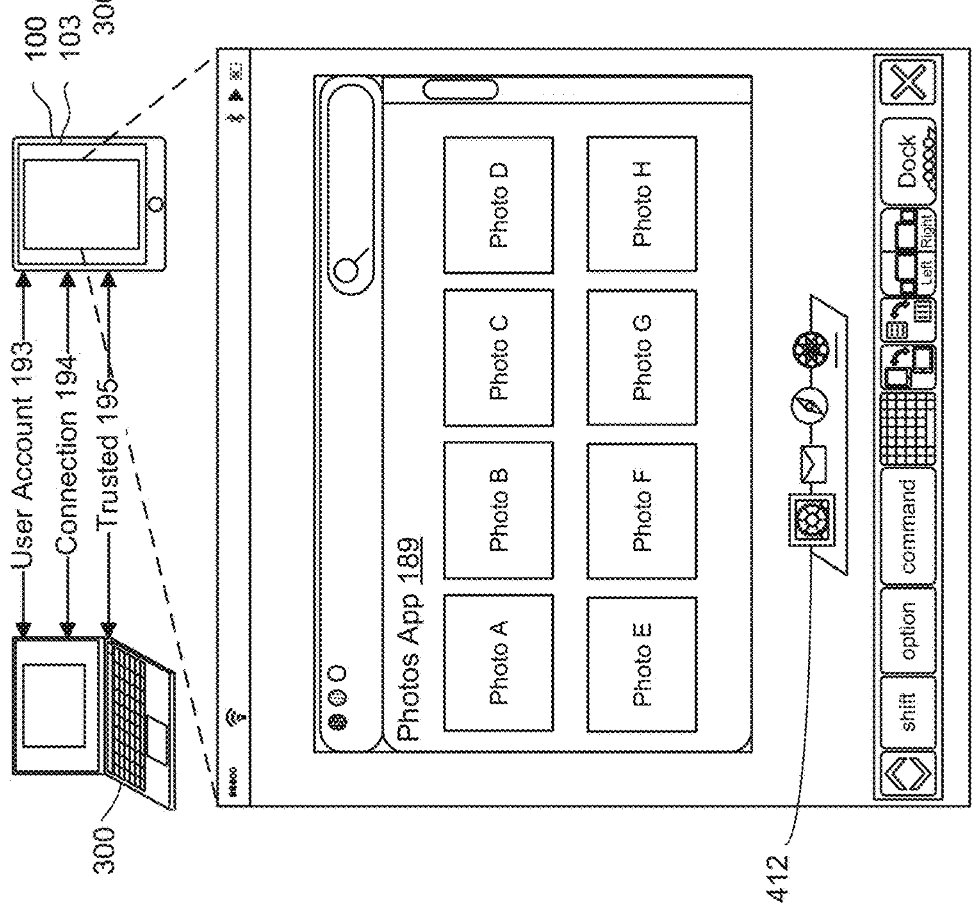

Depending on which input object is used to provide the bottom-edge swipe gesture, the result differs. For instance, FIG. 5F-1 shows that the dock 412 from the laptop 300 is displayed within the companion-display mode on tablet's display in response to the bottom-edge swipe being provided using the stylus. And, as illustrated in FIG. 5F-2, a dock 411 is instead revealed if the bottom-edge swipe gesture is provided using a user's finger.

In some embodiments, when a stylus is used as an input object at the tablet's display while the table is operating in the companion-display mode, then information regarding inputs provided by the stylus are sent to the laptop device for processing; and, when a user's finger is used as an input object at the tablet's display while the tablet is operating in the companion-display mode, then the tablet processes the inputs without sending information to the laptop device. In this way, users are provided with intuitive ways to interact with features available in two different operating systems and, therefore, the human-machine interface is improved.

Attention is now directed to FIGS. 6A-6L, which illustrate schematics of user interfaces used in conjunction with an annotation mode for marking-up content (e.g., where content is an image, a screenshot, etc.). In some embodiments, the annotation mode allows a user to send content from one device to a different device, to be marked-up on the different device. An annotation mode is entered into when a first device instructs a second device to enter an annotation mode. Instructing a device to enter an annotation mode allows the user to be able to take advantage of the second device's features that may not be present on the first electronic device (e.g., a touch-sensitive display and use of a stylus, which might not be available at the first device). A user may markup content with a plurality of markup options (e.g., a pencil markup, a pen markup, a highlight markup, etc.).

The user interfaces depicted in FIGS. 6A-6L are used as examples to illustrate the methods and/or processes described below. One of ordinary skill in the art will appreciate that the following user interfaces are merely examples. Moreover, one of ordinary skill in the art will appreciate that a different layouts with additional or fewer affordances, user interface elements, or graphics can be used in various circumstances.

Figure 6A:
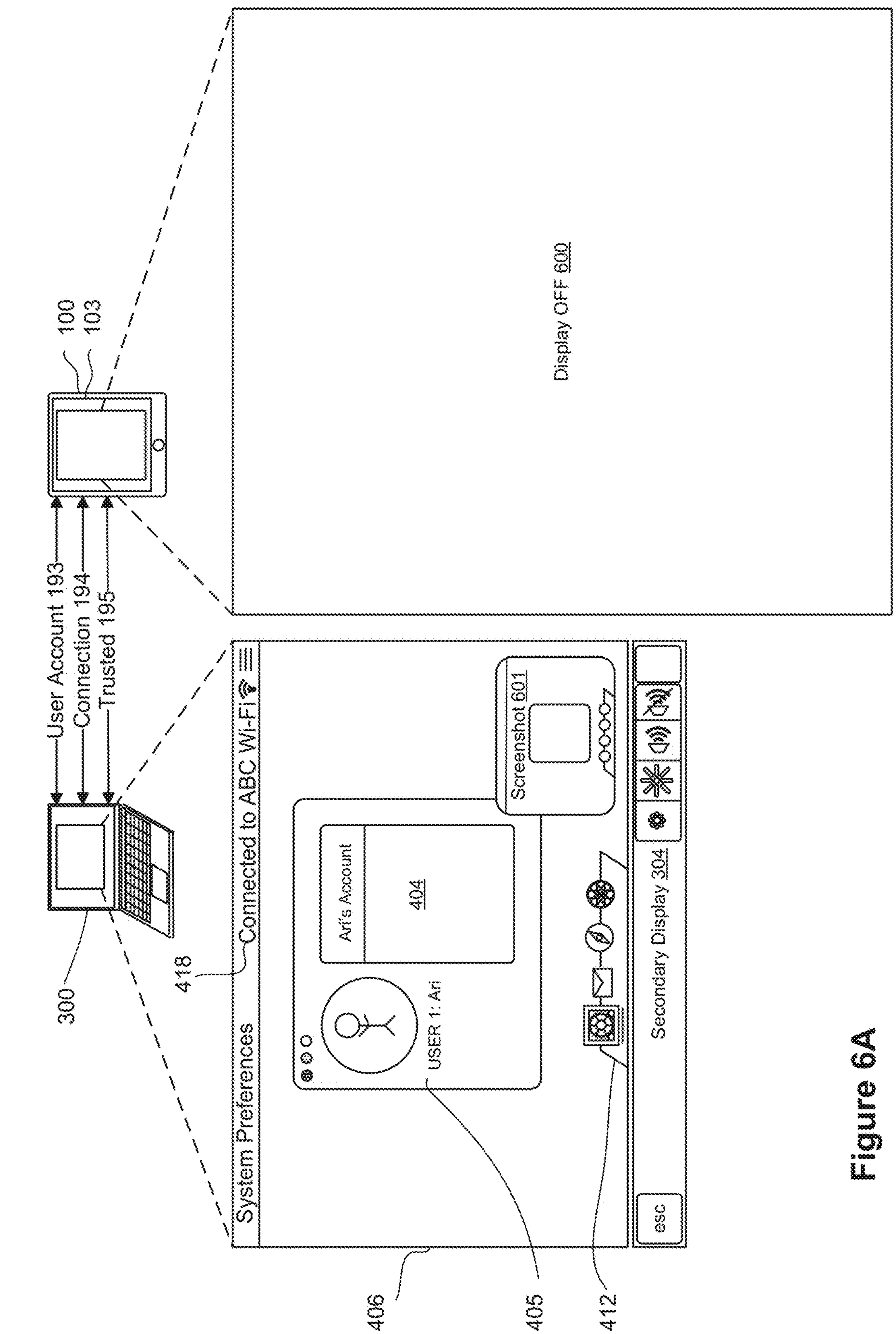
FIGS. 6A-6L are schematics of displays used to illustrate example user interfaces for initiating and interacting with an annotation mode, in accordance with some embodiments. Additional details regarding these figures are also provided below with reference to the descriptions of methods 800, 900, 1000, and 1100.

FIG. 6A illustrates a screenshot being taken on a laptop 300, while the laptop is connected to a tablet device 100. Similar to the above descriptions regarding the companion-display mode, one or more secure-connection criterion (user account 193, connection 194, and trusted 195) can be used to determine when content can be sent to another device for use in an annotation mode. The screenshot is shown in a user interface element represented using numeral 601 in FIG. 6A. Also illustrated is the tablet device 300, which can be operating in a locked state (e.g., a state in which the tablet's display is not displayed any content). In some embodiments, the tablet device 100 may be operating in an unlocked state, and additionally may be displaying a user interface for some application that is available on the tablet device. When the tablet device 100 is operating in any of the discussed states, activation of the annotation mode on the device 300 causes immediate replacement of whatever interface is currently on the tablet's display.

Figure 6B:
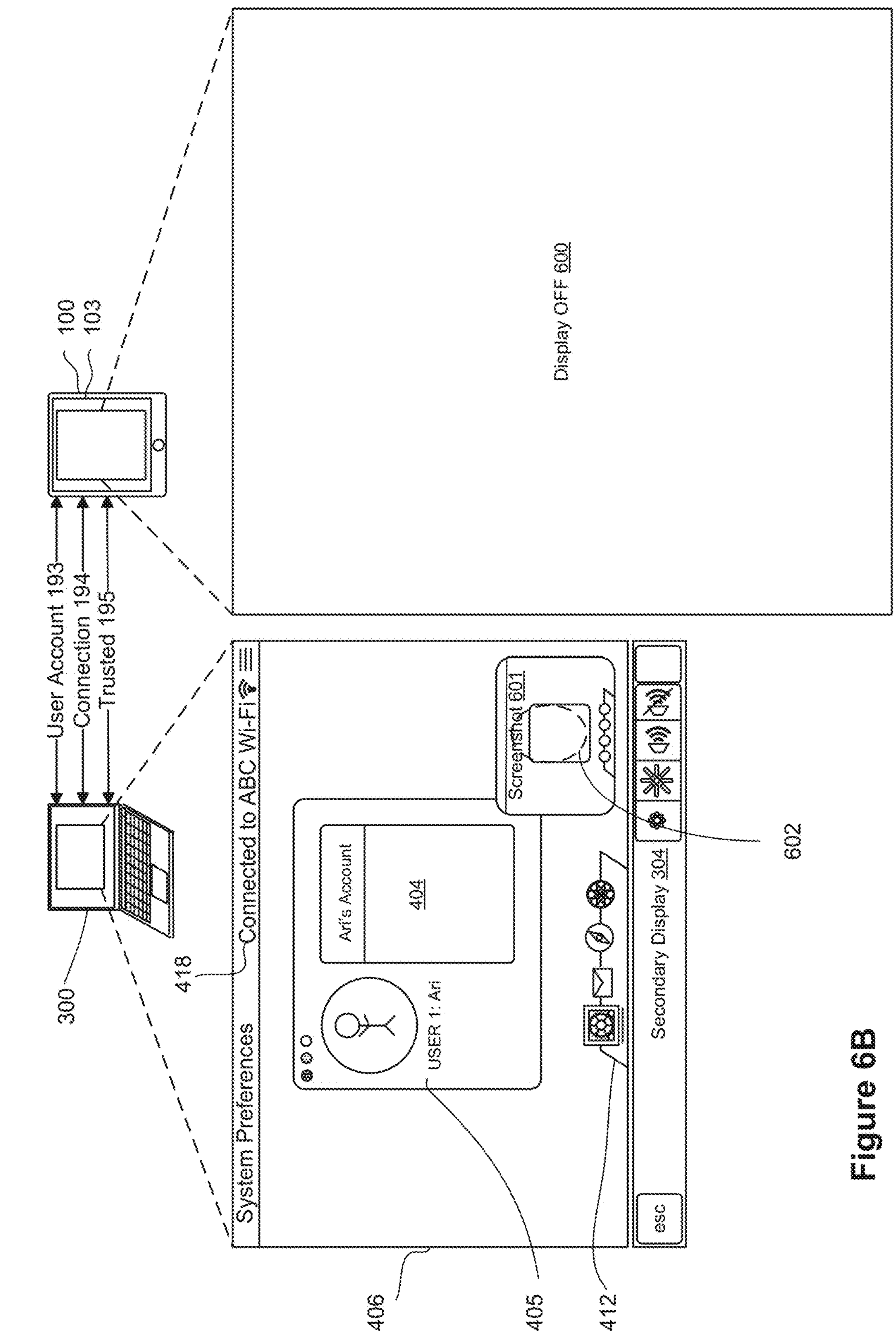

FIG. 6B illustrates an input 602 on the screenshot user interface element 601 made within the laptop's display.

Figure 6C:
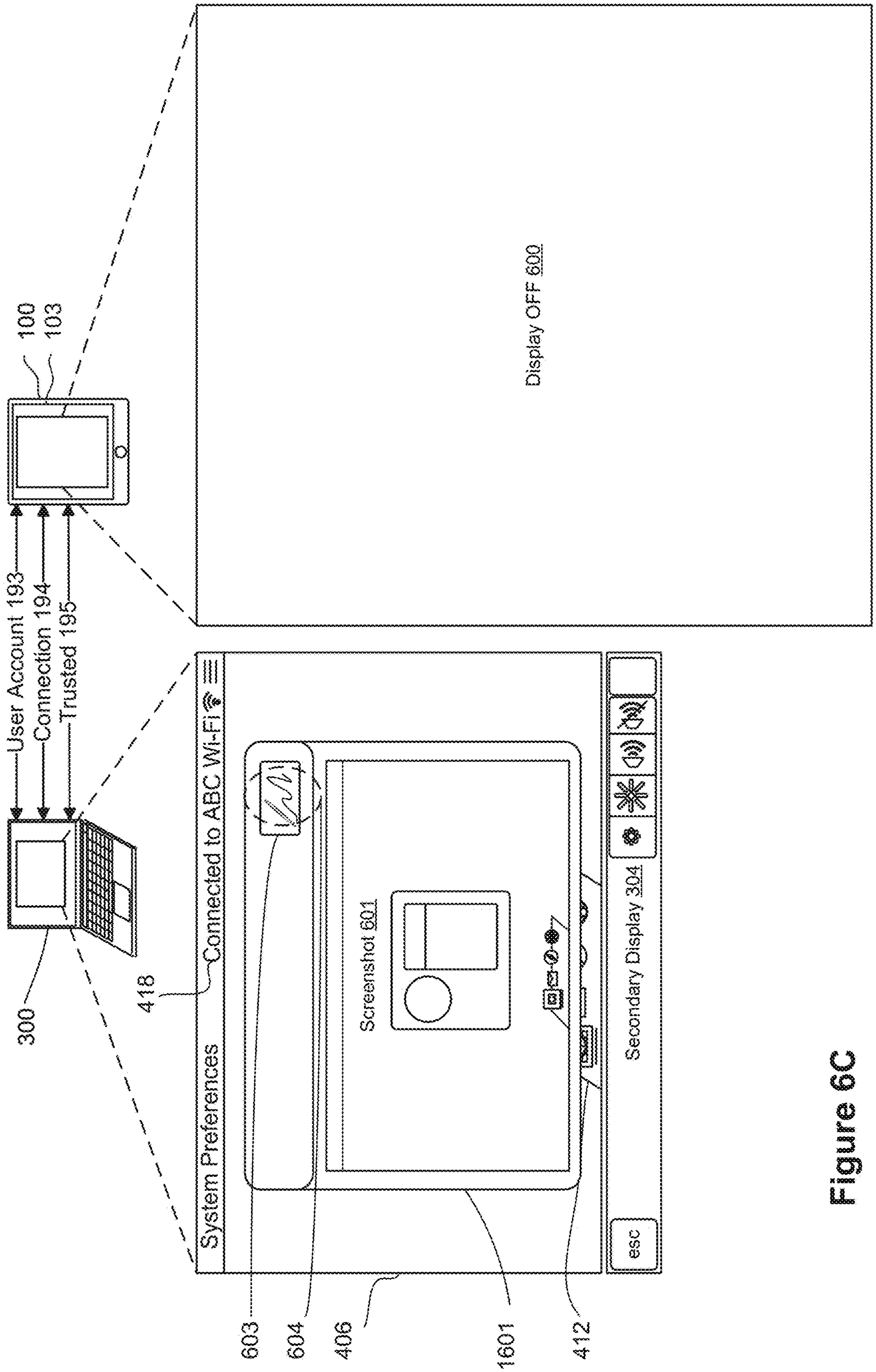

After selection of the screenshot UI element 601 using the input 602, FIG. 6C shows that a user interface 1601 for displaying a full view of the screenshot 601 is then displayed on the laptop's display. The user interface 1601 includes a user interface element 603 for entering an annotation mode, and FIG. 6C shows that an input 604 is provided at the user interface element 603.

Upon selection of the user interface element 603 for entering an annotation mode, the laptop can then display a submenu with a plurality of devices available for use with the annotation mode. In some embodiments, when a user has already approved another device (e.g., the device 100) for use with the companion display mode (or for use with the annotation mode), a single input over the user interface element 603 does not bring up a submenu, and instead initiates sending the content (e.g., screenshot discussed above) to the device that was already approved.

Figure 6D:
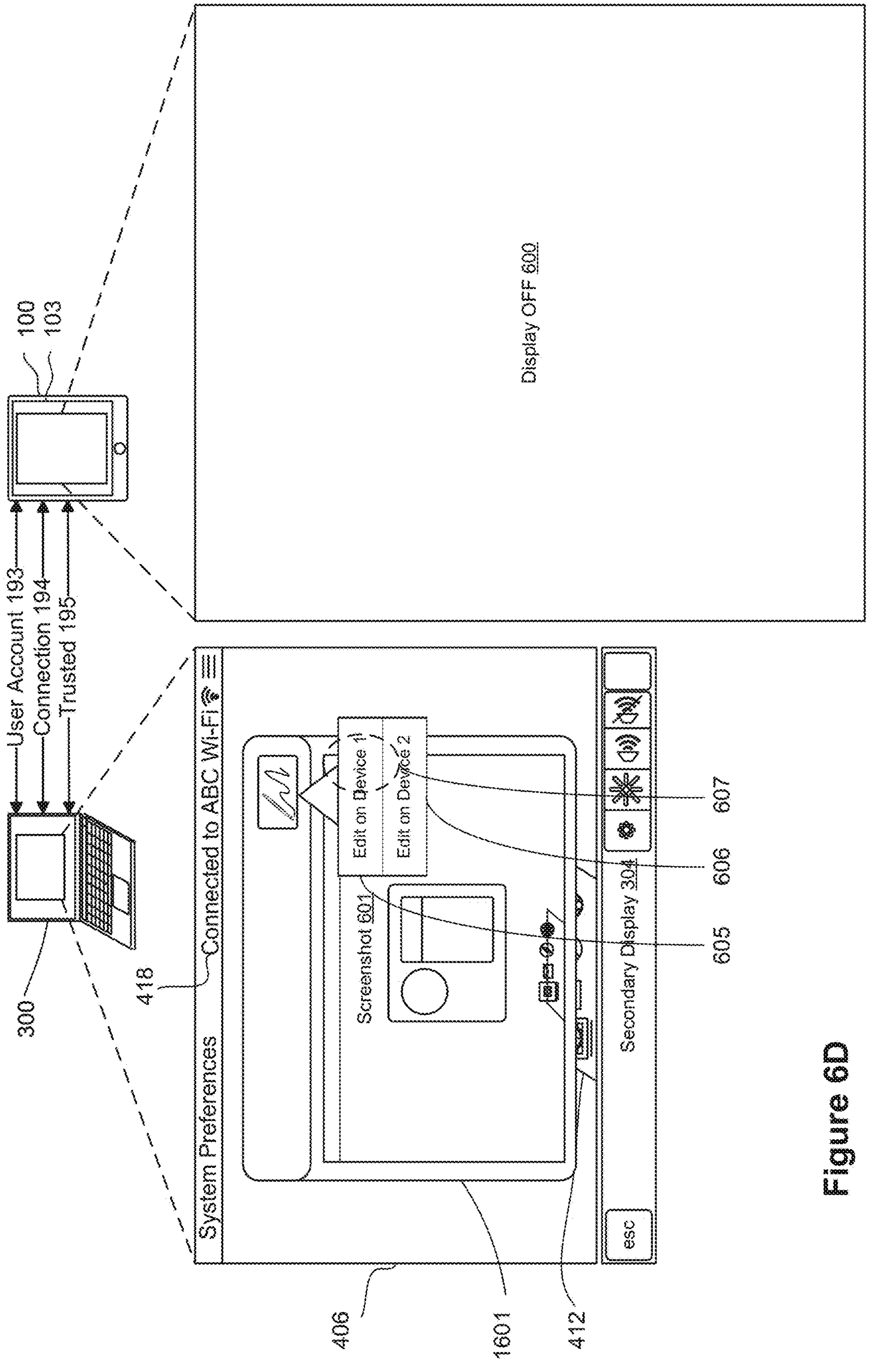

In FIG. 6D, another device has not yet been approved, so in this example a submenu 606 is presented on the laptop's display that shows multiple devices available for use with the annotation mode. Additionally, FIG. 6D shows an input 607 at the "Edit on Device 1" selectable option 605 that, when selected, causes the laptop 300 to send the screenshot 601 to the tablet device 100 (e.g., Device 1) for use with the annotation mode. For purposes of this example, annotation mode is illustrated on a tablet device 100, but can be done so with other devices, or multiple devices at the same time (e.g. a user requests that the annotation mode is entered into on multiple devices at the same time). Furthermore, the devices that are shown within the submenu may be shown based those devices having met one or more secure-connection criterion (examples of these secure-connection criteria were described above).

Figure 6E:
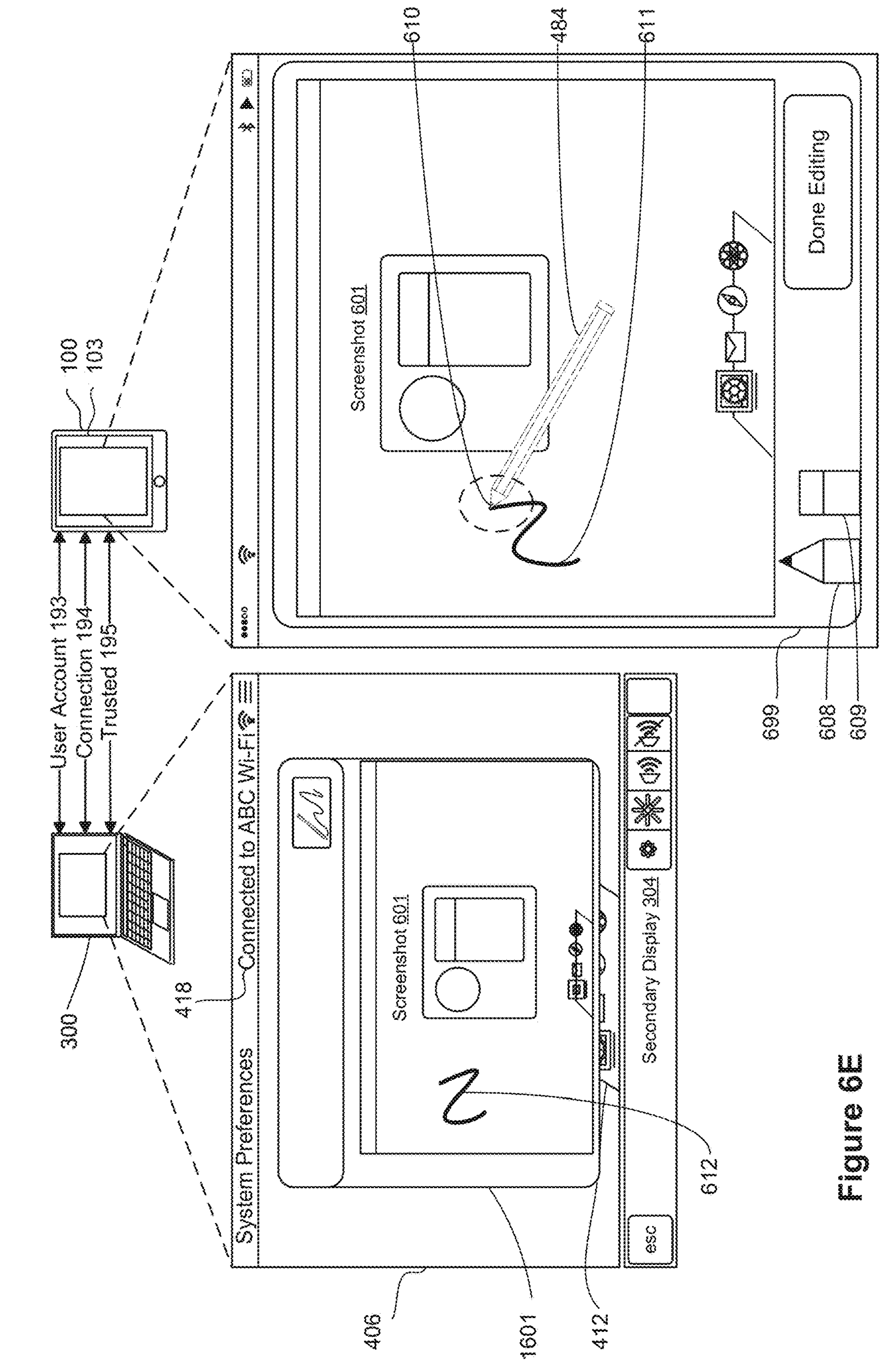
Figure 6F:
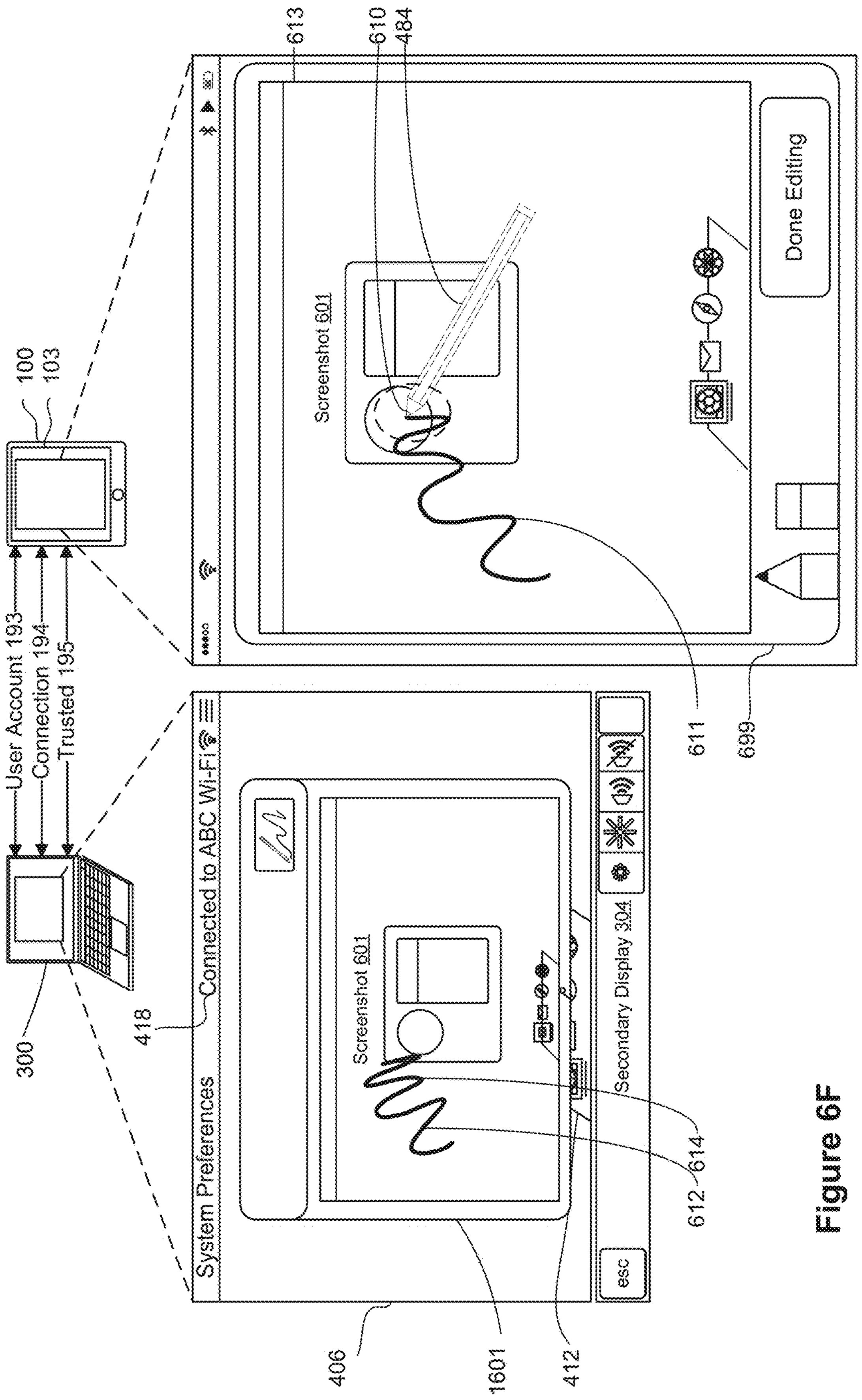
Figure 6G:
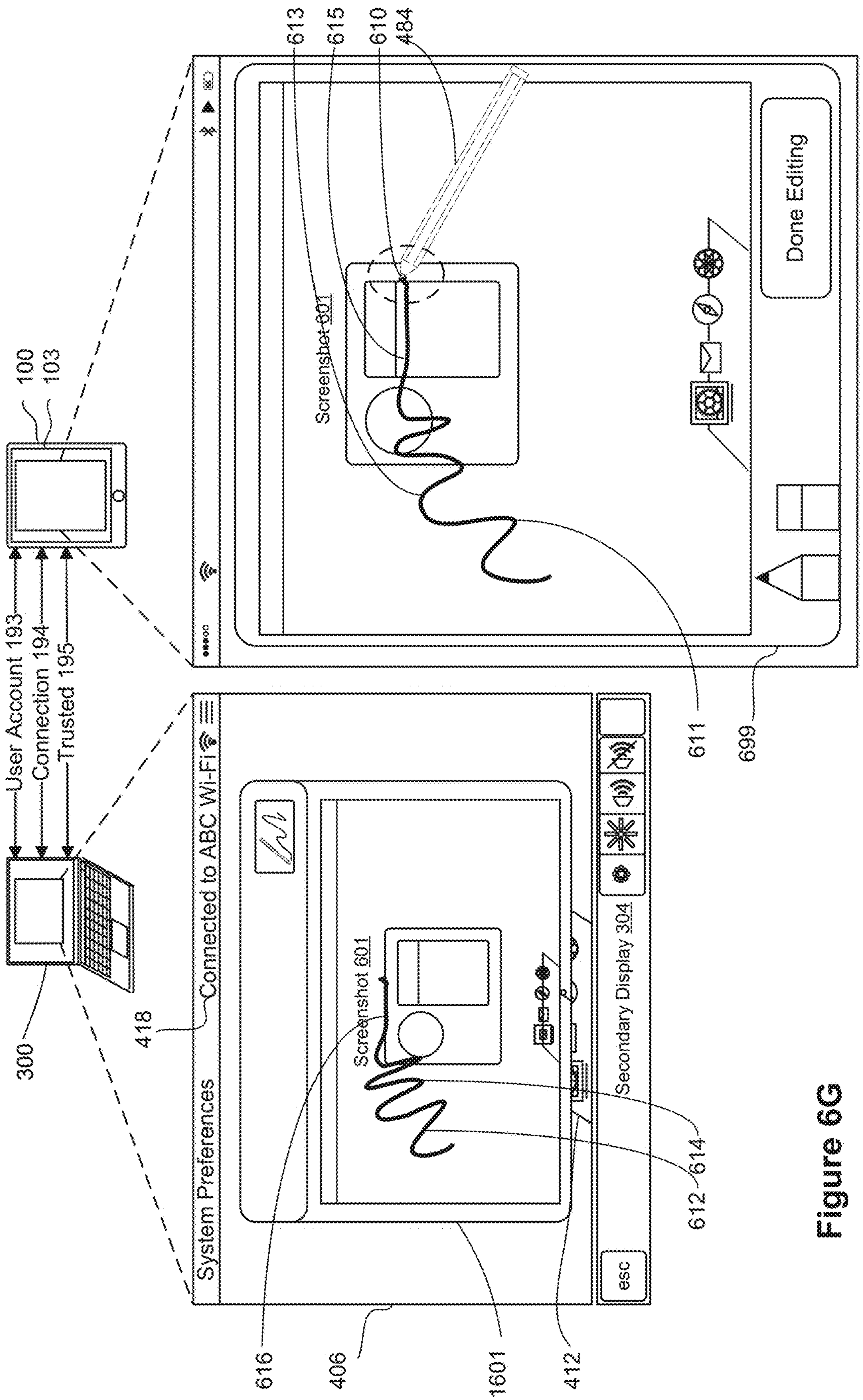

FIG. 6E illustrates that in response to the input 607 at the "Edit on Device 1" selectable option 605, tablet device then enters the annotation mode for the screenshot 601. In FIG. 6E, the annotation mode user interface 699 presented on the tablet's display includes the same content (e.g., the screenshot 601) as is displayed on the laptop 300, which allows a user to provide inputs at tablet and see those inputs reflect on both the tablet display and the laptop display in a substantially simultaneous fashion (e.g., after providing an input at the tablet, the input is reflected at the laptop's display within less than 0.25 seconds). The screenshot 601 is an image capture of the currently displayed user interface on the laptop 300. As depicted, the annotation mode also includes multiple markup tools for marking up the content (e.g. the screenshot 601) on the tablet device. These markup tools include a pencil/pen tools 608, and an eraser tool 609, and other like tools (which tools can be displayed on either or both of the laptop and the tablet).

As is also shown in FIG. 6E, the stylus 484 can be used to draw a line segment 611 on top of the screenshot 601.

At substantially the same time as the input is received on the tablet device 100, the tablet device sends information to allow for display updates at the laptop 300, so the laptop 300 can display the marked-up content as well. In FIGS. 6E-6H, additional inputs are provided by the stylus 484 on top of the screenshot 601 (respective inputs to add line segments 613 and 615 in FIGS. 6G-6H, respectively), and those inputs result in mark-up annotations added on top of the screenshot 601, and the mark-up annotations can be displayed at both the tablet and the laptop.

Figure 6H:
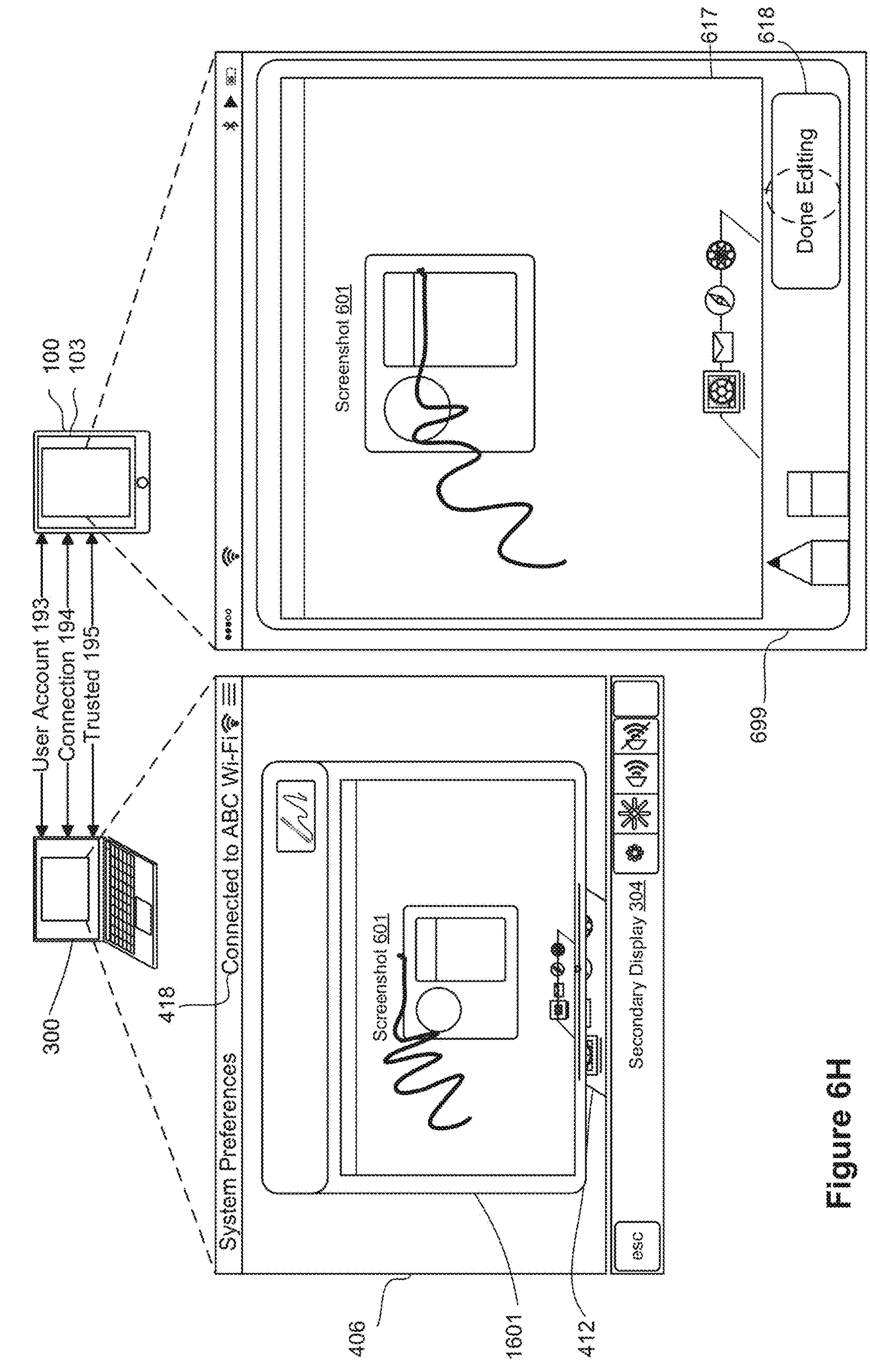

FIG. 6H illustrates an input directed to a "Done Editing" user interface element 618. Upon selection of the "Done Editing" user interface element 618, the device that was invoked to run in the annotation mode will return to its previous state (e.g., the screen off state, the locked state, the unlocked state, or the previous user interface state, etc.).

Figure 6I:
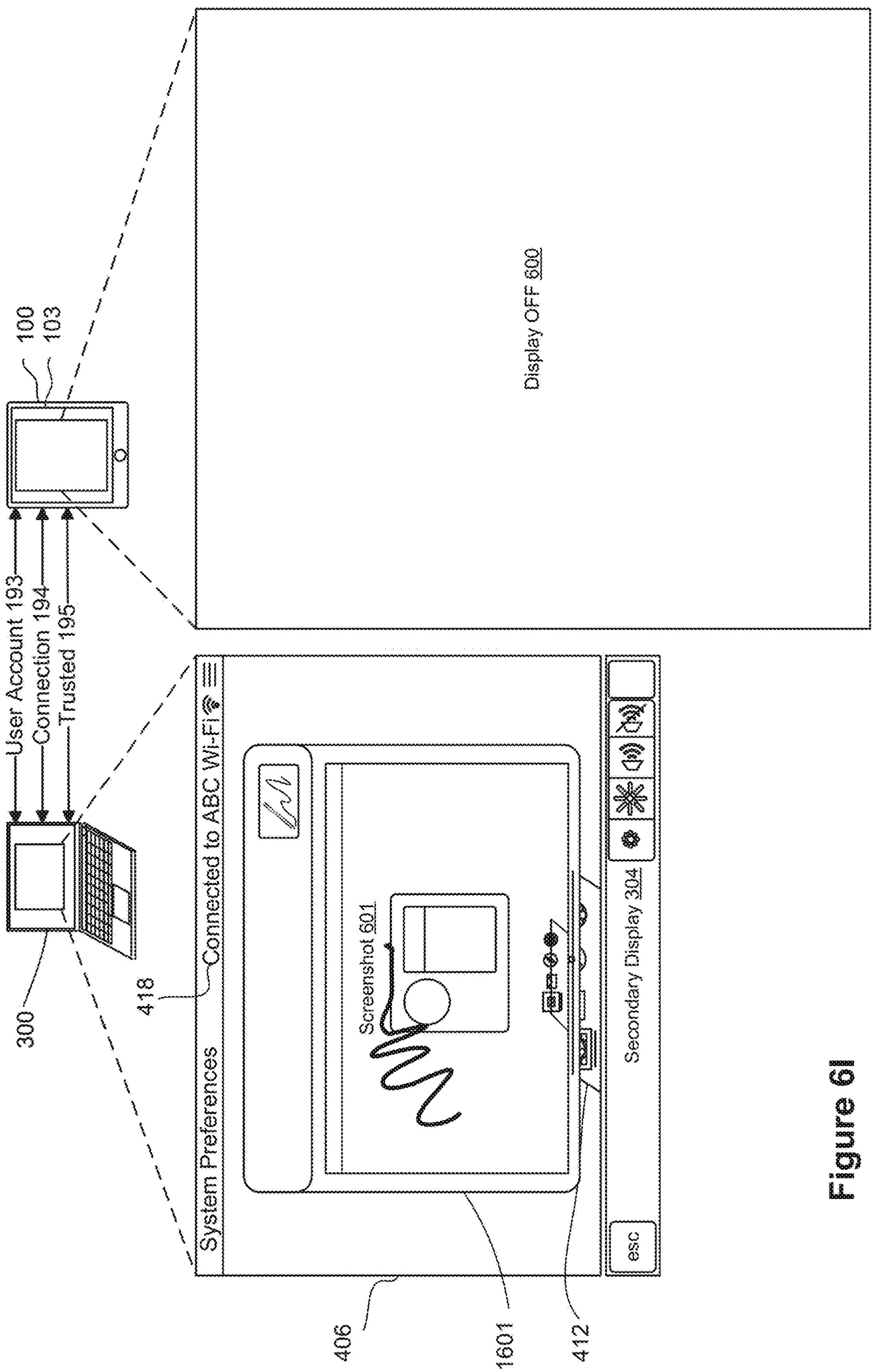

FIG. 6I illustrates the response to the selection 617 of the "Done Editing" user interface element 618. Upon selection of the "Done Editing" user interface element 618, the tablet device 100 returns to its pervious state, which in this example is the locked state. Also, in response to selection of the "Done Editing" user interface element 618, the laptop device displays the screenshot with the markup annotations that were added at the tablet device 100.

Figure 6J:
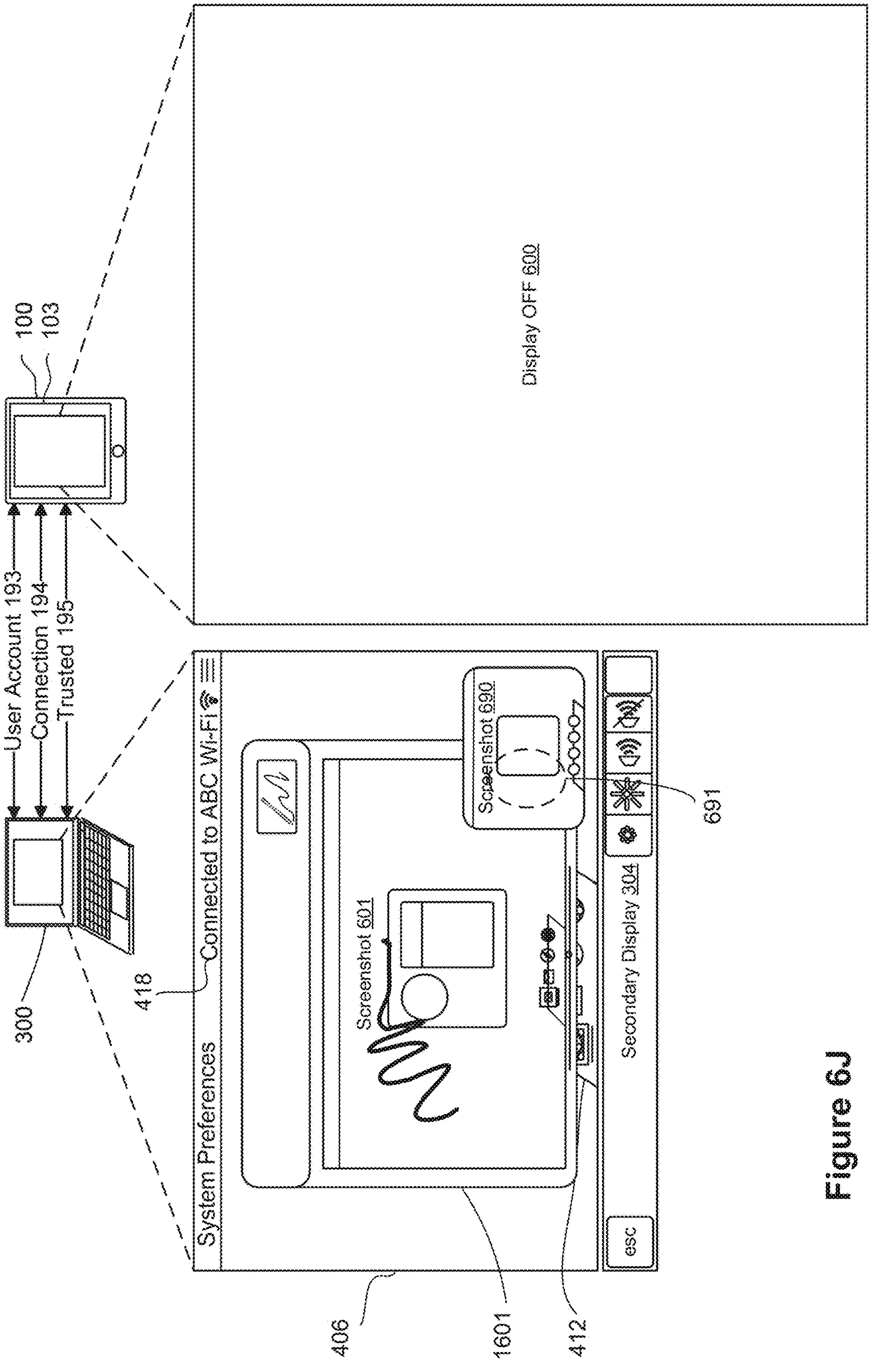
Figure 6K:
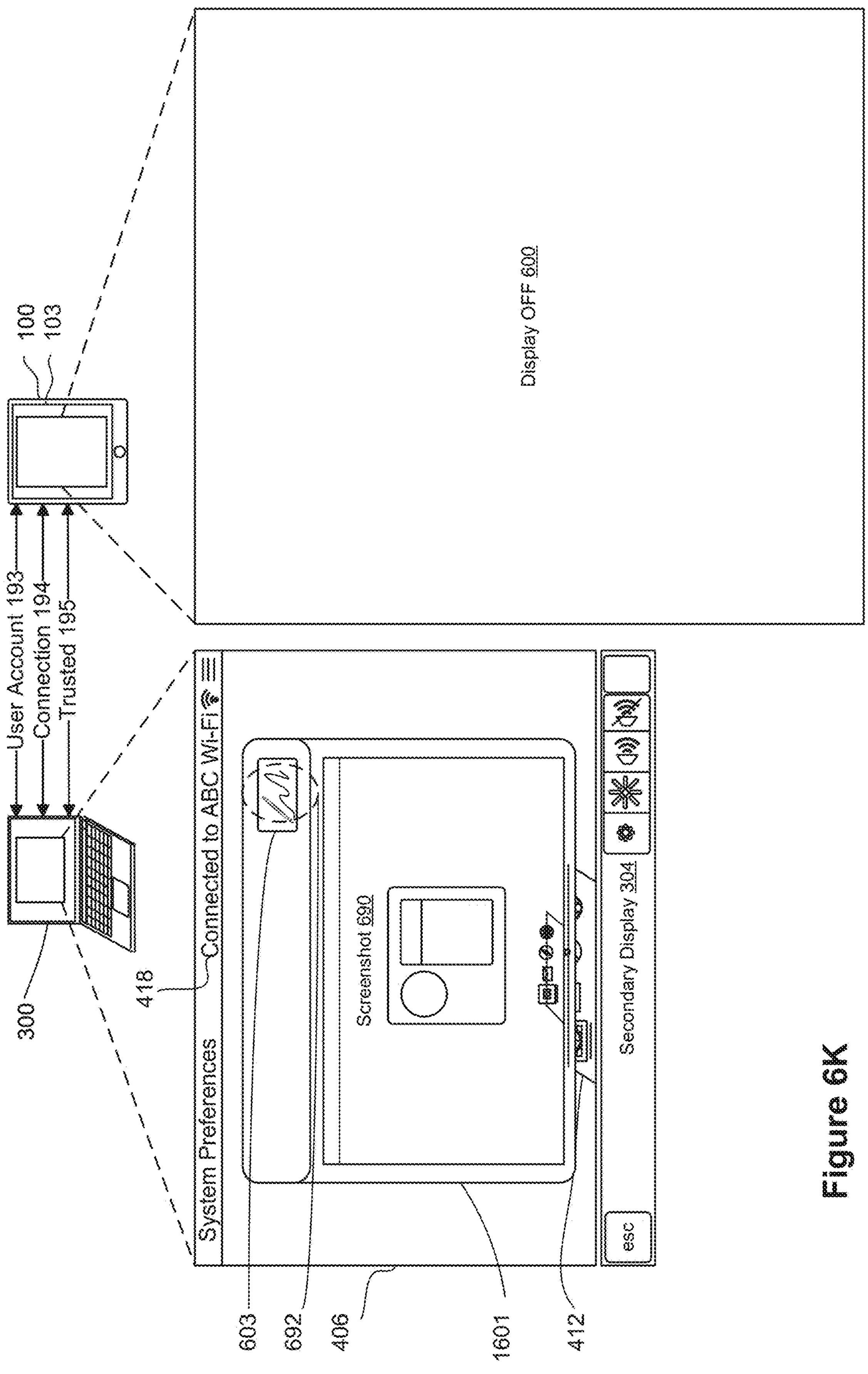
Figure 6L:
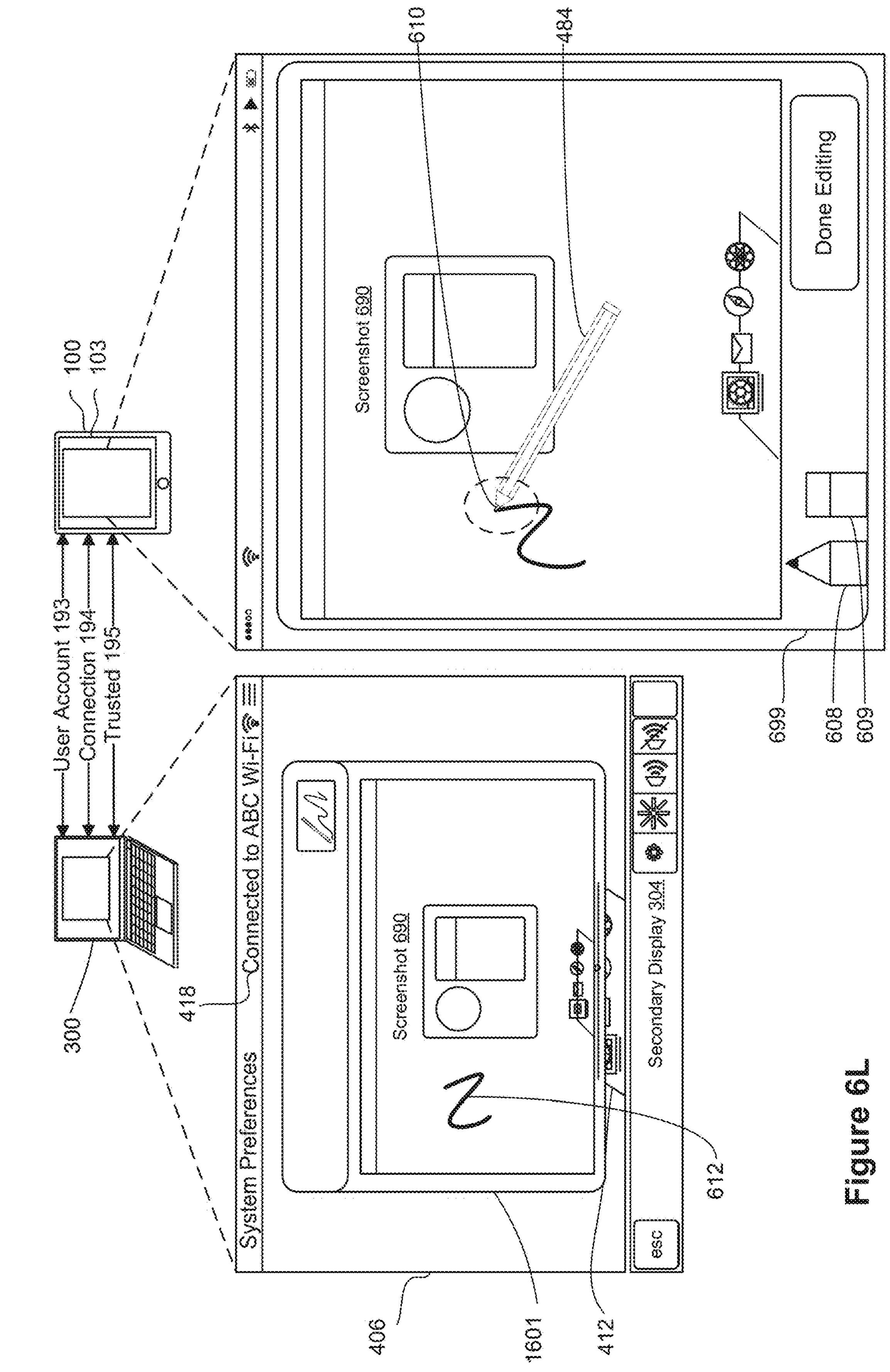

FIGS. 6J-6L illustrate an embodiment where a user of a first computing device (e.g., laptop 300) is able to take a screenshot at the laptop 300, and annotate it on a tablet device 100. FIG. 6J illustrates a new screenshot that is shown in a user interface element represented using numeral 690 in FIG. 6J. The new screenshot 691 is an image capture of the currently displayed user interface on the laptop 300. FIG. 6J also depicts an input 691 received at or on the new screenshot 690. As shown in FIGS. 6J-6L, in this embodiment the user does not need to select the device on which the annotation will be performed, because (i) the user previously selected a device for annotation and the laptop 300 stored the selection. Thereafter, if the selected device (e.g., tablet device 100) is available, then the laptop 300 will automatically without human intervention invoke the annotation mode on the previously selected device (e.g., tablet device 100).

FIG. 6K illustrates the response to the input 691 received at or on the second screenshot 690. In response to the input 691, the screenshot 690 is displayed within the user interface 1601 on the laptop 300. A user can then select the annotation mode via input 692 at the user interface element 603 shown in FIG. 6K.

FIG. 6L depicts the tablet device 100 transitioning from an off state 600 (as show in FIG. 6K) to the annotation mode user interface 699. Notably, since a selection of a device for annotation was previously made (e.g., as shown in FIG. 6D when a selection of "Edit on Device 1" occurs) and stored, the prompt to select a device for annotation is not shown again (assuming the previously selected device is connected and available for use). In other words, the laptop 300 will select the device to put in the annotation mode, without human intervention, based on the previous selection (e.g., the selection of "Edit on Device 1" in FIG. 6D) that is stored at the laptop 300.

Figure 7A:
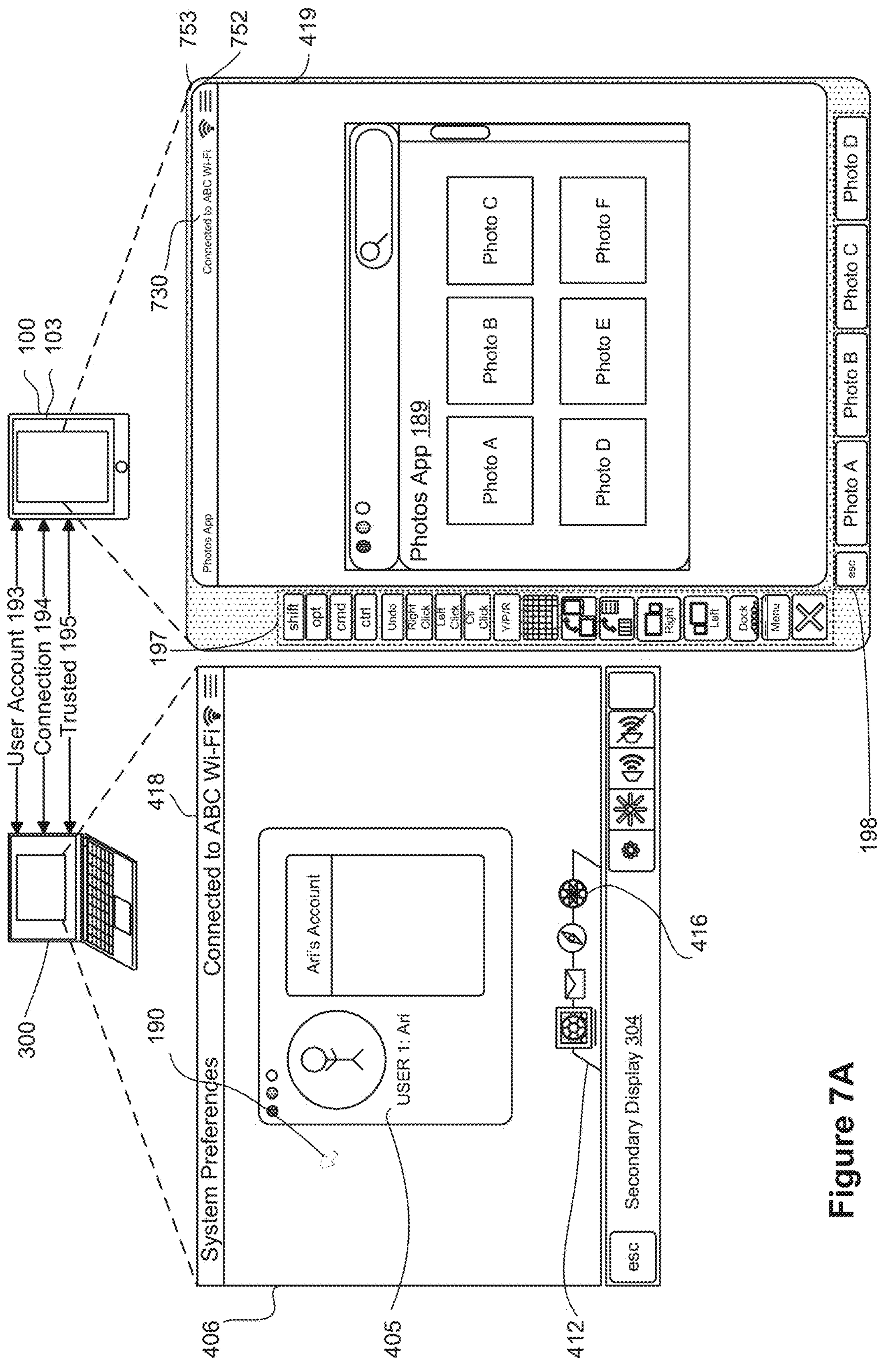
FIGS. 7A-7W are schematics of displays to illustrate example user interfaces for interacting with a companion-display mode, in accordance with some embodiments. Additional details regarding these figures are also provided below with reference to the descriptions of methods 800, 900, 1000, and 1100.
Figure 7B:
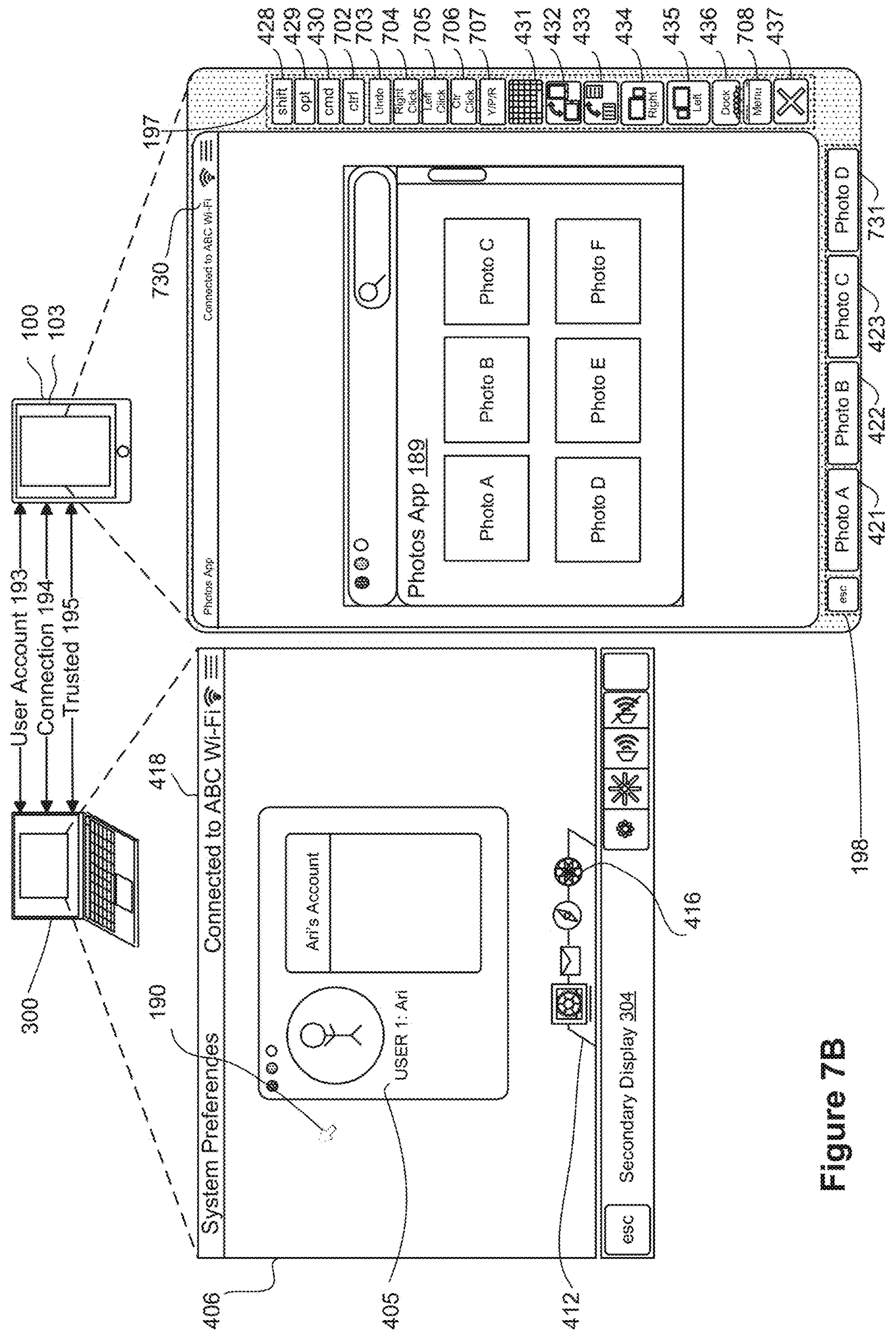
Figure 7C:
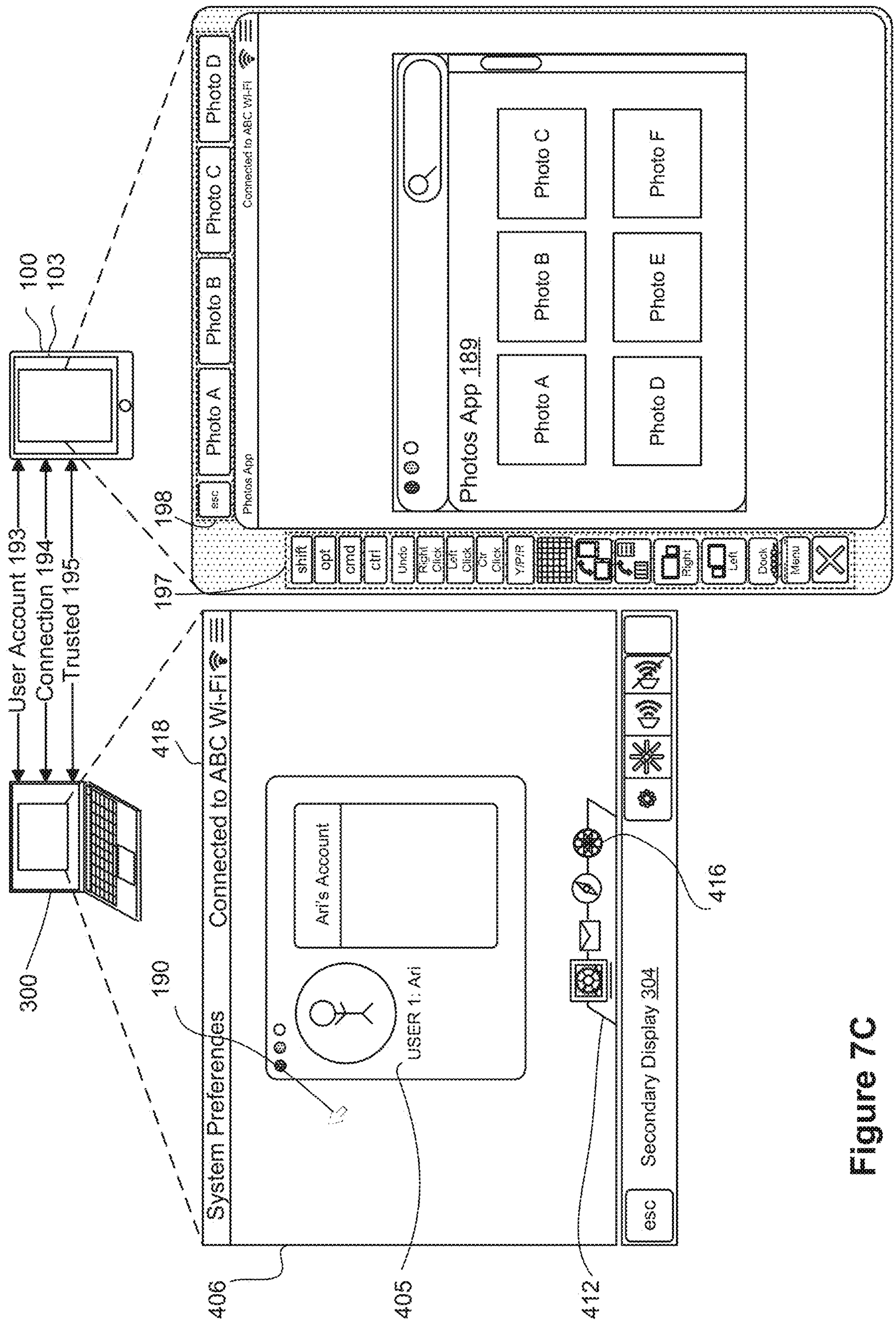
Figure 7D:
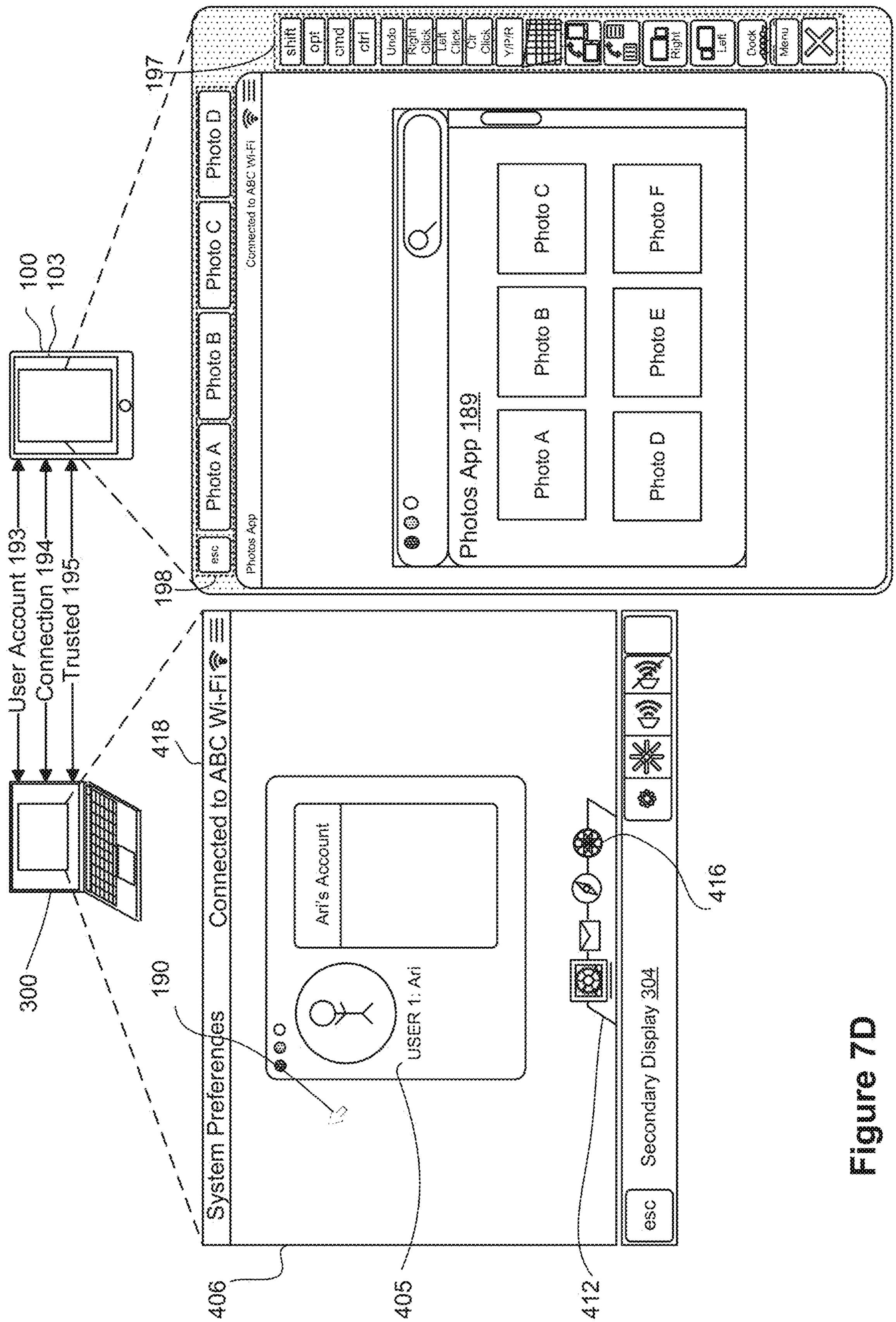
Figure 7E:
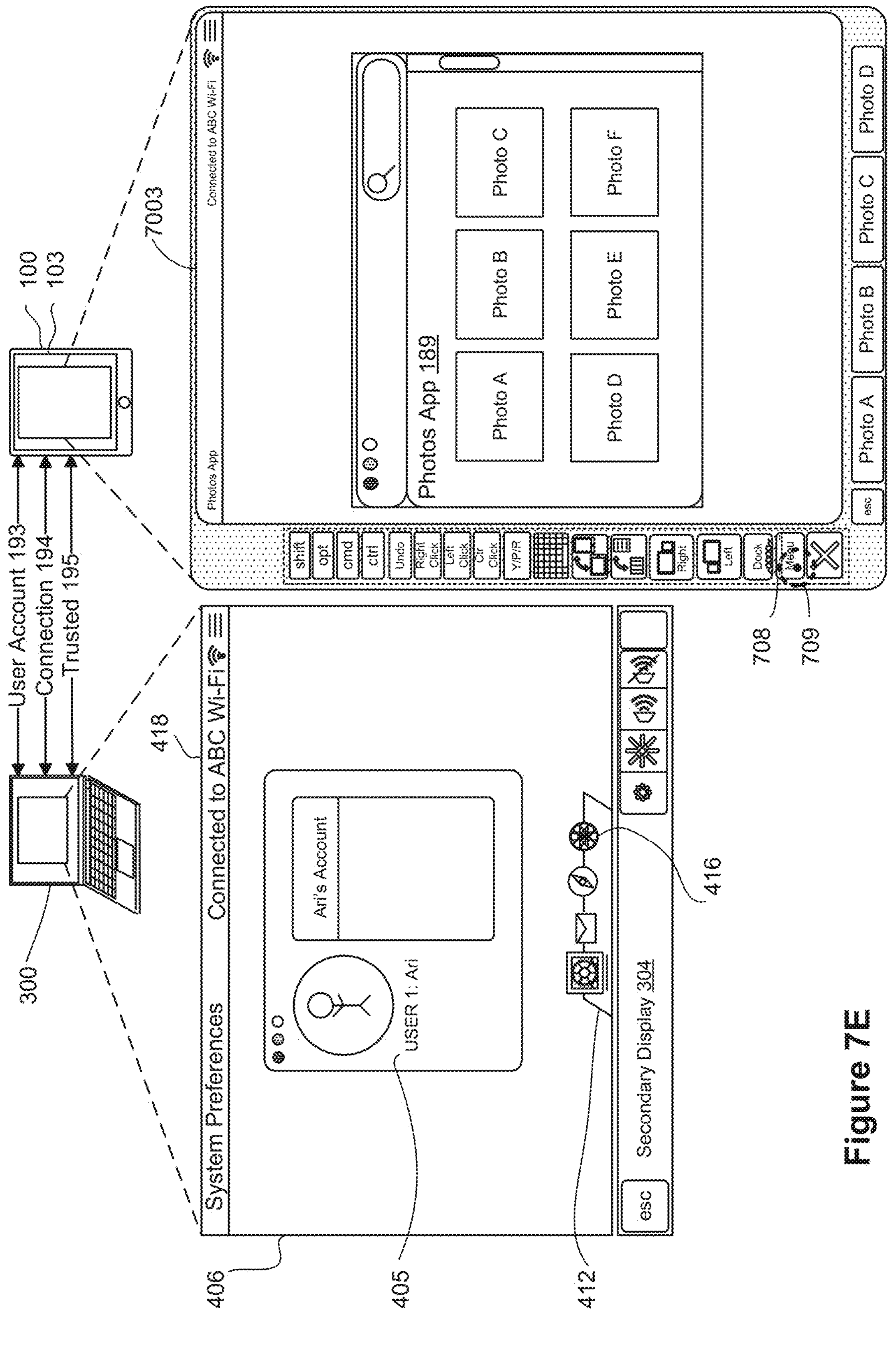
Figure 7F:
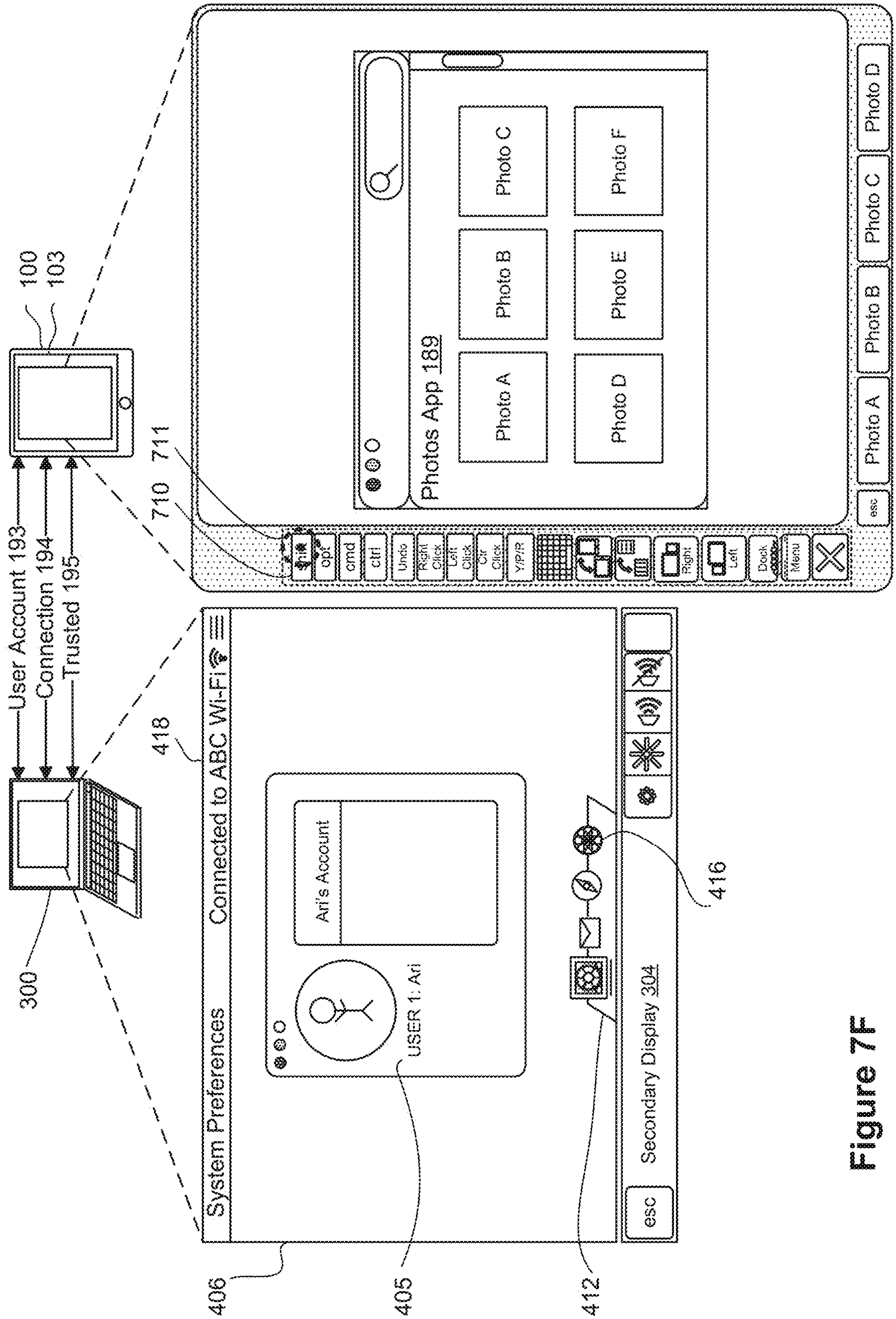
Figure 7G:
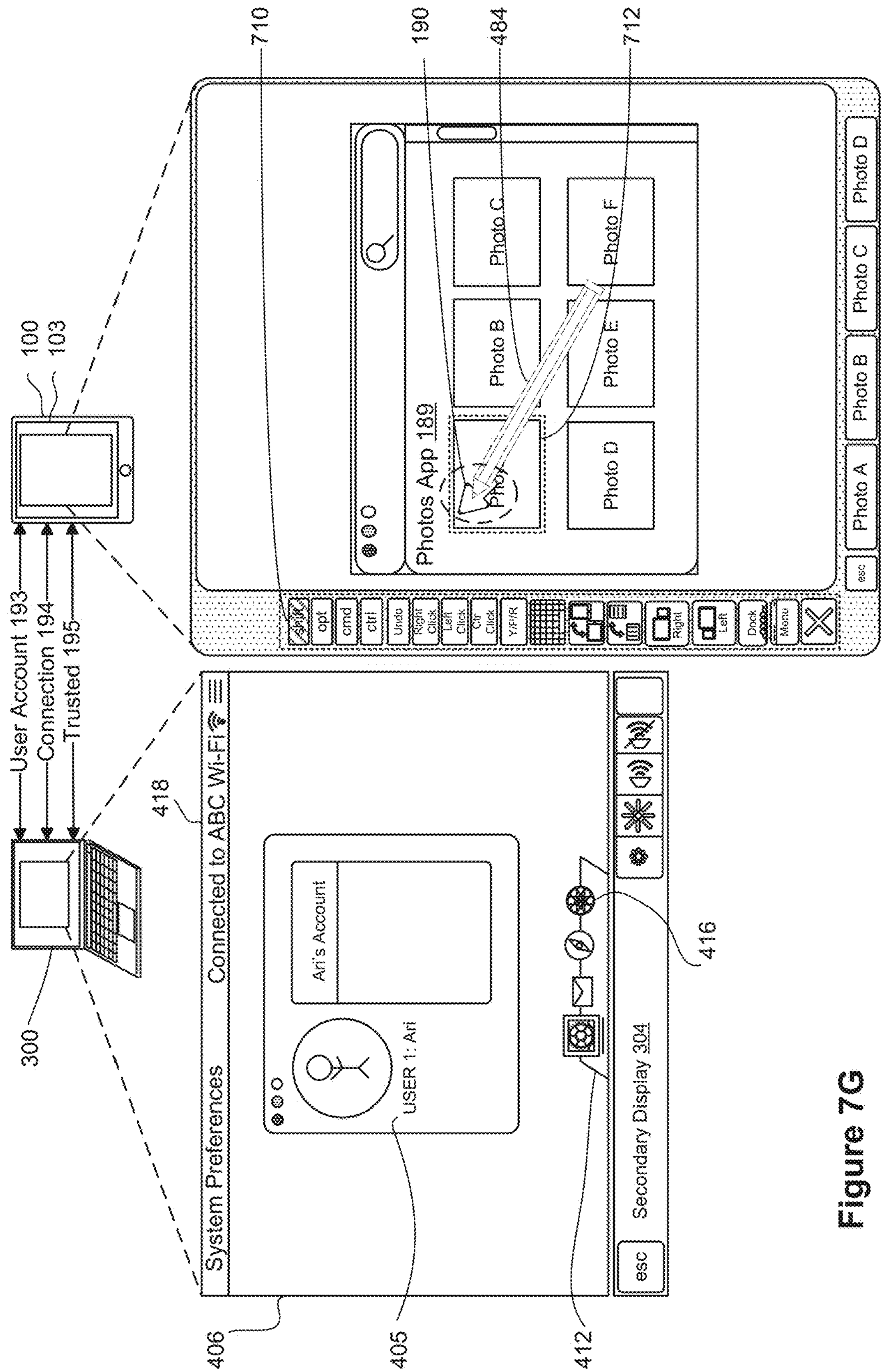
Figure 7H:
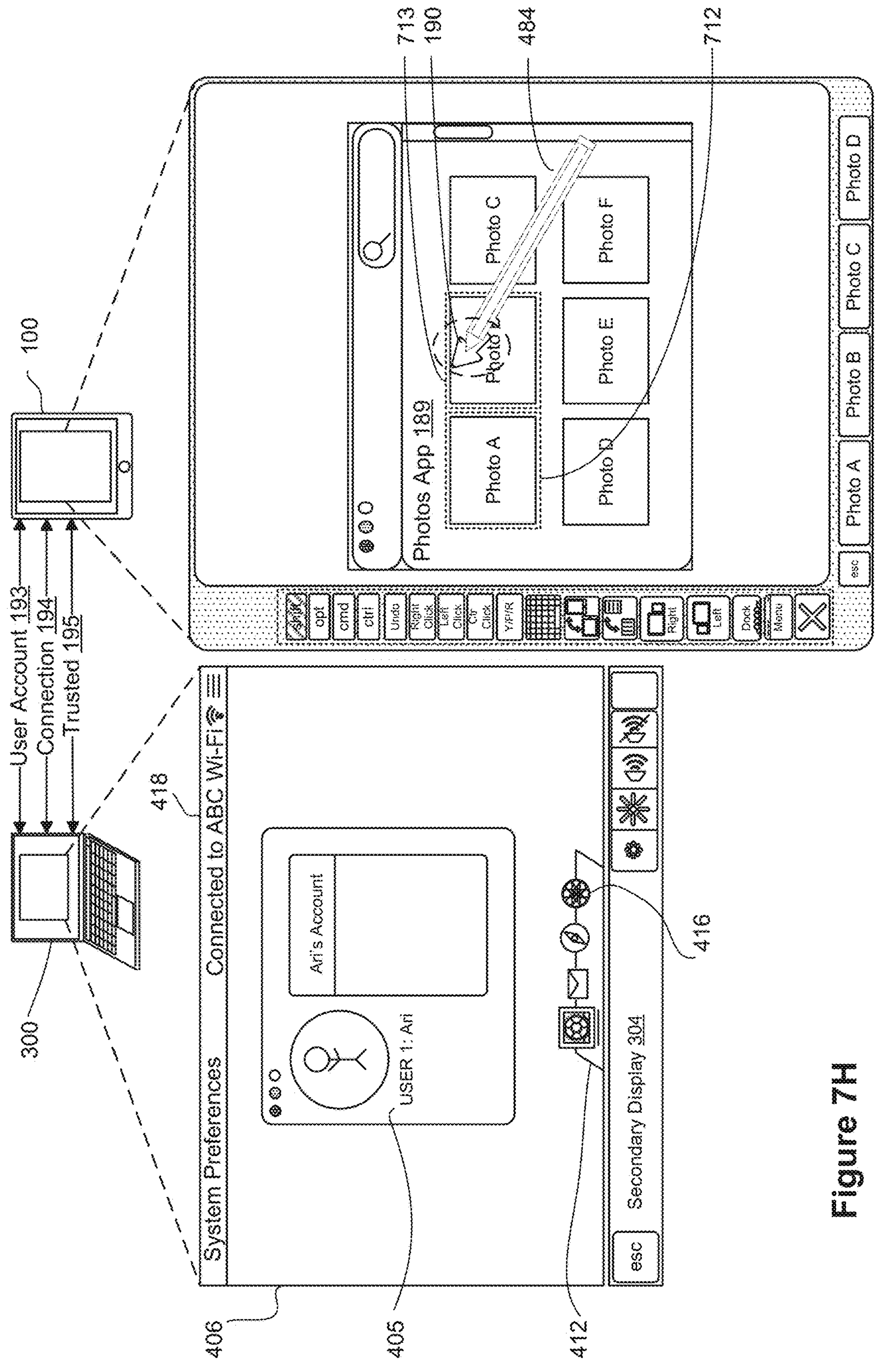
Figure 7I:
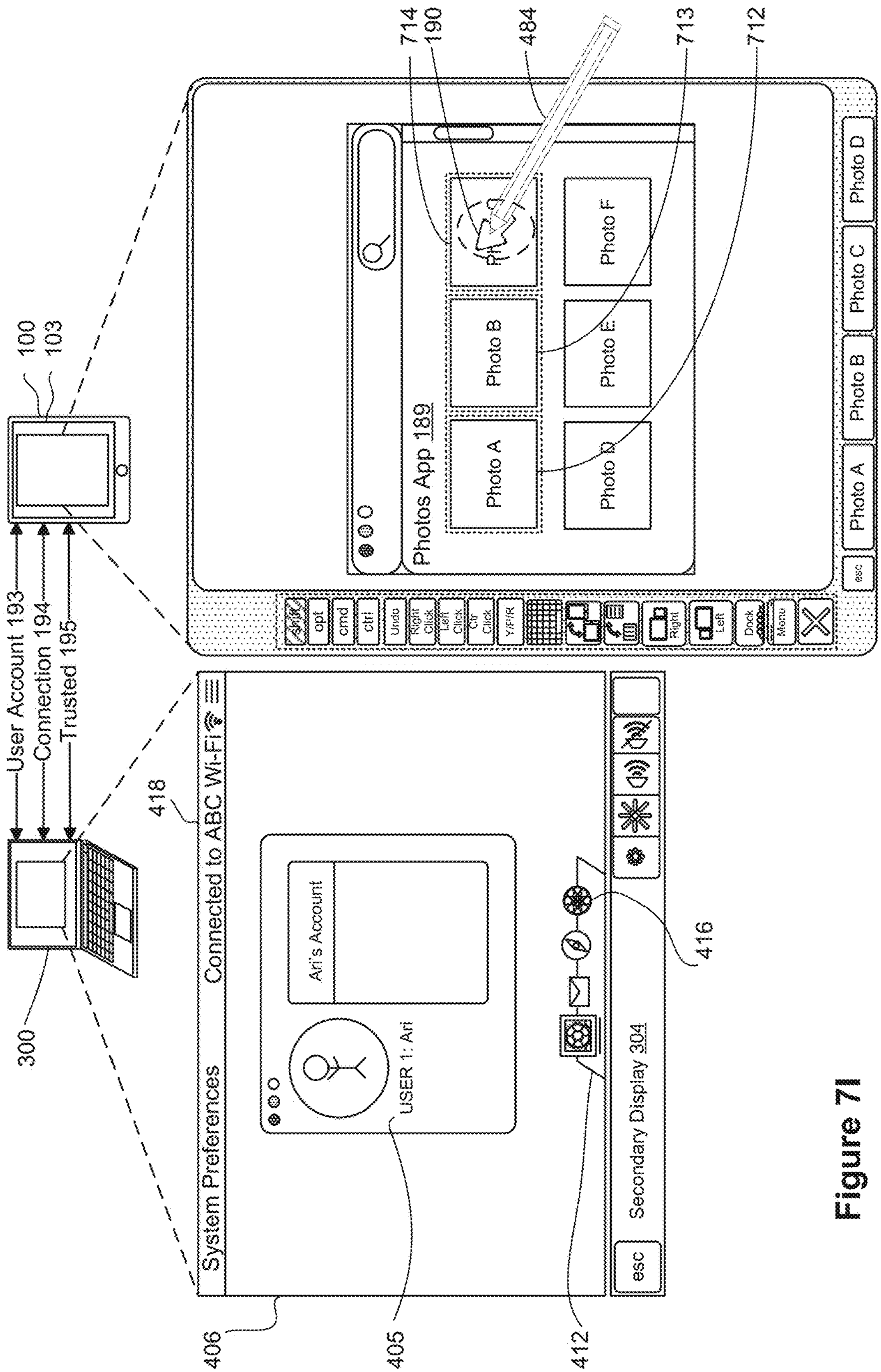
Figure 7J:
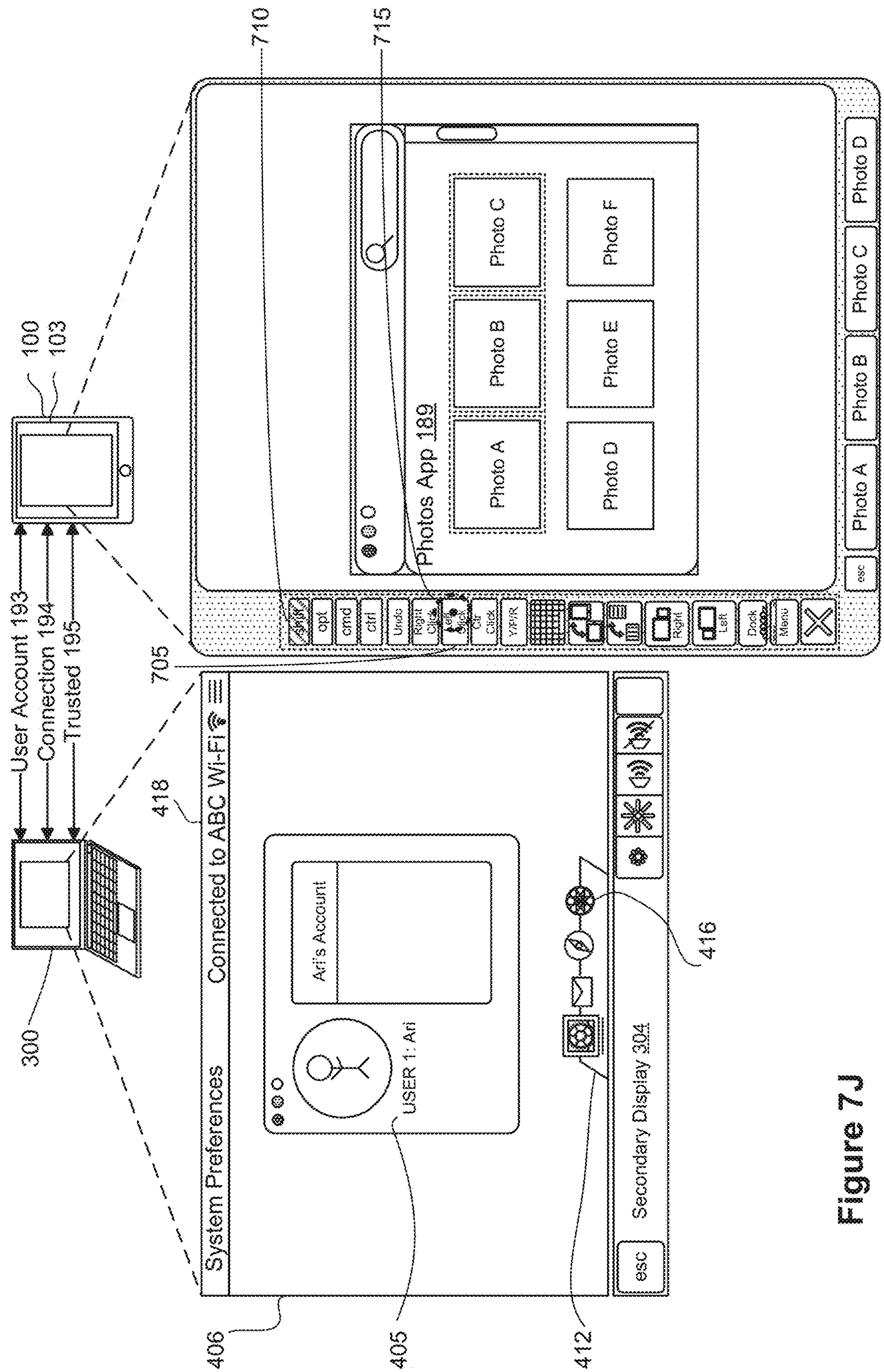
Figure 7K:
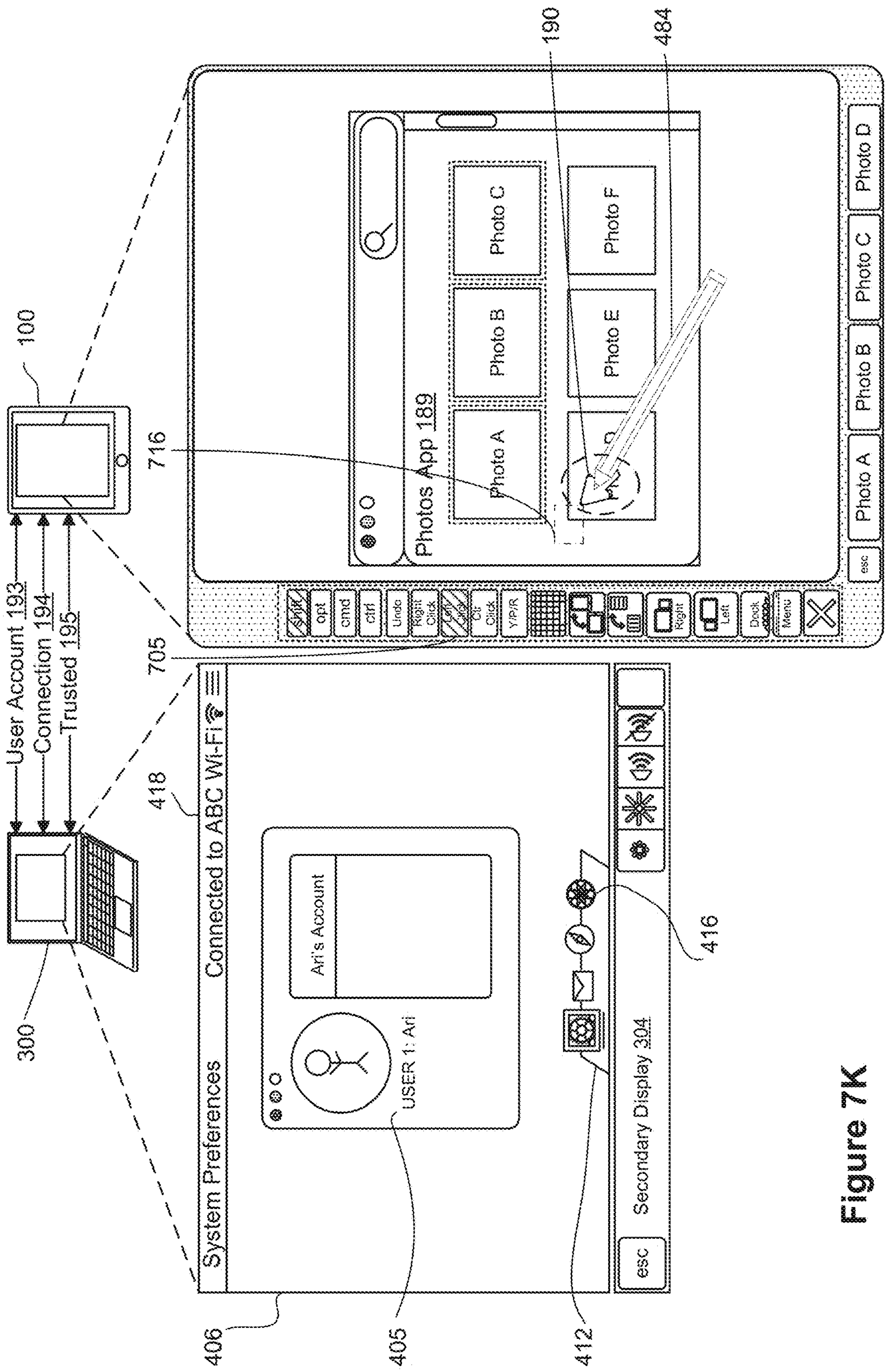
Figure 7L:
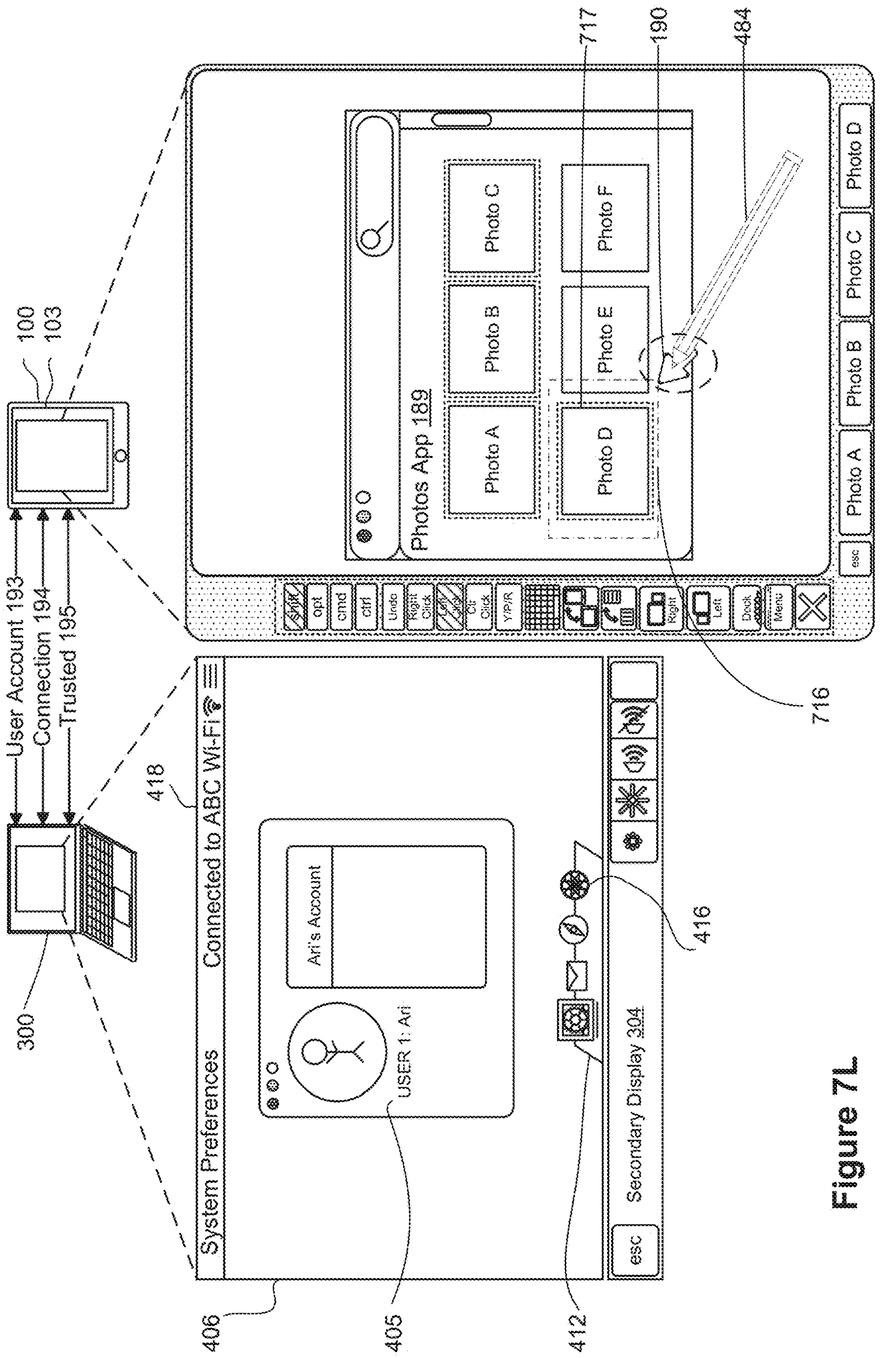
Figure 7M:
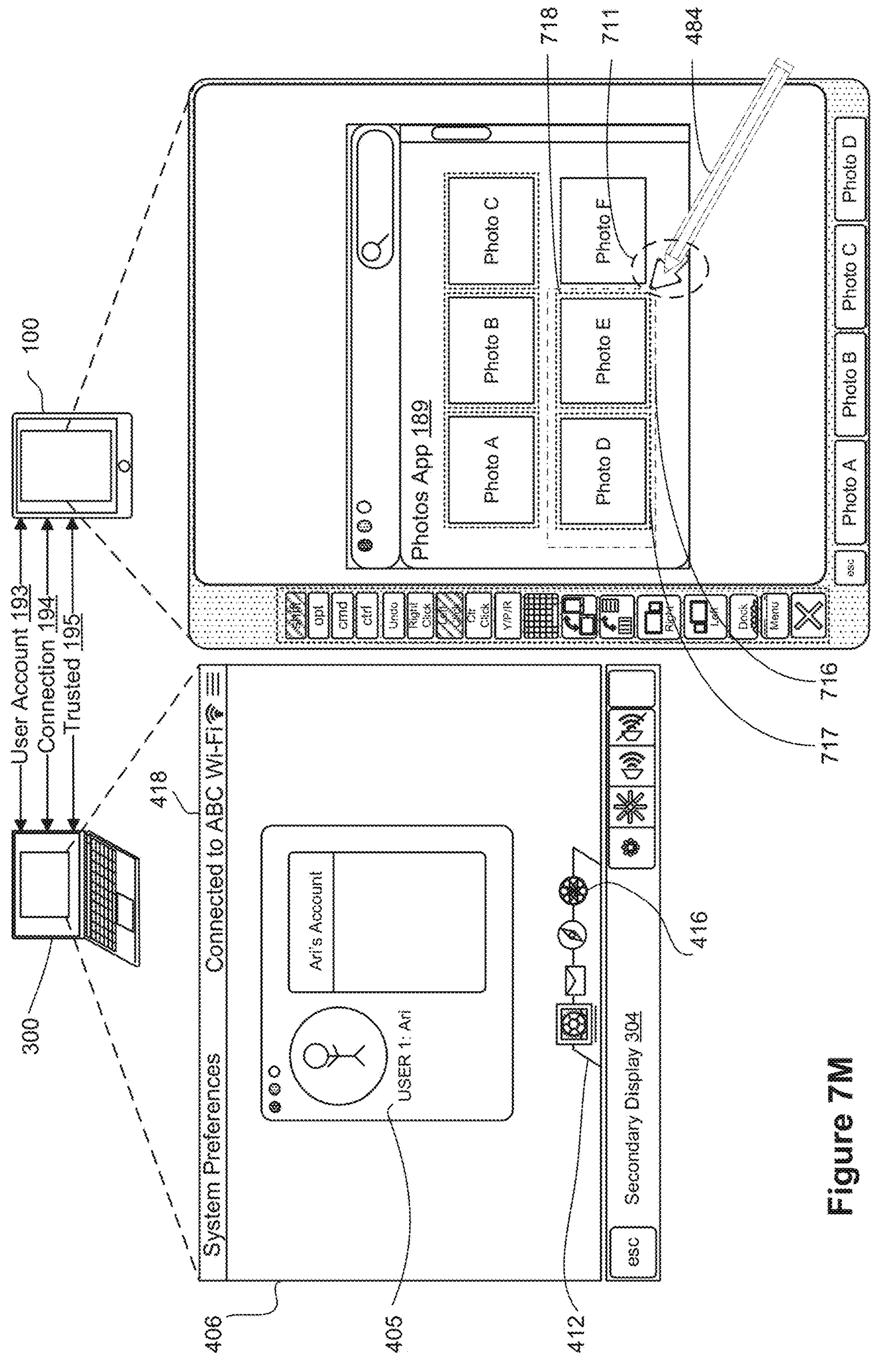
Figure 7N:
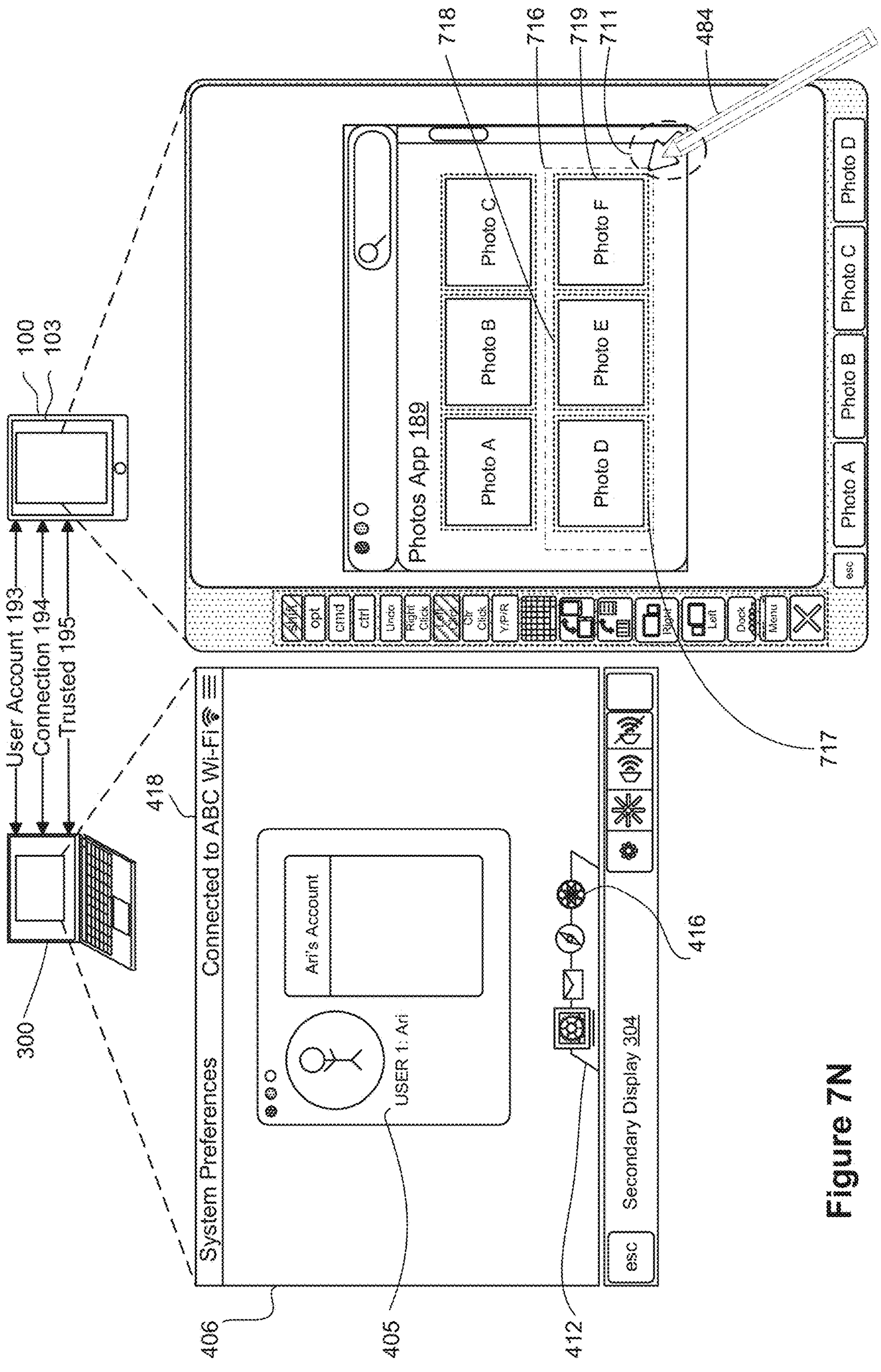
Figure 7O:
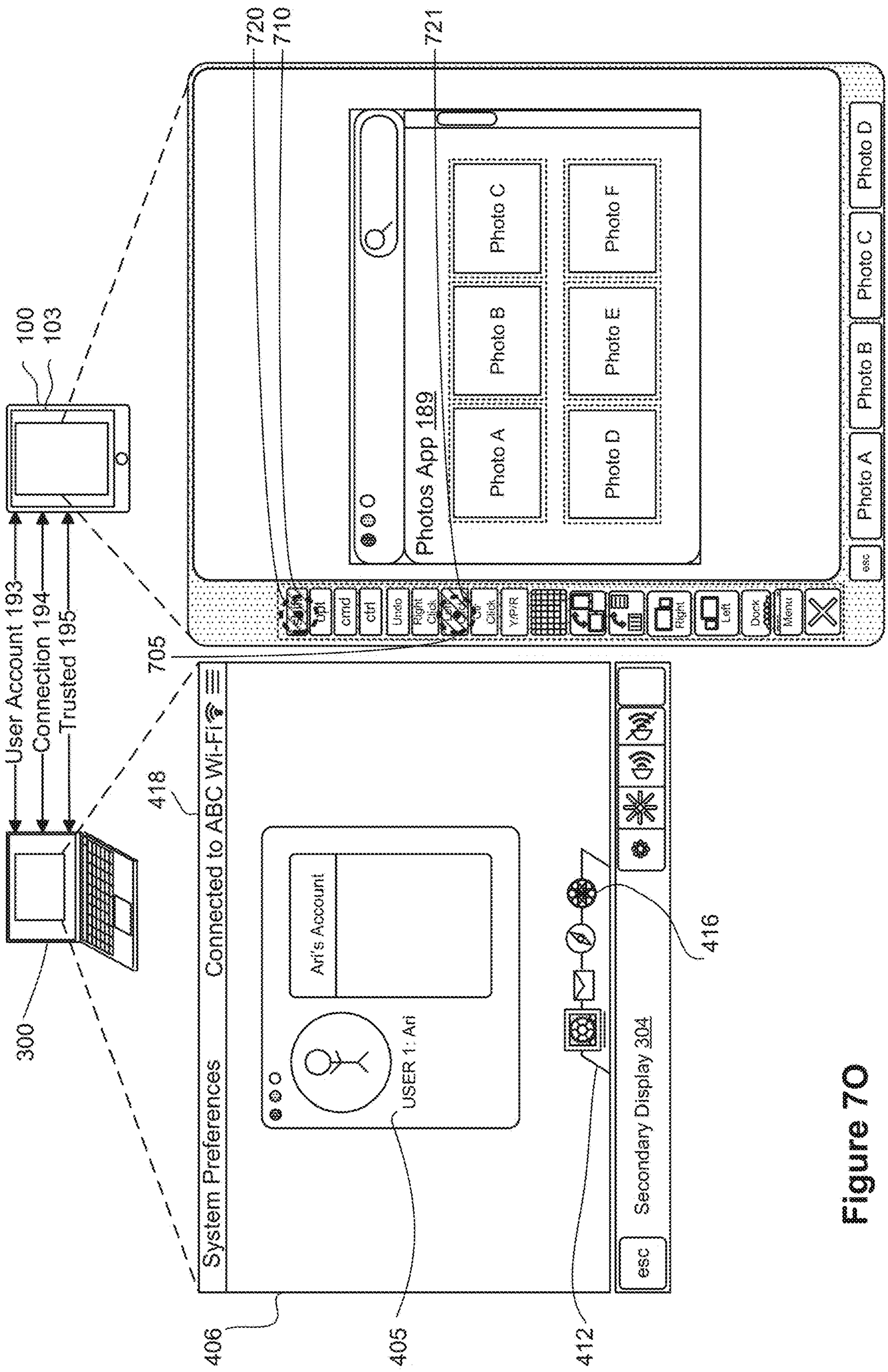
Figure 7P:
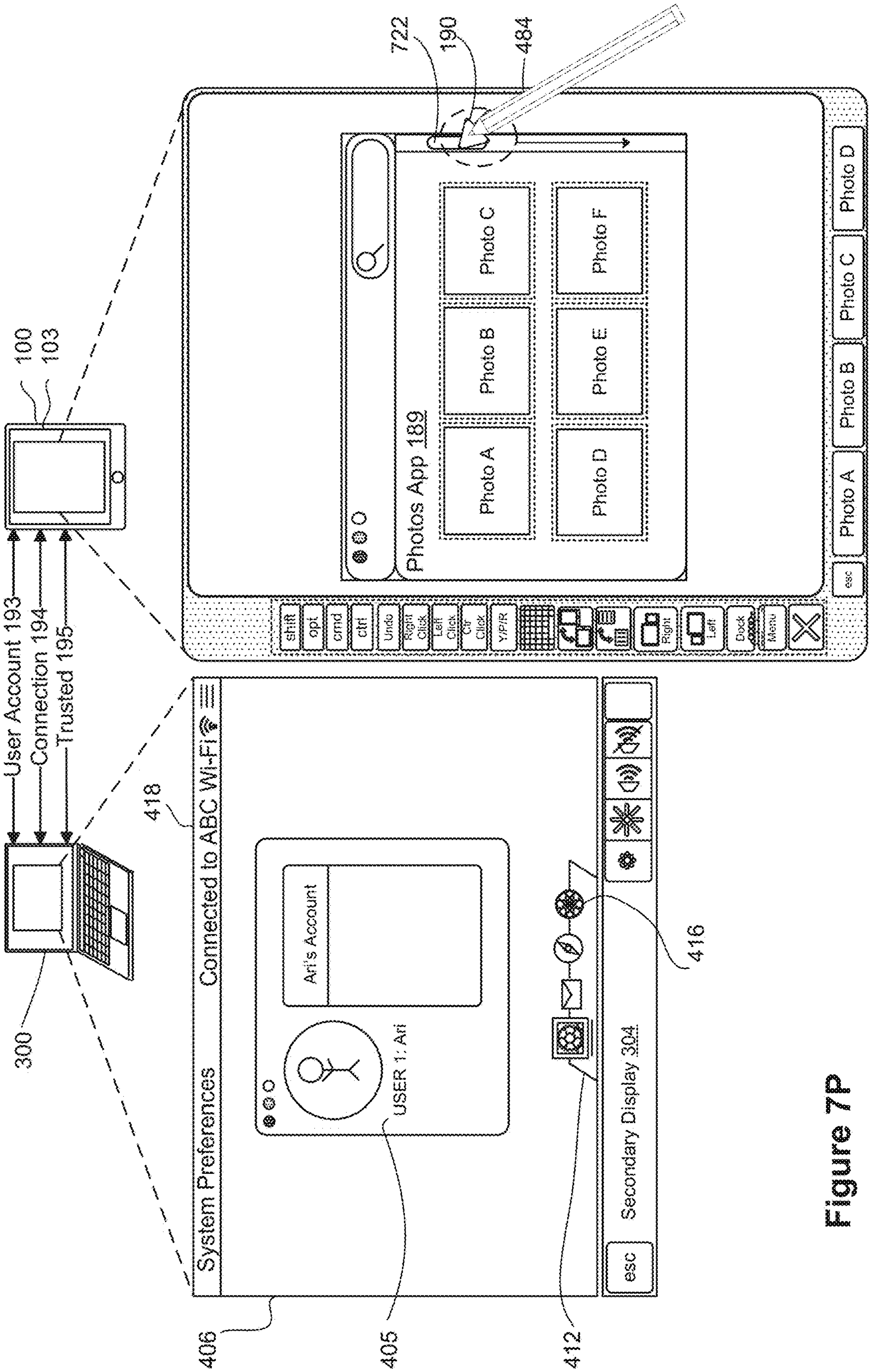
Figure 7Q:
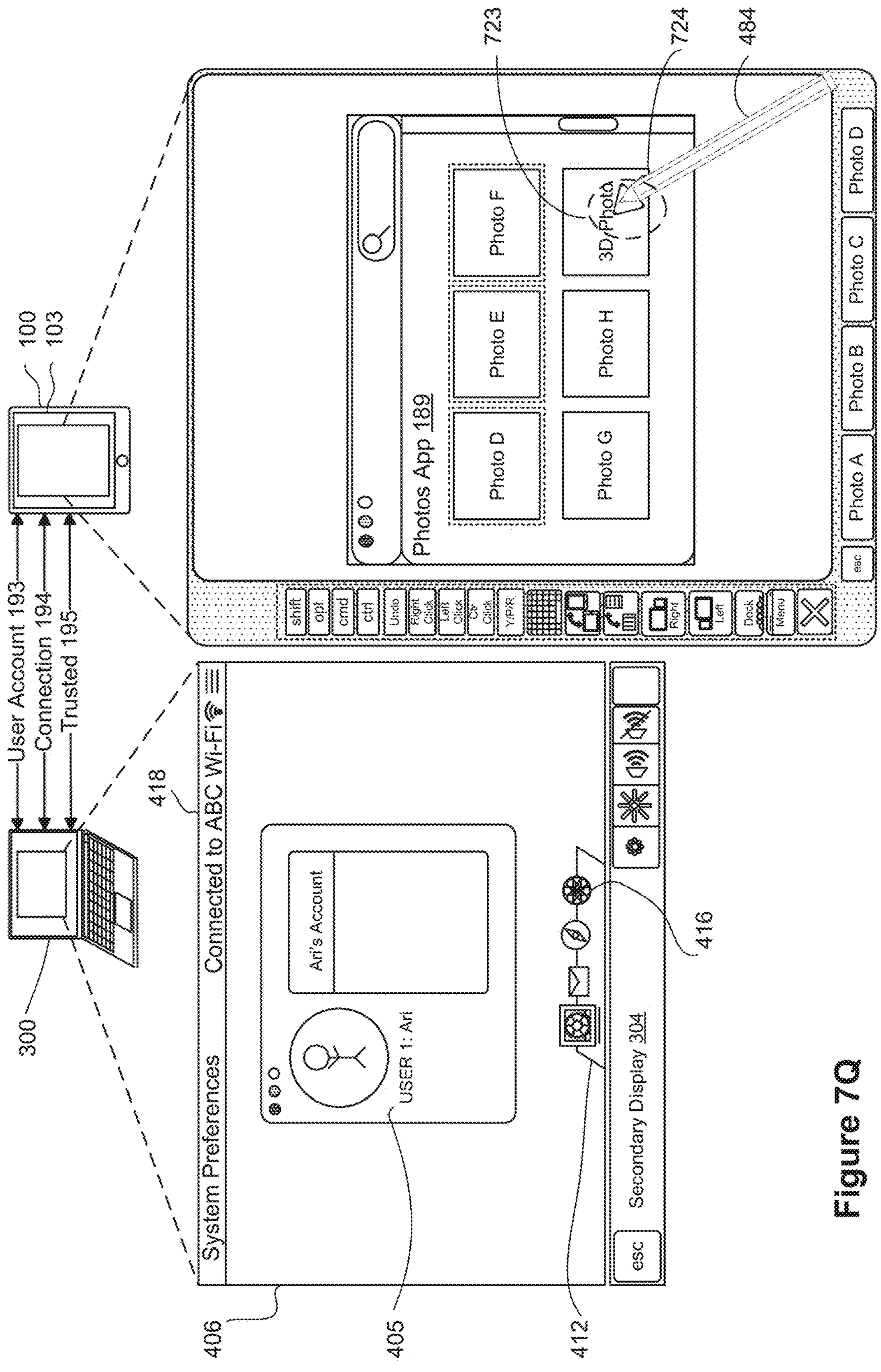
Figure 7R:
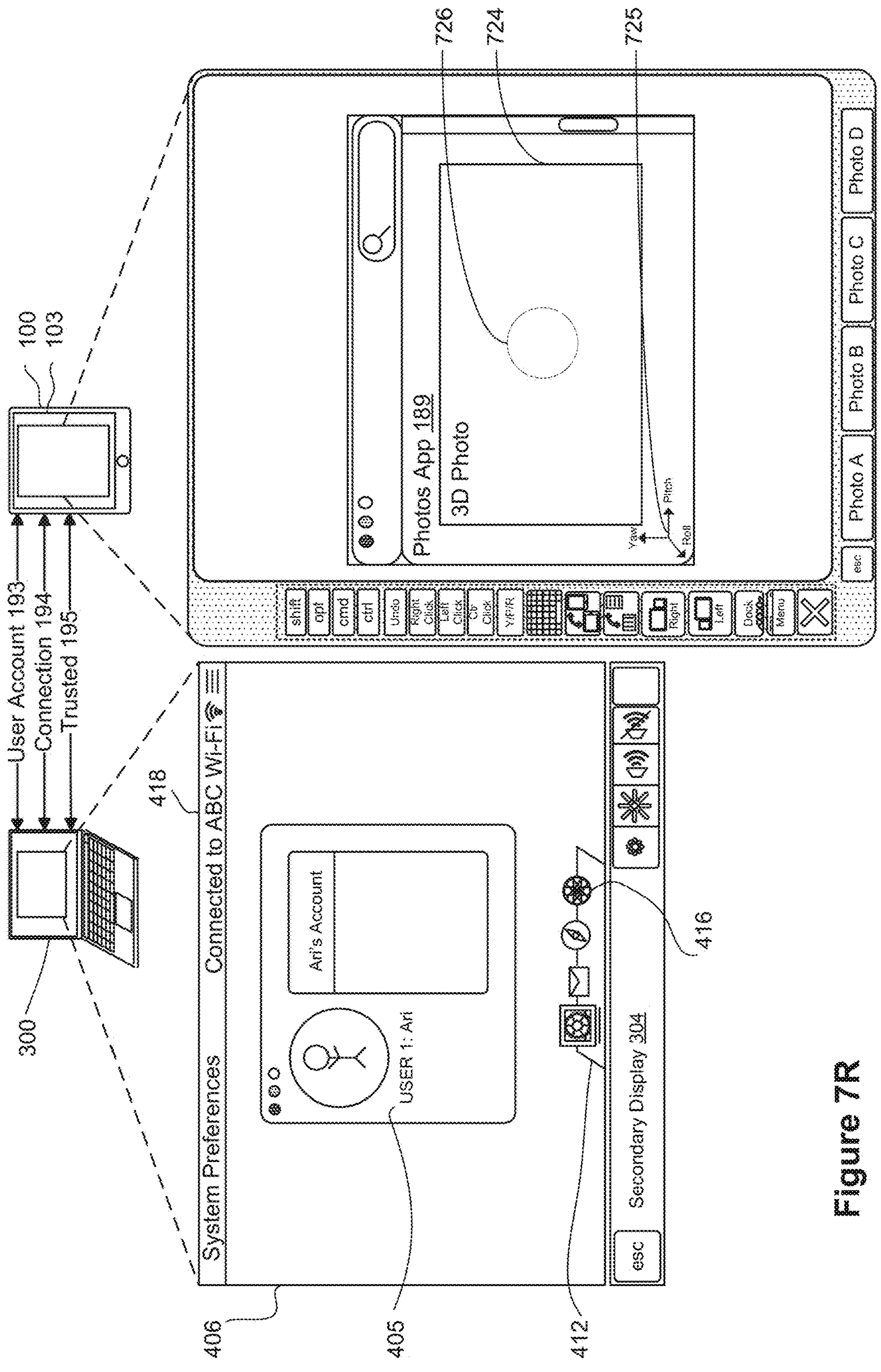
Figure 7S:
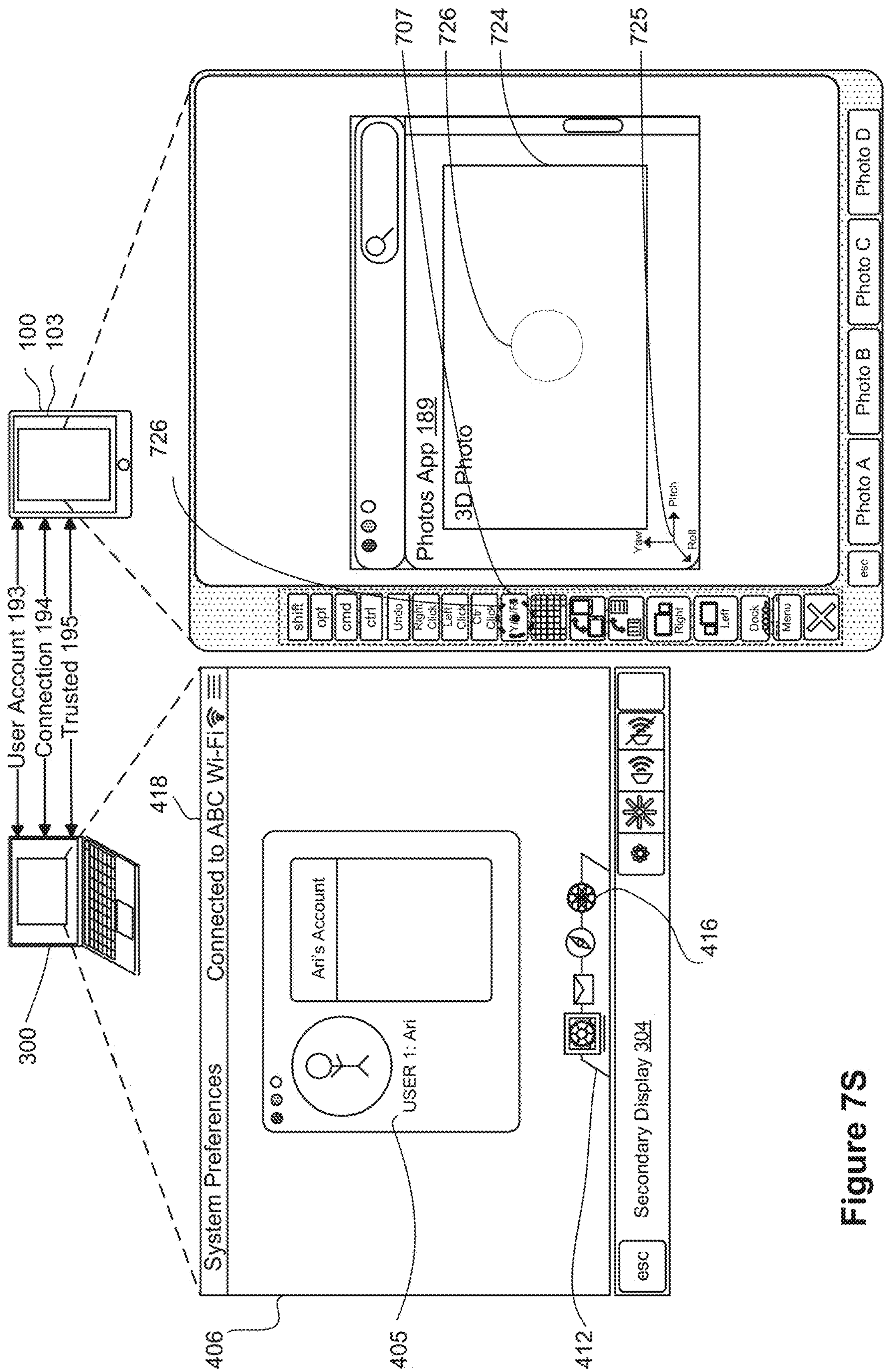
Figure 7T:
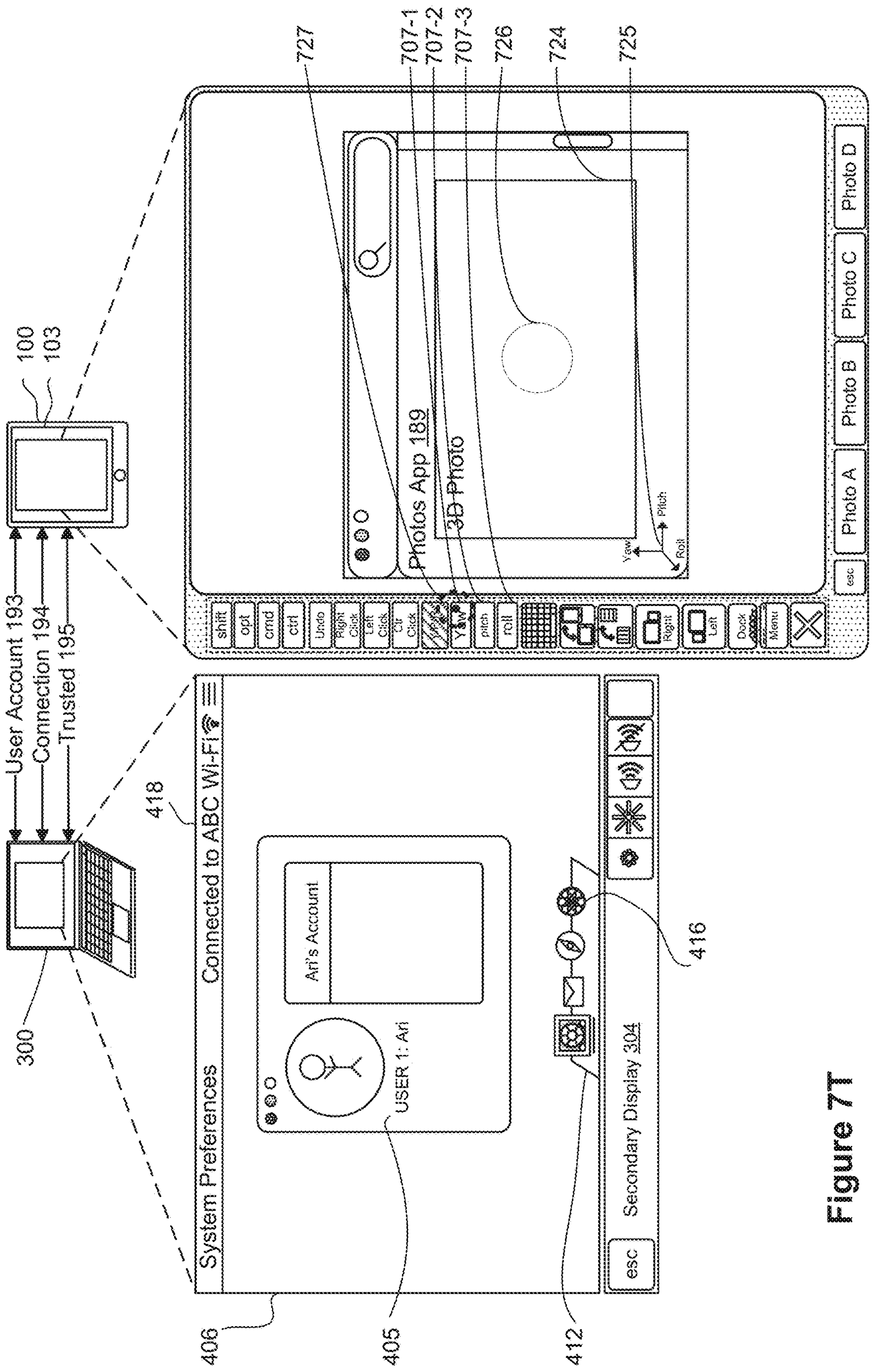
Figure 7U:
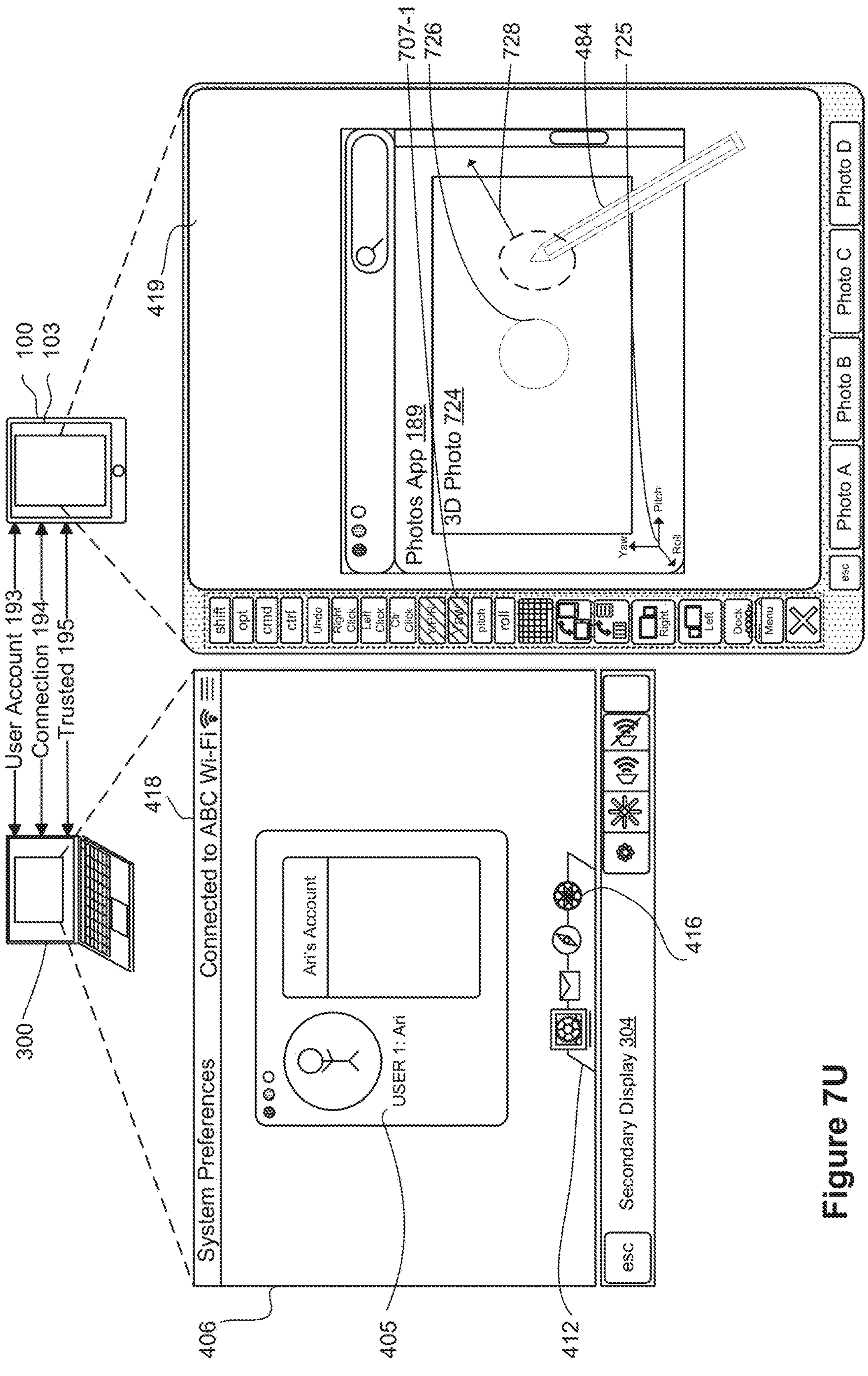
Figure 7V:
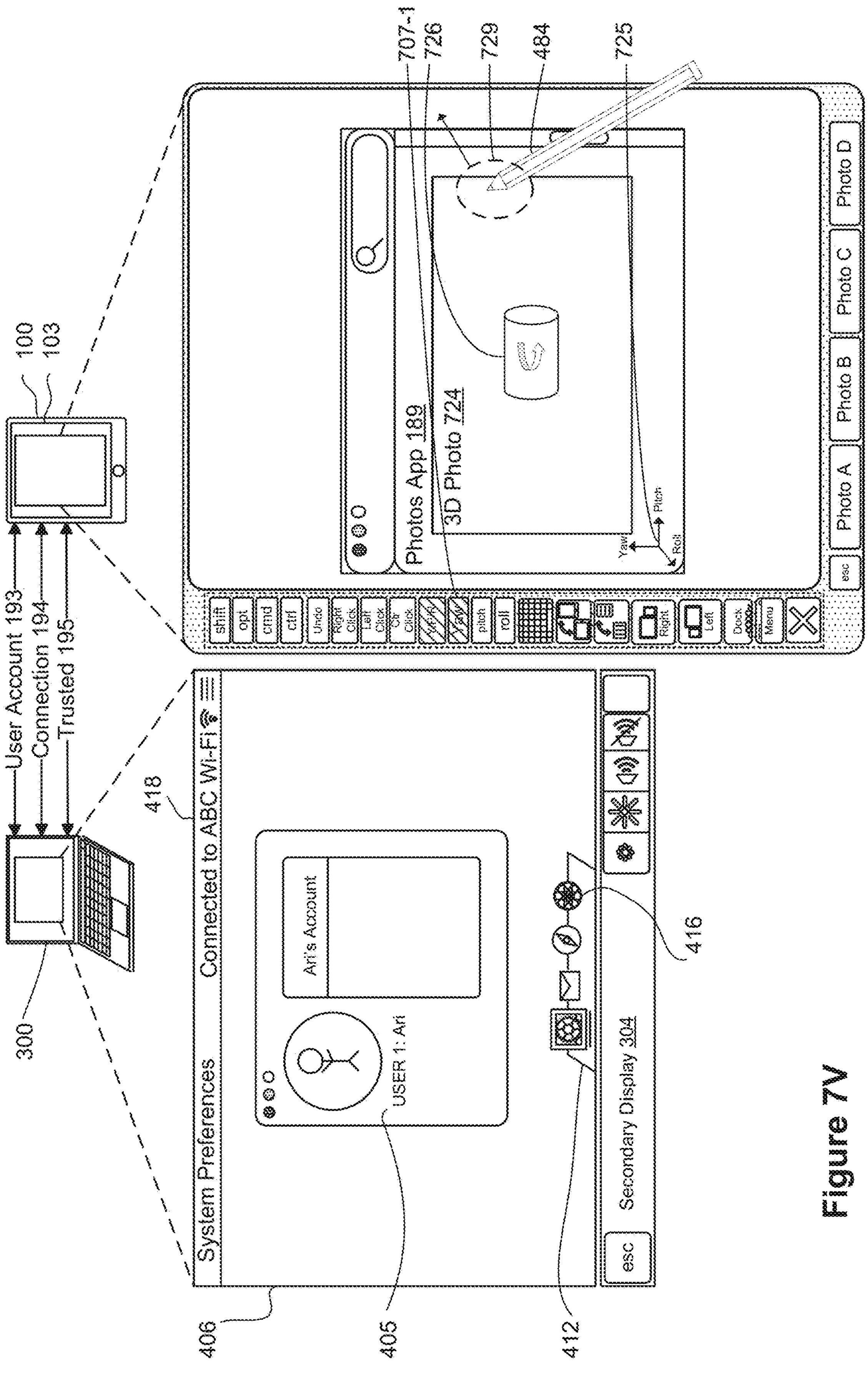
Figure 7W:
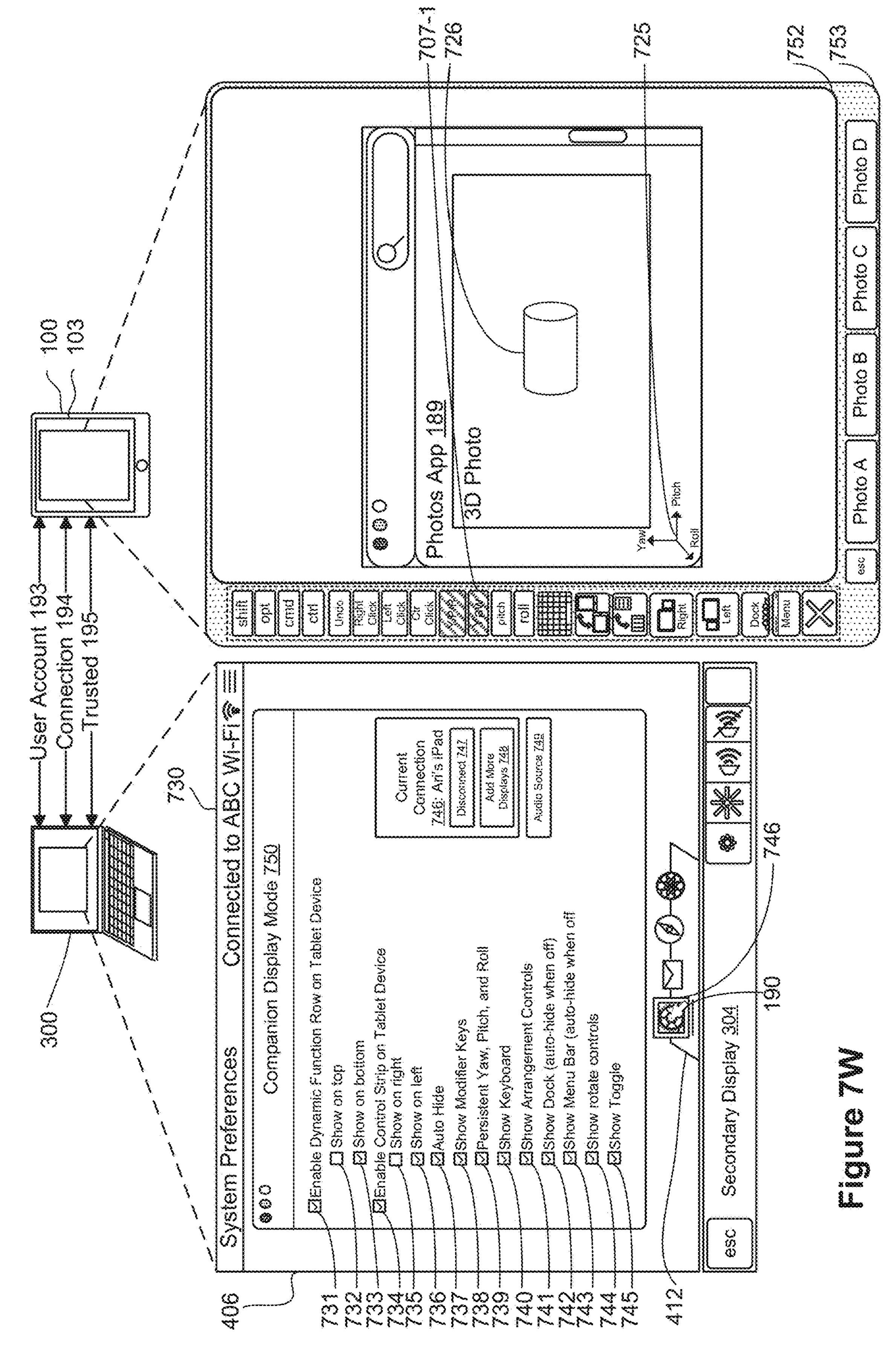

FIGS. 7A-7W are schematics of the laptop's display and the tablet's display, which are used to illustrate example user interfaces used in conjunction with a companion-display mode in accordance with some embodiments. The user interfaces in these figures are used to illustrate the methods and/or processes described below. One of ordinary skill in the art will appreciate that the following user interfaces are merely examples. Moreover, one of ordinary skill in the art will appreciate that a different layout with additional or fewer affordances, user interface elements, or graphics can be used in various circumstances.

As was mentioned above, in some embodiments, the control strip 197 can be displayed outside of a window boundary for user interface 419, and a dynamic function row 198 can be displayed in addition to the control strip 197 and also outside of a window boundary for user interface 419. In some instances, displaying the control strip 197 and dynamic function row 198 outside of the window boundary of UI 419 helps to avoid user confusion during the companion-display mode. An example of this display arrangement is shown in FIG. 7A, which shows that the control strip 197 and the dynamic function row 198 are both displayed outside of a window boundary 419. The functionality of the companion-display mode discussed with respect to FIGS. 4A-4QQQ also applies to the depicted user interfaces of FIGS. 7A-W. As FIG. 7A shows, companion-display mode user interface 419 can be displayed with simulated rounded edges 752 that mimic the physical edges of the mobile device 753 that are also rounded.

FIG. 7B illustrates an example arrangement of the control strip 197 and the dynamic function row 198, in which the control strip 197 is instead displayed on a right side of the user interface 419 (other display arrangement options are also available to users using the settings interface described with reference to FIG. 7W). FIG. 7B also shows that the control strip 197 can include additional functions for controlling the companion-display mode. The functions include keyboard modifier keys such as shift 428, option 429, command 430, and control 702.

The functions also include an undo or redo key 703, which is shown within the control strip 197. Such a function can be used to redo an input or undo an input. When a user performs multiple inputs, it can be quicker to perform an undo or redo function, instead of manually deleting the inputted information or reinserting the previously inputted information.

The functions further include cursor functions that are accessed from within the control strip 197, where the cursor functions include: right click 704, left click 705, and center click 706. Accessing to these functions allows user to save time while they are interacting with user interfaces presented in conjunction with a companion-display mode (otherwise, users might waste time searching aimlessly for desired functionality).

Interacting with three-dimensional images can be difficult due to three-dimensional images being able to rotate along three separate axis. As such, the functions accessible via the control strip 197 can also include a yaw-pitch-roll function 707 that expands to lock the three-dimensional image to rotate along a particular axis or axes. Additionally, FIG. 7B's control strip 197 can include a menu function 708 for displaying or hiding the top-level status menu bar 730 generated by the laptop device.

The remaining functions that are available in the control strip 197 were discussed above (as was a description of the dynamic function row 198), and these descriptions are not repeated here for the sake of brevity.

FIG. 7C shows that the dynamic function row 198 can also be displayed in different positions, including at a top portion of the tablet's display as depicted in FIG. 7C. One more example of positions for the control strip 197 (right side of tablet's display) and the dynamic function row 198 (top of tablet's display) is shown in FIG. 7D.

FIG. 7E illustrates an input 709 directed to menu function 708 for displaying or hiding the top-level status menu bar 730 generated by the laptop device. Since the menu bar 730 is already displayed in FIG. 7E, a selection of the menu function 708 from within the control strip 197 causes the menu bar 730 to be hidden from display as is shown in FIG. 7F.

FIG. 7F shows an input 711 on the shift function 710 displayed within the control strip 197. In some embodiments, the selection can be made by either a press-and-hold, which causes the function to only be activated while the function is still being held, or a double tap, which locks the function to a persistently activated mode, and does not require the function to be held down to be activated. In this example, the input 711 is a double-tap input over the shift function 710, which causes a persistent selection of the shift key in the control strip 197.

Turning to FIG. 7G, the shift key is now in a persistently selected state, which acts as if a user was holding down the shift key on a physical or virtual keyboard. As shown, the shift key 710 appears with a revised visual appearance (e.g., a darkened or shaded state) to indicate the persistent selection. FIG. 7G further illustrates stylus 484 being used to select "Photo A" 712 with a tap on the screen. Since, the shift key is selected in the control strip; a selection of one item will highlight it, and can allow a user to select multiple items to interact with.

FIG. 7H illustrates that while the shift key is in the persistently selected state, a second input is received at "Photo B" 713, both "Photo A" 712, and "Photo B" 713, will change appearance states to show that they have been selected (e.g., respective dashed lines around each selected photograph).

FIG. 7I illustrates that while the shift key is in the persistently selected state, a third input is received at "Photo C" 714, and then the photos "Photo A" 712, "Photo B" 713, and "Photo C" 714 will change appearance states to show that they have all been selected (e.g., the respective dashed lines around each selected photograph).

FIG. 7J illustrates that while the shift key is in the persistently selected state, an input 715 is received over the left click function 705 that is displayed within the control strip 197. In some embodiments, the input 715 can be made by either a press-and-hold, which causes the function to only be activated while the function is still being held, or a double tap, which locks the function to a persistently activated mode, and does not require the function to be held down to be activated. By placing the shift and left-click functions of the control strip 197 in persistently selected states, inputs at the tablet take both of these persistent selections into account.

For example, in FIG. 7K an input is received from a stylus 484, and that input results in drawing a selection box 716 around items the user wishes to select. The selection box begins where the stylus makes its first contact with the display, and ends where the stylus lifts-off from the display. Since the shift key is also selected, the previously selected photos (e.g., "Photo A" 712, "Photo B" 713, and "Photo C" 714) remain selected, in addition to whatever is selected using the selection box 716.

FIG. 7L illustrates "Photo D" 717 being encased by the selection box 716.

As the stylus 484 moves along the display, the selection box 716 follows it. Because of the encasement of "Photo D" 717 by the selection box, the appearance state of "Photo D" 717 changes similarly to how the previous photos appearance states changed in response to being selected (e.g., the dashed outside line around "Photo D").

FIG. 7M illustrates "Photo D" 717, and "Photo E" 718 being encased by the selection box 716. As the stylus 484 moves along the display, the selection box 716 follows it. Because of the encasement of "Photo E" 718 by the selection box, the appearance state of "Photo E" 718 changes similarly, to how the previous photos appearance state changed in response to being selected.

FIG. 7N illustrates "Photo D" 717, "Photo E" 718, and "Photo F" 719 being encased by the selection box 716. As the stylus 484 moves along the touch-sensitive display 103, the selection box 716 follows it. Because of the encasement of "Photo F" 719 by the selection box, the appearance state of "Photo F" 719 changes similarly, to how the previous photos appearance state changed in response to being selected.

FIG. 7O illustrates an input 720 direction to the shift function 710, and an input 721 directed to the left click function 705 (and each of these inputs results in disabling the persistent selection states for the shift and left click functions of the control strip 197). FIG. 7O also shows that the photos in the photos app user interface 189 remain selected.

FIG. 7P illustrates a stylus 484 interacting with scrollbar 722 to scroll downward through the photos application windows 189. The tap of the stylus 484 results in a pointer 190 performing a left click function, and while the stylus remains in contact with the scrollbar 722 (e.g., is not lifted-off the scrollbar 722), the scrollbar 722 moves in a downward direction in accordance with movement of the stylus 484.

FIG. 7Q illustrates the response to the scrolling of the photos application performed by the stylus 484, and now the photos application window 189 displays other photos that were not previously displayed (e.g., "Photo G", "Photo H", and "3D Photo" 724). Additionally, FIG. 7Q shows a stylus 484 making a left click selection of "3D Photo" 724 with a cursor 190. When no modifier keys are selected (e.g., shift, control command, option) the left click will open up the selected photo to fill the larger portion of the photos application window 189.

FIG. 7R illustrates "3D Photo" 724 that has been selected, and now fills a larger portion of the photos application window 189. While in this expanded view, the previously displayed photos (e.g. "Photo D" 717, "Photo E" 718, and "Photo F" 719 "Photo G", and "Photo H") are no longer displayed. "3D Photo" 724 in this example is a three-dimensional photograph that can be manipulated in a three-dimensional space. An axis 725 can be provided, in some embodiments, in the bottom left portion of the photos application window 189 to help the user interact with the three-dimensional photograph. When interacting with three-dimensional photographs it can be difficult to orient the photograph in the desired orientation due to the multiple axes around which the three-dimensional object can be rotated.

Within "3D Photo" 724 there is a three-dimensional object 726, which in this example is a cylinder. The cylinder is currently being looked at from top, which shows the circular cross section, but can be rotated to different views as desired by the user.

FIG. 7S illustrates an input 727 of the yaw-pitch-roll user function 707 from within the control strip 197. Making a selection of the yaw-pitch-roll user function 707 allows the user to lock which axis the three-dimensional object 726 can be manipulated in. For example if, a user selects to only allow the three-dimensional object 726 to be manipulated in both the yaw, and pitch axes then the three-dimensional photo would not be able to be manipulated along the roll axis.

FIG. 7T illustrates one example where a user has first selected the yaw-pitch-roll user function 707 to bring up additional controls yaw 707-1, pitch 707-2, and roll 707-3. These controls, when selected, allow the user to move the three-dimensional object around the selected axis (e.g., the yaw-axis) based on inputs on the touch-sensitive surface such as a drag input that rotates the object around the selected axis based on a magnitude and/or direction of the drag input. A selection 727 is made at the additional control of yaw 707-1 to lock the rotation to the yaw-axis.

FIG. 7U illustrates a click-and-drag movement by stylus 484 for moving the three-dimensional object 726 of the "3D Photo" 724. Since the degree of freedom is locked to the yaw-axis in the depicted example, the three-dimensional object 726 only rotates around the yaw-axis. Even though the input 728 has a directional component that can cause rotation of the three-dimensional object 726 to occur along a different axis other than the yaw-axis, the three-dimensional object 726 will only rotate along the yaw-axis. The other components of the input that do not concern the yaw rotation will not be used to rotate the 3D Photo.

FIG. 7V illustrates the input 728 continuing to the second location 729, and as a consequence the "3D Photo" 724 is rotated along the yaw-axis. As a result, the three-dimensional object 726 is rotated along the yaw-axis, and reveals the top of the cylinder and the sides of the cylinder due to the rotation around the yaw-axis.

FIG. 7W illustrates, like FIG. 7V illustrates, the input 728 being completed, and the resulting new orientation of the three-dimensional object 726 within the "3D Photo" 724. With reference now to the laptop 300 that is shown in FIG. 7W, a companion display mode settings menu 750 is displayed on the laptop's display. The companion display mode settings menu 750 is displayed in response to a pointer 190 making an input at settings menu icon 751. The settings menu 750 includes a plurality of modifications for adjusting the companion display mode.

In particular, the companion display mode settings menu 750 includes a checkbox 731 for enabling or disabling the dynamic function row 198 on the tablet device. In some embodiments, when the dynamic function row for the tablet device is disabled, the resolution of the companion-display mode user interface 419 is adjusted to expand and fill the space that was previously filled by the dynamic function row 198. In some embodiments, when the dynamic function row on the tablet device is enabled, two additional checkboxes are displayed within the settings menu. The two additional checkboxes are associated with displaying the dynamic function row on the tablet device at the top either of the display 732, or on the bottom of the display 733 (in some embodiments, options for displaying the dynamic function row on a left or right side of the tablet's display can also be presented, but are omitted from FIG. 7W in this illustrated example).

In the illustrated example of FIG. 7W, the companion-display mode settings menu 750 includes a checkbox 734 for enabling or disabling the control strip 197 on the tablet device. In some embodiments, when the control strip 197 for the tablet device is disabled, the resolution of the companion-display mode user interface 419 is adjusted to expand and fill the space that was previously filled by the control strip. When the control strip on the tablet device is enabled, some settings that are configurable are: "show on right" 735, "show on left" 736, "auto-hide" 737, "show modifier keys" 738, "show persistent yaw, pitch, and roll controls" 739, "show keyboard control" 740, "show arrangement controls" 741, "show dock control" 742, "show menu bar" 743, "show rotate controls" 744, "show toggle" 745. Additionally, the companion-display mode settings menu 750 includes a status indicator 746 (e.g., "Current Connection Ari's iPad"), a disconnect user interface element 747 for ending the companion-display mode, an add more displays 748 for adding additional displays for use with the companion-display mode, and an audio source user interface element 749 for bringing up a submenu for controlling where audio is played while operating in the companion display mode. In some embodiments, the "show on right" 735 checkbox is for selecting where the control strip 197 is displayed on the tablet device, and the "show on left" 736 checkbox is also for selecting where the control strip 197 is displayed on the tablet device. With respect to "show on right" 735, and "show on left" 736, only one checkbox can be selected at a time, because the control strip can only be displayed in one location at a time (in some embodiments the menu 750 also includes checkboxes for selecting whether to display the control strip 197 on a top or a bottom portion of the tablet's display).

In some embodiments, the "auto-hide" 737 checkbox enables the control strip to appear only when the user interacts with the side of the display where the control strip is located. In one example, when the control strip is hidden the companion-display mode user interface 419 is resized to fill the area that was previously occupied by the now hidden control strip 197. In some embodiments, the "show modifier keys" 738 checkbox allows the user to decide if they want modifier keys to be displayed within the control strip 197 (e.g., shift, option, command, and control keys). In some embodiments, the settings menu can include submenus that allows for selecting which specific modifier keys to display.

In some embodiments, the "show persistent yaw, pitch, and roll" 739 checkbox allows the user to decide whether or not additional controls yaw 707-1, pitch 707-2, and roll 707-3 should be displayed at all times, or just have them displayed when the yaw-pitch-roll user function 707 is selected. In some embodiments, the "show keyboard" 740 checkbox is for displaying a function within the control strip 197 for displaying a virtual keyboard on the tablet device 100. In some embodiments, the "show arrangement controls" 741 checkbox is for displaying a function for manually arranging the tablet to the left or right of the laptop on the control strip 197; the "show dock control" 742 checkbox is for displaying a toggle on the control strip 197 for displaying the dock 412 at the tablet device 100; the "show menu bar" 743 checkbox is for displaying a toggle on the control strip 197 for displaying menu 730 within the companion-display mode.

In some embodiments, the "show rotate controls" 744 checkbox is for displaying the controls for rotating the display, and controls for rotating the content within the companion-display mode user interface 419. Finally, in some embodiments, the "show toggle" 745 checkbox is used in place of having two separate control bars (e.g., control strip 197 and dynamic function row 198), and allows the user to toggle between the control strip 197, and the dynamic function row 198 at the same location.

Additional descriptions regarding FIGS. 4A-7W are provided below in reference to methods 800-1100.

FIGS. 8A-8G are a flowchart of a method 800 of entering a companion-display mode on a first device (e.g., tablet device running a mobile operating system) and then concurrently displaying a user interface generated by a second device (e.g., laptop device running a desktop operating system) and a control strip that includes companion-display mode specific functions. The method 800 is performed at a first electronic device that includes a touch-sensitive display (801). Some operations in method 800 are, optionally, combined and/or the order of some operations is, optionally, changed.

In the method 800 described below, an example tablet device (running a mobile operating system) can be operated as an extended display for another device (running a desktop operating system), and the desktop operating system can generate user interfaces that are then presented on the example tablet device. For purposes of describing the method 800 below, the device 100 is referred to interchangeably as the first electronic device and as the tablet device (or simply the tablet), and the device 300 is referred to interchangeably as the second electronic device and as the laptop electronic device (or simply the laptop). In other implementations, the devices can switch places and perform operations attributed in the examples below to the other device.

Figure 8A:
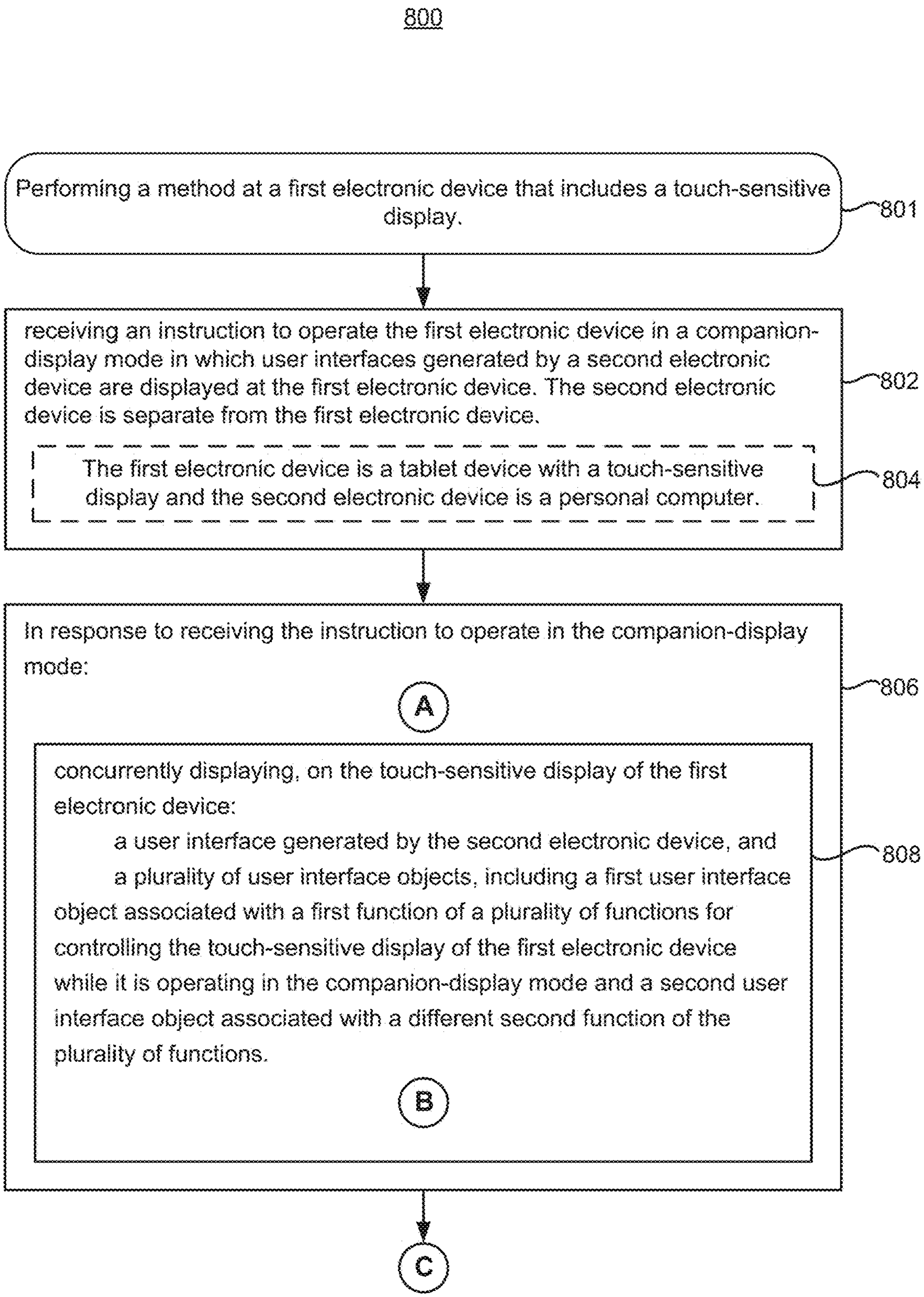

As described below, the method 800 (and associated interfaces) enables quick access to companion-display mode functions. As shown in FIG. 8A, the method 800 initially includes receiving (802) an instruction (e.g., a communication from a laptop with the instruction) to operate the first electronic device in a companion-display mode in which user interfaces generated by a second electronic device (e.g., a laptop) are displayed at the first electronic device. As shown in FIG. 5A, the second electronic device 300 is separate from the first electronic device 100.

As is also shown in FIG. 8A, the first electronic device can be a tablet device with a touch-sensitive display and the second electronic device can be a personal computer (804). In some embodiments, the tablet device may be a secondary device that executes a mobile operating system (as shown in FIGS. 4A-4H, and 4GG-4II), instead of a laptop or desktop based operating system. In response to receiving (806) the instruction to operate in the companion-display mode, the method includes concurrently displaying (808), on the touch-sensitive display of the first electronic device: a user interface generated by the second electronic device (e.g., user interface 406 shown on device 300 in FIG. 4A); and a plurality of user interface objects (e.g., UI objects 427-437 described with reference to FIGS. 4A-4QQ and FIGS. 7A-7W shown in narrow rectangular strip, referred to as control strip 197, of the display for device 100), including a first user interface object associated with a first function of a plurality of functions for controlling the touch-sensitive display of the first electronic device while it is operating in the companion-display mode and a second user interface object associated with a different second function of the plurality of functions. As one example, the first and second user interface objects can be any of the UI objects 427-437.

In some embodiments, the companion-display mode initially uses the first electronic device (e.g., an electronic tablet device) as an extended monitor for the second electronic device (e.g., a laptop, or a desktop). In such an example, the user interface associated with the second electronic device is a background image for a desktop view of the second electronic device (e.g., the user interface of device 100 depicted in FIG. 407 can be a background image for the second electronic device 300). In some embodiments, the companion-display mode initially uses the first electronic device as a mirrored monitor for the second electronic device. In such an example, the user interface associated with the second electronic device is a user interface for whichever application is currently open on the second electronic device. In some embodiments, when the user interface generated by the second electronic device is displayed at the first device, it is not displayed within an application installed on the first device; instead, a companion-display-mode module 180 (e.g., a module that is not available for download from an application store) of the mobile operating system of the first device provides the user interface based on data received from the second device.

In some embodiments, the functions for the companion-display mode are specific to the first electronic device as it operates in the companion-display mode, so those functions are not available at the first electronic device while it is operating in other display modes. In some embodiments, the plurality of user interface objects is displayed in a control strip region that is below the user interface associated with the second electronic device (e.g., control strip 197 discussed above). In other embodiments, the control strip region is overlaying the user interface associated with the second electronic device. The control strip may be a narrow rectangular section of the touch-sensitive display that spans from one edge to another edge of the touch-sensitive display, e.g., as shown in FIG. 4I, the control strip region 197 spans from a left edge to a right edge, along an entire bottom edge of the touch-sensitive display.

Additionally, when a user is interfacing with a secondary display, they typically must navigate through complicated menu sequences to adjust the display according to their needs at various points in time. Allowing a plurality of user interface objects (e.g., objects 428-437, 702-708 displayed within a narrow rectangular strip of the display of device 100) as shown in FIGS. 4I-4PPP, and 7A-7W to be displayed immediately (and without requiring any other human intervention) once the first electronic device (e.g., a mobile device) is placed in a companion-display mode (e.g., a secondary display mode), allows the user to avoid extra inputs to access menus for controlling the touch-sensitive display of the first electronic device. Reducing the number of inputs required for controlling the touch-sensitive display enhances the operability of the device and makes the human machine interface more efficient (e.g., by helping the user to reduce the number of inputs the user needs to make) which, additionally, reduces power usage and improves battery life of the device by enabling the user to use the device more quickly and efficiently.

Figure 8B:
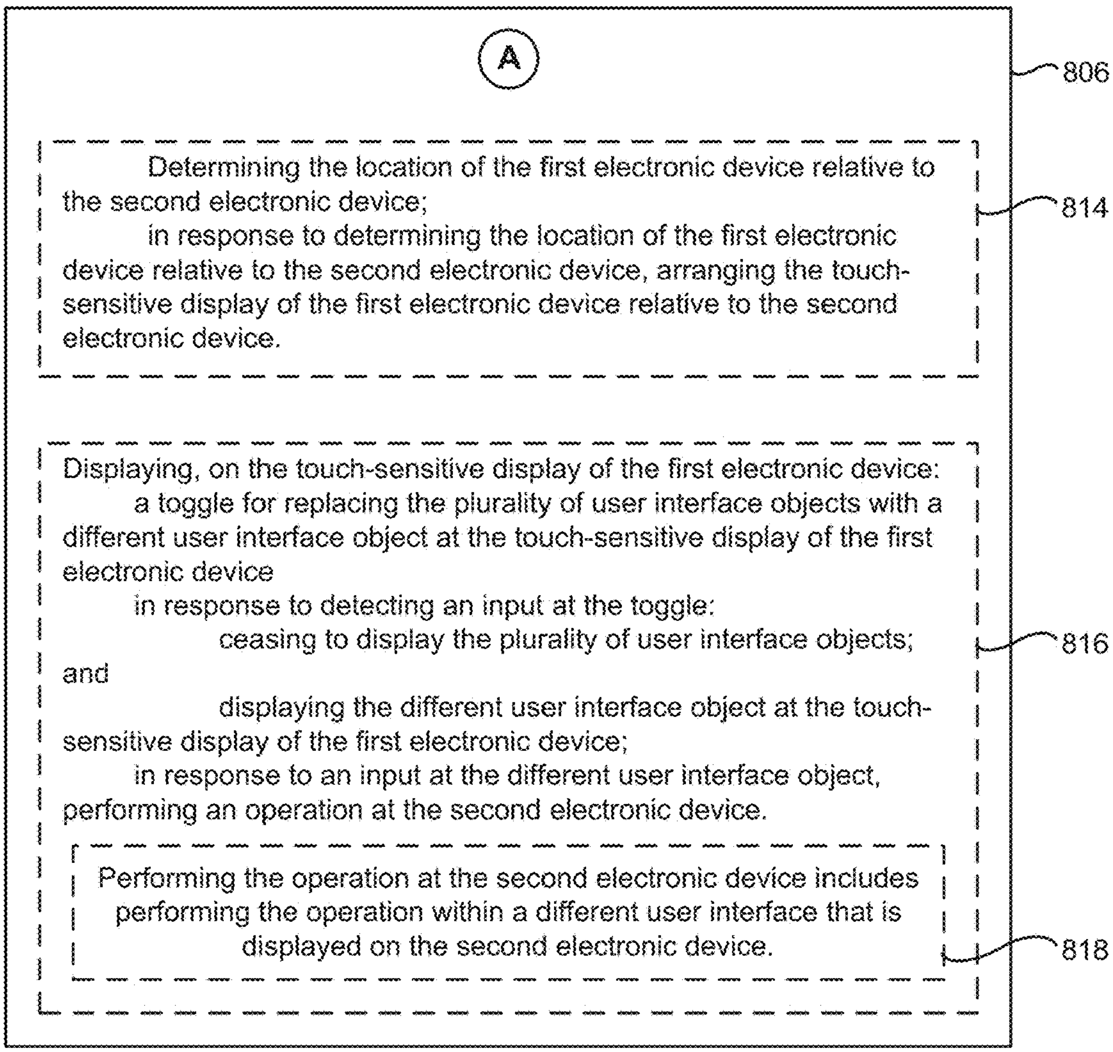

In some embodiments, in response to receiving the instruction (806) to operate in the companion-display mode, the method includes, as depicted in FIG. 8B, determining (814) the location of the first electronic device relative to the second electronic device; (e.g., based on user input identifying the relative location of the two devices or automatically, without user input, determining the relative location of the two devices). The determining operation (814) further includes, in response to determining the location of the first electronic device relative to the second electronic device, arranging the touch-sensitive display of the first electronic device relative to the second electronic device.

In some embodiments, the rightmost edge of the second electronic device is adjacent to the leftmost edge of the first electronic device, which allows the user to move a cursor in a continuous predictable manner between the two displays. While the devices are in this example arrangement, a cursor that leaves the display at the leftmost edge of the second electronic device would reappear on the rightmost edge of the display of the first electronic device, as shown in FIG. 4U-1, and FIG. 4U-2.

In some embodiments, one or more data points are used to determine the location of the first device. Example data points include data provided via sensors (e.g., Bluetooth, Wi-Fi, and Near Field Communication (NFC)) located at one or both devices, and data regarding which side of the second electronic device the first electronic device is physically connected to (e.g., plugged into a Universal Serial Bus (USB) port on the right-side or left-side of the display (in other words, the laptop device detects at which port the tablet device is connected, and makes a determination as to which side that port is on). Arranging the displays of a primary and a second monitor can often force users to waste time attempting to locate menus and then physically rearrange the monitors until a desired arrangement is achieved (often users must relocate the devices to figure out proper placement for a desired arrangement). Allowing the devices to communicate with each other to determine their orientation relative to each other, and arranging the user interfaces on both devices without the user interacting with menus allows for a user to quickly interact with the first electronic device in the companion-display mode. Automatically (without any other human intervention) determining orientation of the displays enhances the operability of the device and makes the human machine interface more efficient (e.g., by allowing the user to not have to go to a menu to set up the arrangement of the displays.) which, additionally, reduces power usage and improves battery life of the device by enabling the user to use the device more quickly and efficiently.

In some embodiments, in response to receiving the instruction (806) to operate in the companion-display mode, the method includes, as depicted in FIG. 8B, displaying (816), on the touch-sensitive display of the first electronic device a toggle for replacing the plurality of user interface objects with a different user interface object at the touch-sensitive display of the first electronic device (e.g., toggle 427 in FIG. 4I); and in response to detecting an input at the toggle: ceasing to display the plurality of user interface objects; and displaying the different user interface object at the touch-sensitive display of the first electronic device (e.g., after an input at the toggle 427 in FIG. 4BB, the control strip is replaced with display of a dynamic function row 198 that includes application-specific user interface objects in FIG.

4CC). In some embodiments, the operation (816) also includes, in response to an input at the different user interface object (e.g., at a photo user interface object displayed within dynamic function row 198), the method 800 includes performing an operation at the second electronic device (e.g., causing a photo associated with the selected photo user interface object to be displayed on the laptop's display).

In some embodiments, the toggle may be used to switch between more than two modes, and those additional modes may include user predefined modes, or a dynamic mode that automatically adjusts the functions it displays based on open applications and user requests, as shown in FIG. 4BB-4CC. Changing functionality of a predefined user interface typically involves going into menus and changing what is displayed. Allowing the user to toggle through as plurality of different menus that address multiple needs set forth by the user, reduces the complexity of adjusting the control strip within a menu setting for each different use. Providing this interaction at the secondary device enhances the operability of the device and makes the human machine interface more efficient (e.g., by allowing the user to quickly and seamlessly switch between multiple control strip functionalities) which, additionally, reduces power usage and improves battery life of the device by enabling the user to use the device more quickly and efficiently. In some embodiments, the tablet's display can display both a control strip 197 and a dynamic function row 198 (FIG. 7A) and, in such embodiments, the toggle can be omitted from display within the control strip 197.

With reference to operation (816), the method 800 further includes, in FIG. 8B, operation for (818) performing the operation at the second electronic device includes performing the operation within a different user interface that is displayed on the second electronic device.

Additionally, in some embodiments, the plurality of functions (correspond to the user interface objects displayed within control strip 197) do not include a volume function or a brightness function, which can help to avoid user confusion as such functions might control the laptop's features and not the tablet's features.

Now looking at FIG. 8C the method operation (808) can include that the plurality of functions for controlling the touch-sensitive display of the first electronic device while it is operating in the companion-display mode is a predefined set of functions including one or more functions associated with functionality of the second device (820).

In some embodiments, there can be a plurality of functions for controlling the touch-sensitive display (e.g., each function accessible by providing an input at the control strip 197), and the respective plurality of functions may be a predefined set of functions associated with the touch sensitive display. In some embodiments, there can be some functions for controlling the second electronic device that are displayed as selectable options at the control strip 197. Furthermore, using a predefined set of functions helps to further enhance operability of these devices and make the human-machine interfaces on these devices more efficient (e.g., by allowing the user to quickly and seamlessly access those functions that they have deemed most useful, and for which they would have to look for more often than other functions). In some embodiments, the predefined set of functions is defined by a user at a settings user interface, such as that shown in FIG. 7W.

When a user is interfacing with a secondary display, they typically must navigate through complicated menu sequences to adjust the display according to their needs at various points in time. To overcome this, method 800, as shown in FIG. 8C, further includes the ability for (822) detecting a request to modify settings associated with the companion-display mode (e.g., the request is a request to open a menu of settings for the companion-display mode, which request can be received at either the first or the second electronic device). In response to detecting the request, the method 800 includes displaying, within a menu of configuration options for the companion-display mode, a selectable option for ceasing display of one of the plurality of user interface objects (e.g., the menu of configuration options is depicted in FIG. 7W). The method 800 can further include, detecting an input directed to the selectable option; and in response to detecting the input, ceasing to display the one of the plurality of user interface objects on the touch-sensitive display of the first electronic device.

As one example, as shown in FIG. 7W, the menu can allow for a user to: enable or disable display of the control strip (e.g., using checkbox 734, FIG. 7W); adjust the control strip's orientation (e.g., using one of checkboxes 735-736, FIG. 7W); add or remove keyboard modifier keys on the control strip (e.g., using checkbox 738, FIG. 7W), add or remove rotate functions on the control strip (e.g., using checkbox 744, FIG. 7W); enable or disable the dynamic function row (e.g., using checkbox 731, FIG. 7W); and adjust the dynamic function row's orientation (e.g., using checkboxes 732-733, FIG. 7W).

Allowing a user to adjust the predefined set of functions allows the user to adjust the functions to better fit their needs. When a user has a customized set of functions already predefined, then they will not need to waste time search for additional menus, which enhances the operability of the device and makes the human machine interface more efficient (e.g., by allowing the user to quickly and seamlessly setup their secondary display specific to their needs without having to navigate a plurality of display menus to set up the display) which, additionally, reduces power usage and improves battery life of the device by enabling the user to find the functions they need on the tablet device more quickly and efficiently while operating in the companion-display mode.

Turning back to FIG. 8C, in the method 800, the first user interface object associated with the first function can be a function for changing the arrangement of the displays relative to one another (824). In one example, the user interface object may allow for different arrangement options for placement of the display of the first electronic device relative to the display of the second electronic device, and examples of changing the arrangement options are shown in FIG. 4T-4U. In some instances, when a user desires to change how the displays are arranged relative to one another, the user must navigate a complicated, confusing, difficult-to-remember sequence of menus to do so. Allowing the user to select display arrangements using a single input at the plurality of user interface objects (displayed at control strip 197 on the tablet's display), allows for the user to quickly change display arrangements without having to go through the laborious task of navigating through sequences of menus. In this way, operability of the device is enhanced and the human-machine interface is made to operate more efficiently (e.g., by allowing the user to avoid menus and quickly override display arrangements on the control strip) which, additionally, reduces power usage and improves battery life of the device by enabling the user to use the device more quickly and efficiently.

Turning next to FIG. 8D, the method 800 can include one or more of the depicted operations 826, 828, and 830.

Looking at operation 826, the method 800 can include, while operating in the companion-display mode: receiving a request to enter a split-screen view on the first electronic device (e.g., a gesture 448 used to drag an application icon out of a dock 411 to trigger activation of a split-screen view, FIG. 4KK-2). Operation 826 also includes, in response to receiving the request to enter the split-screen view on the first electronic device, concurrently displaying, on substantially all of the touch-sensitive display, the user interface generated by the second electronic device side-by-side with a user interface for an application that is installed on the first electronic device (e.g., displaying a mail app side-by-side with a user interface for the companion-display mode, as is shown in FIG. 4LL).

Often it is challenging for users to easily interact simultaneously with two separate devices. Responding to a request to enter a split-screen view by concurrently displaying (on substantially all of the first device's display) a user interface generated by the second device side-by-side with a user interface for an application installed on the first device allows users to easily see and then interact with content associated with two different devices (and two different operating systems). In this way, operability of the device is enhanced (e.g., user is able to interact with two devices at once, instead of switching back and forth between the two devices) and allows for a sustained interaction with the two devices.

In FIG. 8D, the method also optionally includes, while concurrently displaying (828) the user interface generated by the second electronic device and the user interface for the application executing on the first electronic device, detecting a gesture that includes a contact dragging content from within the user interface generated by the second electronic device to the user interface for the application that is executing on the first electronic device (e.g., dragging the Photo H object in FIG. 4MM), and in response to a lift-off of the contact after it dragged the content to the user interface for the application that is executing on the first electronic device (e.g. FIGS. 4NN-4PP show that dragging of the Photo H object moves from the companion-display mode user interface and to the tablet device's e-mail application 450). The method also includes performing an operation corresponding to the content within the user interface for the application on the first electronic device (e.g., displaying the content or a representation of the content in the user interface for the application on the first electronic device, as is shown in FIG. 4PP for "Photo H").

When displaying two user interfaces on one device, where the user interfaces are each driven by separate operating systems on two different devices, it can be inconvenient to quickly transfer files between the two devices. Allowing a user to drag a file from one user interface generated by one operating system to another user interface generated by a second operating system greatly speeds up the process of transferring files. Allowing for the transfer of files between two active operating systems enhances the operability of the device and makes the human machine interface more efficient (e.g., allowing the user to not have to waste time looking for (or recalling) complicated ways to send files between two operating systems (e.g., devices), which, additionally, reduces power usage and improves battery life of the device by enabling the user to use the device more quickly and efficiently.

In FIG. 8D the method optionally includes, while concurrently displaying (830) the user interface generated by the second electronic device and the user interface for the application executing on the first electronic device, detecting a gesture that includes a contact dragging content from within the user interface for the application that is executing on the first electronic device to the user interface generated by the second electronic device; and in response to a lift-off of the contact after it dragged the content to the user interface generated by the second electronic device, performing an operation corresponding to the content within the user interface generated by second electronic device. An example of this is shown in FIGS. 4SS-4XX, where a receipt object 463 is dragged from the e-mail application on the tablet device and to the photos application window 189 of the companion-display mode).

As noted above, allowing for the transfer of content between two active operating systems enhances the operability of the device and makes the human-machine interface more efficient (e.g., allowing the user to not have to look for ways to send files between two operating systems (e.g., devices)), which, additionally, reduces power usage and improves battery life of the device by enabling the user to use the device more quickly and efficiently.

Figure 8E:
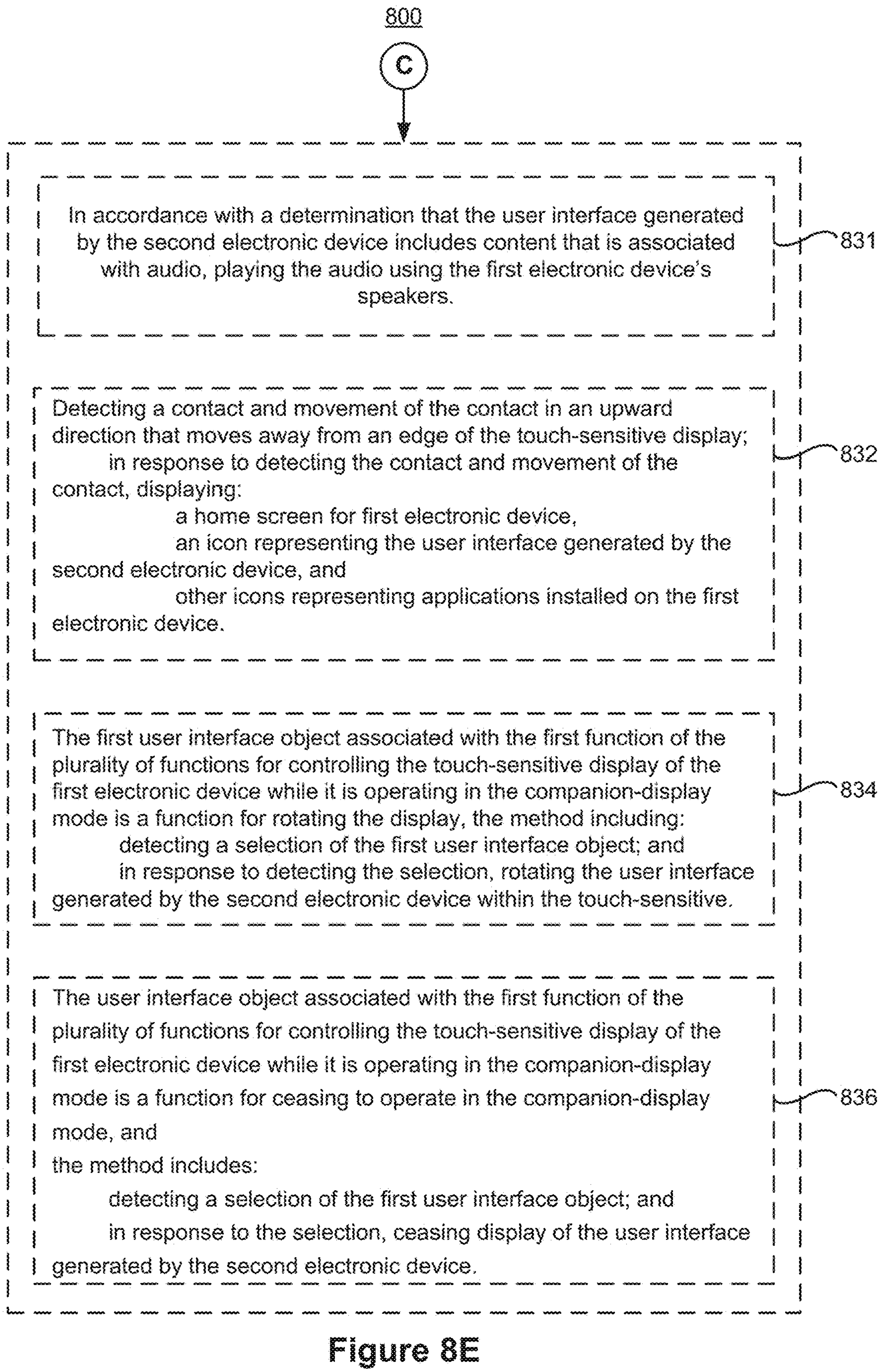

Turning to FIG. 8E, the method 800 also includes, in accordance with a determination that the user interface generated by the second electronic device includes content that is associated with audio, playing (831) the audio using the first electronic device's speakers (e.g., as depicted in FIG. 4000). In some embodiments, this audio playback using the first device's speakers could be instead of, or in addition to, using other speakers associated with the second electronic device such as integrated speakers for the second electronic device or external speakers for the second electronic device. In some embodiments, the user can specify which device they would like the audio to be played from, or can choose to use speakers external to the first and second devices (e.g., chosen from a companion-display mode settings menu 750, such as that depicted in FIG. 7W).

As shown in FIG. 8E, the method 800 includes, detecting (832) a contact and movement of the contact in an upward direction that moves away from an edge of the touch-sensitive display; (e.g., the upward direction that moves away from the edge is an upward direction that is substantially perpendicular to the edge (e.g., the contact moves along a path that is within +/−5% away from a straight line that extends away from the edge at a 90% angle, as shown in FIG. 4FF at gesture 440-442)); in response to detecting the contact and movement of the contact, displaying: a home screen for first electronic device (e.g., the home screen shown in FIG. 4GG), an icon representing the user interface generated by the second electronic device, and other icons representing applications installed on the first electronic device (e.g., the icon 443 in both FIGS. 4GG and 4HH).

When interacting with a device that is multifunctional, there may be times where the user wants to interact with the first electronic device's home screen user interface (or other native user interface), rather than the user interface generated by the second electronic device. Switching back and forth between these two user interfaces, however, may be inconvenient or require searching for the user interface behind a series of other user interfaces associated with other applications. Allowing a representation of the companion-display mode to appear on the home screen of the device to appear when the device is running in a companion-display mode greatly aids in the ease of returning to the user interface generated by the second electronic device from the home screen.

In the method 800, as depicted in FIG. 8E, the first user interface object associated with the first function of the plurality of functions for controlling the touch-sensitive display of the first electronic device while it is operating in the companion-display mode can be a function for rotating the display (e.g., which function can be activated by an input over user interface object 432 displayed in control strip 197 in FIGS. 4L-4P). The method also includes: detecting (834) a selection of the first user interface object; and in response to detecting the selection, rotating the user interface generated by the second electronic device within the touch-sensitive (e.g., example rotation is illustrated in FIGS. 4L-4P).

Allowing a user to adjust the rotation of the screen from the control strip allows a user to quickly adjust the secondary display to their needs. Providing this interaction at the tablet device enhances operability of these devices and makes the human-machine interfaces on these devices more efficient (e.g., by allowing the user to quickly and seamlessly rotate their secondary display without having to navigate a plurality of display menus to rotate the display) which, additionally, reduces power usage and improves battery life of the device by enabling the user to use the device more quickly and efficiently.

In the method 800, as shown in FIG. 8E, the user interface object associated with the first function of the plurality of functions for controlling the touch-sensitive display of the first electronic device while it is operating in the companion-display mode is a function for ceasing to operate in the companion-display mode (e.g., user interface object 437 in FIG. 4I), and the method includes: detecting (836) a selection of the first user interface object; and in response to the selection, ceasing display of the user interface generated by the second electronic device.

In some embodiments, when the companion-display mode is exited, the first electronic device may revert to a previous state that the first device was in use prior to the companion-display mode being invoked. Allowing the user to effortlessly turn off the companion display mode with a single input reduces the complexity of exiting the companion-display mode. Providing this interaction at the secondary device enhances operability of these devices and makes the human-machine interfaces on these devices more efficient (e.g., by allowing the user to quickly and seamlessly exit the companion-display mode without accessing any menus) which, additionally, reduces power usage and improves battery life of the device by enabling the user to use the device more quickly and efficiently.

With reference to FIG. 8F, in the method 800, the first user interface object associated with the first function of the plurality of functions for controlling the touch-sensitive display of the first electronic device while it is operating in the companion-display mode is a function for bringing up a dock associated with the second electronic device (e.g., user interface object 436 in FIGS. 41 and 7B), and the method includes: detecting (838) a selection of the first user interface object; and; in response to the selection, displaying the dock overlaying a portion of the user interface generated by the second electronic device (e.g. dock 439 in 4X, 4Y-1, and 4Y-2, which can float into view when selected).

When operating two separate devices, a user may have to switch between the devices to open their desired applications, which wastes time. Allowing for a user to bring up the docks from two separate devices on a single device removes the need to switch between devices to open the desired application. Providing this interaction at the tablet electronic device enhances operability of these devices and makes the human-machine interfaces on these devices more efficient (e.g., by allowing the user to quickly and seamlessly open applications from two devices on a single device) which, additionally, reduces power usage and improves battery life of the device by enabling the user to use the device more quickly and efficiently.

As shown in FIG. 8F, the method 800 also optionally includes: while operating (840) the first electronic device in the companion-display mode: receiving, at the first electronic device, a request to display an application-switching user interface (e.g., the gesture shown in FIG. 4DD for swiping up to bring up an application-switching user interface), and in response to the request, concurrently displaying: representations of recently used applications (e.g., representations of "Racing Game" 443 and "Messages" 446 in FIG. 4EE); and a representation of individual user interfaces and/or desktops generated by the second electronic device (e.g., representations of "Desktop 1" 445, and "Desktop 2" 444, FIG. 4EE).

In some embodiments, the first electronic device can display multiple representations of different user interfaces from the second electronic device, including different desktop views established at the second electronic device, as well as displaying recently used applications form the first electronic device. Providing an application-switching user interface that includes representations of such recently used applications, as well as a representation of a user interface generated by the second electronic device creates a simple single application-switching user interface. A single application-switching user interface provides users with easy access to all user interfaces available on their devices (including ones for both installed applications and for user interfaces associated with a companion-display mode), which enhances the operability of the device (e.g., by displaying a plurality of accessible user interfaces to a single location between both devices) which, additionally, reduces power usage and improves battery life of the device by enabling the user to use the locate desired user interfaces without needlessly wasting time searching for them.

In FIG. 8F, the method also includes concurrently displaying (842) includes displaying an additional representation of a desktop established at the second electronic device (e.g., the multiple desktops shown in FIG. 4EE, see above). In some embodiments, the desktop established at the second electronic device can be a desktop that does not include the user interface generated by the second electronic device; in other words, the user interface generated at the second device is associated with some other desktop instead. In some embodiments, the app-switching user interface includes representations of all available desktops established at the second device to allow users to easily and seamlessly begin using one of the other desktops at the first device. Making a representation of a desktop established at the second device available at the app-switching user interface of the first device enhances operability of these devices and makes the human-machine interfaces on these devices more efficient (e.g., by allowing the user to quickly select the desktop representation).

As shown in FIG. 8F, in the method 800, the request includes (844): four or more contacts on the touch-sensitive display, and movement of the four or more contacts towards one another on the touch-sensitive display. In one example, the contacts are made with four or five concurrently detected contacts to perform the function of displaying an application-switching user interface, navigating to a home screen and/or switching between different applications or sets of applications. Allowing a user to enter an application-switching view with an intuitive gesture from one hand is very convenient. Providing this interaction at the secondary device enhances operability of these devices and makes the human-machine interfaces on these devices more efficient (e.g., by allowing the user to quickly enter the multitasking view with one hand).

In the method 800, as depicted in FIG. 8F, the request includes a contact, and movement of the contact in an upward direction that starts from an edge of the touch-sensitive display and moves away from the edge of the touch-sensitive display (846). In some embodiments, the movement of the contact is in an upward direction that is perpendicular to an edge of the touch screen display may need to surpass a first distance threshold (e.g., the distance is equal to or above the first threshold) in order to bring up the multitasking user interface, and one example of this is depicted in FIG. 4EE. In some embodiments, there may be a second distance threshold, that is longer than the first distance threshold, when the edge gesture surpasses the second distance threshold the application-switching view is not displayed, and a second function is performed. The second function can be displaying a home screen of the first electronic device, as shown in FIGS. 4FF-4GG. The threshold that is exceeded is determined by the distance from the initial contact to the location of where the liftoff from the display occurs. In some embodiments, the upward direction that moves away from the edge is an upward direction that is substantially perpendicular to the edge (e.g., the contact moves along a path that is within +/−5% away from a straight line that extends away from the edge at a 90% angle). Allowing a user to enter a multitasking view with a single contact gesture is very convenient. Providing this interaction at the secondary device enhances operability of these devices and makes the human-machine interfaces on these devices more efficient (e.g., by allowing the user to quickly enter the multitasking view).

Turing now to FIG. 8G, the plurality of user interface objects can be displayed within a first portion of the touch-sensitive display, and the method 800 comprises: in response to receiving (848) the instruction to operate in the companion-display mode, displaying, in a second portion of the touch-sensitive display that is distinct from the first portion, a plurality of application-specific user interface objects, each respective application-specific user interface object controlling a function available within an application that has focus on the second electronic device. As one example, the plurality of application-specific user interface objects can be displayed within a dynamic function row 198, such as that depicted in FIG. 7A.

In some embodiments, the first portion is a narrow rectangular strip of the display in which the UI objects are display (e.g., a first region or portion of the tablet's display that is used for display of the control strip 197, FIGS. 7A-7W), and the second portion is another, non-overlapping narrow rectangular strip of the display in which the application-specific UI objects are displayed (e.g., a second region or portion of the tablet's display that is used for display of the dynamic function row 198, FIGS. 7A-7W). In some embodiments, the first portion is referred to as a sidebar or control strip, and the second portion is referred to as a touch bar or dynamic function row. The companion-display mode settings configuration menu discussed above in reference to FIG. 7W can be used to allow for reconfiguring positions of the first and second portions on the touch-sensitive display.

As FIG. 8G shows, in the method 800, the user interface generated by the second electronic device is displayed on the touch-sensitive display in a third portion of the touch-sensitive display, and the third portion includes corners that are adjacent to the first and second portions, each of the corners having a visual appearance that mimics physical corners of the first electronic device. An example of this is depicted in FIG. 7A, which shows that the companion display mode user interface 419 has rounded corners that mimic the physical corners that are also rounded.

FIG. 8G also shows an operation 852, which includes, detecting (852) a press-and-hold input directed to the first user interface object displayed on the touch-sensitive display of the first electronic device; after detecting the press-and-hold input: detecting a first input directed to the user interface generated by the second application; in response to detecting the first input, performing an operation within the user interface generated by the second application; detecting a double-tap input directed to the first user interface object displayed on the touch-sensitive display of the first electronic device; (e.g., double-tap selection of left click 705 in FIG. 7J) and in response to detecting the double-tap input, changing a visual appearance of the first user interface object to indicate that it is selected (e.g., the shaded appearance of "left-click" 705 in FIG. 7K); while the first user interface object remains selected: detecting a second input within the user interface generated by the second electronic device; and in response to detecting the second input, performing the operation within the user interface generated by the second electronic device. In some embodiments, while the first user interface object remains selected: detecting a third input within the user interface generated by the second electronic device; and in response to detecting the third input, performing the operation again within the user interface generated by the second electronic device. In this way, uses are able to employ a press-and-hold input to perform an operation associated with a modifier key on a single-use basis, and can also employ a double-tap input to persistently activate the operation associated with the modifier key.

In some embodiments, a notification user interface can be pulled on top of the user interface generated by the laptop device as that user interface is displayed on the tablet device. For example, detecting a contact and movement of the contact in a downward direction that is perpendicular to an edge of the touch-sensitive display and in response to detecting the contact and movement of the contact, overlaying on top of the user interface generated by the second electronic device gesture (e.g., swipe down) to overlay a user interface including a notification user interface element (e.g., shown in FIGS. 5A-2 to 5B-2). In some embodiments, a selection of a notification user interface element results in launching an application associated with the notification on the first electronic device, and launching that application can replace the displayed user interface generated by the second electronic device.

It should be understood that the particular order in which the operations in the method 800 have been described is merely one example and is not intended to indicate that the described order is the only order in which the operations could be performed. One of ordinary skill in the art would recognize various ways to reorder the operations described herein.

Below is described a method 900 of performing different operations (e.g., mobile or desktop operating system operations) depending on which type of input object is used at a first electronic device that is operating in a companion display mode. The method 900 is performed at a first electronic device that includes a touch-sensitive display. Some operations in method 900 are, optionally, combined and/or the order of some operations is, optionally, changed.

The method 900 can be performed at a first electronic device that includes a touch-sensitive display (e.g., a tablet electronic device such as that depicted in FIG. 1A). In some embodiments of the method 900, the method includes: operating (902) the first electronic device in a companion-display mode in which user interfaces generated by a second electronic device are displayed at the first electronic device. The second electronic device is separate from the first electronic device. The method also includes, while operating (904) in the companion-display mode: displaying (906), on the touch-sensitive display of the first electronic device, a user interface generated by the second electronic device (e.g., in various examples, the user interface may be operating in a full screen mode, a minimized mode, or a partially expanded mode); detecting (908), at the first electronic device, a gesture using an input object. The method 900 further includes in response to detecting the first gesture (910): in accordance with determining that the input object is one or more user fingers, performing a first operation on the touch-sensitive display. And, also in response to detecting the first gesture, in accordance with determining that the input object is a stylus, performing a second operation, distinct from the first operation, on the touch-sensitive display. Examples of different gestures and responses thereto based on a type of input object used are shown in FIGS. 5A-1 to 5F-2.

In some embodiments, the stylus can be a passive device that the capacitive touch-sensitive display of the tablet 100 detects, or an active device that is in communication with the device, or the stylus can have active and passive features.

Allowing for single gestures to have multiple purposes depending on the input device (e.g., a finger or a stylus) allows for the user to perform more operations than would typically be possible, and enables efficient interactions for the companion-display mode. Increasing the number of operations that can be performed from a set number of gestures enhances the operability of the device and makes the human machine interface more efficient (e.g., by helping the user to reduce the number of gestures the user needs to make to perform an operation in either of two different operating systems) which, additionally, reduces power usage and improves battery life of the device by enabling the user to use the device more quickly and efficiently.

Figure 9A:
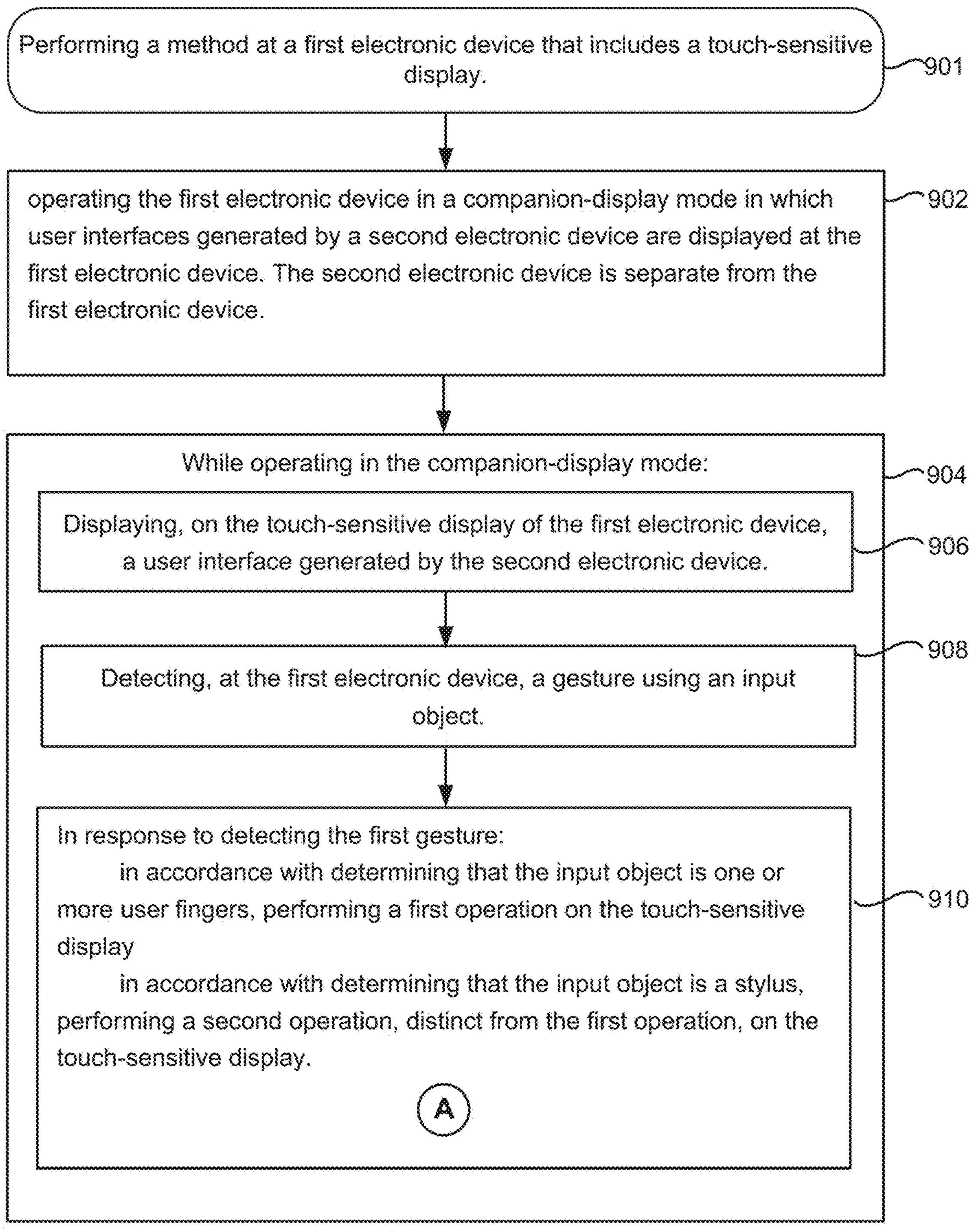
Figure 9B:
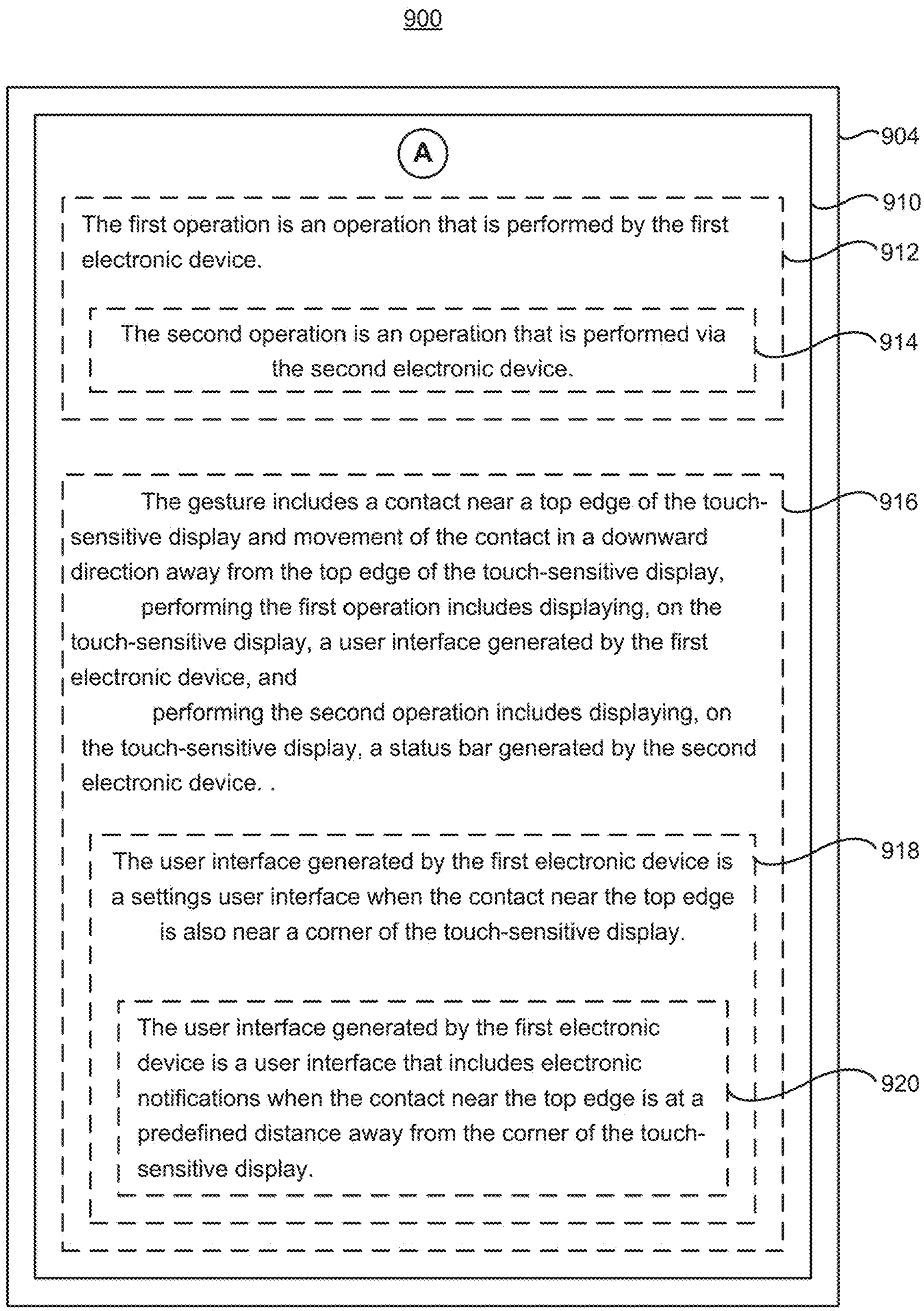

Turning next to FIG. 9B, additional optional method 800 features are depicted. As FIG. 9B shows, in the method 900, the first operation can be an operation that is performed by the first electronic device (912). In some embodiments, the first electronic device performing the first operation includes the first device displaying a notification user interface in response to receiving a swipe-down gesture on the touch-sensitive display provided by a user's finger (e.g., as shown in FIG. 5A-2, a gesture 501 is received from a user's finger and, in response, FIG. 5B-2 shows that a notification-center user interface is then displayed on the tablet's display). Other examples of the first operation are provided below. In some embodiments, the first electronic device is running a mobile operating system, such as the, as shown in FIGS. 4A-4H, and 4GG-4II.

Users have become accustomed to providing finger-based touch inputs at devices with touch-sensitive displays. Accordingly, having these finger-based touch inputs processed by the first electronic device comports with user's expectations and, therefore, ensures a consistent user experience while interacting with the tablet device as it is used in the companion-display mode, which enhances operability of the device and makes the human machine interface more efficient.

In the method 900, as shown in FIG. 9B, the second operation is an operation that is performed via the second electronic device. An example of the second electronic device performing the second operation includes the second device moving a cursor in response to receiving a swipe-down gesture on the touch-sensitive display provided by a stylus (this example is depicted in FIGS. 5A-1 where a downward swiping movement of the stylus causes movement of the pointer/cursor in FIG. 5B-1). Other examples of the second operation are provided below. In some embodiments, the second electronic device is running a desktop/laptop operating system, as shown in FIGS. 4D-4E. In some embodiments, the first electronic device receives the input provided by the stylus, and sends the input to the second electronic device to be processed. In response, the second electronic device will send an updated user interface to be displayed (or data used to present an updated user interface) on the first electronic device.

Allowing inputs provided by a stylus to be processed at the second electronic device helps to avoid confusion with gestures provided using a user's finger (in some instances the same gesture can be provided using either input object, but different responses will be provided depending on which input object is utilized). By providing different response to different input objects, users are able to conveniently interact with user interfaces presented in conjunction with the companion-display mode, using either their fingers or a stylus, thereby ensuring an improved human-machine interface is produced for use with the companion-display mode.

In some embodiments, as shown in FIG. 9B, the gesture includes a contact near a top edge of the touch-sensitive display and movement of the contact in a downward direction away from the top edge of the touch-sensitive display (e.g., gestures shown in FIGS. 5A-1 and 5A-2 move in the downward direction). In some embodiments, the first operation includes displaying, on the touch-sensitive display, a user interface generated by the first electronic device (e.g., displaying a notification-center user interface in FIG. 5B-2), and performing the second operation includes displaying, on the touch-sensitive display, a status bar generated by the second electronic device (e.g., displaying status bar at the top of the display in FIG. 5B-1 if it was previously hidden, or instead moving the pointer 190 if the status bar is already display).

In some embodiments, the gesture must travel a predefined distance (e.g., meet or surpass a threshold) from the edge of the touch-sensitive display, as shown in FIG. 5A-1 and FIG. 5A-2. In some embodiments, the downward direction that moves away from the top edge is a downward direction that is substantially perpendicular to the top edge (e.g., the contact moves along a path that is within +/−5% away from a straight line that extends away from the top edge at a 90% angle).

Requiring the user to memorize and retain multiple gestures for interacting with a touch-sensitive display can frustrate users, and may result in the user forgetting about gestures, and subsequent features. Allowing a single gesture to have multiple purposes, such as displaying a notification center or displaying a menu bar, reduces the requirement for the user to learn how to use the device, and have to memorize different inputs. Increasing the number of operations that can be performed from a set number of gestures enhances the operability of the device and makes the human machine interface more efficient (e.g., by helping the user to remember the shortcuts built into the device) which, additionally, reduces power usage and improves battery life of the device by enabling the user to use the device more quickly and efficiently.

Depending on a location at which the gesture starts from, the response and change in the tablet's display can change. For example, in some embodiments, the user interface generated by the first electronic device is a settings user interface (e.g., control-center user interface shown in FIGS. 4PPP-4QQQ) when the contact near the top edge is also near a corner of the touch-sensitive display (918); but, the user interface generated by the first electronic device is a user interface that includes electronic notifications (e.g., Notification center 503 in FIG. 5B-2) when the contact near the top edge is at a predefined distance away from the corner of the touch-sensitive display (916).

Moving to FIG. 9C, in some embodiments, the gesture includes a contact near a right edge of the touch-sensitive display of the first electronic device and movement of the contact in a leftward direction away from the right edge of the touch-sensitive display (e.g., 506 in FIG. 5C-1, and 507 in 5C-2), performing the first operation includes overlaying, on the touch-sensitive display of the first electronic device, a user interface for an application executing on the first electronic device on a portion of (e.g., less than all) the user interface generated by the second electronic device (e.g., the "Racing Game" 5003 in Figured 5D-2), and performing the second operation includes overlaying, on the touch-sensitive display of the first electronic device, a user interface that includes electronic notifications on a portion of (e.g., less than all) the user interface generated by the second electronic device (e.g., the notification user interface 509 from the laptop 100 in FIG. 5D-1) (922).

In some embodiments, the gesture must travel a predefined distance (e.g., meet or surpass a threshold distance of 0.5 inch) from the edge of the touch-sensitive display. In some embodiments, the leftward direction that moves away from the edge is a leftward direction that is substantially perpendicular to the right edge (e.g., the contact moves along a path that is within +/−5% away from a straight line that extends away from the right edge at a 90% angle).

Requiring the user to memorize and retain multiple gestures for interacting with a touch-sensitive display can be annoying, and may result in the user forgetting about gestures, and their resulting features. Allowing a single gesture to have multiple purposes, such as overlaying an application or a notification user interface on a user interface executing on the first electronic device, reduces the requirement for the user to learn how to use the device, and to have to memorize different inputs. Increasing the number of operations that can be performed from a set number of gestures enhances the operability of the device and makes the human machine interface more efficient (e.g., by helping the user to remember the shortcuts built into the device) which, additionally, reduces power usage and improves battery life of the device by enabling the user to use the device more quickly and efficiently.

In some embodiments, and as also shown in FIG. 9C, the gesture includes a contact near a bottom edge of the touch-sensitive display and movement of the contact in an upward direction away from the bottom edge of the touch-sensitive display (e.g., bottom edge swipe gestures 511 in FIG. 5E-1, and bottom edge swipe gestures 513 in FIG. 5E-2), performing the first operation includes overlaying, on the touch-sensitive display of the first electronic device, a first dock on the user interface generated by the second electronic device, the first dock including user interface objects each for opening an application installed on the first electronic device; (e.g., dock 411 in FIG. 5F-2) and performing the second operation includes overlaying, on the touch-sensitive display of the first electronic device, a second dock on the user interface generated by the second electronic device (e.g., dock 412 in FIG. 5F-1), the second dock including a first user interface object for displaying a user interface of a first application on the second electronic device and a second user interface object for displaying a user interface of a second application on the second electronic device (924).

In some embodiments, the overlaying of the dock may result in some content that was originally displayed at the location where the dock is displayed to be relocated to a new location. In such an embodiment, when the dock is no longer being displayed the dock content will return to its previous location. In one example, the control strip is moved when the dock is displayed. In some embodiments, the upward direction that moves away from the bottom edge is an upward direction that is substantially perpendicular to the bottom edge (e.g., the contact moves along a path that is within +/−5% away from a straight line that extends away from the edge at a 90% angle). Requiring the user to memorize and retain multiple gestures for interacting with a touch-sensitive display can be annoying, and may result in the user forgetting about gestures, and their resulting features. Allowing a single gesture to have multiple purposes, such as overlaying two separate docks on a user interface executing on the first electronic device, reduces the requirement for the user to learn how to use the device, and to have to memorize different inputs. Increasing the number of operations that can be performed from a set number of gestures enhances the operability of the device and makes the human machine interface more efficient (e.g., by helping the user to remember the shortcuts built into the device) which, additionally, reduces power usage and improves battery life of the device by enabling the user to use the device more quickly and efficiently.

Figure 9D:
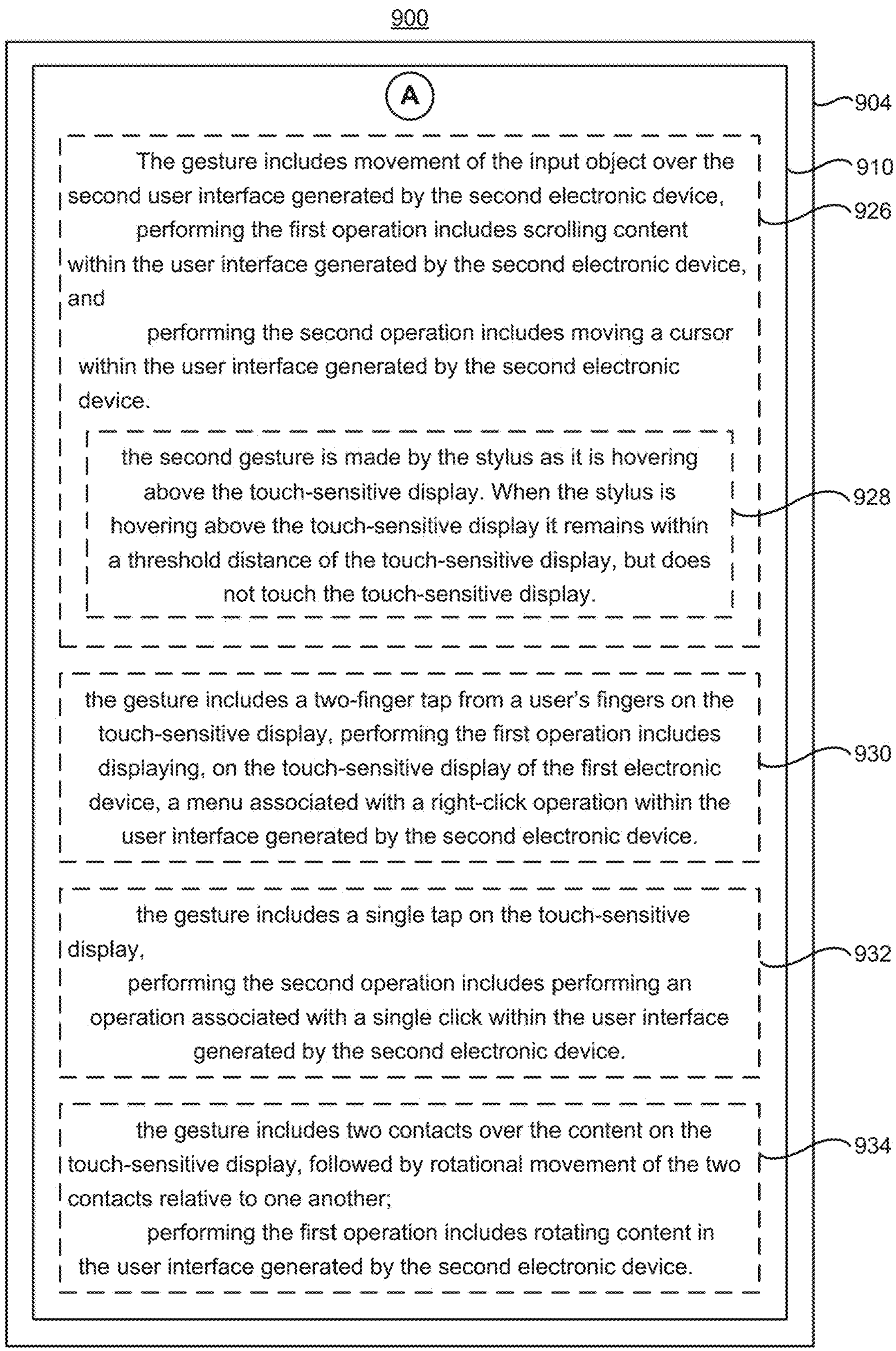

With reference to FIG. 9D now, in some embodiments, the gesture includes movement of the input object over the second user interface generated by the second electronic device, performing the first operation includes scrolling content within the user interface generated by the second electronic device (e.g., the photos application window 189 being scrolled by a contact 471 (e.g., made by a finger) in FIG. 4AAA), and performing the second operation includes moving a cursor within the user interface generated by the second electronic device (e.g., cursor 190 moving in response to stylus 484 in FIGS. 5A-1, and 5B-1) (926).

Requiring the user to memorize and retain multiple gestures for interacting with a touch-sensitive display can be annoying, and may result in the user forgetting about gestures, and their resulting features. Allowing a single gesture to have multiple purposes, such as either moving a cursor or scrolling content, reduces the requirement for the user to learn how to use the device, and to have to memorize different inputs to be performed within operating systems for the first and second devices. Increasing the number of operations that can be performed from a set number of gestures enhances the operability of the device and makes the human machine interface more efficient (e.g., by helping the user to remember the shortcuts built into the device) which, additionally, reduces power usage and improves battery life of the device by enabling the user to use the device more quickly and efficiently.

In some embodiments, the second gesture is made by the stylus as it is hovering above the touch-sensitive display, wherein as the stylus is hovering above the touch-sensitive display it remains within a threshold distance of the touch-sensitive display, but does not touch the touch-sensitive display (928).

Examples of the threshold distance at which the hovering stylus can be detected are 1-2 inches away from the display, or another appropriate value up to 4 inches away from the display. In some embodiments, the device only registers the stylus hovering when it is a predefined distance above the touch-sensitive display. In some embodiments, moving the cursor closer to the display may result in different operations to be performed. In some embodiments, when the stylus is within the predefined range, a visual cue will appear on the display (e.g., a small circle around the tip of the stylus). In another embodiment, the visual cue may decrease in size, as the stylus starts to leave the predefined distance above the touch-sensitive display.

Allowing a stylus to control movement of a cursor/pointer while the stylus hovers above the display provides additional control options without covering the user interface with the stylus, which enhances the operability of the device and makes the user-device interface more efficient (e.g., by allowing the user to see the entirety of the display, and to figure out where to place a cursor), which improves the human machine interface.

In some embodiments, as shown in FIG. 9D, the gesture includes a two-finger tap from a user's fingers on the touch-sensitive display, performing (930) the first operation includes displaying, on the touch-sensitive display of the first electronic device, a menu associated with a right-click operation within the user interface generated by the second electronic device (e.g., as shown in FIG. 4BBB as two finger tap gesture 472). In one example, the right-click operation includes a drop down menu with functions related to the user interface at a position where the two-finger tap gesture was detected. The cursor may relocate to the location where the two-finger tap gesture occurred, and in other embodiments, the cursor may remain the same location. Allowing users to have access to a gesture that includes a two-finger tap enables access to right-click functionality, which otherwise would be difficult to access, and would result in frustration for users. As such, this gesture enhances operability of the device and improves the human-machine interface.

In some embodiments, the gesture includes a single tap on the touch-sensitive display, performing (932) the second operation includes performing an operation associated with a single click within the user interface generated by the second electronic device (e.g., as shown in FIGS. 4KKK-4NNN). Allowing users to have access to a gesture that includes a single stylus tap enables access to left-click functionality, which otherwise would be difficult to access, and would result in frustration for users. As such, this gesture enhances operability of the device and improves the human-machine interface.

In some embodiments, the gesture includes two contacts over the content on the touch-sensitive display, followed by rotational movement of the two contacts relative to one another (e.g., 482-1, and 482-2 of FIG. 4HHH); performing (934) the first operation includes rotating content in the user interface generated by the second electronic device (e.g., rotated "Photo E" 479 in FIG. 4III). In one example, when there is a lift-off of the two contacts on the touch-sensitive display, the rotated content will revert to its original orientation. Allowing users to have access to a gesture that includes a two-contact rotation around a common location enables access to a rotating content functionality, which otherwise would be difficult to access, and would result in frustration for users. As such, this gesture enhances operability of the device and improves the human-machine interface.

Figure 9E:
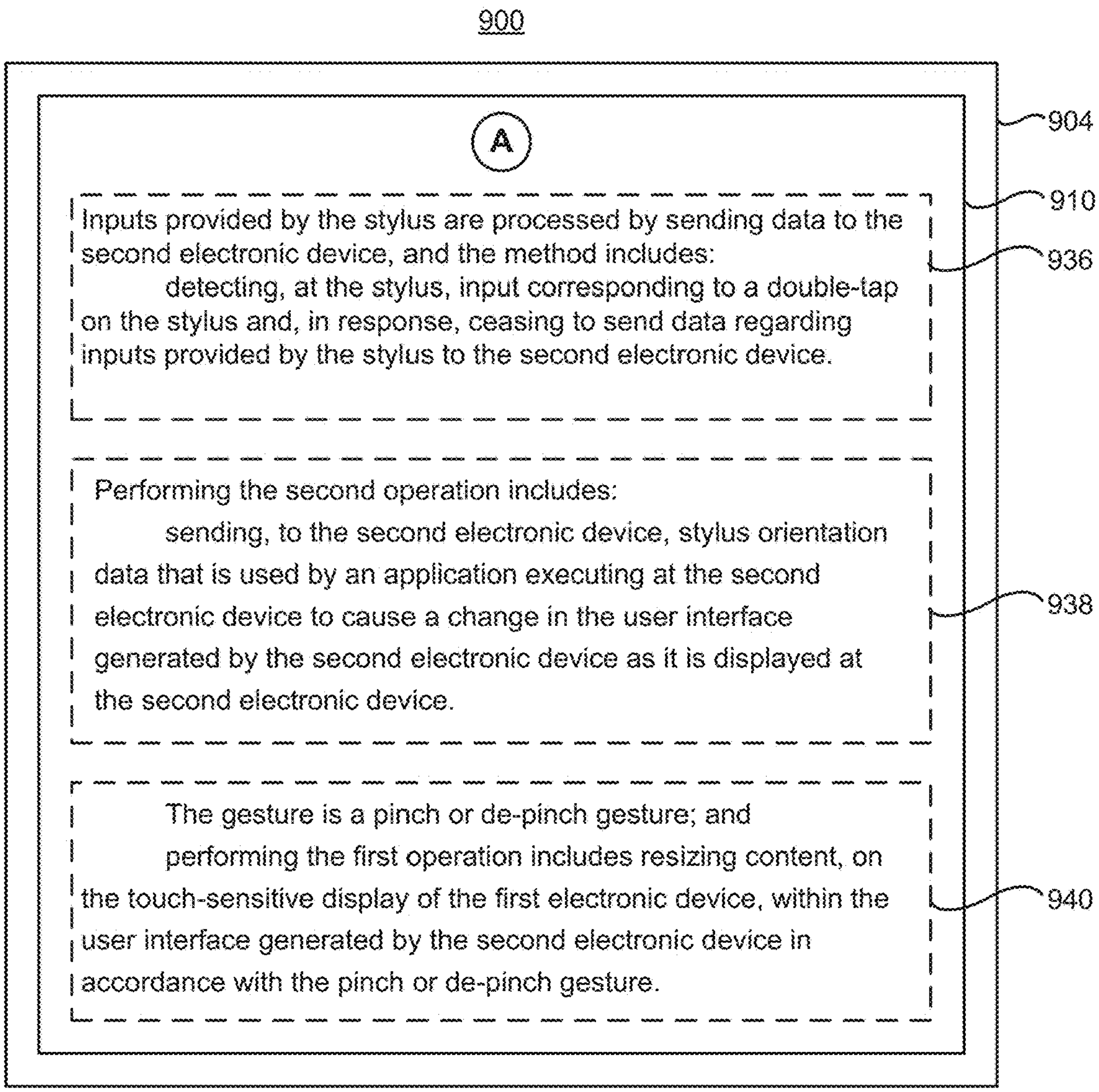

In some embodiments, as shown in FIG. 9E, inputs provided by the stylus are processed by sending data to the second electronic device, and the method includes: detecting (936), at the stylus, input corresponding to a double-tap on the stylus and, in response, ceasing to send data regarding inputs provided by the stylus to the second electronic device.

In some embodiments, the double-tap includes two consecutive tap inputs on the stylus, where a first tap is received followed by a second tap received within a predetermined time threshold thereafter (e.g., 50 or 60 ms). In some embodiments, the stylus is used to provide inputs that are processed by the second electronic device, but users may also be interested in enabling the stylus to work with other tablet-device features (including certain drawing features). As such, it is desirable to allow users to perform a double tap on the stylus to revert the stylus back to working with tablet-device features, thereby allowing users to easily switch back-and-forth between using a stylus to provide inputs at the second device (e.g., cursor-control inputs), or using the stylus to perform operations processed by the first device (e.g., drawing inputs)

In some embodiments, performing (938) the second operation includes sending, to the second electronic device, stylus orientation data that is used by an application executing at the second electronic device to cause a change in the user interface generated by the second electronic device as it is displayed at the second electronic device. In some embodiments, stylus orientation data includes the pressure the user is exerting on the display with the stylus, the coordinates of the stylus on the display, and the acceleration, and velocity of stylus strokes.

In some embodiments, the gesture is a pinch or de-pinch gesture; and performing (940) the first operation includes resizing content, on the touch-sensitive display of the first electronic device, within the user interface generated by the second electronic device in accordance with the pinch or de-pinch gesture (e.g., the example pinch and de-pinch gestures depicted in FIGS. 4EEE-4GGG). In some embodiments, when there is a lift-off of the two contacts on the touch-sensitive display, the resized content will revert to its original size.

Allowing users to have access to a gesture that includes a two-finger pinch or de-pinch enables access to resize content, which would otherwise be difficult to access, and would result in frustration for users. As such, this gesture enhances operability of the device and improves the human-machine interface.

It should be understood that the particular order in which the operations in the method 900 have been described is merely one example and is not intended to indicate that the described order is the only order in which the operations could be performed. One of ordinary skill in the art would recognize various ways to reorder the operations described herein.

Below is described a method 1000 of providing at a first electronic device (e.g., a laptop device) selectable options to change display properties of a user interface (e.g., maximize the user interface at the display of the first device) and to send the user interface to a second electronic device (e.g., a tablet device). The method 1000 is performed at a first electronic device that includes a touch-sensitive display. Some operations in method 1000 are, optionally, combined and/or the order of some operations is, optionally, changed.

In some embodiments, the method 1000 is performed at a first electronic device (e.g., laptop illustrated in FIG. 1A) that includes a display (1001). The method can include: displaying 1002, on the display, a user interface that is associated with an application, the user interface displayed with a control user interface element (e.g., the maximize button 196 of FIGS. 4G-4E) for changing a display property of (only) the user interface (e.g., a display property may include: size, display location, etc. of the user interface); detecting (1004) an input directed to (hover or right click) the control user interface element. The method may optionally include that the input over the control user interface element is made by a right-click or a hover operation at the first electronic device (1006). In some embodiments a hover operation may require the input to remain over the control user interface element for a specific period of time (e.g., 0.5 seconds), without making contact with the display during that period of time.

Additionally, following from operation 1004, in response to detecting the input, and while continuing to display the user interface (1008), the method 1000 includes concurrently displaying (1010) on the display: a first selectable option for changing the display property of the user interface on the display of the first electronic device (e.g., selectable option 191 displayed in FIG. 4G); and a second selectable option for requesting display at a second electronic device, distinct from the first electronic device, of a user interface that includes content from the user interface (e.g., selectable option 192, FIG. 4G).

In some embodiments, the first electronic device is a laptop or a desktop computer running desktop/laptop operating system, and the second electronic device is an electronic tablet device operating system, as shown in FIGS. 4A-4G. A display property includes the size of the user interface, and the location of the user interface within the display. In some embodiments, the first and second selectable options are shown in a drop down menu below the control user interface element. The selectable options can be displayed in response to a hover input or a right-click input over the control user interface element, as shown for the input depicted over control user interface element 196 in FIG. 4F.

Changing the arrangement of user interfaces running on multiple displays can at times involve performance of repeated dragging operations or use of multiple keyboard commands to achieve a desired orientation. Allowing a user to be able to select a single control user interface element that populates a list of a plurality of selectable options for changing a display property (e.g., maximize window, send to another display, etc.) ensures that a minimal number of inputs is utilized to change such display properties. Reducing the number of inputs to change these display properties enhances the operability of the device and makes the human machine interface more efficient (e.g., by helping the user to reduce the number of inputs needed to send a user interface to some other device), which, additionally, reduces power usage and improves battery life of the device by enabling the user to use the device more quickly and efficiently.

In some embodiments, the method 1000 includes: receiving (1016) a selection of the first selectable option; and in response to receiving the selection of the first selectable option, changing a display property of the user interface on the display of the first electronic device (e.g., in response to an input over the first selectable option 191 (FIG. 4G), then the user interface window is displayed in a full screen size).

In some embodiments, changing (1020) the display property of the user interface includes maximizing the user interface to fill substantially all of the display of the first electronic device. In some embodiments, maximizing the user interface fills the entirety of the display, and hides all menu bars and docks, leaving only the user interface associated with the application. In some embodiments, maximizing means the user interface fills all of the display except for portions where the menu bar and dock are still displayed. Allowing a user to adjust a display property without having to interact with a separate button enhances the operability of the device by reducing the number of inputs needed to perform an operation (e.g., by having control user interface element be a multifunctional user interface element), which additionally, reduces power usage and improves battery life of the device by enabling the user to use the device more quickly and efficiently.

A display property includes the size of the user interface, and the location of the user interface within the display. Allowing a user to adjust a display property without having to interact with a separate button enhances the operability of the device by providing additional control options without cluttering the user interface with additional displayed controls (e.g., by having control user interface element be a multifunctional user interface element), which additionally, reduces power usage and improves battery life of the device by enabling the user to use the device more quickly and efficiently.

In some embodiments, instead of utilizing a maximize button as the control user interface element, a minimize button can instead be used. In such embodiments, the first selectable option can cause minimization of the user interface window. And, in such embodiments, changing (1018) the display property of the user interface includes minimizing the user interface of the first electronic device. In some embodiments, an animation may be associated with the minimization process. In another embodiment, the active window may minimize to an icon displayed on the dock at the second electronic device when it is running in a companion-display mode. Allowing a user to adjust a display property without having to interact with a separate button enhances the operability of the device by reducing the number of inputs needed to perform an operation (e.g., by having control user interface element be a multifunctional user interface element), which additionally, reduces power usage and improves battery life of the device by enabling the user to use the device more quickly and efficiently.

Figure 10A:
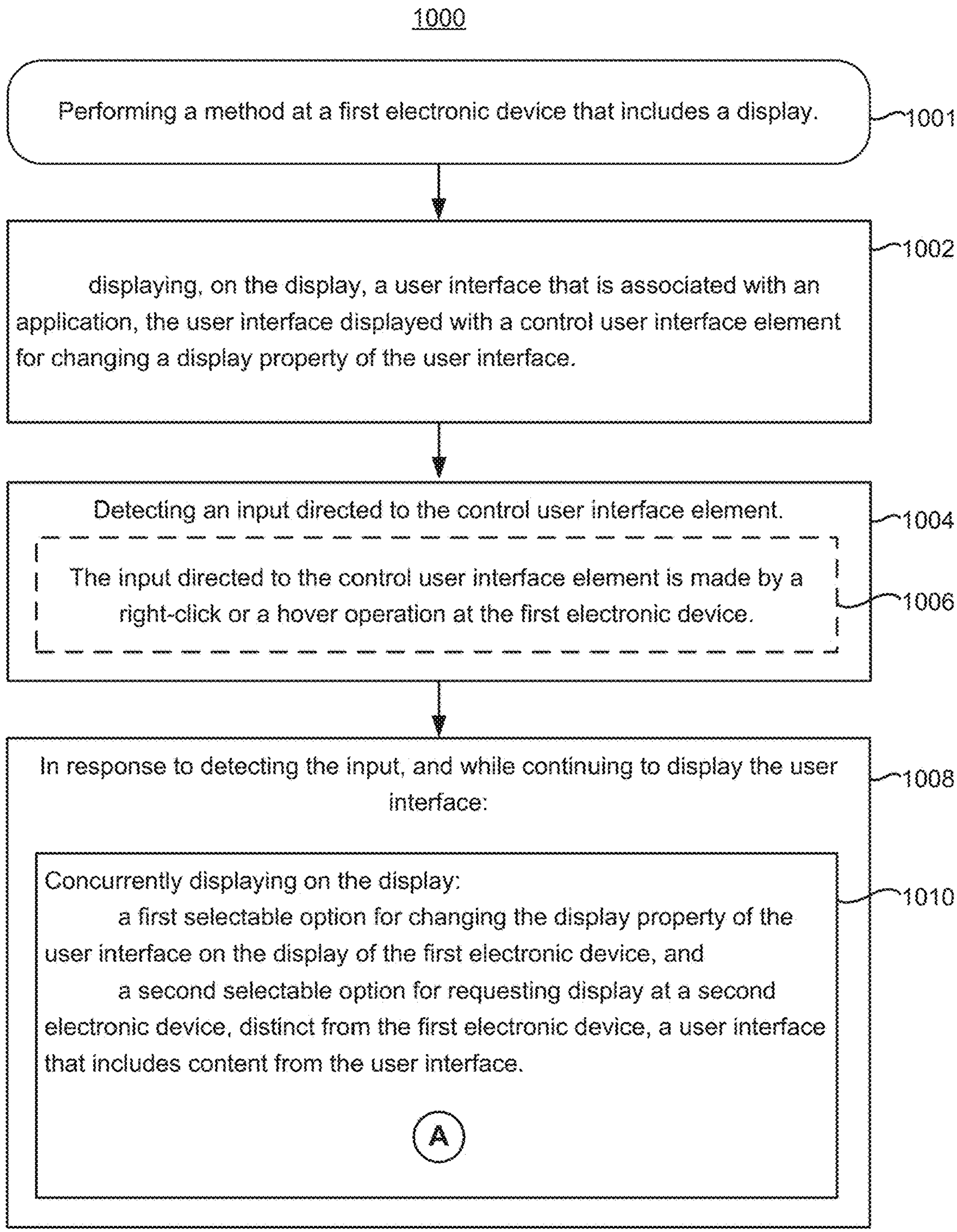
FIGS. 10A-10C are flowcharts of methods for interacting with a control user interface element to invoke a companion-display mode, in accordance with some embodiments.
Figure 10B:
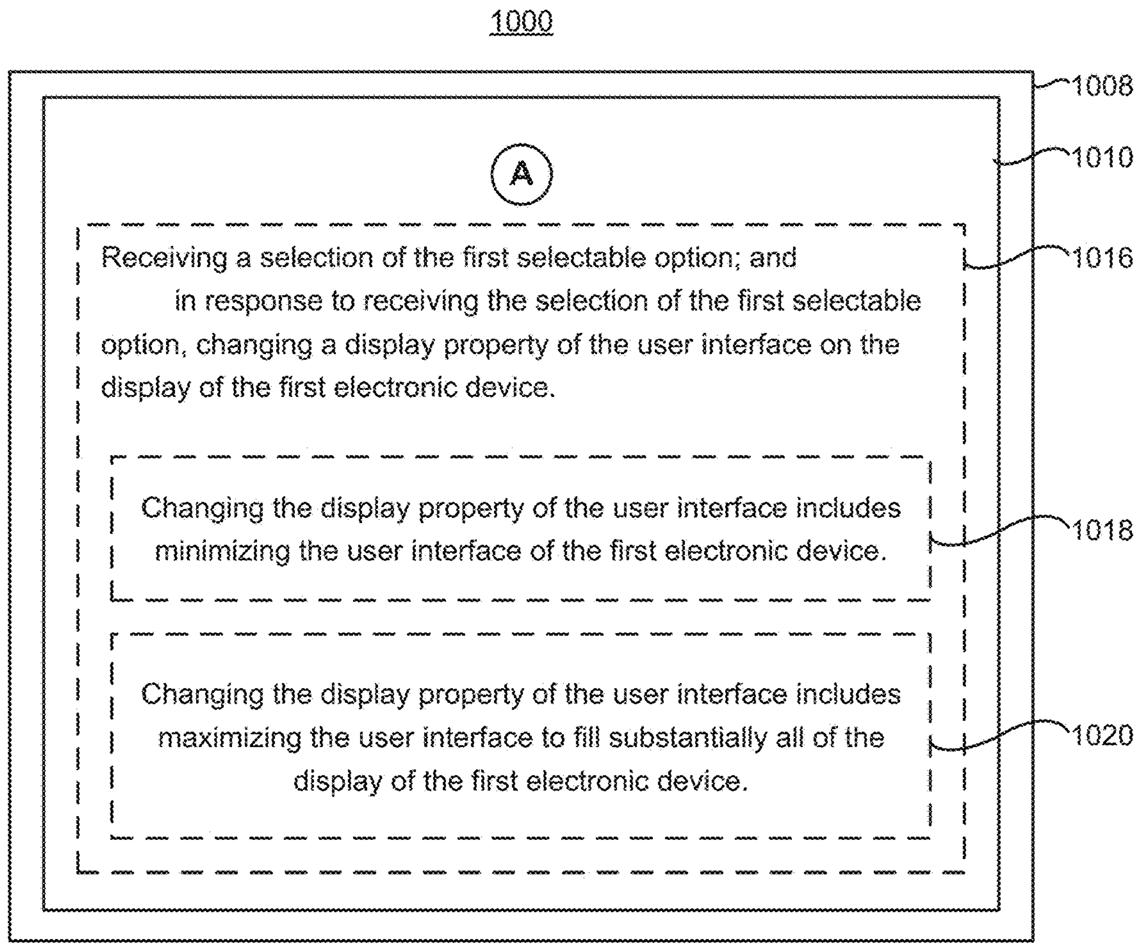
Figure 10C:
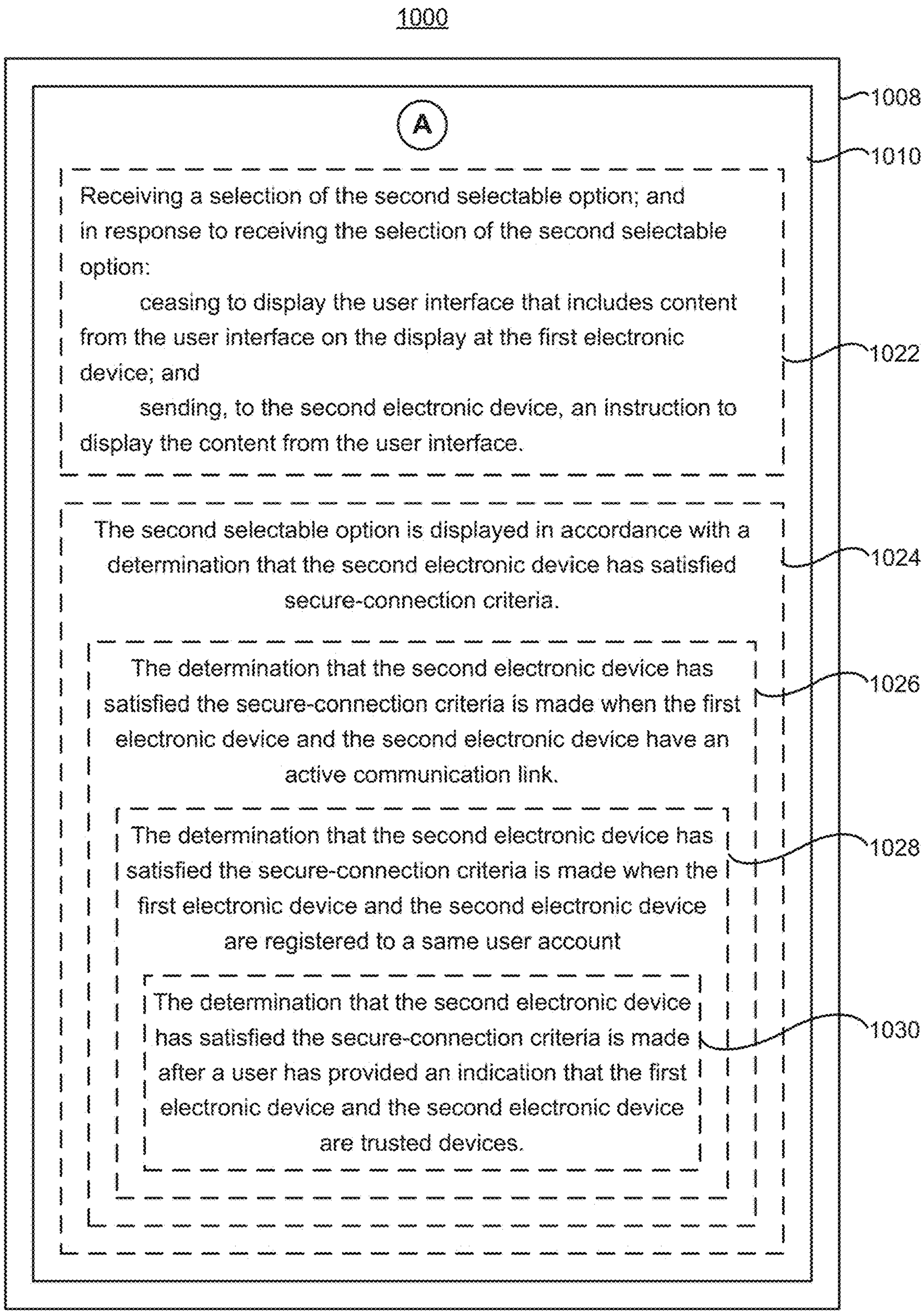

In some embodiments, and with reference now to FIG. 10C, the method 1000 optionally includes: receiving (1022) a selection of the second selectable option; and in response to receiving the selection of the second selectable option: ceasing to display the user interface that includes content from the user interface on the display at the first electronic device; and sending, to the second electronic device, an instruction to display the content from the user interface (e.g., as illustrated by the transition from FIG. 4H to FIG. 4I).

In some embodiments, the instruction to display the content from the user interface includes instructions for resizing the user interface in order to fit on the second electronic device, as shown in FIG. 4H-4I. In one example, after ceasing to display the user interface that includes content from the user interface, a second user interface is shown that works in conjunction with the user interface that was ceased to be displayed on the first electronic device (e.g., the laptop). Typically, moving one user interface from one display to a second display involves dragging the user interface from one location to another, and may involve multiple dragging gestures to get the desired orientation of the user interface. Allowing a user to make a single selection of the second selectable option allows the user to quickly send the desired user interface to a second display (e.g., the second electronic device) ensure that minimal inputs are required to send the user interfaces for display at a new touch sensitive display. Reducing the number of inputs to send user interfaces to other devices enhances the operability of the device and makes the human machine interface more efficient (e.g., by helping reduce the number of gestures the user needs to make to move interfaces) which, additionally, reduces power usage and improves battery life of the device by enabling the user to use the device more quickly and efficiently.

In some embodiments, the second selectable option is displayed in accordance with a determination that the second electronic device has satisfied secure-connection criteria (e.g., trusted connection 195 in FIG. 4G) (1024). Example criterion of the secure-connection criteria include one or more criterion selected from the following: a criterion that is satisfied when the first and second devices have an active communication link (wired or wireless), a criterion that is satisfied when the first electronic device and the second electronic device are registered to a same user account, and a criterion that is satisfied when a user has provided an indication that the first electronic device and the second electronic device are trusted devices. Limiting the selectable options to devices that are physically or wirelessly connected to the first electronic device ensures that devices that are unavailable, but still registered to the same user account are not shown. Performing an operation when a set of conditions has been met without requiring further user input enhance the operability of the device and makes the user-device interface more efficient (e.g., by not requiring the user to determine whether or not a device is available or not), which, additionally, reduces power usage and improves battery life of the device by enabling the user to use the device more quickly and efficiently.

In some embodiments, and as is also shown in FIG. 10C, the determination that the second electronic device has satisfied the secure-connection criteria is made when the first electronic device and the second electronic device have an active communication link (1026). In some embodiments, the wireless connection is established through a plurality of networks, (e.g., a Wi-Fi network, a Bluetooth network, or Near Field Communications (NFC) network. In some embodiments, the first electronic device may be continuously scanning for other devices on one of these networks, and when the detected, will update the selectable options available within the user interface.

In some embodiments, the determination that the second electronic device has satisfied the secure-connection criteria is made when the first electronic device and the second electronic device are registered to a same user account (e.g., FIG. 4A "Ari's user account is registered on both the tablet device 100, and the laptop 300) (1028). In some embodiments, the user account is an ICLOUD™ ACCOUNT offered by APPLE INC. of Cupertino, Calif. In such embodiments, a user is required to sign into their user account on both devices prior to activating features, as shown in FIG. 4A. In some embodiments, when the first connection is made the electronic devices show prompts for users to log into their user accounts to allow this the companion-display mode to operate.

In some embodiments, the determination that the second electronic device has satisfied the secure-connection criteria is made after a user has provided an indication that the first electronic device and the second electronic device are trusted devices (e.g., the trust prompt 413 in FIGS. 4B-4C). In some embodiments, a user may be prompted on either the first electronic device (e.g., the laptop), the second electronic device (e.g., the tablet device), or both devices to trust the other device. In some embodiments, the confirmation to trust the other device occurs immediately after the physical connection between the two devices is made.

It should be understood that the particular order in which the operations in the method 1000 have been described is merely one example and is not intended to indicate that the described order is the only order in which the operations could be performed. One of ordinary skill in the art would recognize various ways to reorder the operations described herein.

Next is described a method 1100 of receiving a request to annotate content at a first electronic device (e.g., a laptop device) and then determining whether to display a selectable option to allow for selecting a device at which to annotate the content or to send an instruction to a second device (which is available and which has been previously approved) to display content in the annotation mode. The method 1100 is performed at a first electronic device that includes a touch-sensitive display. Some operations in method 1100 are, optionally, combined and/or the order of some operations is, optionally, changed.

The method 1100 can be performed at a first electronic device that includes a display device (1101), and the method 1100 includes: receiving (1102) a request to annotate content on the first electronic device. In some embodiments, the request to annotate content is a request to take a screenshot of the content on the first electronic device (e.g., screenshot 601 in FIG. 6A) (1104).

In some embodiments, a screenshot is taken through a combination of key inputs on a keyboard on the second electronic device. In other embodiments, a screenshot is taken by user selecting an area with the cursor to take the screenshot of. When a user takes a screenshot, usually they are trying to share something on their screen with someone else, as such allowing a user to quickly, with minimal inputs, enter an annotation mode to annotate the screenshot is convenient. Reducing the number of inputs needed to perform an operation enhances the operability of the device and makes the user-device interface more efficient (e.g., by providing a shortcut to the annotation mode in certain conditions, such as a taking a screenshot), which, additionally, reduces power usage and improves battery life of the device by enabling the user to use the device more quickly and efficiently.

Continuing from operation 1102, in response to receiving (1106) the request, the method 1100 includes: in accordance with a determination that a second electronic device, distinct from the first electronic device, is available for displaying the content in an annotation mode and that using the second electronic device to display the content in the annotation mode has not previously been approved, displaying, via the display device, a selectable option that, when selected, causes the first electronic device to send an instruction to display the content in the annotation mode at the second electronic device (1108) (e.g., a prompt for picking the electronic device for annotation mode, as shown in FIG. 6D). In some embodiments, an annotation is a mode in which inputs are received at certain locations over content and then those inputs are used to annotate the content, including to draw lines, circles, handwriting, shapes, etc.).

Also in response to receiving the request, the method 1100 includes: in accordance with a determination that the second electronic device is available for displaying the content in the annotation mode and that using the second electronic device to display the content in the annotation mode has previously been approved (e.g., the second electronic device has already been selected as a device to use for annotating content that was displayed on the first electronic device), sending an instruction to the second electronic device to display the content in the annotation mode automatically without further user intervention (e.g., as shown in Screenshot 601 on the tablet device 100 in FIG. 6E-6H) (1110).

In some embodiments, if a user has already indicated that the second electronic device is approved to display content in the annotation mode, then it would waste time and require superfluous inputs to continuously require a user to reapprove that second device. Accordingly, responding to a request to annotate content by determining whether the second device is available for display content in the annotation mode, and whether that second device has been previously approved, ensures users do not waste time providing extra inputs to reapprove the second electronic device. In this way, the human-machine interface is improved and sustained interactions with the two different devices are made possible.

In some embodiments of the method 1100, the method includes: in response to receiving the request: in accordance with a determination that the second electronic device is not available to enter the annotation mode: ceasing (1112) to display the selectable option; and forgoing sending instructions to the second electronic device to display the additional content in the annotation mode. Not showing a selectable option is convenient to the user, because it signifies that the device is not available for the annotation mode. Providing this improved visual feedback enhances the operability of the device and makes the user-device interface more efficient (e.g., by not confusing the user as to which devise are available or not), which, additionally, reduces power usage and improves battery life of the device by enabling the user to use the device more quickly and efficiently.

Figure 11A:
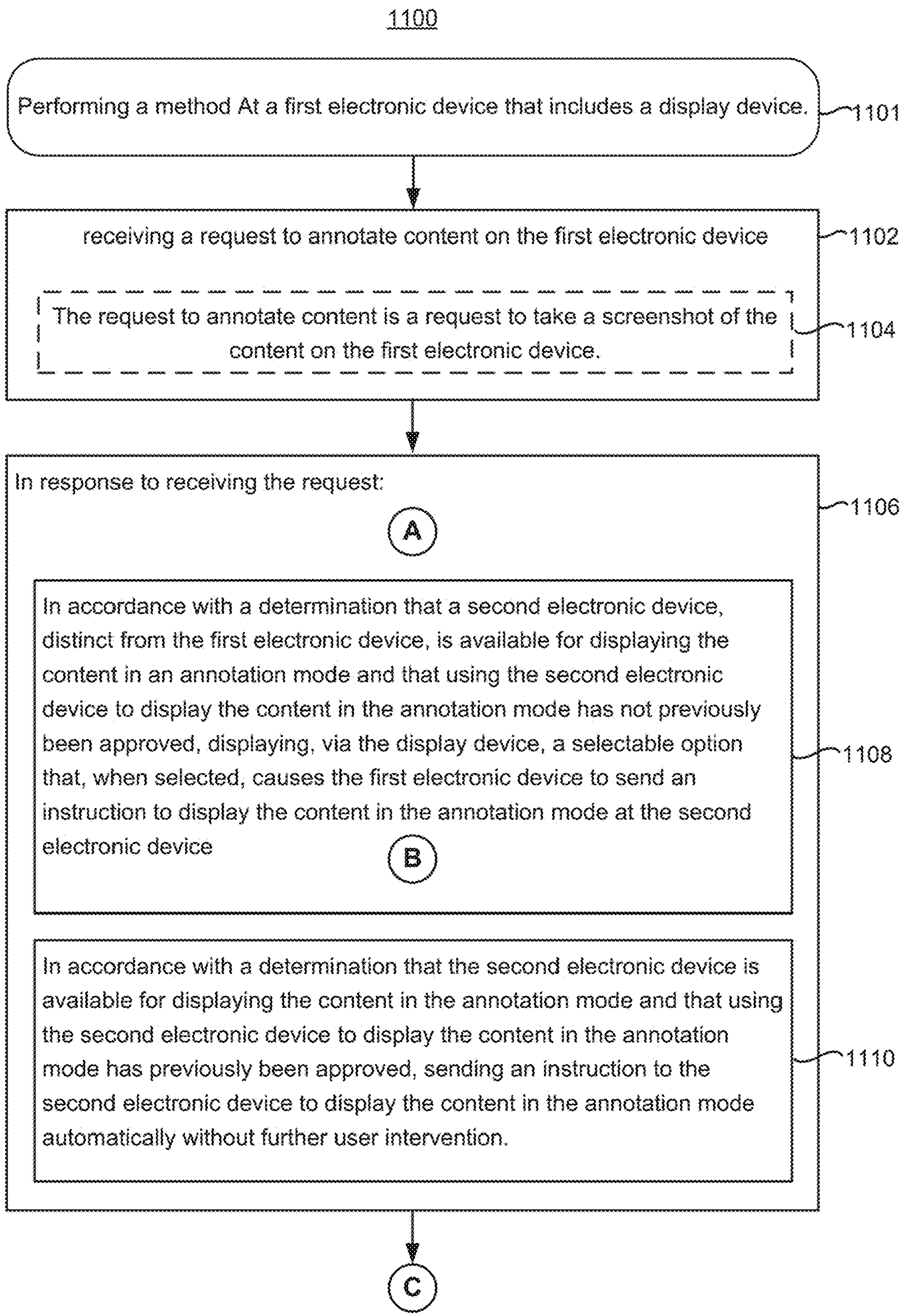
FIGS. 11A-11D are flowcharts of methods for sending content from one device to another device for use with an annotation mode, in accordance with some embodiments.
Figure 11B:
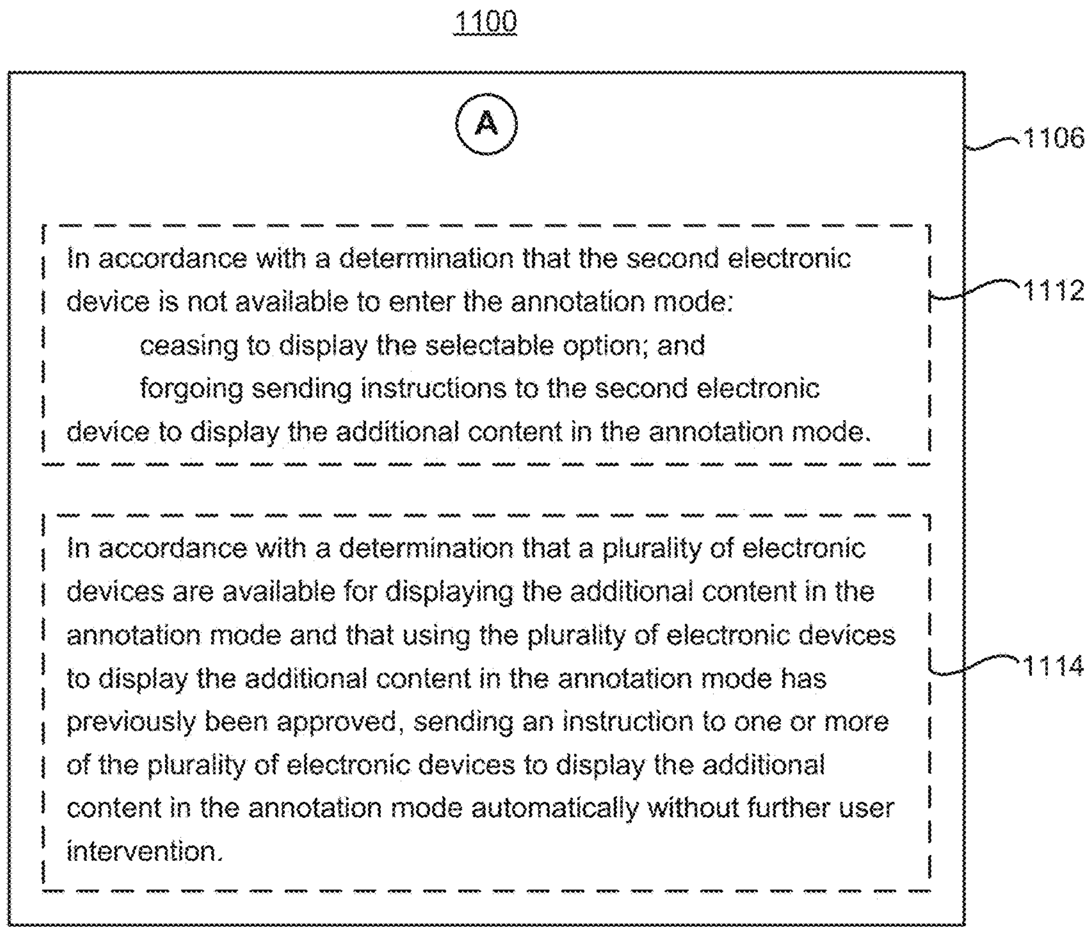

With continued reference to FIG. 11B, the method 1100 can also include: in response to receiving the request: in accordance with a determination that a plurality of electronic devices are available for displaying the additional content in the annotation mode and that using the plurality of electronic devices to display the additional content in the annotation mode has previously been approved, sending (1114) an instruction to one or more of the plurality of electronic devices to display the additional content in the annotation mode automatically without further user intervention.

Many devices have varying degrees of usability (e.g., some accept inputs from precise input devices, while others provide a larger display to work with). As such, it may be convenient for a user to be able to make annotations across multiple devices. Performing an operation when a set of conditions has been met without requiring further user input enhances the operability of the device and makes the user-device interface more efficient (e.g., by not requiring the user to exit the annotation mode, and making a second selection of a selectable option to use a second device), which, additionally, reduces power usage and improves battery life of the device by enabling the user to use the device more quickly and efficiently.

Figure 11C:
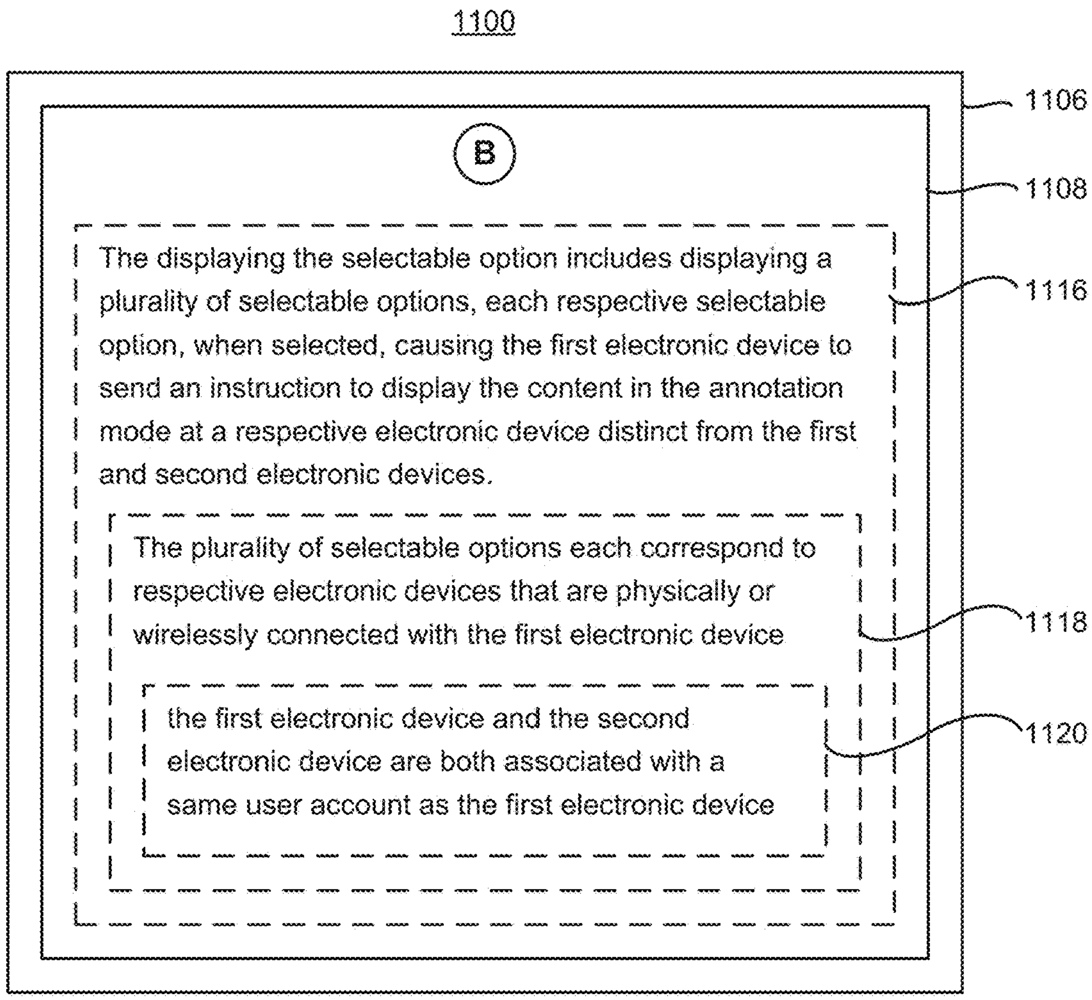

Now with reference to FIG. 11C, in some embodiments, the displaying the selectable option includes displaying a plurality of selectable options, each respective selectable option, when selected, causing (1116) the first electronic device to send an instruction to display the content in the annotation mode at a respective electronic device distinct from the first and second electronic devices. In some embodiments, the selectable options may show different representations of each available device. For example, if a mobile device such as a smart phone is set up for the annotation mode the selectable option may be a visual representation of the smart phone.

Selecting multiple devices to send an instruction to display the content in the annotation mode can be inconvenient and inefficient. Having a simplified menu that contains a plurality of selectable options representing devices is convenient, because it puts all the options in a single location without having to navigate to a settings page. Reducing the number of inputs needed to perform an operation enhances the operability of the device and makes the user-device interface more efficient (e.g., by allowing the user to quickly interface with devices that are approved for the annotation mode), which, additionally, reduces power usage and improves battery life of the device by enabling the user to use the device more quickly and efficiently.

In some embodiments, the plurality of selectable options each correspond to respective electronic devices that are physically or wirelessly connected with the first electronic device (1118). In some embodiments, a wireless connection may be made through a wired connection such as Universal Serial Bus (USB), or a wireless connection such as Bluetooth, Wi-Fi, and Near Field Communication (NFC). Limiting the selectable options to devices that are physically or wirelessly connected to the first electronic device ensures that devices that are unavailable, but still registered to the same user account are not shown. Performing an operation when a set of conditions has been met without requiring further user input enhances the operability of the device and makes the user-device interface more efficient (e.g., by not requiring the user to determine whether or not a device is available or not), which, additionally, reduces power usage and improves battery life of the device by enabling the user to use the device more quickly and efficiently.

In some embodiments, the first electronic device and the second electronic device are both associated with a same user account as the first electronic device (e.g., user account 193, connection 194, and trusted connection 195 of FIGS. 6A-6L) (1120). In some embodiments, the user account is an ICLOUD™ ACCOUNT offered by APPLE INC. of Cupertino, Calif. Registering a device to a user account includes signing into the user account on the electronic device.

When multiple devices are by the computer, for security purposes it is important that the devices that connect to the first electronic device are not unknown devices. Allowing the first electronic device to enter the annotation mode with devices that share the same user account as the first electronic device, helps ensure that there is a secure connection between the two devices, and does not require the user to select, which device they think is on the same account as theirs. Performing an operation when a set of conditions has been met without requiring further user input enhances the operability of the device and makes the user-device interface more efficient (e.g., by determining if the same user account is associated with both devices, and not displaying devices that aren't associated with the same user account), which, additionally, reduces power usage and improves battery life of the device by enabling the user to use the device more quickly and efficiently.

Figure 11D:
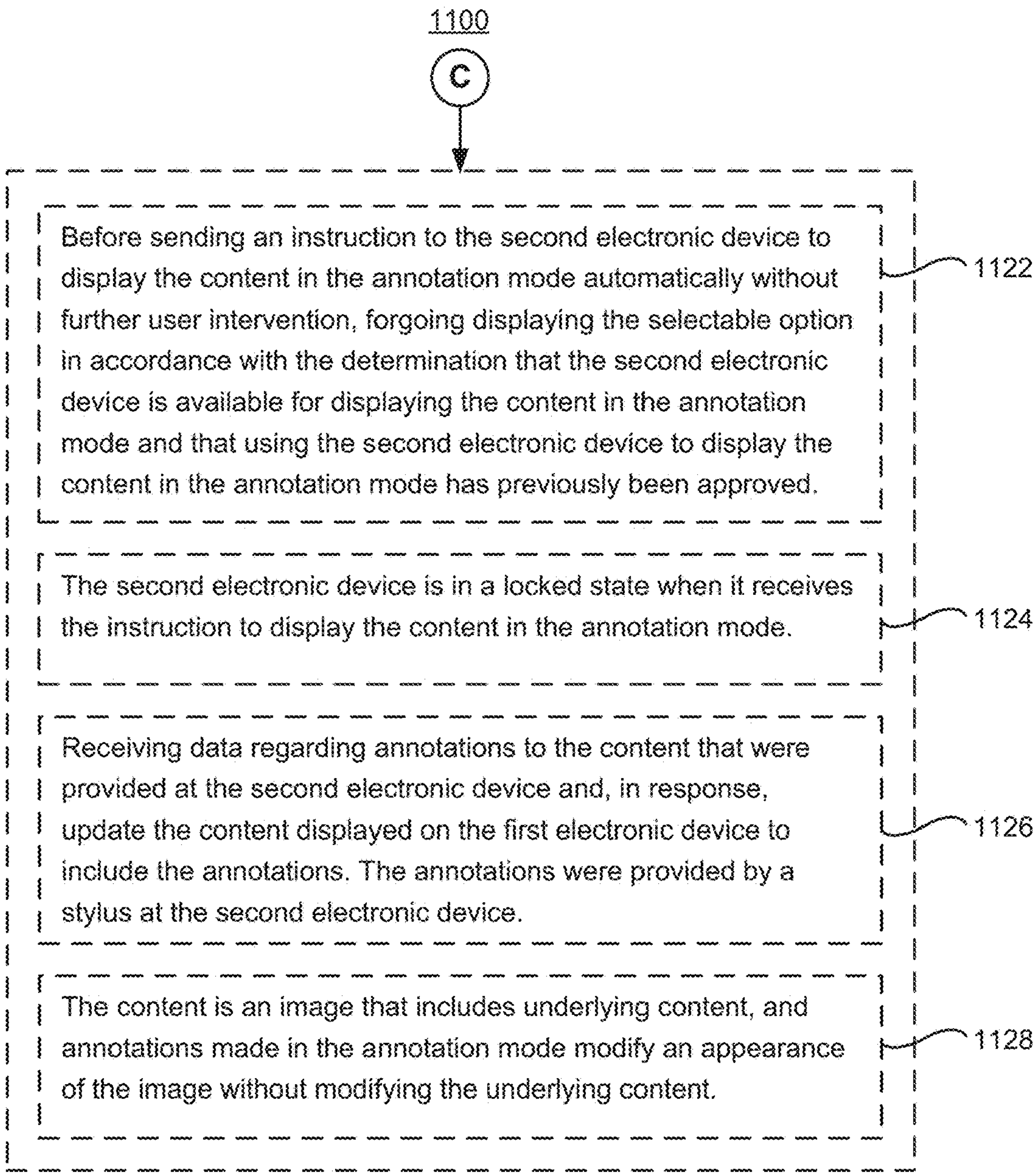

Attention is now directed to FIG. 11D, which shows that the method 1100 can optionally include: before sending an instruction to the second electronic device to display the content in the annotation mode automatically without further user intervention, forgoing (1122) displaying the selectable option in accordance with the determination that the second electronic device is available for displaying the content in the annotation mode and that using the second electronic device to display the content in the annotation mode has previously been approved.

In some embodiments, more than one device may be put in the annotation mode automatically without further user intervention. Optionally, a user may choose to have only on preferred device, when entering the annotation mode. If a user has already indicated that the second electronic device is approved to display content in the annotation mode, then it would be wasteful to make the user repeatedly make the user approve the second electronic device. Accordingly, by foregoing displaying the selectable option in accordance with the determination that the second electronic device is available for displaying the content in the annotation mode ensures users do not waste time have reselecting the second electronic device, due to the device performing the operation when a set of conditions has been met without requiring further user input. By this method, the device's operability is enhanced by reducing the number of inputs needed to perform an operation (e.g., entering the annotation mode).

In some embodiments, the second electronic device is in a locked state when it receives the instruction to display the content in the annotation mode (1124) (an example of this is shown in FIGS. 6A-6E, where content for use in an annotation mode is sent from the laptop device to the table device even though the tablet device started in a locked state). Allowing situations where the second electronic device remains in a locked state, but also allows instruction to display the content in the annotation mode, can speed up the interaction process without comprising security. Providing a limited access mode enhances the operability of the device and makes the user-device interface more efficient (e.g., by allowing a user to quickly interact with the annotation mode without having to exit the locked state) which, additionally, reduces power usage and improves battery life of the device by enabling the user to use the device more quickly and efficiently.

In some embodiments, the method 1100 can include receiving (1126) data regarding annotations to the content that were provided at the second electronic device and, in response, updating the content displayed on the first electronic device to include the annotations (e.g., as shown as line inputs 611, 613, 615 are synchronously displayed at both devices in FIGS. 6E-6H). The annotations can be provided by a stylus at the second electronic device (e.g., stylus 484 in FIGS. 6E-6H).

In some embodiments, knowing that the annotations were provided with a stylus may result in certain annotation settings on the first electronic device to appear. When interacting with the same content on two separate devices, it can become confusing to the user if the inputs do not cause a change at both devices. Accordingly, requiring that the annotations from the second electronic device are transferred to the first electronic device, and vice versa, helps stop the user from making redundant inputs. In this way, a user will not make duplicative inputs due to no visual feedback on one of the devices, which, additionally, reduces power usage and improves battery life of the device by enabling the user to use the device more quickly and efficiently.

Finally, as shown in FIG. 11D, in some embodiments, the content is an image (e.g., screenshot 601 from FIG. 6B is an example image, and other images could be photos, images of documents, and other like content) that includes underlying content, and annotations made in the annotation mode modify an appearance of the image without modifying the underlying content (1128).

When a user annotates an image, it is usually to emphasize a portion of the image or make some other comment about the image. Allowing a user to change an appearance of the image (e.g., make a note on top of it) without comprising the underlying content, makes creating annotations more simple. For example, if a user was using the eraser function, and wanted to erase just an annotation, it would be inconvenient and unintuitive if the eraser also erased the underlying image they were trying to annotate. Providing additional control options without cluttering the user interface with additional displayed controls enhances the operability of the device and makes the user-device interface more efficient (e.g., by not allowing the user to edit the underlying content), which, additionally, reduces power usage and improves battery life of the device by enabling the user to use the device more quickly and efficiently.

It should be understood that the particular order in which the operations in the method 1100 have been described is merely one example and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a first electronic device that includes a display:
- logging the first electronic device into a first user account;
- displaying, on the display, a user interface that is associated with an application, the user interface comprising: (i) content, and (ii) a control user interface element;
- detecting an input directed to the control user interface element; and
- in response to detecting the input, and while continuing to display the user interface:
  - concurrently:
    - displaying, on the display, a first selectable option for changing the size or location of the user interface on the display of the first electronic device; and
    - in accordance with a determination that a second electronic device is also logged into the first user account, displaying on the display a second selectable option for requesting display at the second electronic device, distinct from the first electronic device, of the user interface.

2. The method of claim 1, comprising:

receiving a selection of the second selectable option; and in response to receiving the selection of the second selectable option:
- ceasing to display the user interface on the display at the first electronic device; and
- sending, to the second electronic device, an instruction to display the user interface.

3. The method of claim 1, wherein the second selectable option is displayed in accordance with a determination that the second electronic device has satisfied secure-connection criteria.

4. The method of claim 3, wherein the determination that the second electronic device has satisfied the secure-connection criteria is made when the first electronic device and the second electronic device have an active communication link.

5. The method of claim 4, wherein the determination that the second electronic device has satisfied the secure-connection criteria is made when the first electronic device and the second electronic device are registered to a same user account.

6. The method of claim 5, wherein the determination that the second electronic device has satisfied the secure-connection criteria is made after a user has provided an indication that the first electronic device and the second electronic device are trusted devices.

7. The method of claim 1, comprising:
- receiving a selection of the first selectable option; and
- in response to receiving the selection of the first selectable option, changing the size or location of the user interface on the display of the first electronic device.

8. The method of claim 7, wherein changing the size of the user interface includes minimizing the user interface of the first electronic device.

9. The method of claim 7, wherein changing the size of the user interface includes maximizing the user interface to fill substantially all of the display of the first electronic device.

10. The method of claim 1, wherein the input over the control user interface element is made by a right-click or a hover operation at the first electronic device.

11. A non-transitory computer-readable storage medium storing executable instructions that, when executed by one or more processors of a first electronic device with a display, cause the first electronic device to:
- log the first electronic device into a first user account;
- display, on the display, a user interface that is associated with an application, the user interface comprising: (i) content, and (ii) a control user interface element;
- detect an input directed to the control user interface element; and
- in response to detecting the input, and while continuing to display the user interface:
  - concurrently:
    - display, on the display, a first selectable option for changing the size or location of the user interface on the display of the first electronic device; and
    - in accordance with a determination that a second electronic device is also logged into the first user account, display on the display a second selectable option for requesting display at the second electronic device, distinct from the first electronic device, of the user interface.

12. The non-transitory computer readable storage medium of claim 11, wherein the executable instructions that, when executed by the one or more processors of the first electronic device, also cause the first electronic device to:
- receive a selection of the second selectable option; and
- in response to receiving the selection of the second selectable option:
  - cease to display the user interface on the display at the first electronic device; and
  - send, to the second electronic device, an instruction to display the user interface.

13. The non-transitory computer readable storage medium of claim 11, wherein the second selectable option is displayed in accordance with a determination that the second electronic device has satisfied secure-connection criteria.

14. The non-transitory computer readable storage medium of claim 13, wherein the determination that the second electronic device has satisfied the secure-connection criteria is made when the first electronic device and the second electronic device have an active communication link.

15. The non-transitory computer readable storage medium of claim 14, wherein the determination that the second electronic device has satisfied the secure-connection criteria is made when the first electronic device and the second electronic device are registered to a same user account.

16. The non-transitory computer readable storage medium of claim 15, wherein the determination that the second electronic device has satisfied the secure-connection criteria is made after a user has provided an indication that the first electronic device and the second electronic device are trusted devices.

17. The non-transitory computer readable storage medium of claim 11, wherein the executable instructions that, when executed by the one or more processors of the first electronic device, also cause the first electronic device to:
- receive a selection of the first selectable option; and
- in response to receiving the selection of the first selectable option, change the size or location of the user interface on the display of the first electronic device.

18. The non-transitory computer readable storage medium of claim 17, wherein changing the size of the user interface includes minimizing the user interface of the first electronic device.

19. The non-transitory computer readable storage medium of claim 17, wherein changing the size of the user interface includes maximizing the user interface to fill substantially all of the display of the first electronic device.

20. A first electronic device, comprising:
- one or more processors;
- a display; and
- memory storing one or more programs that are configured for execution by the one or more processors, the one or more programs including instructions for:
  - logging the first electronic device into a first user account;
  - displaying, on the display, a user interface that is associated with an application, the user interface comprising: (i) content, and (ii) a control user interface element;
  - detecting an input directed to the control user interface element; and
  - in response to detecting the input, and while continuing to display the user interface:
    - concurrently:
      - displaying, on the display, a first selectable option for changing the size or location of the user interface on the display of the first electronic device; and
      - in accordance with a determination that a second electronic device is also logged into the first user account, displaying on the display a second selectable option for requesting display at the second electronic device, distinct from the first electronic device, of the user interface.

21. The non-transitory computer readable storage medium of claim 11, wherein the input over the control user interface element is made by a right-click or a hover operation at the first electronic device.

22. The first electronic device of claim 20, wherein the one or more programs include instructions for:
receiving a selection of the second selectable option; and
in response to receiving the selection of the second selectable option:
ceasing to display the user interface on the display at the first electronic device; and
sending, to the second electronic device, an instruction to display the user interface.

23. The first electronic device of claim 20, wherein the second selectable option is displayed in accordance with a determination that the second electronic device has satisfied secure-connection criteria.

24. The first electronic device of claim 23, wherein the determination that the second electronic device has satisfied the secure-connection criteria is made when the first electronic device and the second electronic device have an active communication link.

25. The first electronic device of claim 24, wherein the determination that the second electronic device has satisfied the secure-connection criteria is made when the first electronic device and the second electronic device are registered to a same user account.

26. The first electronic device of claim 25, wherein the determination that the second electronic device has satisfied the secure-connection criteria is made after a user has provided an indication that the first electronic device and the second electronic device are trusted devices.

27. The first electronic device of claim 20, wherein the one or more programs include instructions for:
receiving a selection of the first selectable option; and
in response to receiving the selection of the first selectable option, changing the size or location of the user interface on the display of the first electronic device.

28. The first electronic device of claim 27, wherein changing the size of the user interface includes minimizing the user interface of the first electronic device.

29. The first electronic device of claim 27, wherein changing the size of the user interface includes maximizing the user interface to fill substantially all of the display of the first electronic device.

30. The first electronic device of claim 20, wherein the input over the control user interface element is made by a right-click or a hover operation at the first electronic device.

* * * * *